US 6,567,176 B1

(12) United States Patent
Jeyachandran et al.

(10) Patent No.: US 6,567,176 B1
(45) Date of Patent: *May 20, 2003

(54) INFORMATION PROCESSING APPARATUS AND CONTROL METHOD THEREFOR

(75) Inventors: Suresh Jeyachandran, Yokohama (JP); Shouichi Ibaraki, Tokyo (JP); Masayuki Takayama, Kashiwa (JP); Aruna Rohra Suda, Yokohama (JP); Masanori Wakai, Tokyo (JP); Kenichi Fujii, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,032

(22) Filed: Dec. 24, 1997

(30) Foreign Application Priority Data

Dec. 26, 1996 (JP) .............................. 8-348025
Feb. 28, 1997 (JP) .............................. 9-044525
Mar. 6, 1997 (JP) .............................. 9-051727

(51) Int. Cl.$^7$ ................................. B41J 3/00
(52) U.S. Cl. .................... 358/1.14; 358/1.01; 358/1.02; 358/1.1; 358/1.12
(58) Field of Search ............................... 395/101, 102, 395/110, 112, 114; 358/1.01, 1.02, 1.1, 1.12, 1.14

(56) References Cited

U.S. PATENT DOCUMENTS

| | | | | |
|---|---|---|---|---|
| 4,851,922 A | * | 7/1989 | Takayama et al. | 358/451 |
| 5,689,755 A | * | 11/1997 | Ataka | 399/8 |
| 5,999,708 A | * | 12/1999 | Kajita | 395/114 |

FOREIGN PATENT DOCUMENTS

| | | | | |
|---|---|---|---|---|
| EP | 0469865 | 2/1992 | .......... | G06K/15/00 |
| EP | 0577087 | 1/1994 | .......... | G06K/15/00 |
| EP | 0674289 | 9/1995 | .......... | G06K/15/02 |
| EP | 0749064 | 12/1996 | ............ | G06K/3/12 |

OTHER PUBLICATIONS

About DCF 1.3, 1987.*
OS/390 V2R7.0 JES2 Messages, 1988.*
OS/390 V2R4.0 JES2 Introduction, 1990.*
OS/390 V2R7.0 JES2 Initialization And Tuning Guide, 1988.*
OS/390 V2R7.0 JES2 Commands, 1988.*
OS V1R1MO MVS JCL Reference.*

* cited by examiner

Primary Examiner—Mark Zimmerman
Assistant Examiner—Lance W. Sealey
(74) Attorney, Agent, or Firm—Fitzpatrick, Cella, Harper & Scinto

(57) ABSTRACT

A server machine receives a printing job, including information to be printed, and a first print parameter, and based on that information, sets a second print parameter that is suitable for the information and also alters the first print parameter. A printer prints the received information based on the printing parameters that are set or changed. Further, users who submit information that is received are identified and the printed results are stored at storage locations that differ for each user. In addition, information may be requested from an external device, and the requested information printed when it is received. Furthermore, information that is input may be transmitted to external devices to request that those devices process that information. Moreover, when an output device that is designated by a received output instruction is a locally owned apparatus, the apparatus performs the processing as instructed. When a designated output device is another device, external transmission of the output instruction is performed.

7 Claims, 156 Drawing Sheets

FIG. 13

| KINDS OF JOB | CONDITION | NOTIFICATION IN ADVANCE |
|---|---|---|
| INFORMATION RECEPTION | | NO |
| INFORMATION TRANSMISSION | DURING OFFICE HOURS | YES |
| STATUS NORMAL | | NO |
| STATUS ABNORMAL | | YES |
| OTHERS | | YES |

FIG. 17

| INTERROGATION WINDOW |
|---|

PRINTING CANNOT BE EFFECTED BY
ANY PRINTER WHICH YOU CAN USE
CHANGE TONER OF PRINTER 104 OR
FEED PAPER OF PRINTER 103

| YES | NO |
|---|---|

| JOB EXECUTION CONDITION | JOB EXECUTION CONTENTS |
|---|---|
| NO INPUT & NO JOB & POWER SUPPLY OFF PRACTICABLE PERIOD OF TIME | POWER SUPPLY OFF |

PRINT WINDOW

FILE NAME [FILE A]

[PRINT] [CANCEL]

| JOB EXECUTION CONDITION | JOB EXECUTION CONTENTS |
|---|---|
| UNCONDITIONAL | ANALIZE INPUT |
| NO INPUT & NO JOB & POWER SUPPLY OFF PRACTICABLE PERIOD OF TIME | POWER SUPPLY OFF |

INTRODUCTION OF NEW PRODUCT
SPORTS CAR FFX2

WE INTRODUCE ON DECEMBER, 1996,
NEW MODEL CAR EQUIPPED WITH
DX ENGINE, THE FIRST OF THE WORLD.

REFER TO TEL 0120-12345 !

FIG. 24

| INQUIRY WINDOW |
|---|
| PRINTING BY COLOR PRINTER ? |
| YES NO |

FIG. 25

| JOB EXECUTION CONDITION | JOB EXECUTION CONTENTS |
|---|---|
| NO INPUT & 10 MINUTES PASS | ATTEND TO CASE OF NO REPLY FROM USER |
| NO INPUT & NO JOB & POWER SUPPLY OFF PRACTICABLE PERIOD OF TIME | POWER SUPPLY OFF |

FIG. 26

| TIME | SCHEDULE | WHERE TO MAKE CONTACT | PREARRANGED MATERIALS FOR USE |
|---|---|---|---|
| 12/5 10:00 TO 12:00 | CONFERENCE | EXT 12345 | NO |
| 12/5 13:00 TO 15:00 | BUSINESS TALK | 03-3210-9876 | FILE A |

FIG. 27

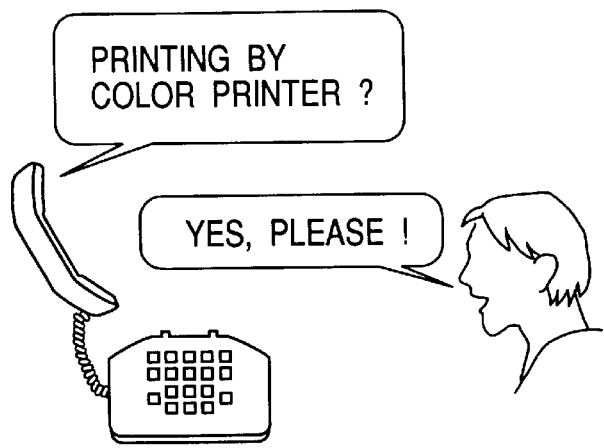

PRINTING BY COLOR PRINTER ?

YES, PLEASE !

FIG. 28

| JOB EXECUTION CONDITION | JOB EXECUTION CONTENTS |
|---|---|
| NO INPUT | ATTEND TO CASE OF NO REPLY FROM USER |
| NO INPUT & NO JOB & POWER SUPPLY OFF PRACTICABLE PERIOD OF TIME | POWER SUPPLY OFF |

FIG. 29

| JOB EXECUTION CONDITION | JOB EXECUTION CONTENTS |
|---|---|
| PRINTER STATUS "IN PRINTING" HAS BEEN CHANGED TO OTHER STATUS | EFFECT PROCESSING CORRESPONDING TO STATUS |
| NO INPUT & NO JOB & POWER SUPPLY OFF PRACTICABLE PERIOD OF TIME | POWER SUPPLY OFF |

FIG. 30

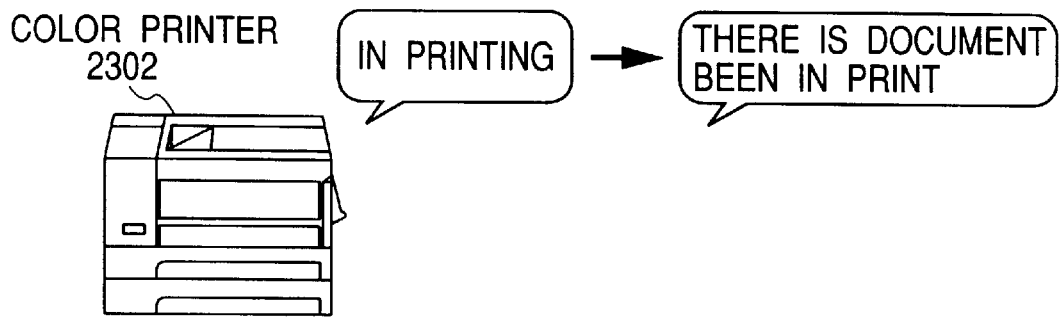

COLOR PRINTER 2302 — IN PRINTING → THERE IS DOCUMENT BEEN IN PRINT

FIG. 31

| PRINTER STATUS | STATUS MEANING |
|---|---|
| NORMAL | NORMAL |
| IN PRINTING | IN PRINTING |
| PRINTED DOCUMENTS ARE THERE | PREVIOUSLY PRINTED DOCUMENTS REMAIN IN TRAY |

FIG. 32

| JOB EXECUTION CONDITION | JOB EXECUTION CONTENTS |
|---|---|
| PRINTER STATUS IS THAT ALREADY PRINTED DOCUMENT REMAIN AS IS AND 10 MINUTES PASS | ATTEND TO CASE OF REMAINDER OF ALREADY PRINTED DOCUMENT |
| NO INPUT & NO JOB & POWER SUPPLY OFF PRACTICABLE PERIOD OF TIME | POWER SUPPLY OFF |

FIG. 33
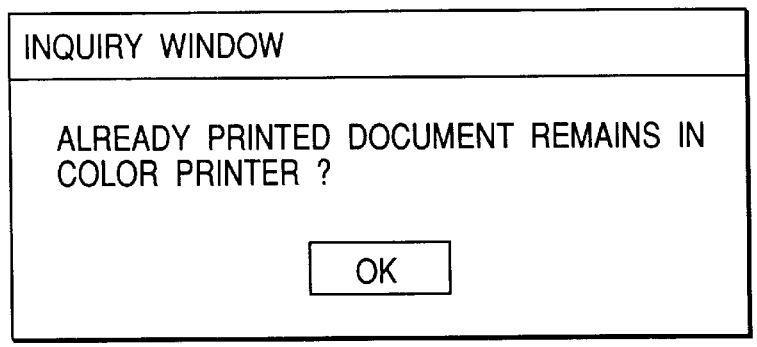
FIG. 34
| JOB EXECUTION CONDITION | JOB EXECUTION CONTENTS |
|---|---|
| PRINTER STATUS IS OTHER THAN "ALREADY PRINTED DOCUMENT REMAIN" | LOOK JOB OVER AGAIN IN RESPONSE TO STATUS "ALREADY PRINTED DOCUMENT REMAIN" |
| NO INPUT & 10 MINUTES PASS | ATTEND TO CASE OF NO REPLY FROM USER |
| NO INPUT & NO JOB & POWER SUPPLY OFF PRACTICABLE PERIOD OF TIME | POWER SUPPLY OFF |
FIG. 35

FIG. 36

| USER OBJECT | PREMISE CONDITION | PLAN & ACTION |
|---|---|---|
| ACQUIRE ALREADY PRINTED DOCUMENT | ALREADY PRINTED DOCUMENT EXISTS | (1) FIND PLACE OF DOCUMENT<br>(2) ACCESS TO THE PLACE<br>(3) ACQUIRE ALREADY PRINTED DOCUMENT |
| ALREADY PRINTED DOCUMENT EXISTS | PRINT SOURCE DOCUMENT EXISTS & DOCUMENT WHICH MEETS REQUEST IS IN PRINTABLE PRINT ENVIRONMENT | (1) GIVE INSTRUCTIONS FOR PRINTING |
| APPROVAL EXPRESSION | INQUIRY IS MADE | (1) BY USE OF VOICE, MOUSE OPERATION ETC. APPROVAL EXPRESSION OPERATION |
| OPPOSITION EXPRESSION | INQUIRY IS MADE | (1) BY USE OF VOICE, MOUSE OPERATION ETC. OPPOSITION EXPRESSION OPERATION |

FIG. 37

| SYSTEM OBJECT | PREMISE CONDITION | PLAN & ACTION |
|---|---|---|
| ATTAIN USER OBJECT | SYSTEM IS STABLE | (1) ANALIZE USER OBJECT<br>(2) PLANNING TO ATTAIN OBJECT<br>(3) EXECUTE |
| SYSTEM IS STABLE | SYSTEM IS ABNORMAL | (1) NORMALIZE SYSTEM |
| | NO JOB IN EXECUTION & POWER SUPPLY OFF POSSIBLE PERIOD OF TIME | (1) POWER SUPPLY OFF |
| ANALIZE USER OBJECT | INPUT PRESENT | (1) ANALYZE INPUT |
| TRANSFER ALREADY PRINTED DOCUMENT TO USER | ALREADY PRINTED DOCUMENT EXISTS | (1) SHOW PLACE WHERE DOCUMENT EXISTS |
| ALREADY PRINTED DOCUMENT EXISTS | PRINT SOURCE DOCUMENT EXISTS & CLARIFY PRINT CONDITION & PRINT ENVIRONMENT IS NORMAL | (1) SELECT PRINT ENVIRONMENT<br>(2) EXECUTE PRINTING |
| PRINT SOURCE DOCUMENT EXISTS | | (1) PREPARE PRINT SOURCE DOCUMENT |
| CLARIFY PRINT CONDITION | | (1) INQUIRE OF USER |
| PRINT ENVIRONMENT IS NORMAL | PRINT ENVIRONMENT IS ABNORMAL | (1) NORMALIZE PRINT ENVIRONMENT |
| ACQUIRE USER INTENTION | PREDETERMINED PERIOD OF TIME PASS | (1) PLANNING AGAIN |

FIG. 39

| PROPERTY | ORIGINAL DOCUMENT | COLOR PRINTER BJC600 | BLACK AND WHITE PRINTER LBP9000 |
|---|---|---|---|
| PRINTER TYPE | | BJ | LBP |
| COLOR OR BLACK AND WHITE | IN COLOR | COLOR | BLACK AND WHITE |
| RUNNING COST | | 20 YEN/SHEET | 5 YEN/SHEET |
| PRINTING SPEED | | 5 SHEETS/MIN. | 20 SHEETS/MIN. |
| ORIGINAL PAPER SIZE | A4 | A4 | A3 |
| OUTPUT PAPER SIZE | | A4 | A3 |
| USABLE PAPER KIND | | ORDINARY, BJ, OHP | ORDINARY, OHP |
| VARIABLE REPRODUCTION RATIOS POSSIBLE | | NOT POSSIBLE | 50% TO 200% |
| LAYOUT POSSIBLE | | NOT POSSIBLE | VERTICAL · HORIZONTAL · QUADRIPARTITE |
| PRINTING DIRECTION | | CHANGEABLE | CHANGEABLE |
| METHOD OF FEEDING PAPER | | MANUAL FEED, CARTRIDGE | MANUAL FEED, A3 CARTRIDGE, A4 CARTRIDGE |
| TWO-SIDED COPY POSSIBLE | | NOT POSSIBLE | POSSIBLE |
| BINDING DIRECTION DESIGNATION | | POSSIBLE | POSSIBLE |
| BINDING MARGIN DESIGNATION | | POSSIBLE | POSSIBLE |
| FONT DESIGNATION | | POSSIBLE | POSSIBLE |

FIG. 40

| STATUS | COLOR PRINTER BJC600 | BLACK AND WHITE PRINTER LBP9000 |
|---|---|---|
| OPERATION STATE | NORMAL | NORMAL |
| REMAINING PAPER QUANTITY | 80% OR MORE | 80% OR MORE |
| REMAINING TONER QUANTITY | 80% OR MORE | 80% OR MORE |
| ALREADY PRINTED DOCUMENT | NO | [USER A DOCUMENT] [USER B DOCUMENT] |

FIG. 53

| QUALITY | ITEM | PRINTER A | PRINTER B |
|---|---|---|---|
| 1 | PRINTING PERIOD OF TIME/ONE CHARACTER | 100ms | 200ms |
| 1 | CONSUMPTION OF TONER/ONE CHARACTER | 100mg | 200mg |
| 2 | PRINTING PERIOD OF TIME/ONE CHARACTER | 200ms | 400ms |
| 2 | CONSUMPTION OF TONER/ONE CHARACTER | 200mg | 400mg |
| 3 | PRINTING PERIOD OF TIME/ONE CHARACTER | 300ms | 600ms |
| 3 | CONSUMPTION OF TONER/ONE CHARACTER | 300mg | 600mg |
| 4 | PRINTING PERIOD OF TIME/ONE CHARACTER | 400ms | 800ms |
| 4 | CONSUMPTION OF TONER/ONE CHARACTER | 400mg | 800mg |
| 5 | PRINTING PERIOD OF TIME/ONE CHARACTER | 500ms | 1000ms |
| 5 | CONSUMPTION OF TONER/ONE CHARACTER | 500mg | 1000mg |

FIG. 56

PRINT JOB CONTENTS

CONFERENCE MATERIAL

NEW MODEL PRINTER LBPXXX

- FIRST A1 COMPATIBLE PRINTER IN THE WORLD
- HIGH SPEED PRINTING OF 1000 SHEETS/MIN
- BATTERY-OPERATED

LPBXXX TO BE RELEASED THIS SPRING HAS THREE FEATURES THAT ARE FIRST PROVIDED IN THE WORLD:
FIRST, PRINTING OF SHEETS OF A1 SIZE; SECOND, FAST PRINTING OF 1000 SHEETS PER MINUTE; AND THIRD, ENHANCED PORTABILITY USING A BATTERY, WHILE IMPLEMENTING SUCH HIGH PERFORMANCES.

| PRODUCT | PRICE | RELEASED | REMARKS |
|---------|-------|----------|---------|
| xxx | 9999 | 95-3 | |
| yyy | 8888 | 95-4 | |
| zzz | 7777 | 95-5 | |
| aaa | 6666 | 95-6 | |

---

PRINT JOB SETUP

PRINT COPIES [1] SHEET    DETAILS SETUP

PRIORITY ○    ○    ●

- URGENCY: THIS WEEK / TODAY / 1 HOUR / 10 MIN / ●1 MIN
- ECONOMICS: HIGH — ● — LOW
- QUALITY: HIGH — ● — LOW

[PRINT]  [CLOSE]  [CANCEL]

PRINT JOB SETUP PARAMETER

FIG. 58B

| INPUT | MEANING | REQUEST ITEM |
|---|---|---|
| PRINT | ACTION (PRINT) | OBJECT, QUALITY, NUMBER OF SHEETS |
| TRANSMIT | ACTION (TRANSMISSION) | OBJECT, DESTINATION |
| CLIENT | QUALITY (HIGH DIGNITY) | |
| MEMBER | QUALITY (UNRESTRICTED) | |
| SHEET | NUMBER OF SHEETS | NUMBER |

FIG. 59

PRINT JOB CONTENTS

CONFERENCE MATERIAL

NEW MODEL PRINTER LBPXXX

- FIRST A1 COMPATIBLE PRINTER IN THE WORLD
- HIGH SPEED PRINTING OF 1000 SHEETS/MIN
- BATTERY-OPERATED

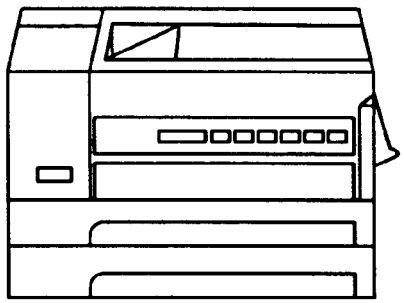

LPBXXX TO BE RELEASED THIS SPRING HAS THREE FEATURES THAT ARE FIRST PROVIDED IN THE WORLD:
FIRST, PRINTING OF SHEETS OF A1 SIZE; SECOND, FAST PRINTING OF 1000 SHEETS PER MINUTE; AND THIRD, ENHANCED PORTABILITY USING A BATTERY, WHILE IMPLEMENTING SUCH HIGH PERFORMANCES.

| PRODUCT | PRICE | RELEASED | REMARKS |
|---|---|---|---|
| xxx | 9999 | 95-3 | |
| yyy | 8888 | 95-4 | |
| zzz | 7777 | 95-5 | |
| aaa | 6666 | 95-6 | |

| DESTINATION | NUMBER OF SHEETS |
|---|---|
| CLIENT | 1 COPY |
| ABC PROJECT | 5 COPIES |

FIG. 81

CANON

DATE: NOV 25, 1996

TO: MACROHARD CORP.
ATTN: MR. JOHN SMITH
TEL: 001-1-(415)-394-1111
FAX: 001-1-(415)-394-2312

FROM: CANON INC.
SENDER: DR. ROHRA
TEL: +81-44-543-3333
FAX: +81-44-543-5555

DEAR SIR,

THANK YOU FOR YOUR PHONE CALL THIS MORNING.

PLEASE FIND ENCLOSED HERE WITH THE INFORMATION REGARDING THE HOTEL ACCOMMODATION AND OTHER TRAVEL INFORMATION FOR YOUR FORTH COMING TRIP TO JAPAN. I WILL BE COMING TO YOKOHAMA CITY AIR TERMINAL TO PICK YOU UP, HENCE KINDLY CALL ME AT MY RESIDENCE, AFTER YOU BOARD THE LIMOUSINE BUS.

HOTEL ACCOMMODATION FOR YOUR TRIP IS AS FOLLOWS:
        HOTEL: SHIN-YOKOHAMA PRINCE HOTEL
        PERIOD OF STAY: 18TH DEC 1996 - 22ND DEC 1996 (4 NIGHTS)

HAVE A PLEASANT JOURNEY,

WITH REGARDS, (ARUNA ROHRA)

FIG. 88

| CHARACTER STRING | CONCEPTION | ROLE | CONDITION |
|---|---|---|---|
| TO: | CO. NAME OR NAME | RECEPTION CO. NAME OR NAME | |
| FROM: | CO. NAME OR NAME | TRANSMISSION CO. NAME OR NAME | |
| ATTN: | NAME | RECEIVER NAME | |
| RECEIVER: | NAME | RECEPTION NAME | |
| SENDER: | NAME | SENDER NAME | |
| DATE: | DATE | DATE MAILED | DOCUMENT HEAD |
| TEL: | TELEPHONE NUMBER | SENDER TELEPHONE NO. | SENDER COLUMN |
| TEL: | TELEPHONE NUMBER | RECEIVER TELEPHONE NO. | RECEIVER COLUMN |
| FAX: | FAX NUMBER | SENDER FAX NO. | SENDER COLUMN |
| FAX: | FAX NUMBER | RECEIVER FAX NO. | RECEIVER COLUMN |
| ... | ... | ... | |

FIG. 89

| CHARACTER STRING | CONCEPTION | ROLE | ACTION |
|---|---|---|---|
| NOTIFYME: | NOTIFICATION METHOD | METHOD OF NOTIFYING SENDER | NOTIFY SENDER |
| NOTIFYHIM: | NOTIFICATION METHOD | METHOD OF NOTIFYING RECEIVER | NOTIFY RECEIVER |
| FILE: | DIRECTORY NAME | FILING PLACE | FILING |
| KEYWORDS: | KEYWORD | INDEX | PREPARE INDEX |
| ... | ... | ... | ... |

FIG. 92

DATE: NOV 22, 1996

TO: CANON INC.
ATTN: DR. ARUNA ROHRA
TEL: +81-44-543-3333
FAX: +81-44-543-5555

FROM: MACROHARD CORP.
SENDER: MR. JOHN SMITH
TEL: (415)-394-1111
FAX: (415)-394-2312

DEAR DR. ROHRA,

THANK YOU FOR YOUR FAX.

I WILL BE REACHING YOKOHAMA AT 3:00 PM ON 28TH NOVEMBER.
SINCE I AM COMING FOR THE FIRST TIME TO YOKOHAMA AND AS I AM NOT VERY FLUENT IN JAPANESE, I WOULD BE GRATEFUL IF YOU COULD KINDLY MEET ME AT THE STATION.

THANKING YOU,

YOURS SINCERELY,

JOHN SMITH

FIG. 93

SYSTEM: YOU ARE SUPPOSED TO MEET MR. JOHN ON 28TH, BUT WHAT WOULD YOU DO ?

USER: ASK MR. TANAKA TO MEET HIM, WILL YOU ?

SYSTEM: CERTAINLY.

FIG. 94

SUBJECT: JOHN'S VISIT
DATE: FRI, 23 NOV 1996 17:57:22+0900
FROM: IDCP < IDCP@abc.canon.co.jp >
REPLY-TO: IDCP < IDCP@abc.canon.co.jp >
ORGANIZATION: CANON INC.
TO: tanaka@dos.canon.co.jp
REFERENCES:

MR. JOHN ARRIVES AT YOKOHAMA ON 28TH. ROHRA WOULD LIKE YOU TO MEET HIM AND TAKE CARE OF HIM.

I ATTACH THE FACSIMILE FROM HIM FOR YOUR REFERENCE.
THANK YOU.

-YOUR FAVOURITE FRIEND! ;-)

|  | BEGINNER | SENIOR |
|---|---|---|
| FAX | STANDARD UI | STANDARD UI +MULTI-ADDRESS COMMUNICATION UI |

FIG. 121

| TIME | DIRECTOR | ACTION |
|---|---|---|
| 1996/7/5 10:00 | TOM | TRANSMIT FILE ABC TO A CO. MR. A |
| 1996/7/3 18:50 | MARY | TAKE TEN COPIES OF FILE XYZ |

FIG. 127
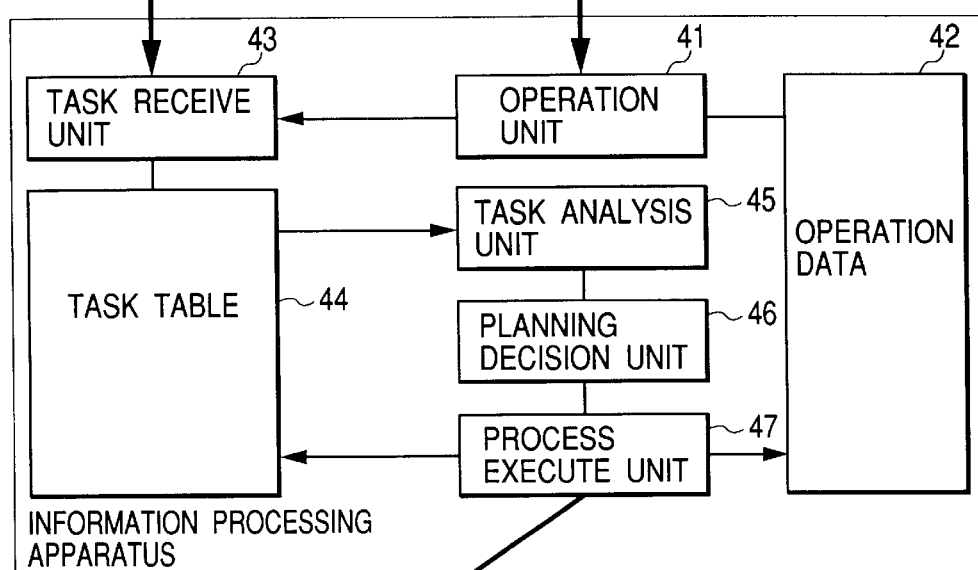
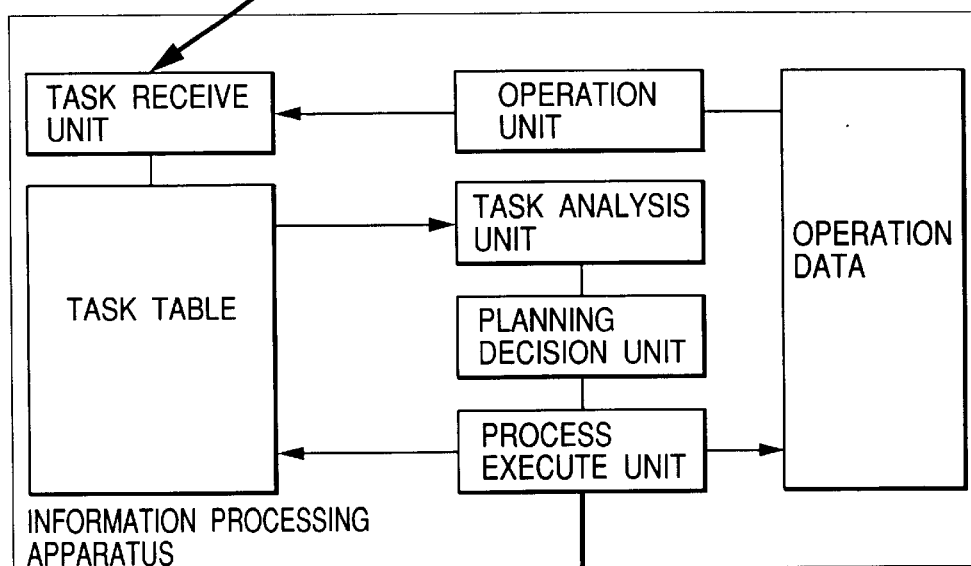

FIG. 129A
61

| START CONDITION | CONTENTS OF TASK |
|---|---|
| IDLING FOR PREDETERMIND PERIOD OF TIME | MAKE ( Object: IDLE PERIOD TASK ) |

| START CONDITION | CONTENTS OF TASK |
|---|---|
| UNCONDITIONAL | ANALYZE ( Object: RECEPTION INFORMATION 「Print "contract.doc" from B」) |
| IDLING FOR PREDETERMIND PERIOD OF TIME | MAKE ( Object: IDLE PERIOD TASK ) |

| START CONDITION | CONTENTS OF TASK |
|---|---|
| UNCONDITIONAL | PRINT ( Object: "contract.doc" =PULL ( Actor: A Object: < contract.doc > Iobject: B )) |
| IDLING FOR PREDETERMIND PERIOD OF TIME | MAKE ( Object: IDLE PERIOD TASK ) |

| START CONDITION | CONTENTS OF TASK |
|---|---|
| UNCONDITIONAL | PULL ( Actor: A Object: < contract.doc > Iobject: B )) |
| UNCONDITIONAL | PRINT ( Object: < contract.doc > =PULL ) |
| IDLING FOR PREDETERMIND PERIOD OF TIME | MAKE ( Object: IDLE PERIOD TASK ) |

| START CONDITION | CONTENTS OF TASK |
|---|---|
| UNCONDITIONAL | PRINT ( Object: < contract.doc > =PULL ) |
| IDLING FOR PREDETERMIND PERIOD OF TIME | MAKE ( Object: IDLE PERIOD TASK ) |

| START CONDITION | CONTENTS OF TASK |
|---|---|
| IDLING FOR PREDETERMIND PERIOD OF TIME | MAKE ( Object: IDLE PERIOD TASK ) |

TASK = COMMUNICATION (A, B, INFORMATION)

TASK = PULL (A, B, INFORMATION)

TASK = PUSH (A, B, INFORMATION)

TASK = INDICATE (A, B, INSTRUCTION INFORMATION)

TASK = RESPOND (B, A, REQUEST)

RESPOND (TO B, A, INFORMATION REQUEST TYPE REQUEST)

RESPOND (TO B, A, INFORMATION STORAGE TYPE REQUEST)

PRINT (A, "abc.doc") OR PRINT (NOT A, "abc.doc")

INFORMATION PROCESSING APPARATUS AND CONTROL METHOD THEREFOR

BACKGROUND OF THE INVENTION

1. Field of the Invention

The present invention relates to an information processing apparatus for outputting information, and a control method therefor. In particular, the present invention pertains to an information processing apparatus that is one of a plurality of apparatuses that communicate with each other, one apparatus outputting information in response to the receipt of an instruction from another apparatus, or requesting a required process from another apparatus, and a control method therefor.

2. Related Background Art

A conventional printing apparatus-can perform printing in consonance with an objective by altering the setups for various printing parameters, such as the paper size, the number of printed copies, the printing speed and the printing quality.

However, among the factors involved in the setting up of printing parameters, there are certain elements, such as urgency, economy and print quality, that in some cases may be in conflict, and as the number of parameters to be set is therefore increased, it is difficult for a user to set the appropriate parameters. Even when a user knows which parameter values are appropriate, for the user it is inconvenient to set the parameters one after another. And while a complex setup operation will not be required when default values are employed, it is not possible to establish optimal parameter values for individual documents.

A single printer on a network can be used in a plurality of users. In this case, a document submitted by one user is mixed with a document submitted by another user. Therefore, when, for example, two users submit a plurality of documents, the results obtained as the output must be sorted. When a document is left on an output tray, the contents of the document must be examined in order to determine who submitted the document.

An information processing apparatus, called a personal computer (hereinafter referred to as a PC), handles electronic data. Therefore, physical information, such as information written on paper or a printed document that exists in real space is converted into electronic information by an input device, such as a scanner or a digital camera, so that a PC can process the information. When a person is to process electronic information stored in a PC, the electronic information must be converted into physical information by an output device, such as a printer or a display.

Based on the fact that the output device is one of the peripheral devices attached to a PC, it can be controlled by the PC, not by another peripheral device. The information required for such control must be stored in the PC in an appropriate form.

A user is to perform the following operation on a PC and a printer to convert electronic information stored in a PC into printed physical information, as is shown in FIG. 159. In this case, the PC must hold, in the form of a printer driver, information concerning the operating procedures for the printer.

First, a user employs a printer driver held in the PC to send a printing instruction. Then, the PC sends a printing command to the printer. Upon the receipt of the printing command, the printer, unless it is busy, immediately initiates the printing of the instructed information. Following this, the user collects the printed document. The printing command includes the document data that is the printing target. The printing target must be described in a form that the printer can process.

A PC can be used as a server terminal, as is shown in FIG. 160. In this case, the PC receives from a server each select data that is to be displayed on a screen in accordance with the transmission protocol, such as X Window System, and displays the data as prescribed by the instructions.

Information read by a scanner can be transmitted to a printer for printing via a PC, as is shown in FIG. 161. Therefore, a scanner and a printer can together be employed as a pseudo copier. It should be noted, however, that a scanner driver and a printer driver must be installed in the PC in advance, and the joint employment of the two devices must be specified. If conversion of the image format of the scanner into a format that the printer can process is required, the PC must perform such format conversion before transmitting the data. Further, the format conversion must be performed, as needed, at the discretion of a user.

A printing command for a specific printer must be directly transmitted to that printer. In addition, printing target information must also be transmitted to the printer with the printing command from the PC. If the printing target information is to be transmitted-to a device other than a PC, or to a printer in some cases, first the PC must acquire the information by communicating with another device, and must then transmit the information to the printer.

The received printing target document is immediately printed if printing is enabled.

SUMMARY OF THE INVENTION

It is one objective of the present invention to provide an information processing apparatus that can reduce the load placed on a user when performing an operation to implement the objective of processing, and a control method therefor.

It is another objective of the present invention to provide a printing apparatus that can perform printing by employing appropriate printing parameters consonant with the processing objective, without a complex operation being required, and a control method therefor.

It is an additional objective of the present invention to provide a printing apparatus that permits a plurality of users to efficiently employ a single printer, and a control method therefor.

It is a further objective of the present invention to provide an information processing apparatus that can handle a command for another output device and can perform a pre-process for outputting data from the output device, and a control method therefor.

It is still another objective of the present invention to provide an information processing apparatus that can suspend received data instead of processing them, and a control method therefor.

It is a still additional objective of the present invention to provide an information processing apparatus wherein an output side can, as needed, from an apparatus or an external device, acquire and output information to be processed, and a control method therefor.

It is a still further objective of the present invention to provide an information processing apparatus that can by itself employ an information resource belonging to an external device.

It is yet another objective of the present invention to provide an information processing apparatus that can employ a resource belonging to an external device to process information input by the apparatus.

According to one aspect, the present invention which achieves these objectives relates to a printing apparatus comprising:

reception means for receiving information to be printed and a first printing parameter;

determination means for employing the information that is received to determine a second parameter suitable for the information;

setup means for setting up the first and the second parameters; and printing means for printing the information based on the first and the second printing parameters set up by the setup means.

According to another aspect, the present invention which achieves these objectives relates to a printing apparatus comprising:

reception means for receiving information to be printed;

identification means for identifying a user for the information that is received;

printing means for printing the information;

printing results storage means having a plurality of storage locations; and control means for storing, at a different location in the printing results storage means, printing results obtained by the printing means for each user who is identified by the identification means.

According to another aspect, the present invention which achieves these objectives relates to an information processing apparatus comprising:

communication means for communicating with an external device;

output means for outputting information; and control means for requesting information from the external device, for receiving the information from the external device, and for permitting the output device to output the information.

According to another aspect, the present invention which achieves these objectives relates to an information processing apparatus comprising:

communication means for communicating with an external device;

input means for receiving information;

processing means for processing the information received by the input means; and control means for transmitting the information through the communication means to the external device and requesting the external device to process the information.

According to another aspect, the present invention which achieves these objectives relates to an information processing apparatus comprising:

output means for outputting information;

acceptance means for accepting an output instruction, including designation information included for the designation of an output device;

detection means for detecting an apparatus that is identified in the designation information;

output control means for permitting the output means to execute the output instruction when the apparatus detected by the detection means is the information processing apparatus, and for transmitting the output instruction to an external device when the apparatus detected by the detection means is other than the information processing apparatus.

According to another aspect, the present invention which achieves these objectives relates to an information processing apparatus comprising:

communication means for communicating with an external device;

processing means for processing information;

management means for receiving from the external device through the communication means information to be processed and for managing the information by employing a plurality of management states, including a process pending state and a process wait state; and control means for permitting the processing means to process the information.

According to another aspect, the present invention which achieves these objectives relates to an information processing apparatus comprising:

reception means for receiving a process to be performed by another device;

processing means for performing a predetermined process required for the performance of the process received by the reception means; and output means for outputting the results obtained by the processing means.

According to another aspect, the present invention which achieves these objectives relates to an information processing apparatus comprising:

reception means for receiving designation information that identifies a target to be processed;

acquisition means for acquiring the target identified in the designation information received by the reception means;

processing means for performing a process for the target acquired by the acquisition means; and output means for outputting the results obtained by the processing means.

According to another aspect, the present invention which achieves these objectives relates to an information processing apparatus comprising:

reception means for receiving information to be processed;

processing means for processing the information; and conversion control means for controlling a conversion of the information that is received by the reception means into information, described using a description language, that is to be processed by the processing means.

According to another aspect, the present invention which achieves these objectives relates to a printing method comprising:

a reception step of receiving information to be printed and a first printing parameter;

a determination step of employing the information that is received to determine a second parameter suitable for the information;

a setup step of setting up the first and the second parameters; and a printing step of printing the information based on the first and the second printing parameters set up at the setup step.

According to another aspect, the present invention which achieves these objectives relates to a printing method comprising:

a reception step of receiving information to be printed;

an identification step of identifying a user for the information that is received;

a printing step of printing the information;

a printing results storage step of storing printing results in one of a plurality of storage locations; and a control step of storing printing results at a different location for each user who is identified at the identification step.

According to another aspect, the present invention which achieves these objectives relates to an information processing. method comprising:

a communication step of communicating with an external device;

an output step of outputting information; and a control step of requesting information from the external device, of receiving the information from the external device, and of permitting the output device to output the information.

According to another aspect, the present invention which achieves these objectives relates to an information processing method comprising:

a communication step of communicating with an external device;

an input step of receiving information;

a processing step of processing the information received at the input step; and a control step of transmitting the information to the external device at the communication step and of requesting the external device to process the information.

According to another aspect, the present invention which achieves these objectives relates to an information processing method comprising:

an output step of outputting information;

an acceptance step of accepting an output instruction, including designation information included for the designation of an output device;

a detection step of detecting an apparatus that is identified in the designation information;

an output control step of permitting the output means to execute the output instruction when the apparatus detected at the detection step is the information processing apparatus, and of transmitting the output instruction to an external device when the apparatus detected at the detection step is other than the information processing apparatus.

According to another aspect, the present invention which achieves these objectives relates to an information processing method comprising:

a processing step of processing information;

a management step of receiving information to be processed from the external device through a communication unit for communicating with the external device, and of managing the information by employing a plurality of management states, including a process pending state and a process wait state; and a control step of permitting the processing means to process the information.

According to another aspect, the present invention which achieves these objectives relates to an information processing method comprising:

a reception step of receiving a process to be performed by another device;

a processing step of performing a predetermined process required for the performance of the process received at the reception step; and an output step of outputting the results obtained at the processing step.

According to another aspect, the present invention which achieves these objectives relates to an information processing method comprising:

a reception step of receiving designation information that identifies a target to be processed;

an acquisition step of acquiring the target identified in the designation information received at the reception step;

a processing step of performing a process for the target acquired at the acquisition step; and an output step of outputting the results obtained at the processing step.

According to another aspect, the present invention which achieves these objectives relates to an. information processing method comprising:

a reception step of receiving information to be processed;

a processing step of processing the information; and a conversion control step of controlling a conversion of the information that is received at the reception step into information, described using a description language, that is to be processed at the processing step.

According to another aspect, the present invention which achieves these objectives relates to a computer-readable storage medium storing a printing program for controlling a computer to perform printing, the program comprising codes for causing the computer to perform:

a reception step of receiving information to be printed and a first printing parameter;

a determination step of employing the information that is received to determine a second parameter suitable for the information;

a setup step of setting up the first and the second parameters; and a printing step of printing the information based on the first and the second printing parameters set up at the setup step.

According to another aspect, the present invention which achieves these objectives relates to a computer-readable storage medium storing a printing program for controlling a computer to perform printing, the program comprising codes for causing the computer to perform:

a reception step of receiving information to be printed;

an identification step of identifying a user for the information that is received;

a printing step of printing the information;

a printing results storage step of storing printing results in one of a plurality of storage locations; and a control step of storing printing results at a different location for each user who is identified at the identification step.

According to another aspect, the present invention which achieves these objectives relates to a computer-readable storage medium storing a printing program for controlling a computer to perform printing, the program comprising codes for causing the computer to perform:

a communication step of communicating with an external device;

an output step of outputting information; and a control step of requesting information from the external device, of receiving the information from the external device, and of permitting the output device to output the information.

According to another aspect, the present invention which achieves these objectives relates to a computer-readable storage medium storing a printing program for controlling a computer to perform printing, the program comprising codes for causing the computer to perform:

a communication step of communicating with an external device;

an input step of receiving information;

a processing step of processing the information received at the input step; and a control step of transmitting the information to the external device at the communication step and of requesting the external device to process the information.

According to another aspect, the present invention which achieves these objectives relates to a computer-readable storage medium storing a printing program for controlling a computer to perform printing, the program comprising codes for causing the computer to perform:

an output step of outputting information;

an acceptance step of accepting an output instruction, including designation information included for the designation of an output device;

a detection step of detecting an apparatus that is identified in the designation information;

an output control step of permitting the output means to execute the output instruction when the apparatus detected at the detection step is the information processing apparatus, and of transmitting the output instruction to an external device when the apparatus detected at the detection step is other than the information processing apparatus.

According to another aspect, the present invention which achieves these objectives relates to a computer-readable storage medium storing a printing program for controlling a computer to perform printing, the program comprising codes for causing the computer to perform:

a processing step of processing information;

a management step of receiving information to be processed from the external device through a communication unit for communicating with the external device, and of managing the information by employing a plurality of management states, including a process pending state and a process wait state; and a control step of permitting the processing means to process the information.

According to another aspect, the present invention which achieves these objectives relates to a computer-readable storage medium storing a printing program for controlling a computer to perform printing, the program comprising codes for causing the computer to perform:

a reception step of receiving a process to be performed by another device;

a processing step of performing a predetermined process required for the performance of the process received at the reception step; and an output step of outputting the results obtained at the processing step.

According to another aspect, the present invention which achieves these objectives relates to a computer-readable storage medium storing a printing program for controlling a computer to perform printing, the program comprising codes for causing the computer to perform:

a reception step of receiving designation information that identifies a target to be processed;

an acquisition step of acquiring the target identified in the designation information received at the reception step;

a processing step of performing a process for the target acquired at the acquisition step; and an output step of outputting the results obtained at the processing step.

According to another aspect, the present invention which achieves these objectives relates to a computer-readable storage medium storing a printing program for controlling a computer to perform printing, the program comprising codes for causing the computer to perform:

a reception step of receiving information to be processed;

a processing step of processing the information; and a conversion control step of controlling a conversion of the information that is received at the reception step into information, described using a description language, that is to be processed at the processing step.

Other objectives and advantages those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 13 is a table containing remarks for determining whether or not an advance notice should be transmitted in consonance with job types and conditions;

FIG. 17 is a diagram showing an example display for a window by which an optimal method is proposed to a user;

FIG. 24 is a diagram showing an inquiry window;

FIG. 25 is an example job table;

FIG. 26 is a diagram showing example scheduling data;

FIG. 27 is a diagram showing an example user query;

FIG. 28 is an example job table;

FIG. 29 is an example job table;

FIG. 30 is a diagram showing an example change in the status of a printer;

FIG. 31 is a table showing printer statuses;

FIG. 32 is an example job table;

FIG. 33 is a diagram showing a query window;

FIG. 34 is an example job table;

FIG. 35 is a diagram showing an example printer change status;

FIG. 36 is a table for displaying planning and action rules;

FIG. 37 is a table for displaying planning and action rules;

FIG. 39 is a table for example apparatus properties;

FIG. 40 is a table for example apparatus statuses;

FIG. 53 is a table showing printing periods and consumption of toner for a plurality of printers for printing a single character;

FIG. 56 is a diagram showing the contents of a print job and parameters designated by a user;

FIG. 58B is a table showing the meanings of character strings in the parameter setup, and request items with which to complete the meanings;

FIG. 59 is a diagram showing an example where parameters of a print job are set by using a document;

FIG. 81 is a diagram showing an example document from which data are to be extracted;

FIG. 88 is a table showing knowledge of a common knowledge base;

FIG. 89 is a table showing knowledge of a common knowledge base in a field specified on a cover page;

FIG. 92 is a diagram illustrating an example input document;

FIG. 93 is a diagram showing the contents of a conversation between a system and a user;

FIG. 94 is a diagram showing an output document that a system prepares based on the judgement of the conversation;

FIG. 120 is a flowchart for the processing performed by a server according to the fortieth embodiment;

FIG. 121 is a table showing example updated history information;

FIG. 122 is a diagram illustrating an example wherein an operation is performed based on history;

FIG. 123 is a diagram illustrating the example wherein the operation is performed based on history;

FIG. 124 is a diagram showing an example structure for a controller;

FIG. 125 is a diagram showing another example structure for a controller;

FIG. 126 is a diagram showing an additional example structure for a controller;

FIG. 127 is a diagram showing a functional arrangement according to a forty-second embodiment;

FIG. 128 is a flowchart showing the processing for the forty-second embodiment;

FIGS. 129A, 129B, 129C, 129D, 129E and 129F are example task tables;

FIG. 130 is a diagram showing an example input/output apparatus that can operate another apparatus;

FIG. 131 is a diagram showing an example input/output apparatus that can operate a system consisting of a plurality of apparatuses;

Figure 132:
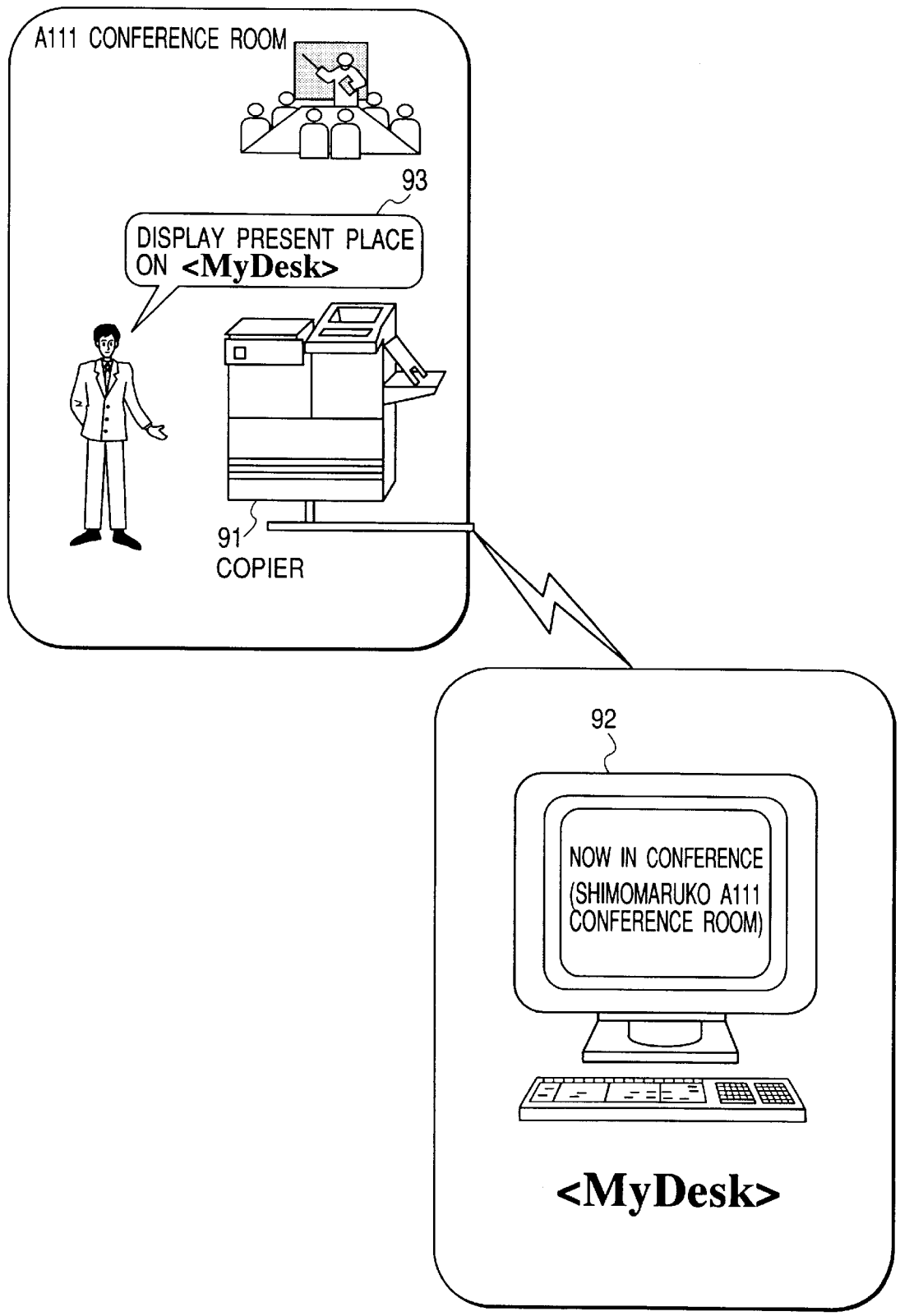
Figure 133:
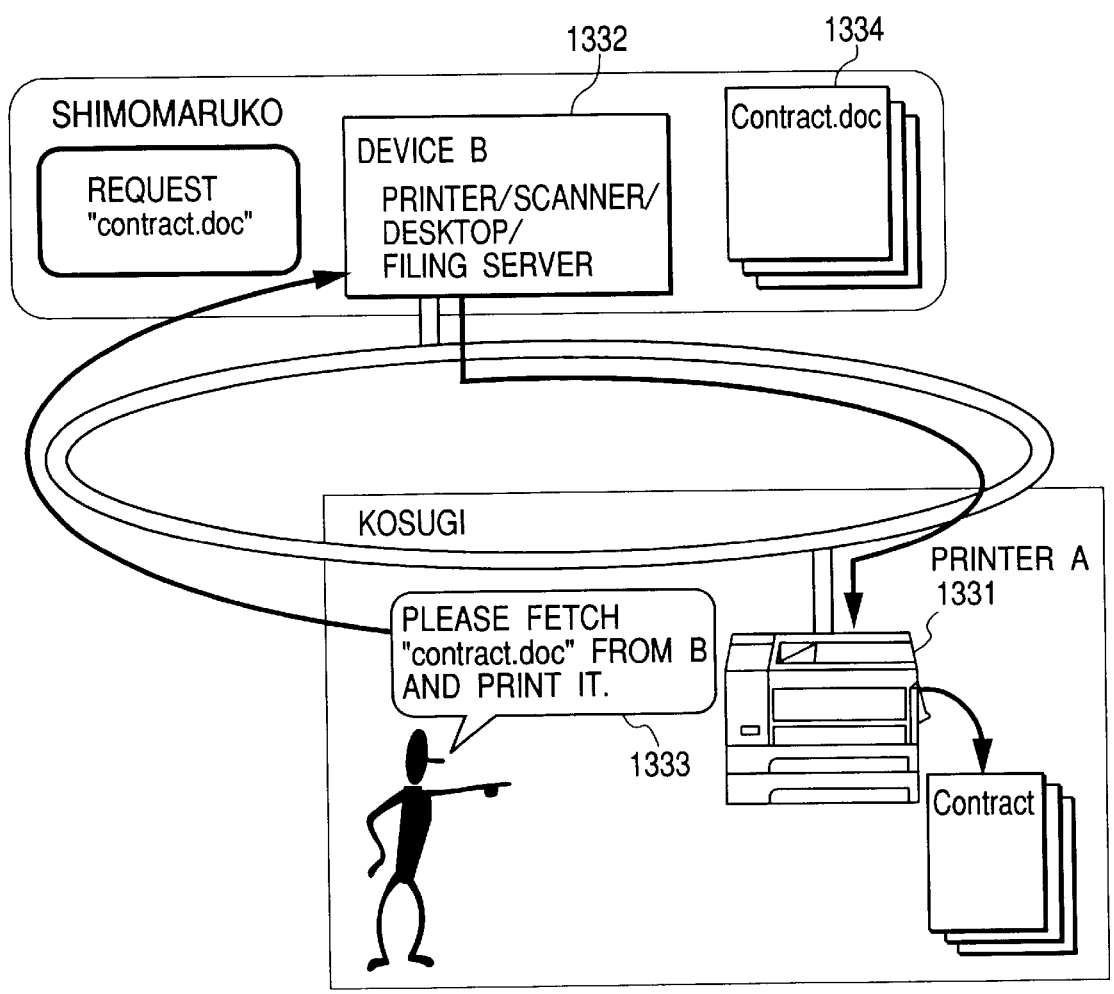
Figure 134:
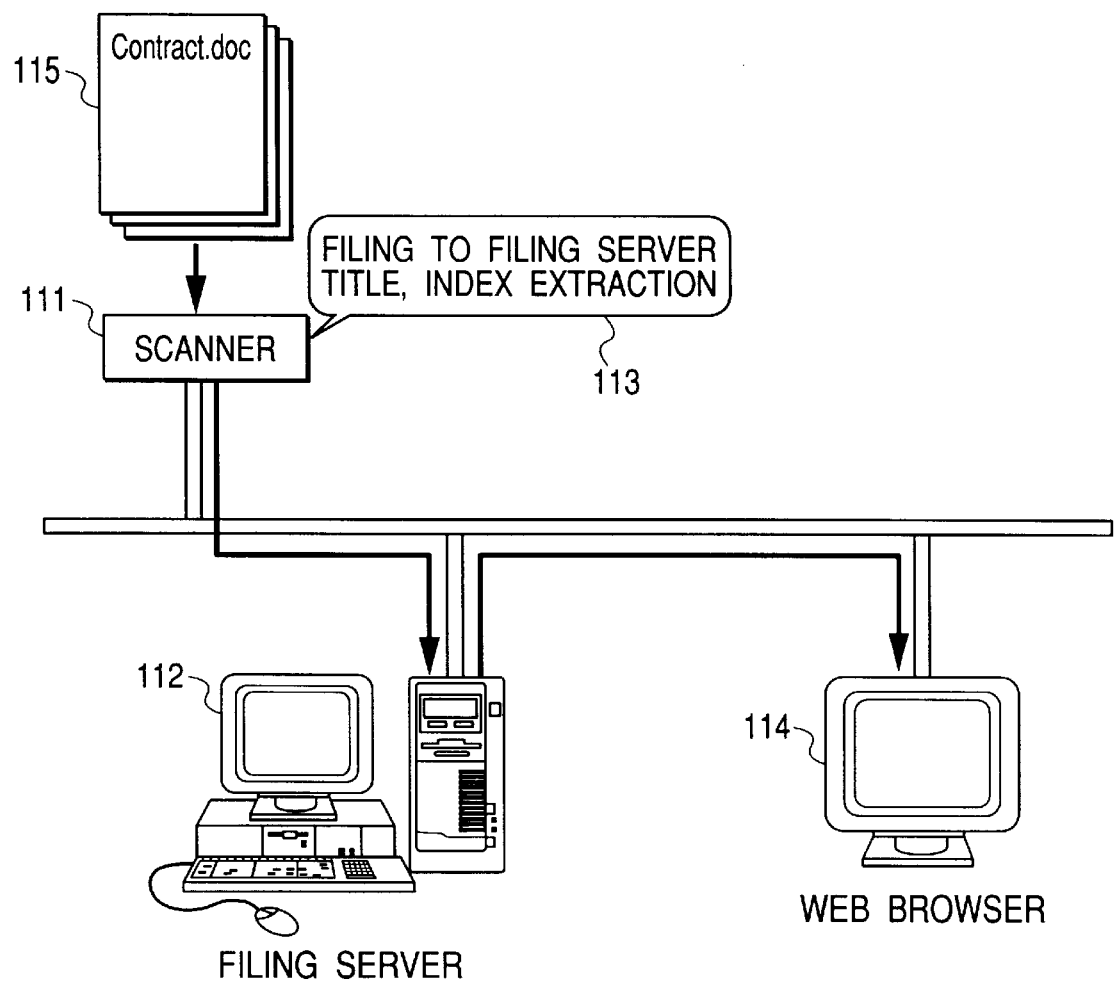
Figure 135:
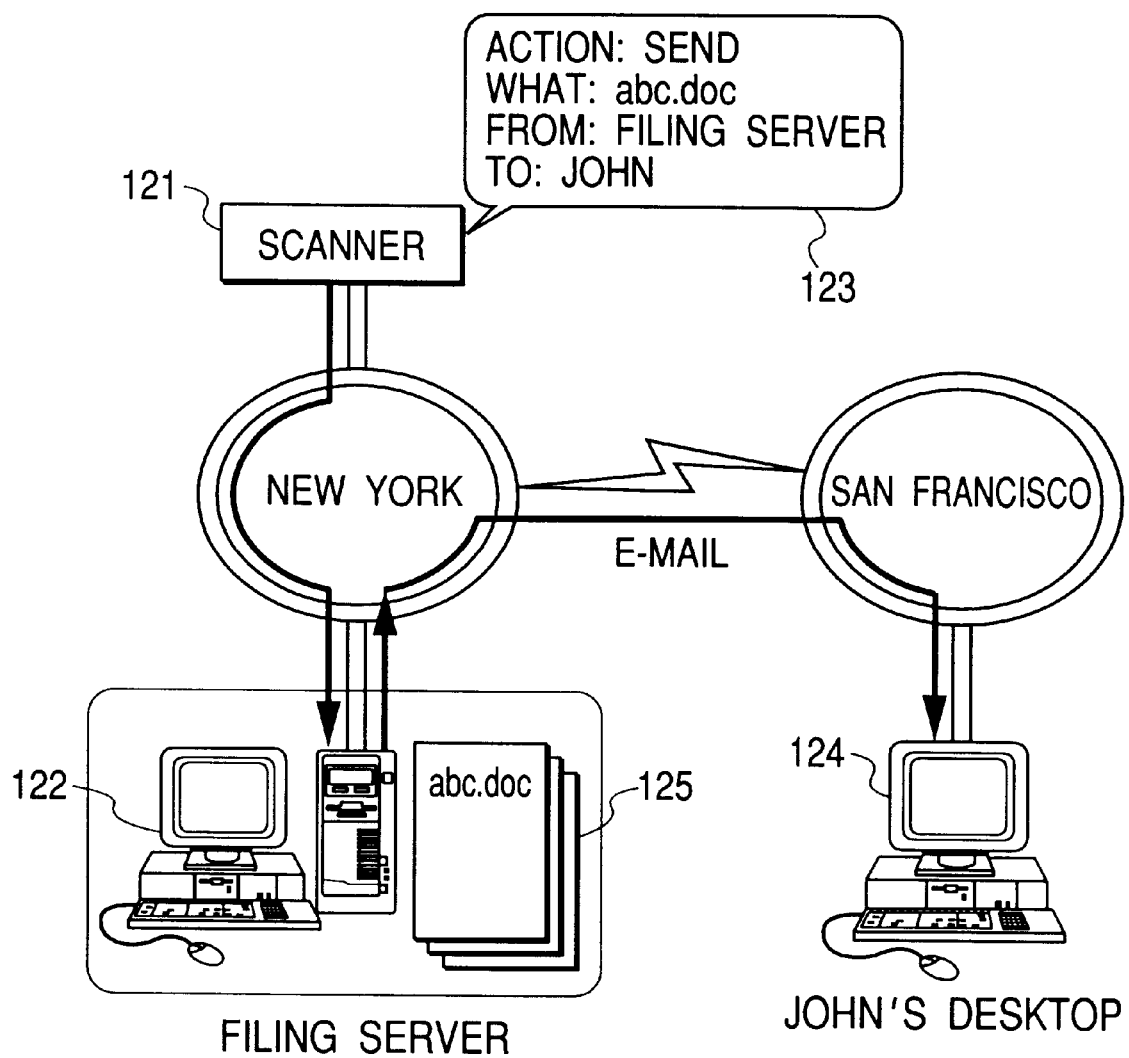
Figure 136:
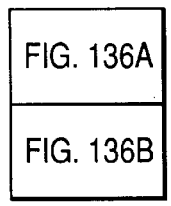
Figure 136A:
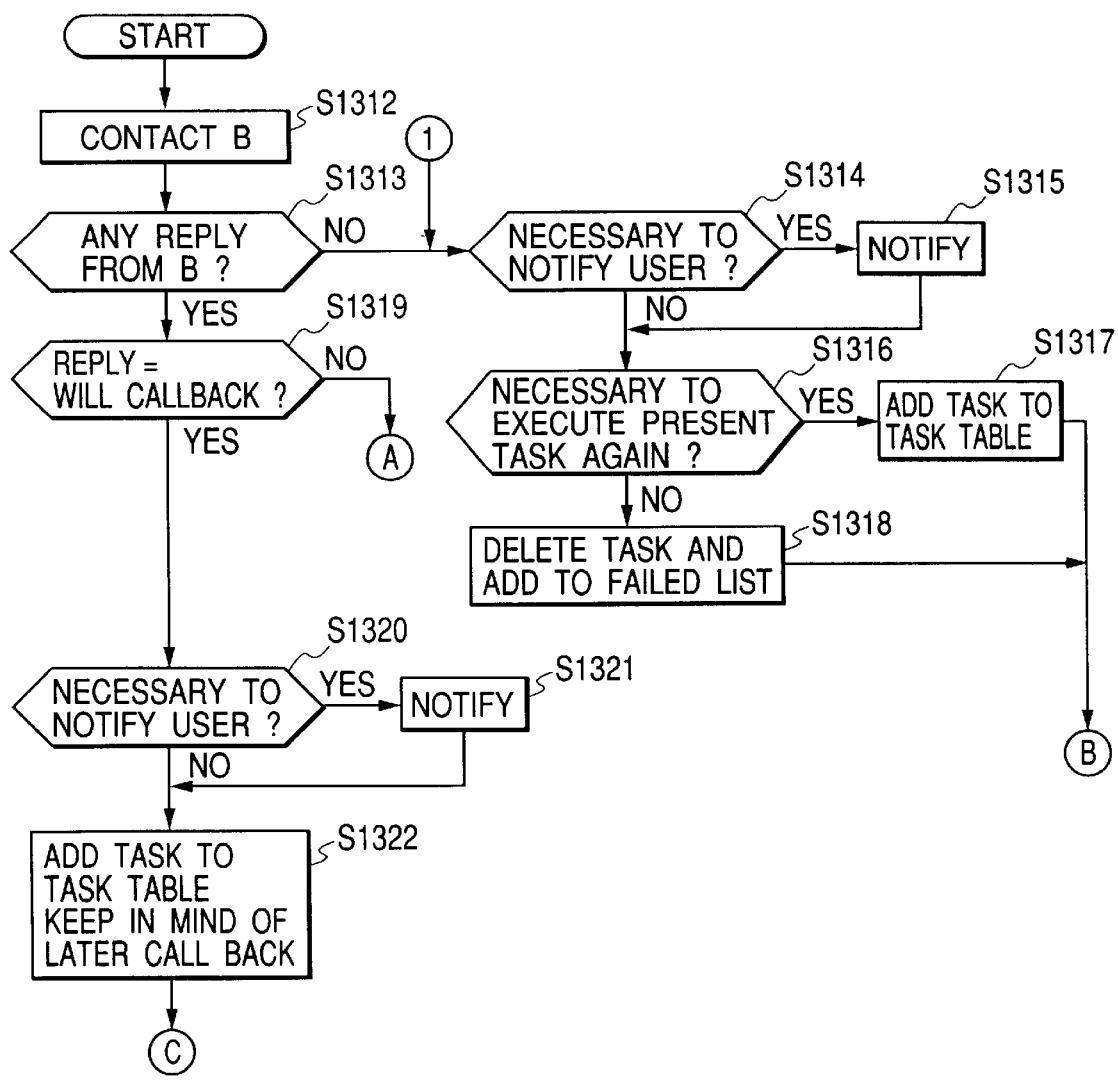
Figure 136B:
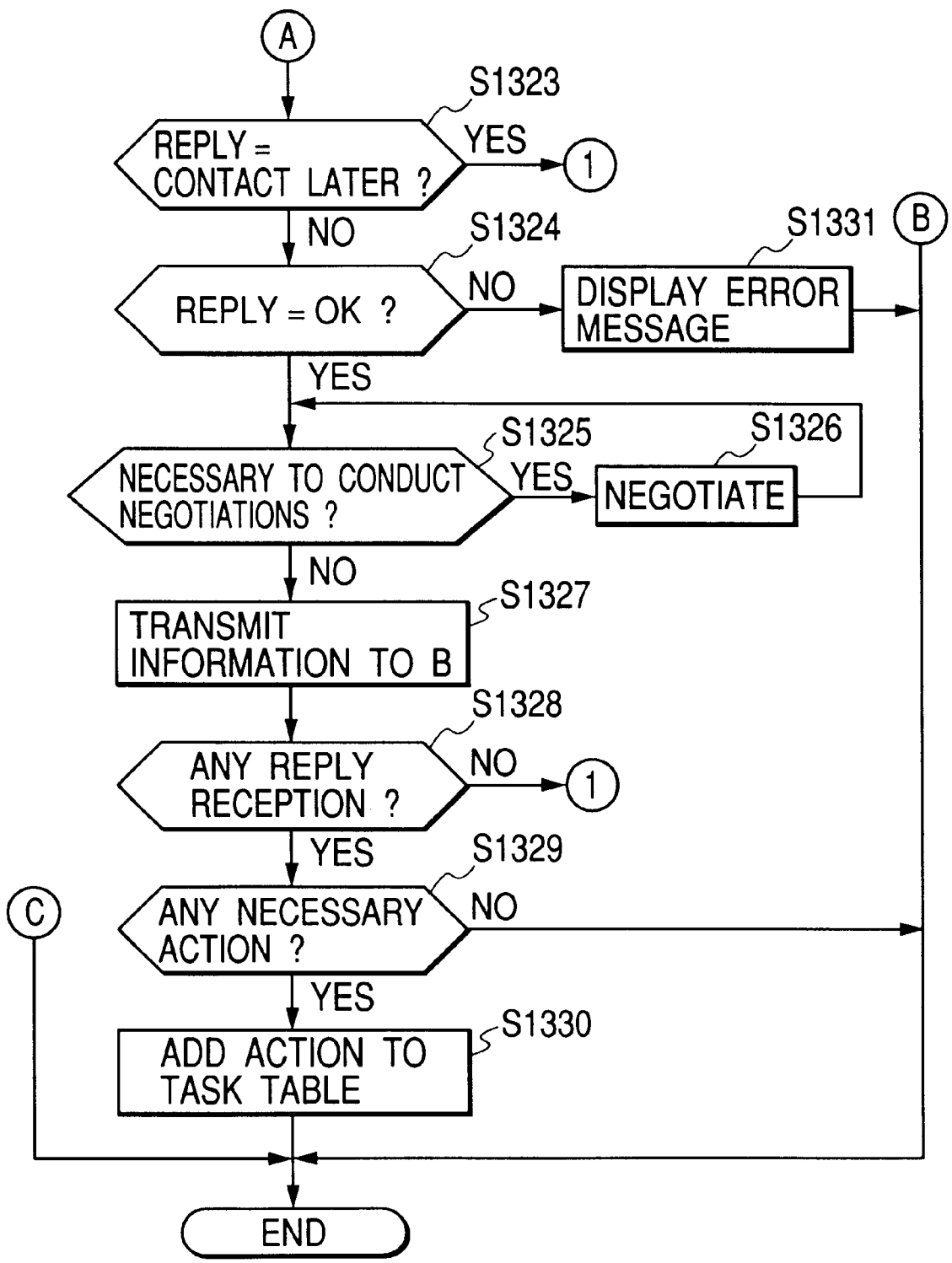
Figure 137:
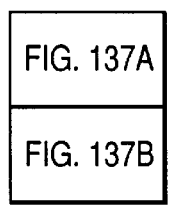
Figure 137A:
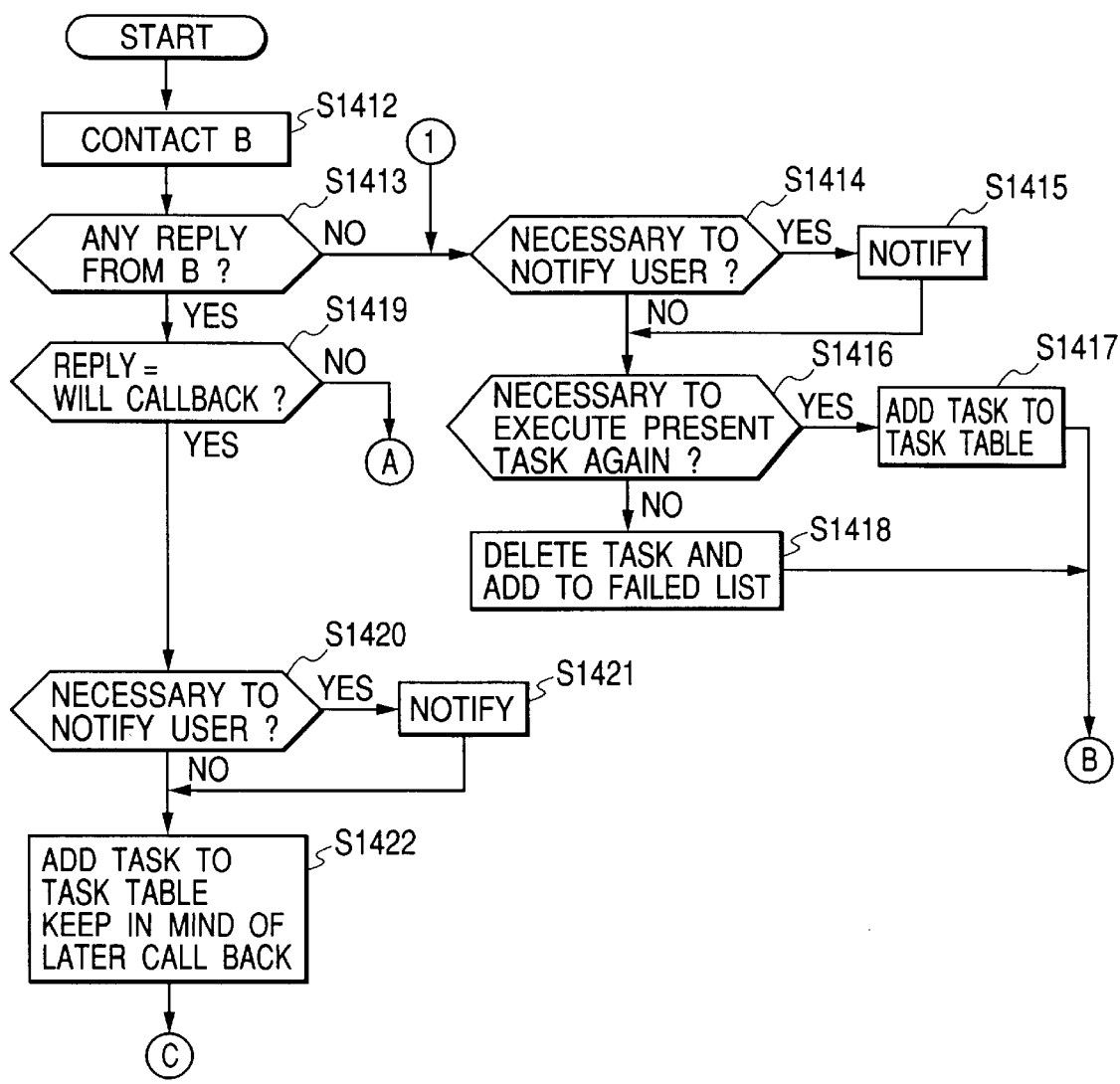
Figure 137B:
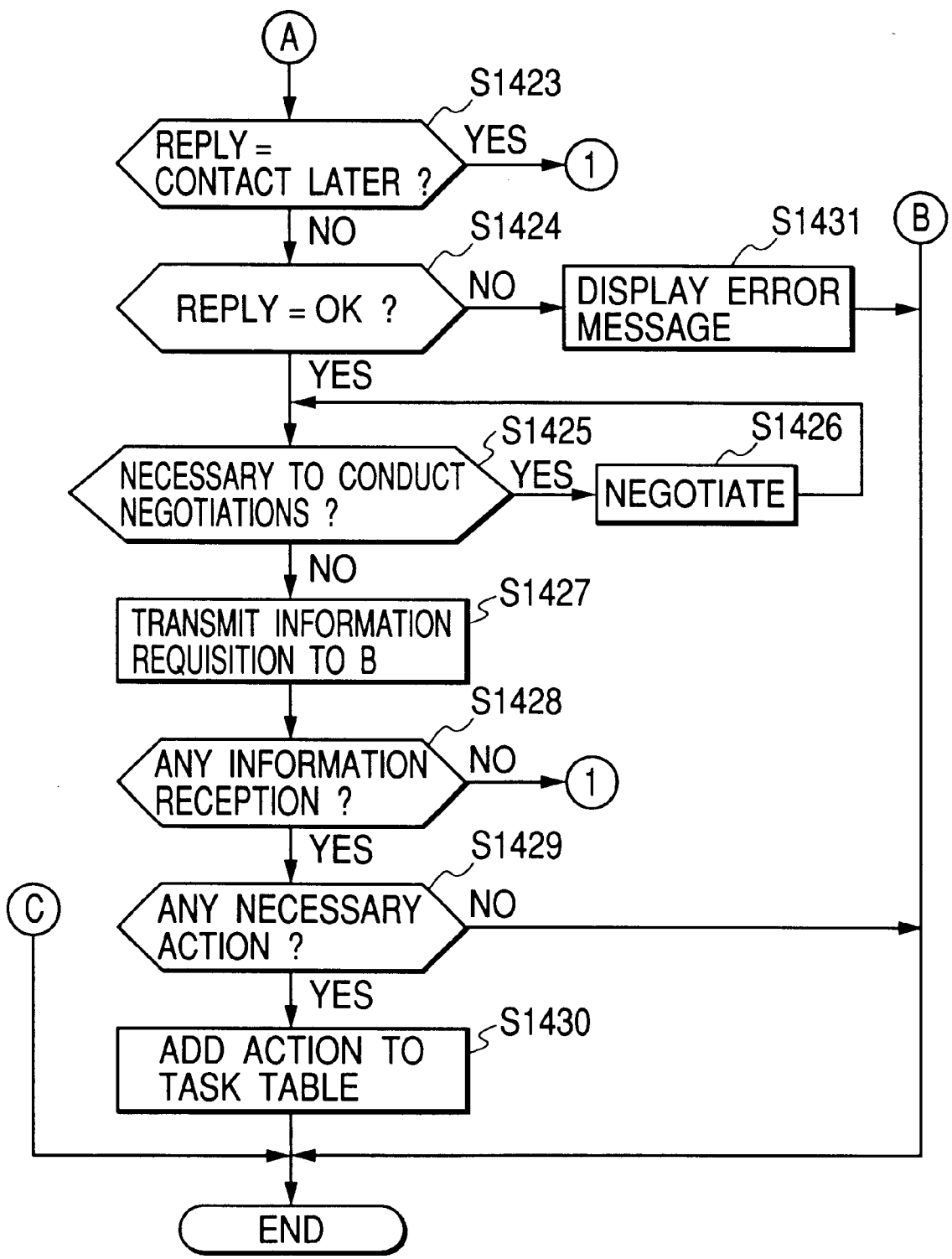
Figure 138:
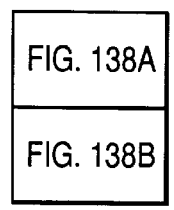
Figure 138A:
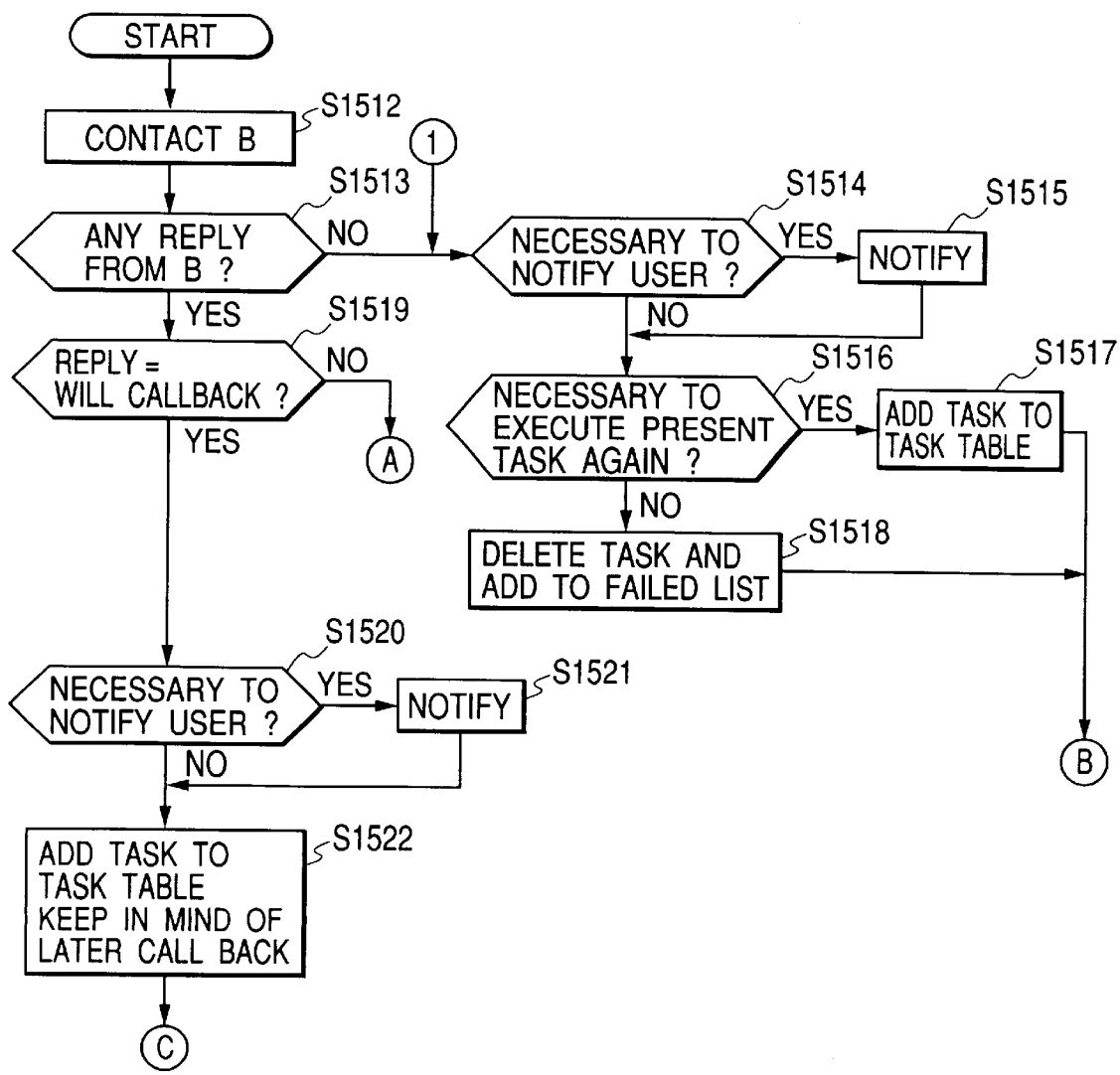
Figure 138B:
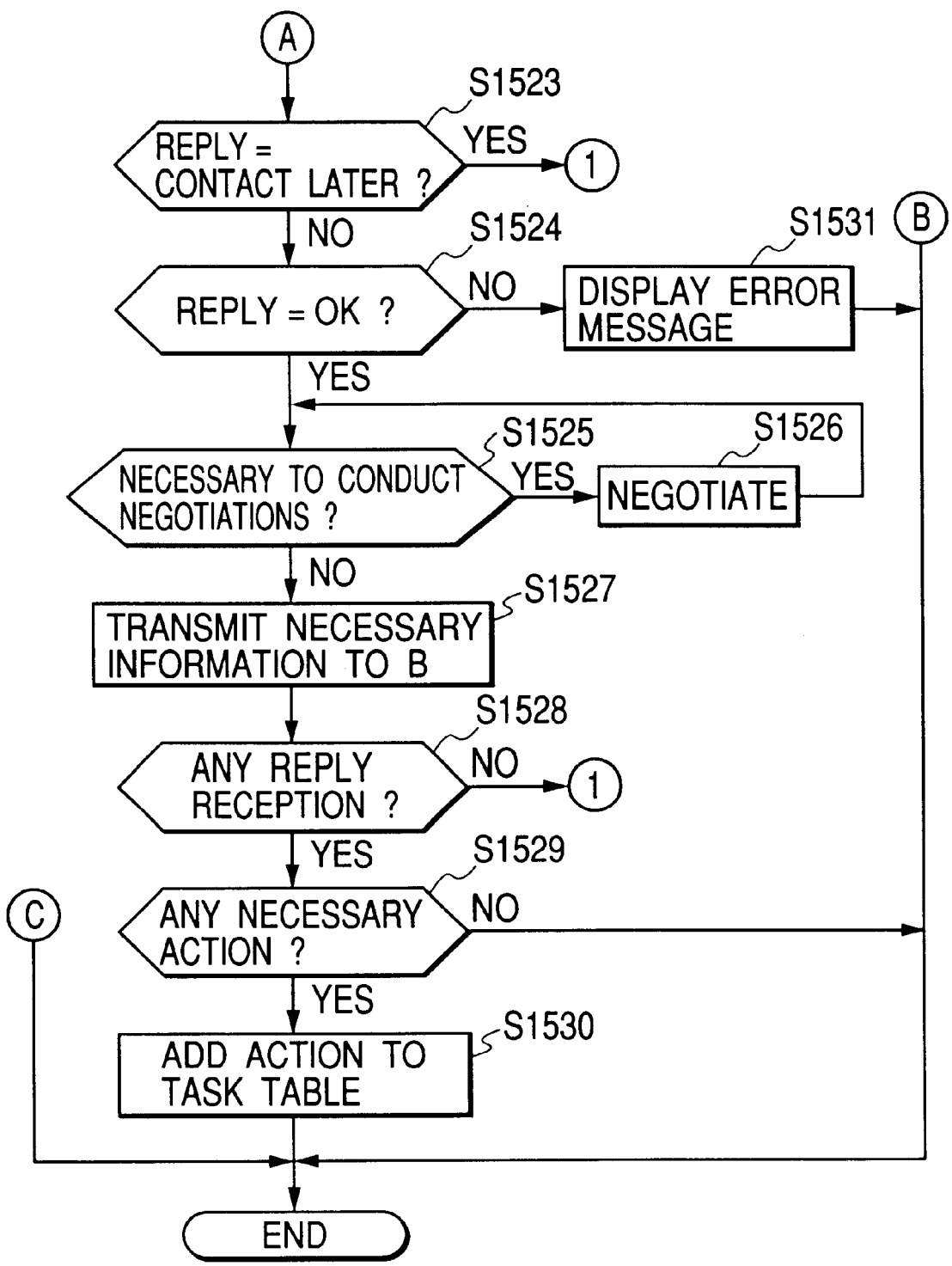
Figure 139:
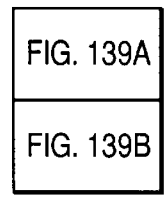
Figure 139A:
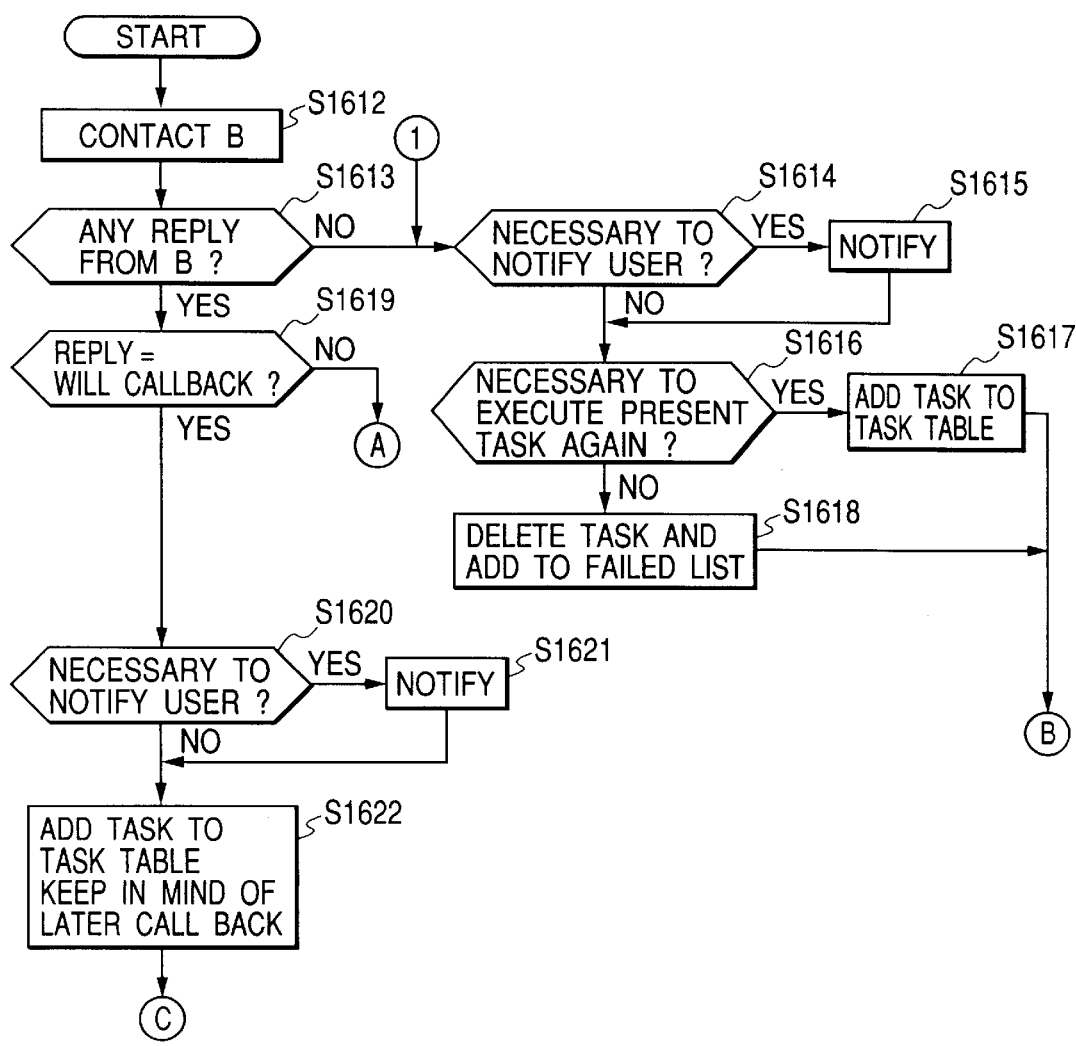
Figure 139B:
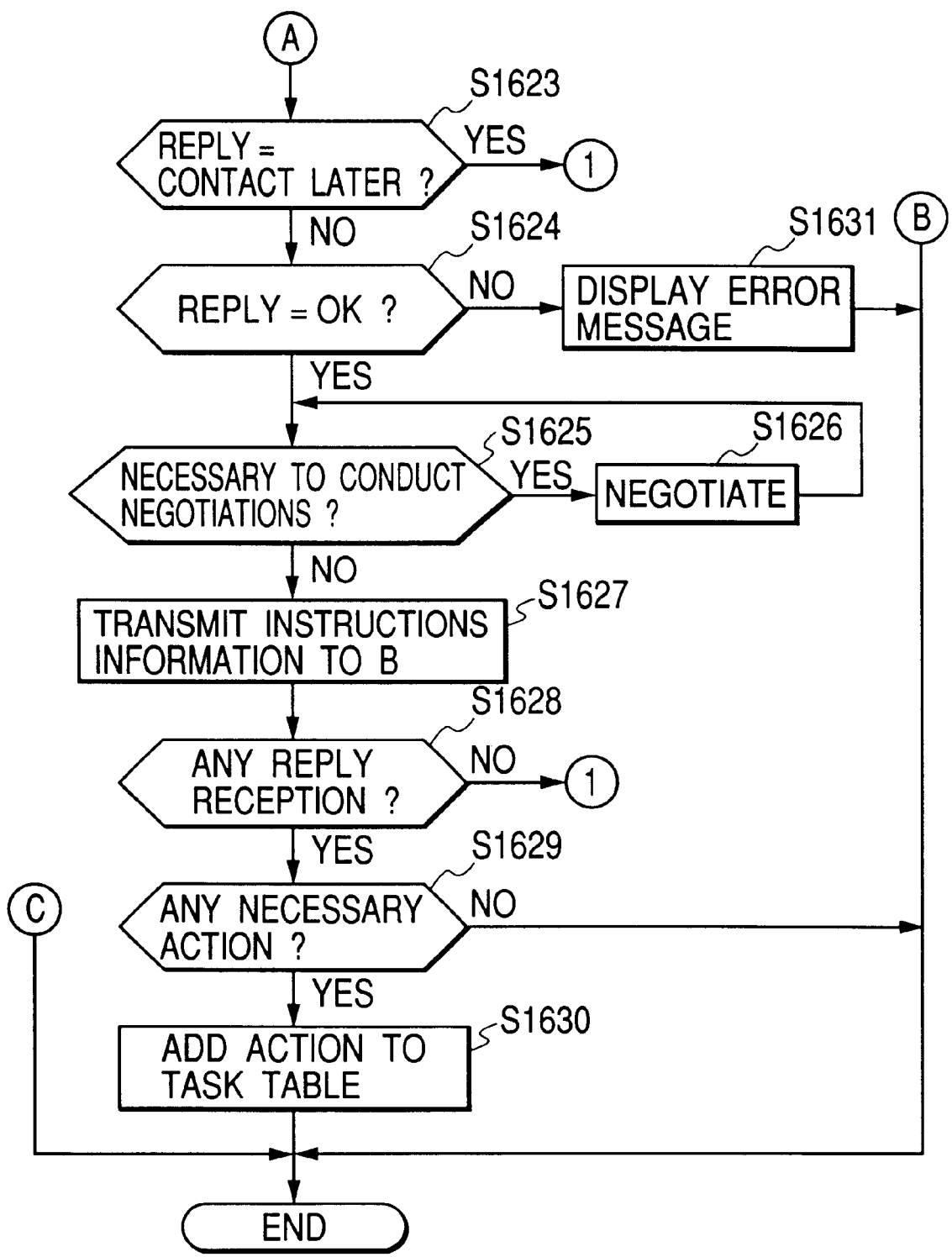
Figure 140:
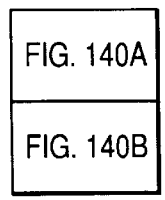
Figure 140A:
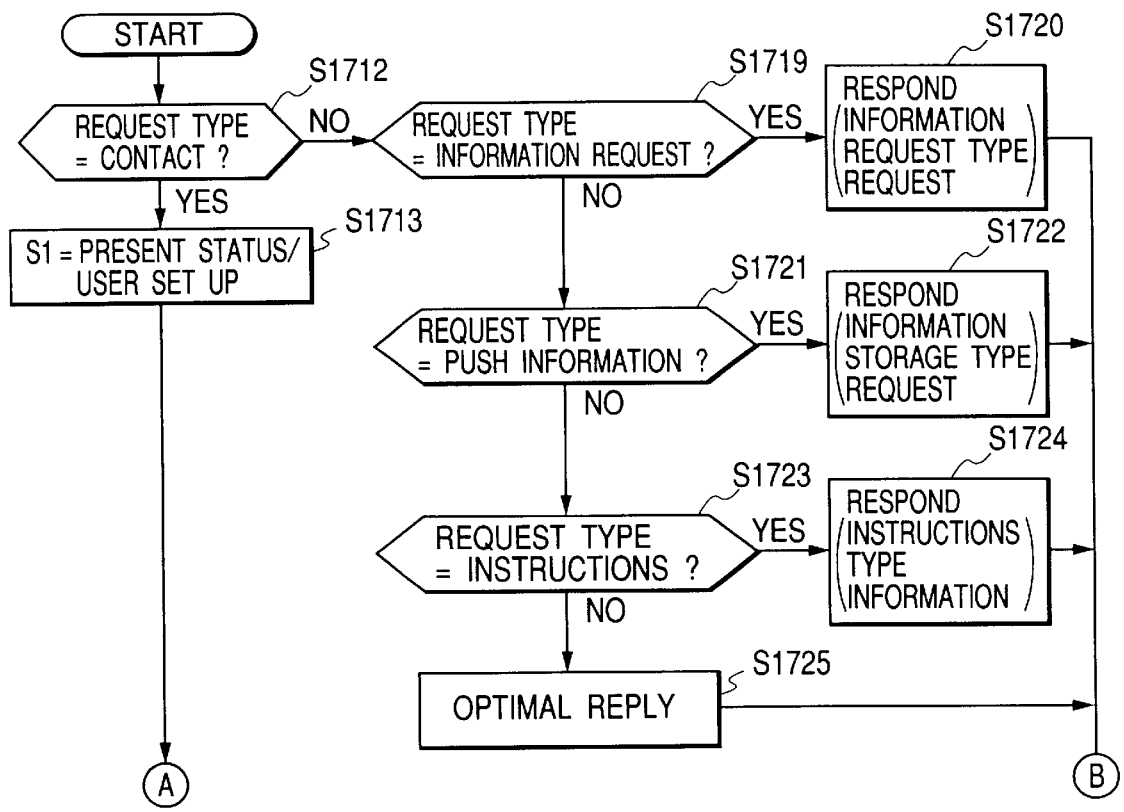
Figure 140B:
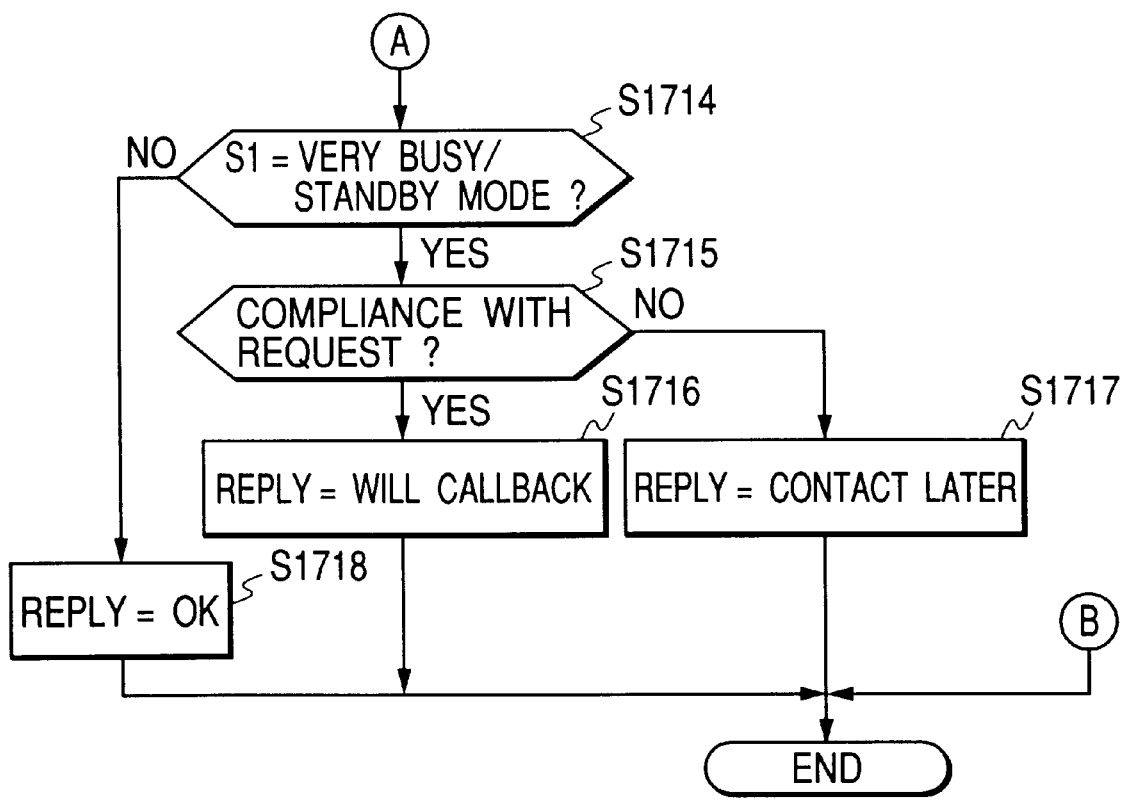
Figure 141:
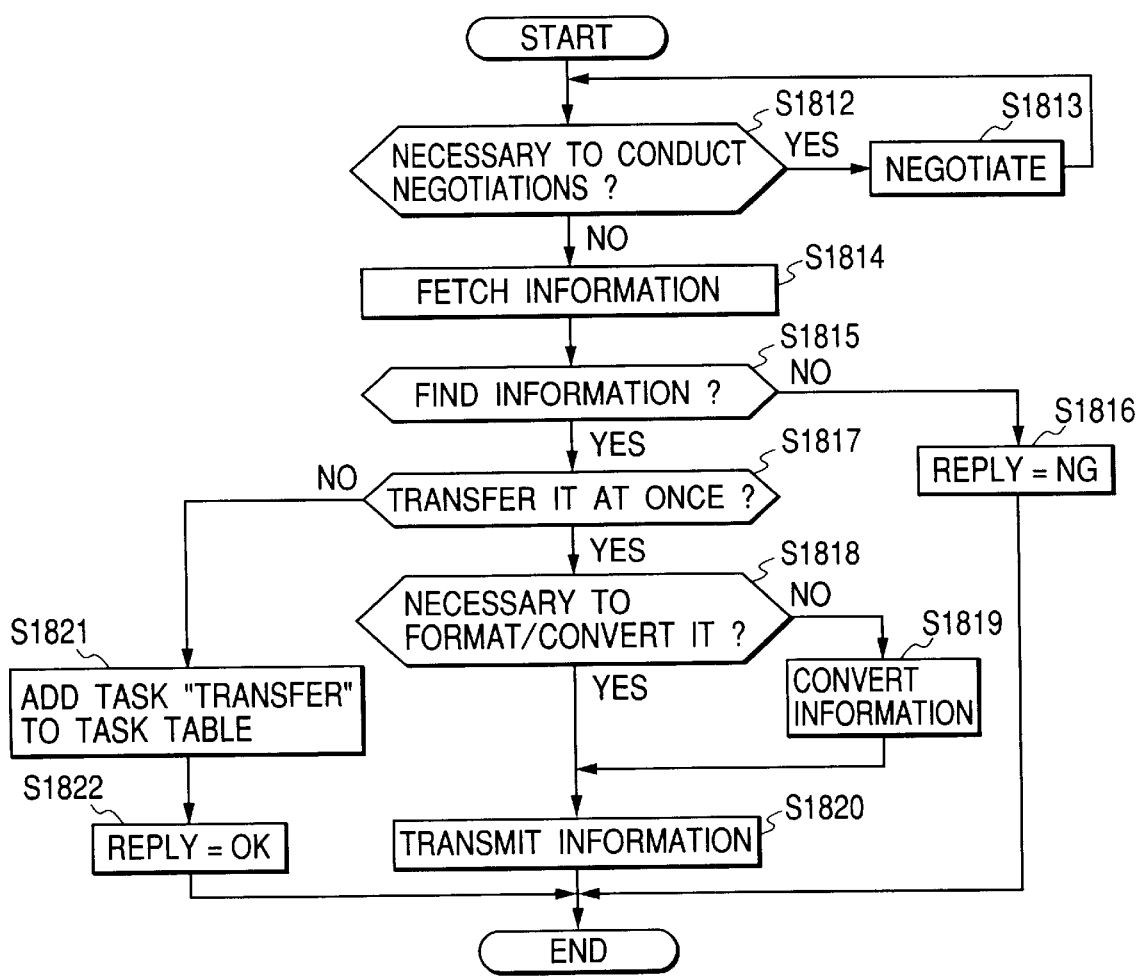
Figure 142:
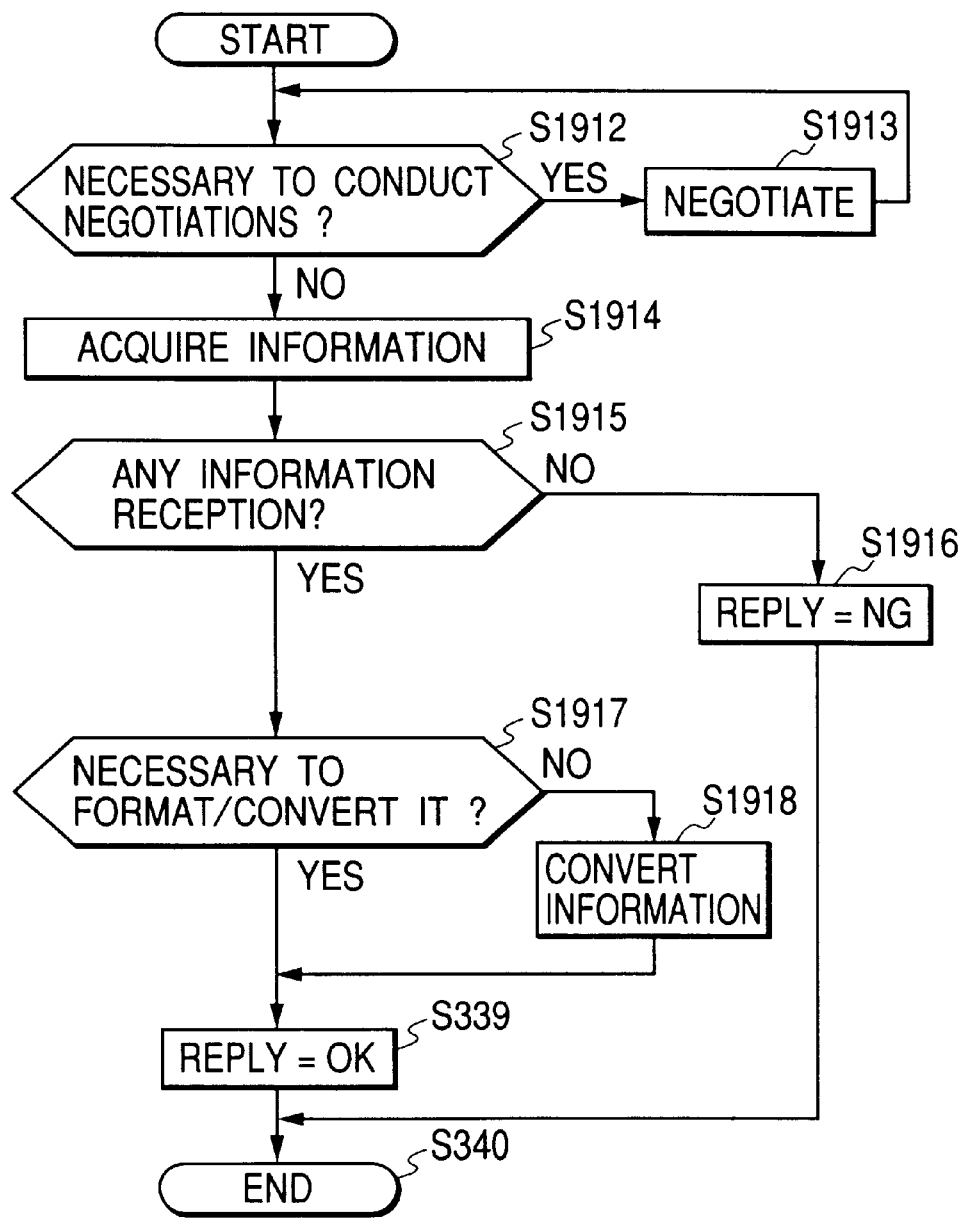
Figure 143:
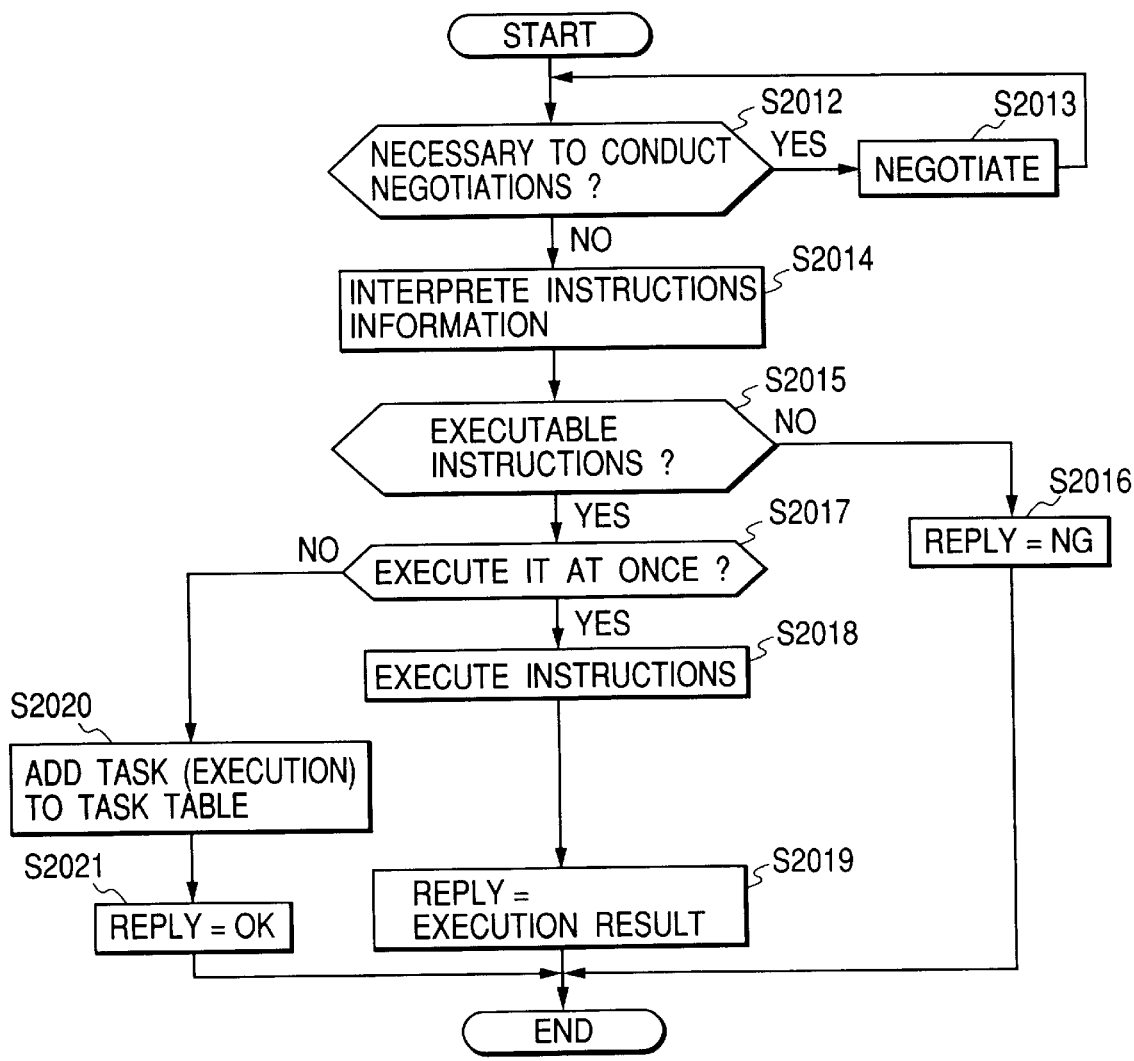
Figure 144:
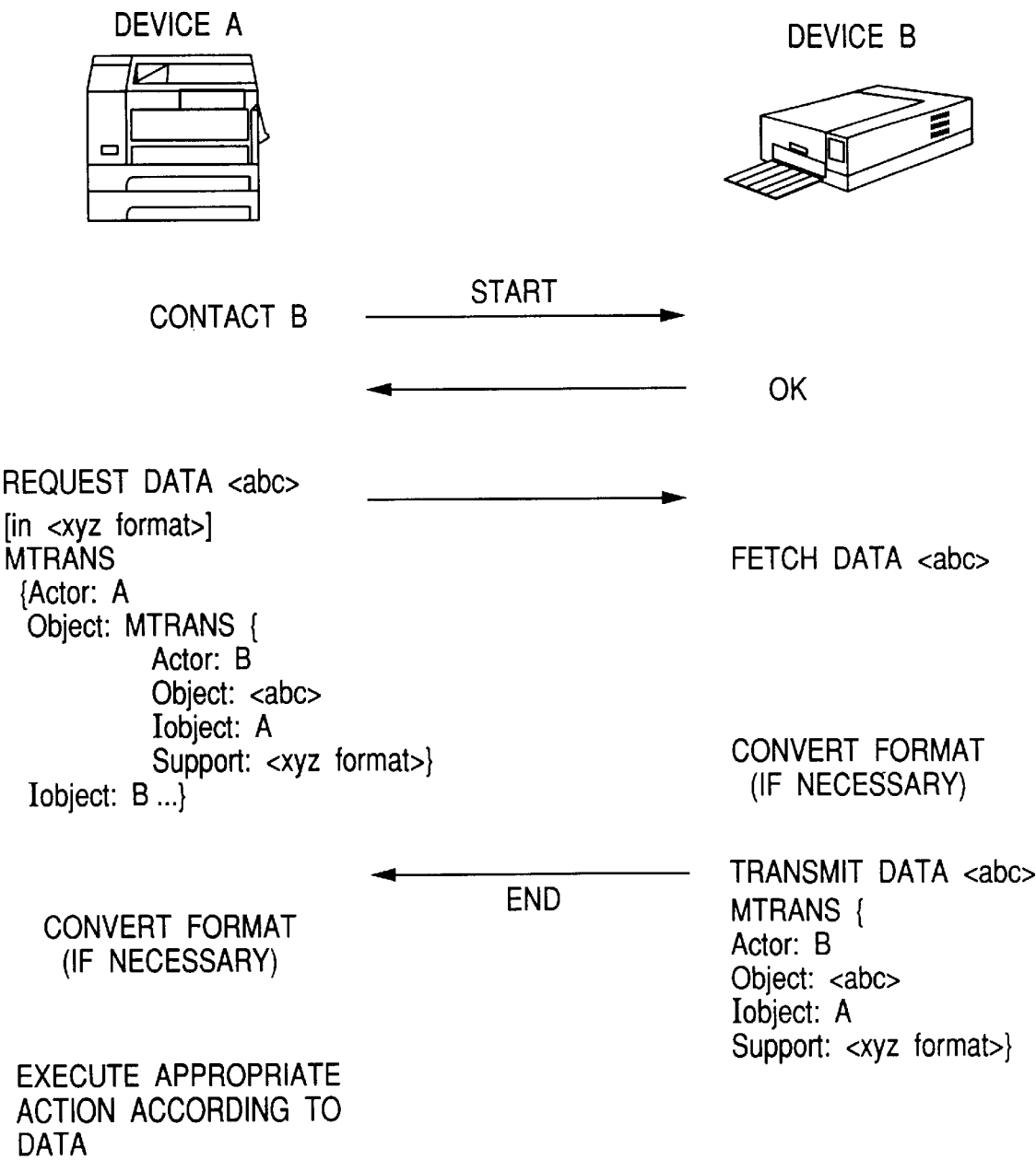
Figure 145:
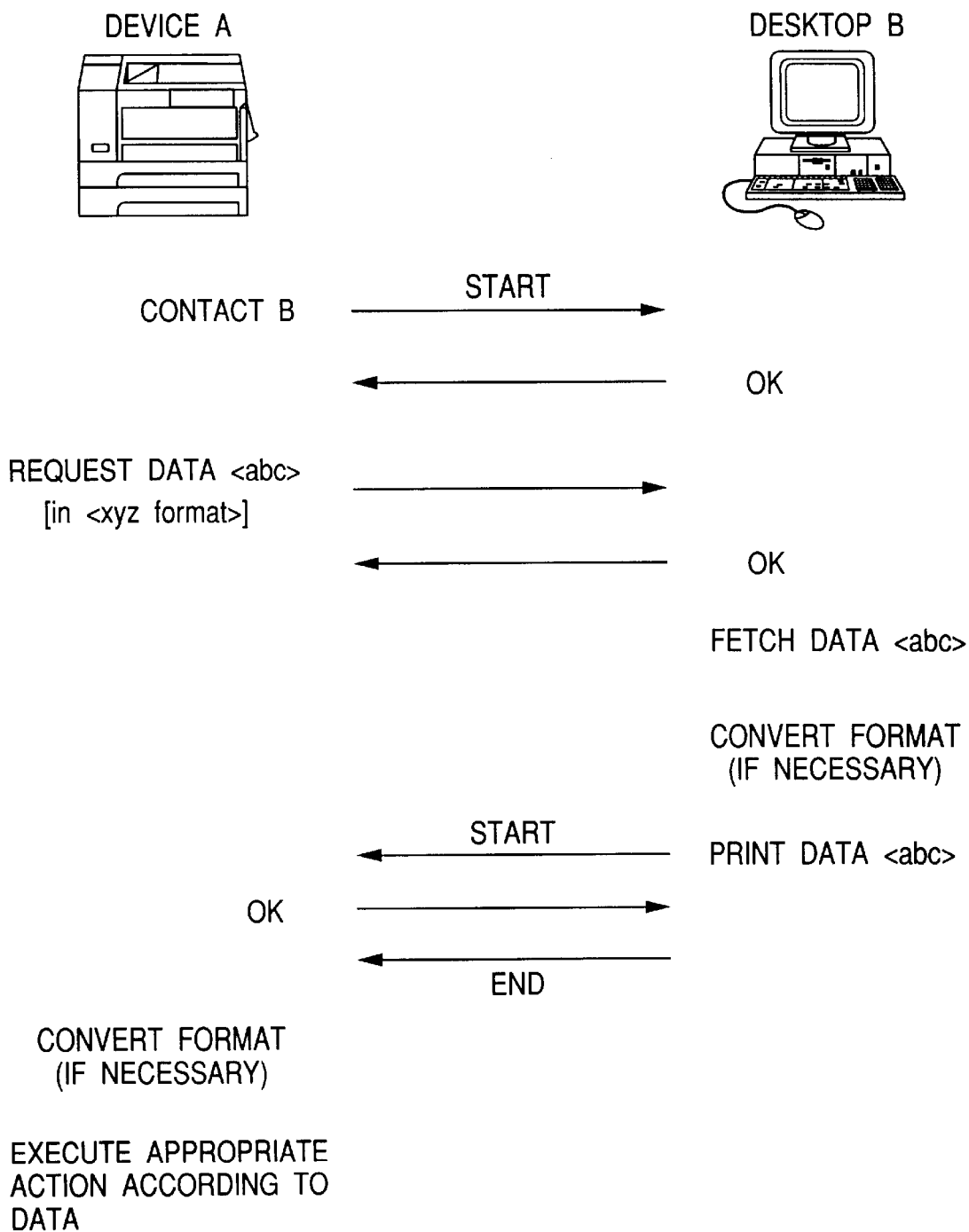
Figure 146:
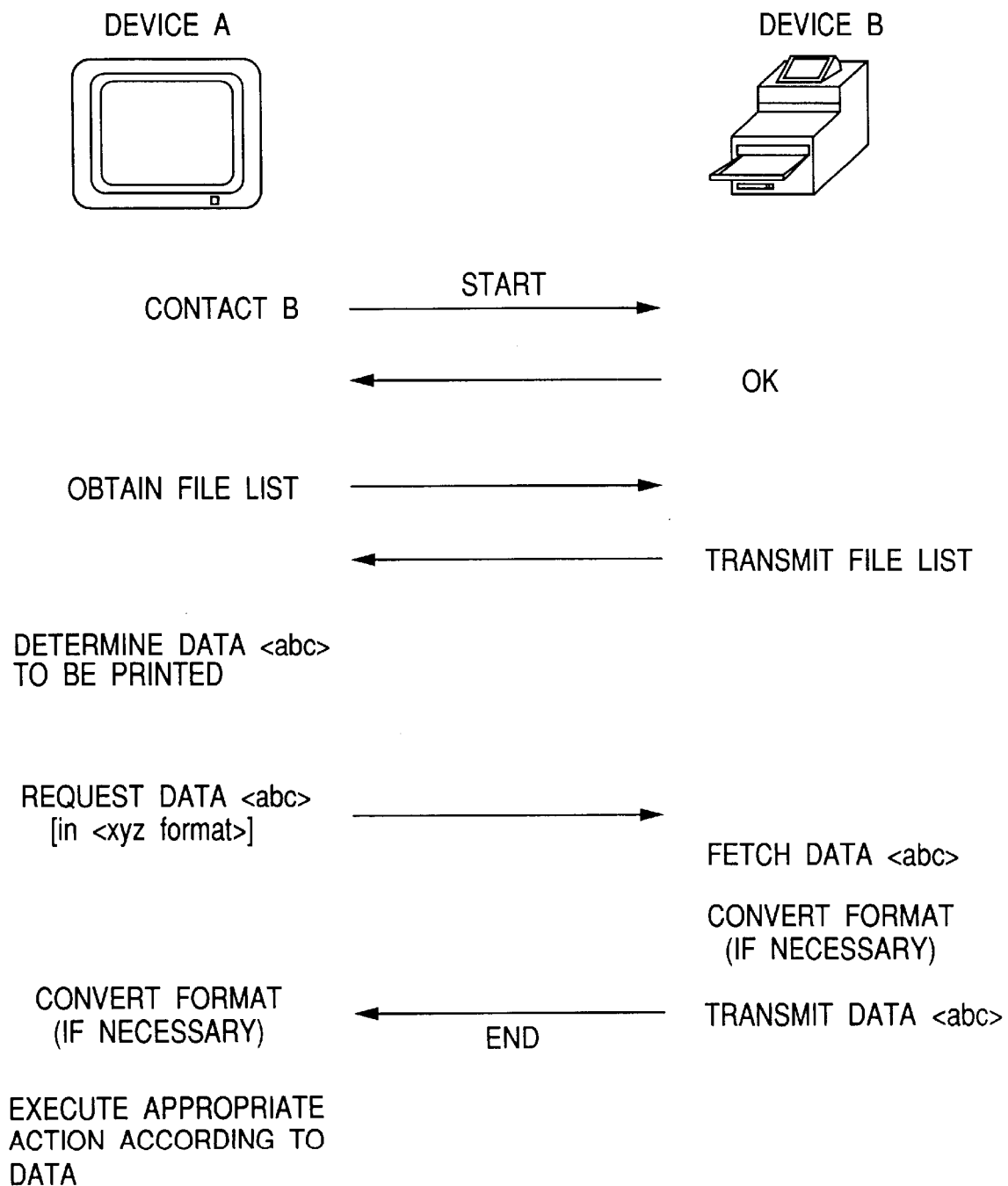
Figure 147:
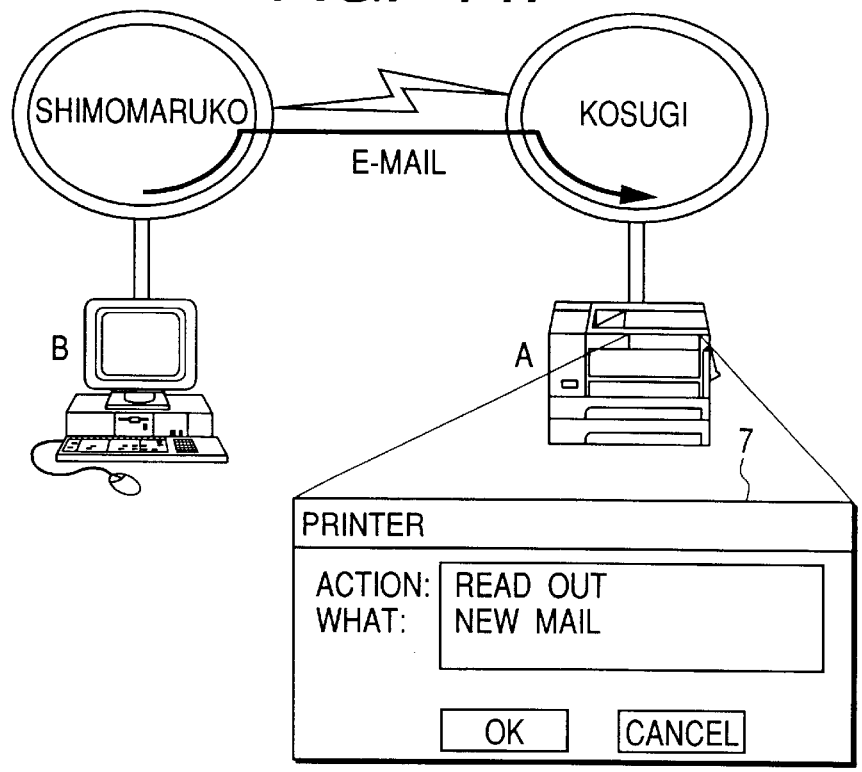
Figure 149:
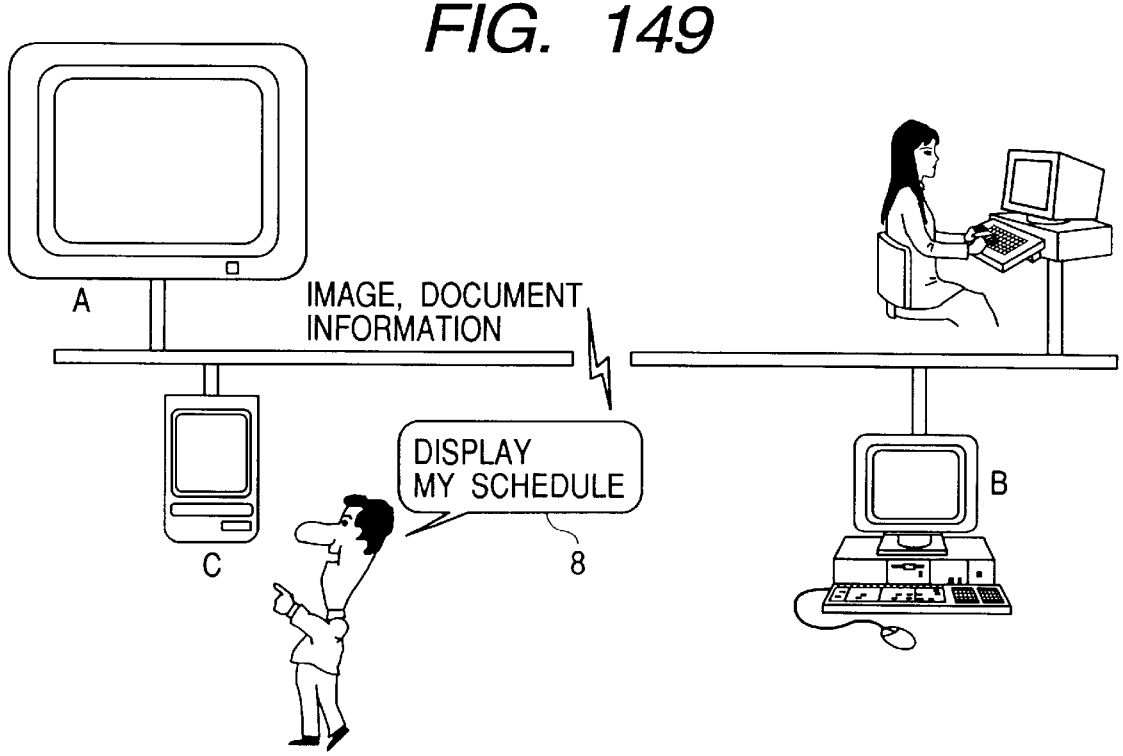
Figure 148:
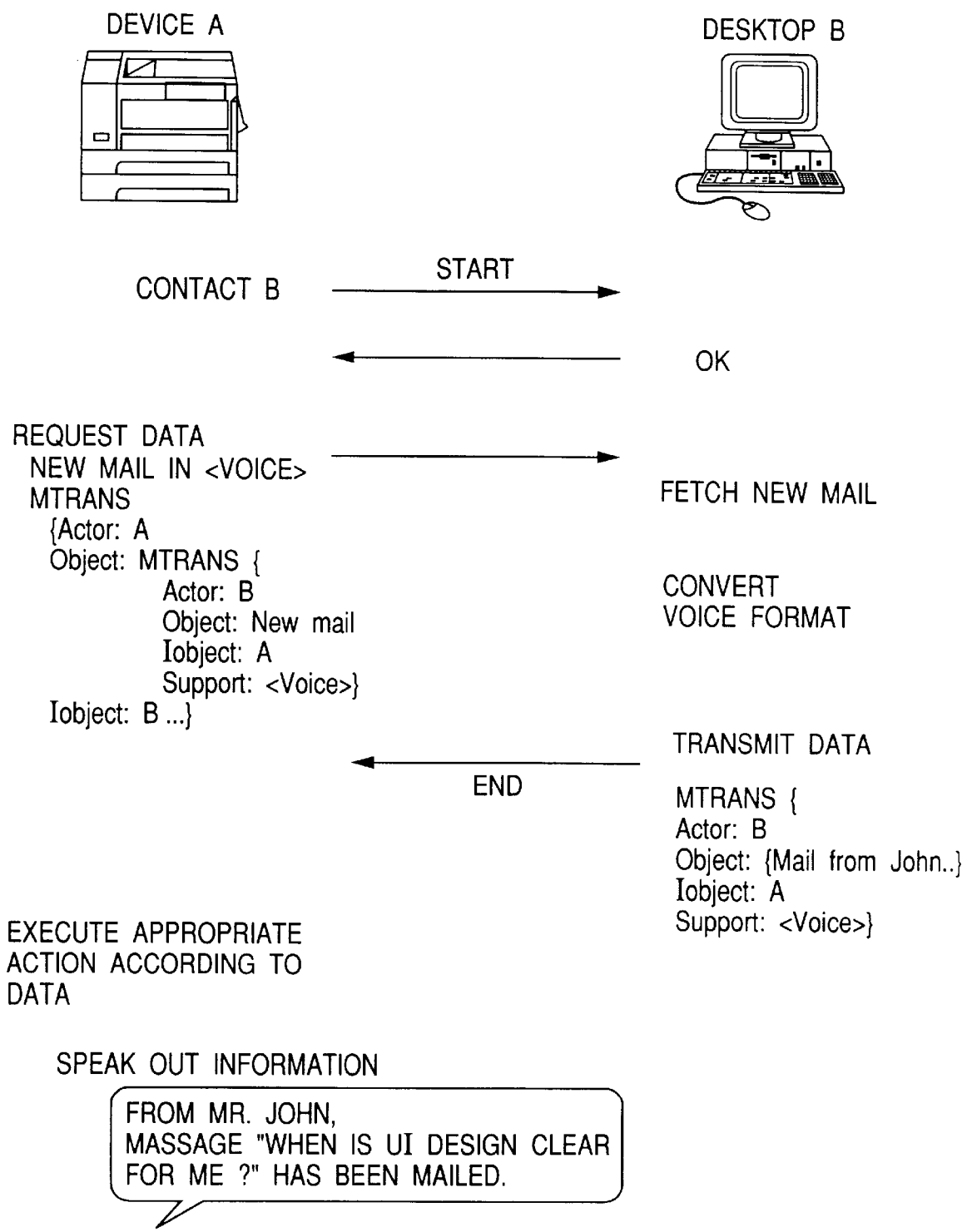
Figure 150:
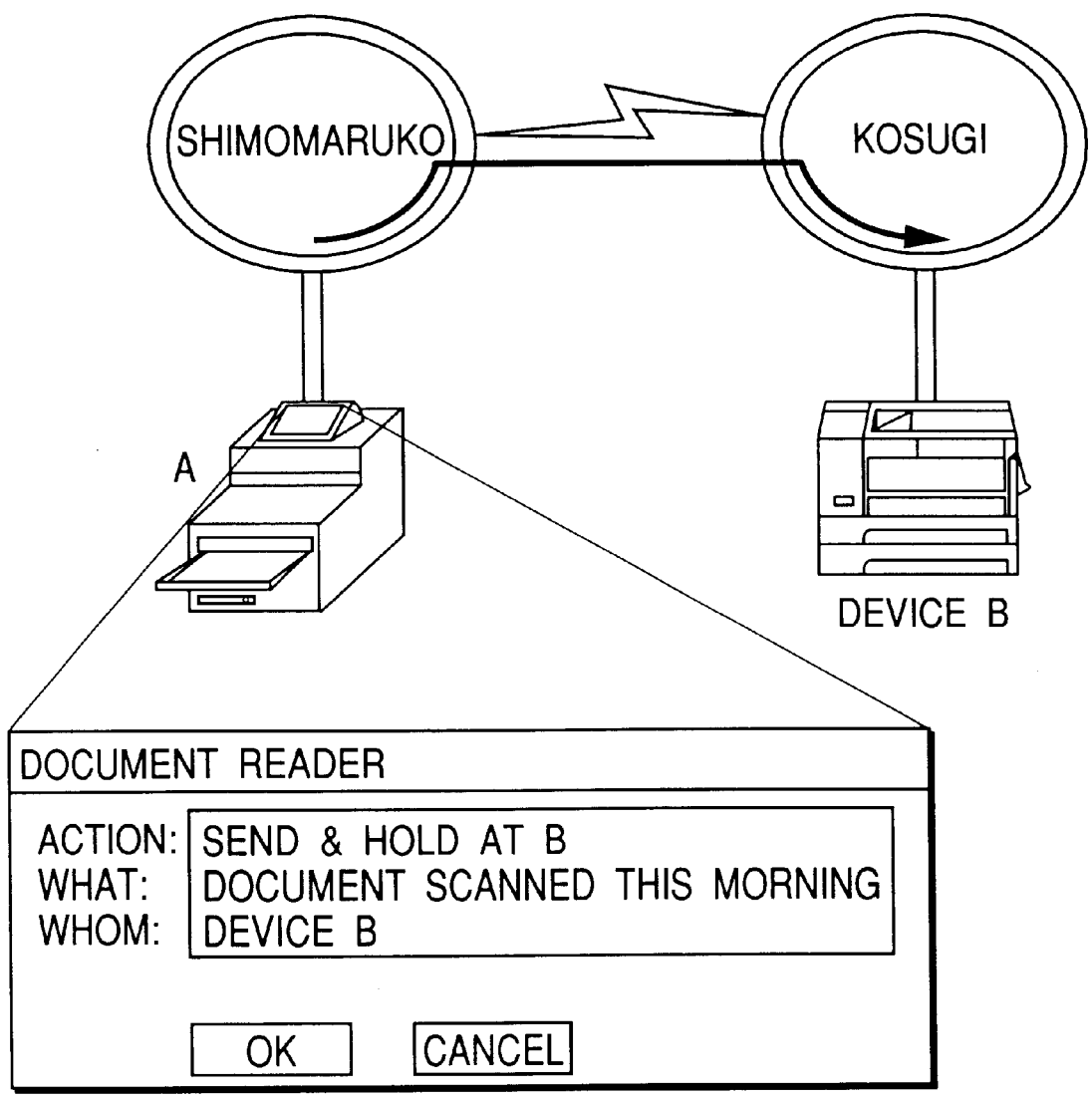
Figure 151:
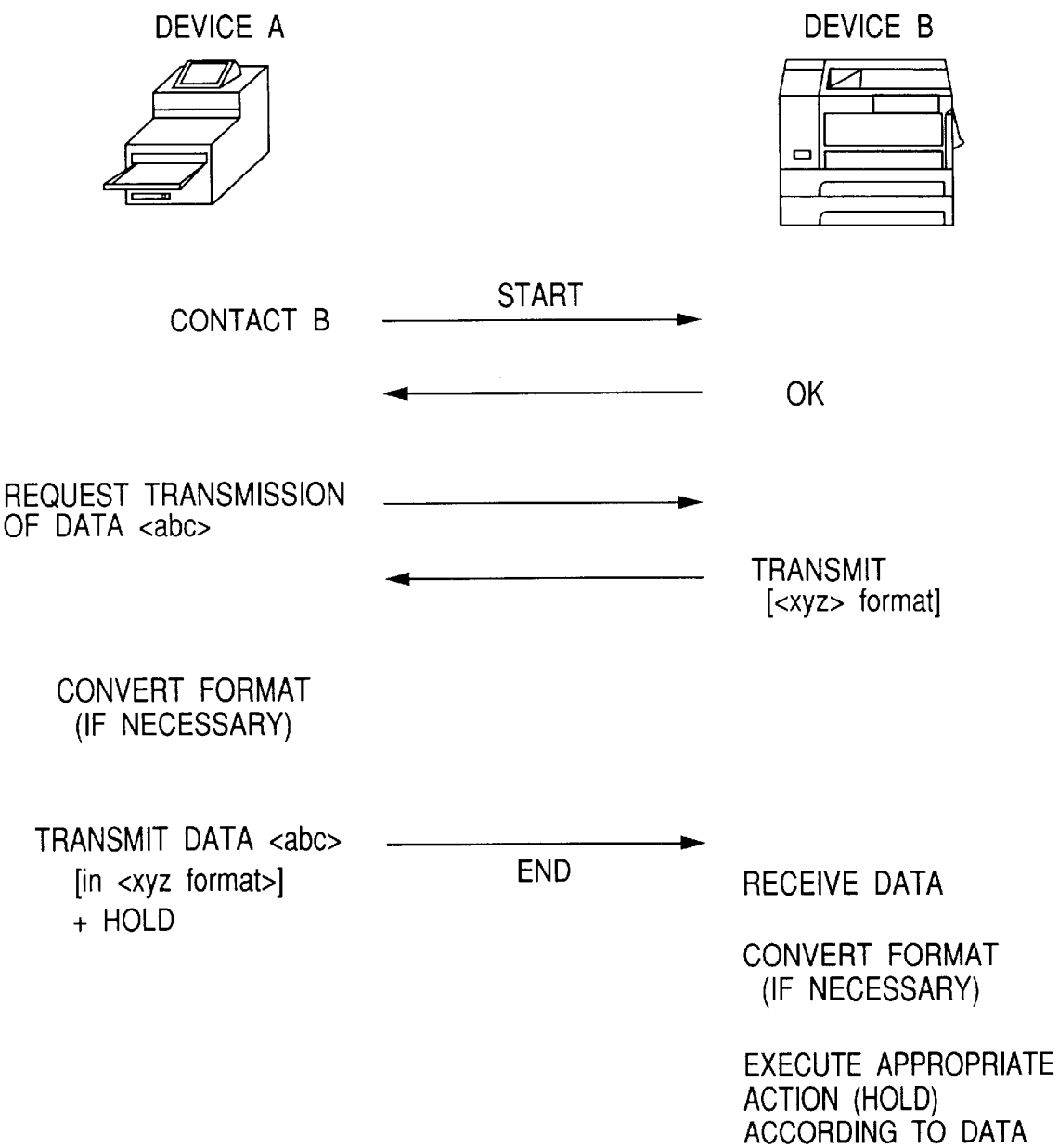
Figure 152:
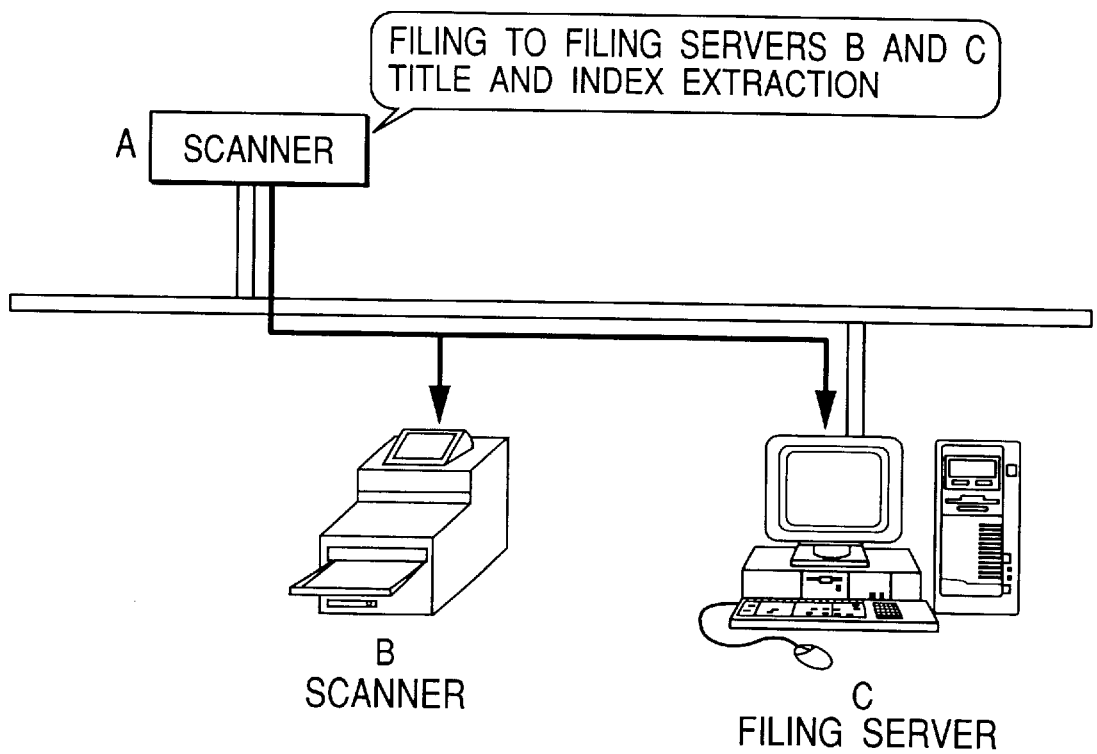
Figure 153:
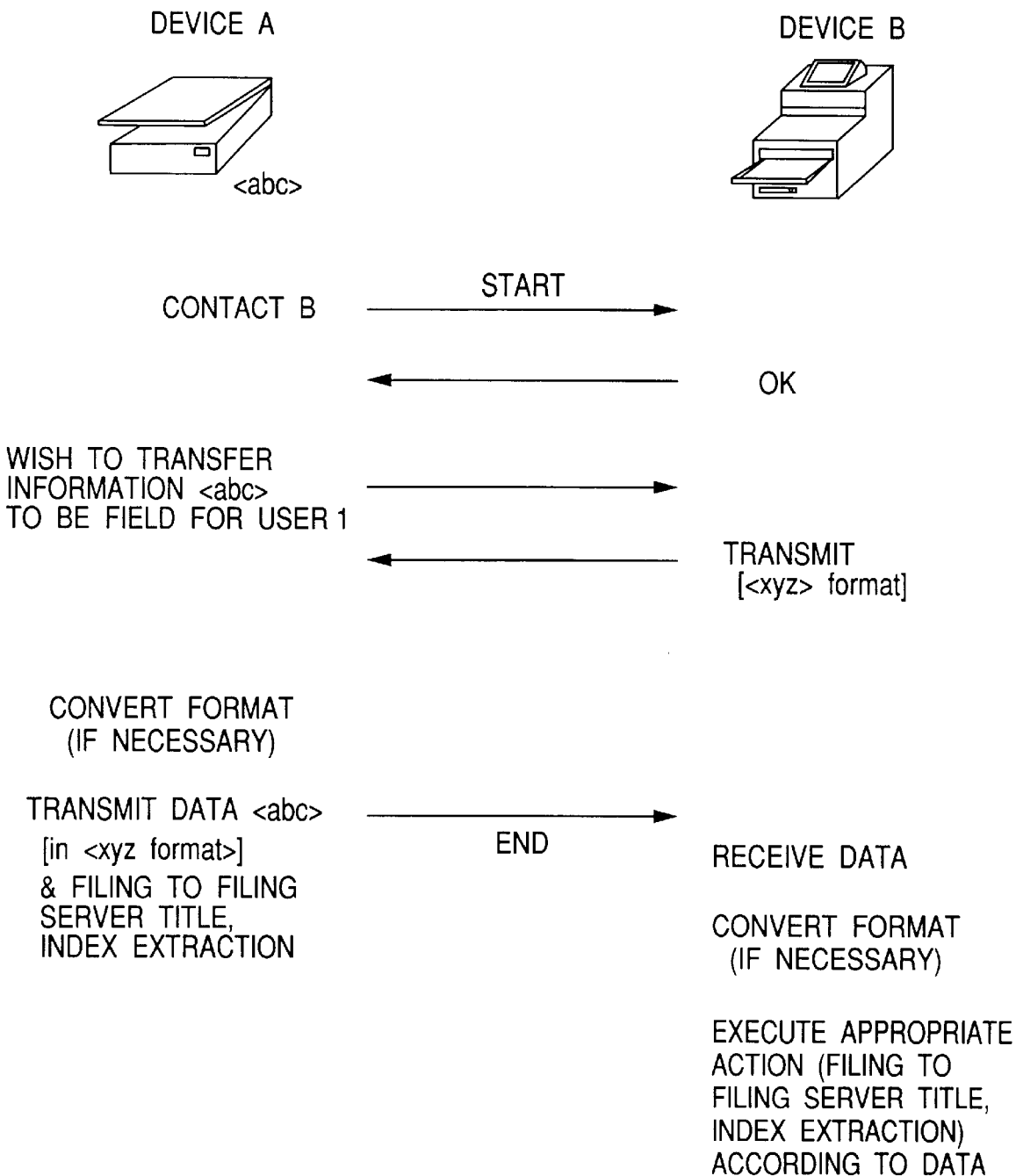
Figure 154:
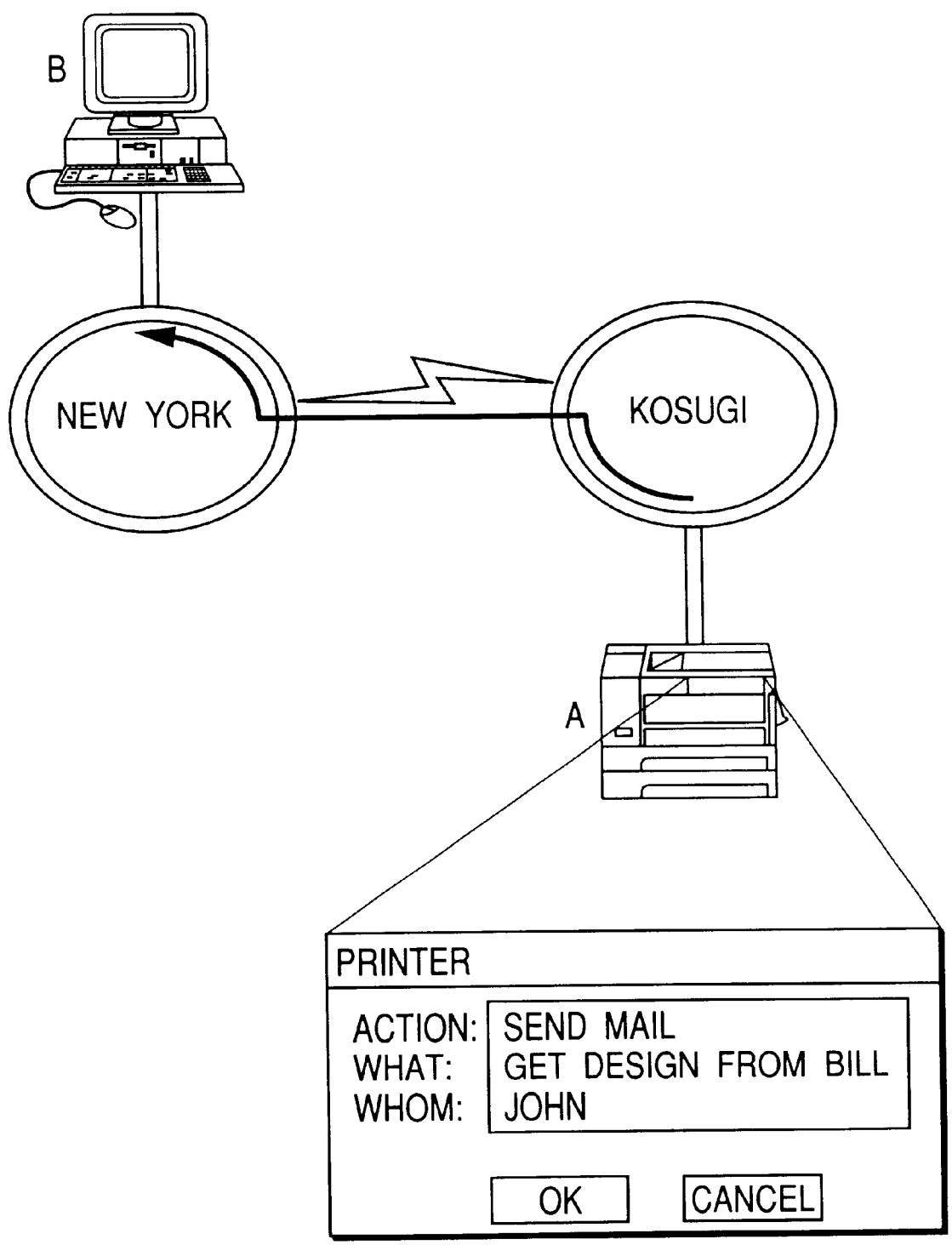
Figure 155:
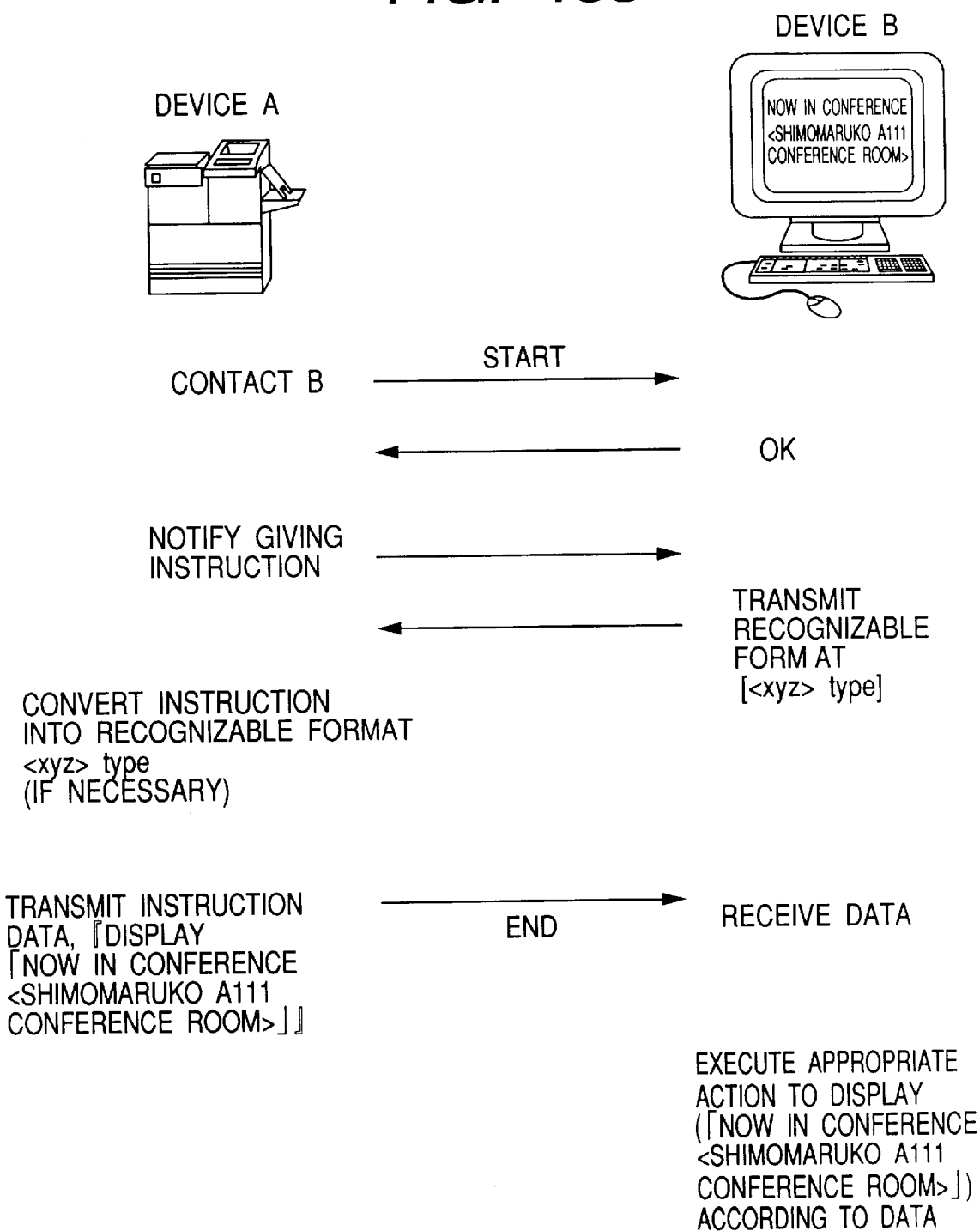
Figure 156:
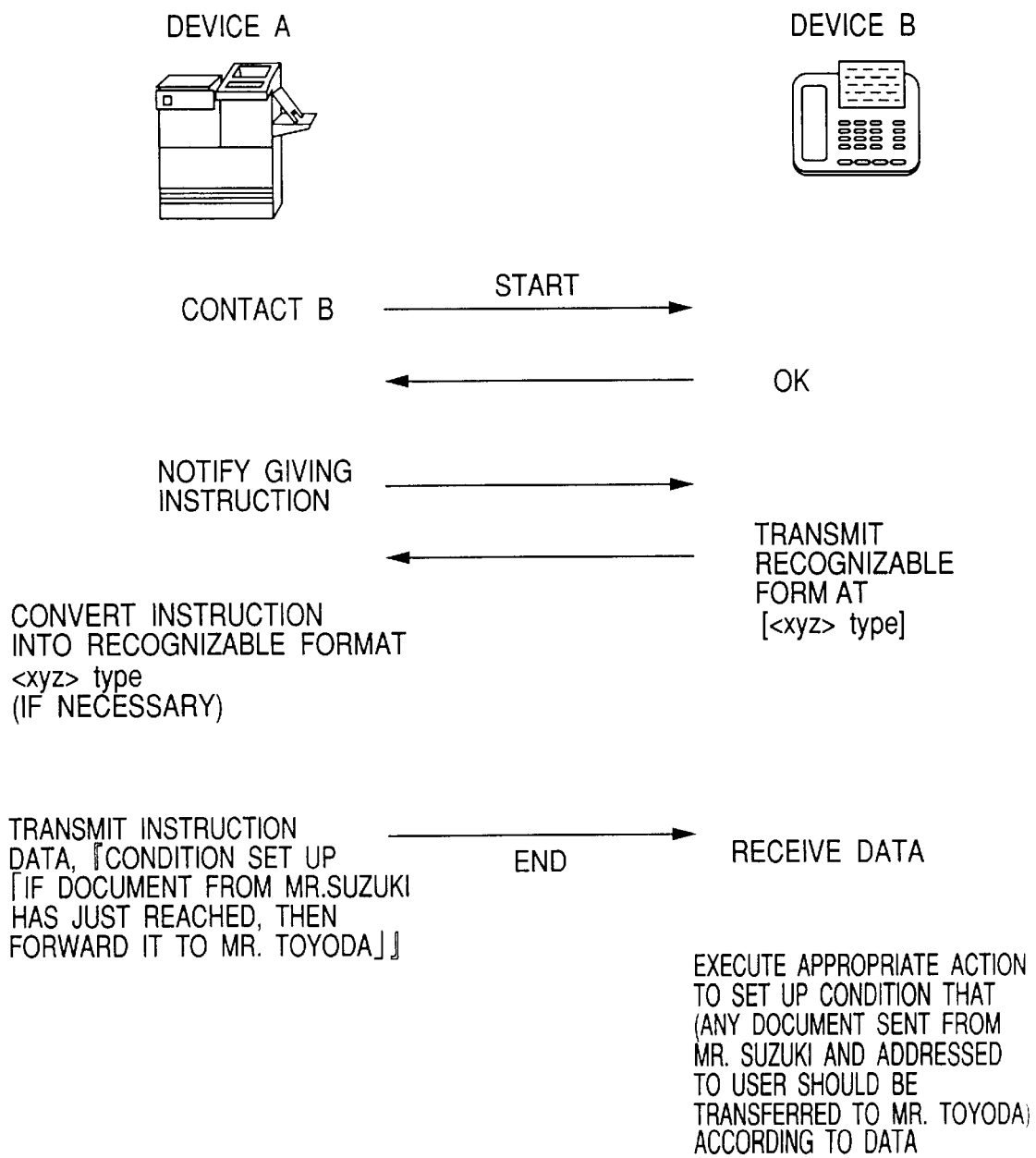
Figure 157:
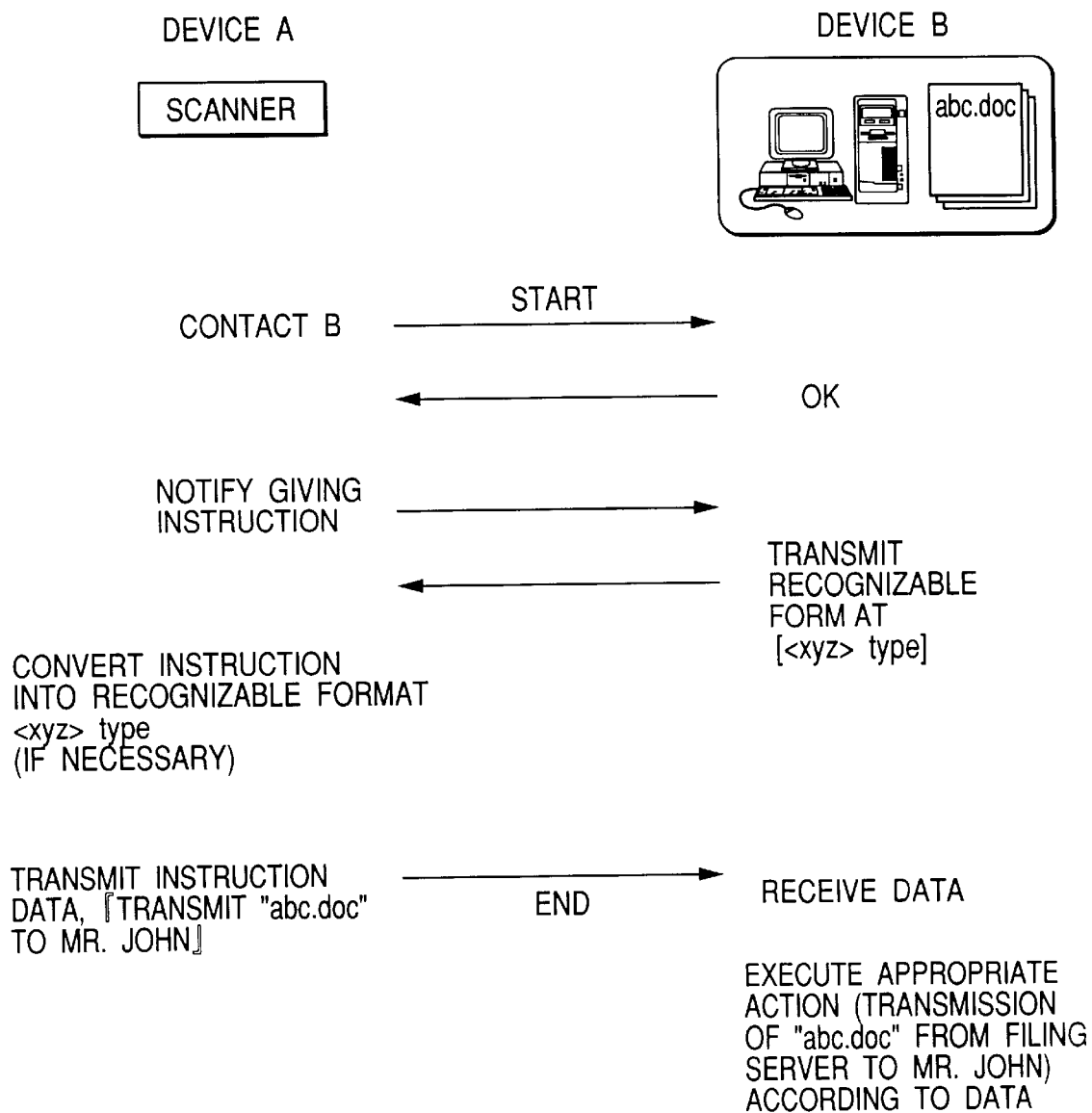
Figure 158:
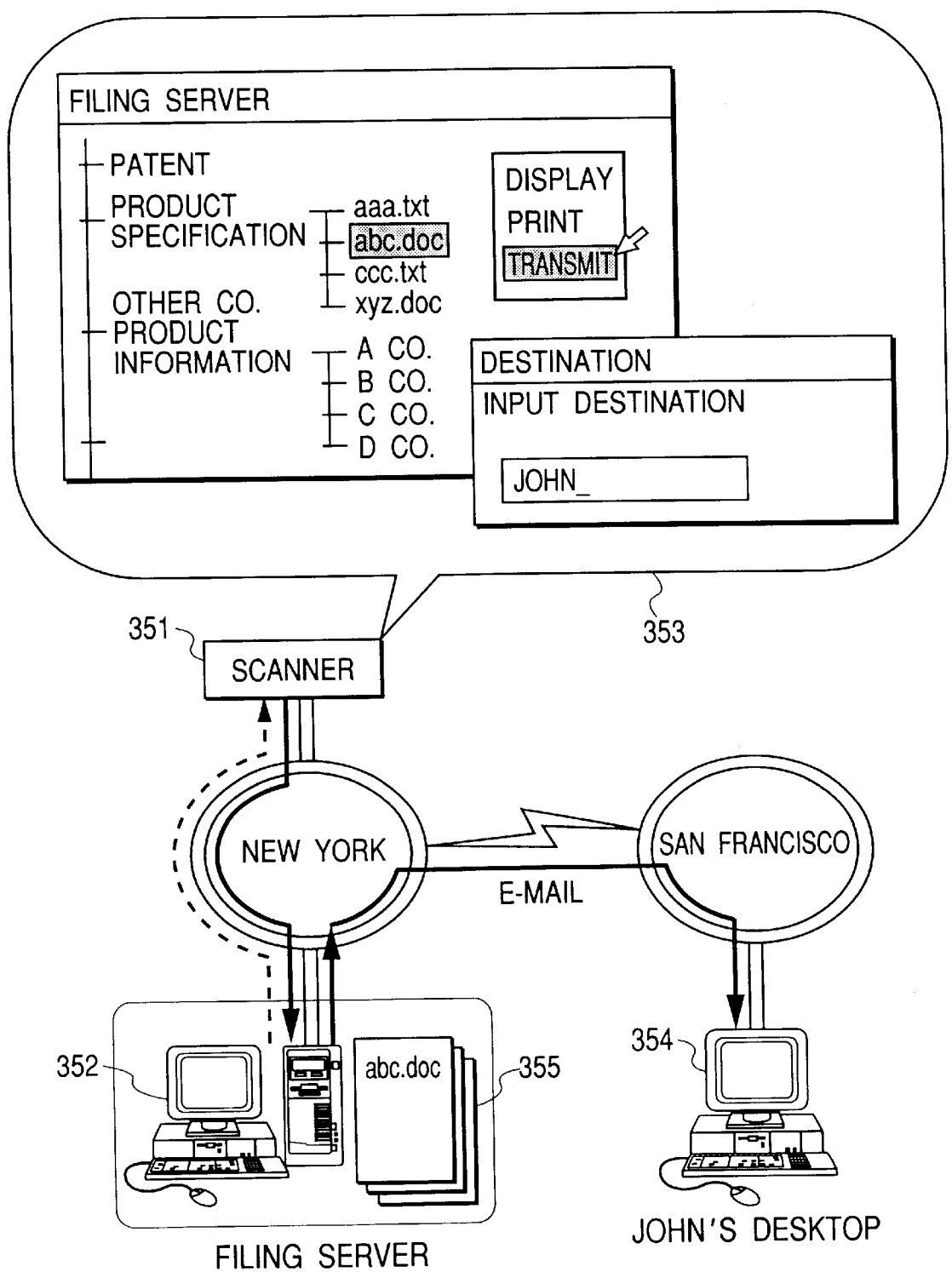
Figure 159:
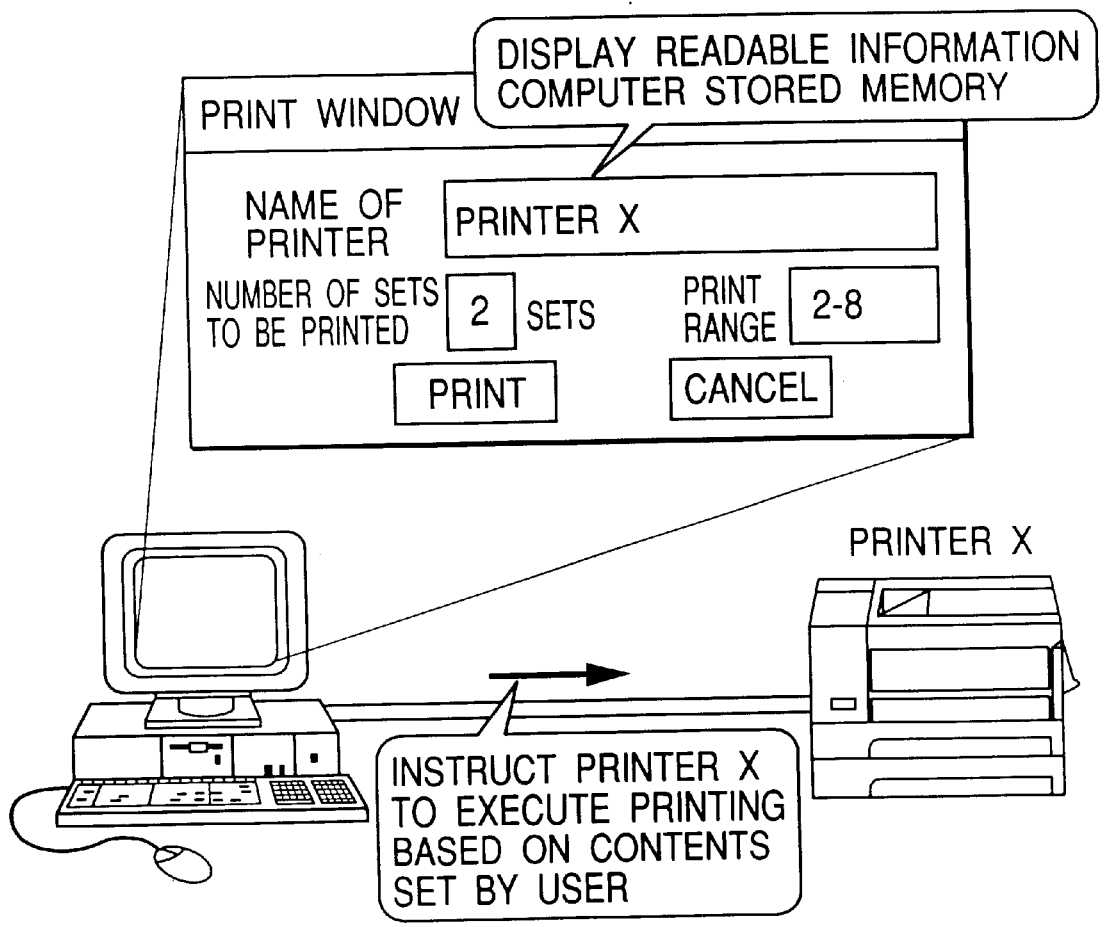
Figure 160:
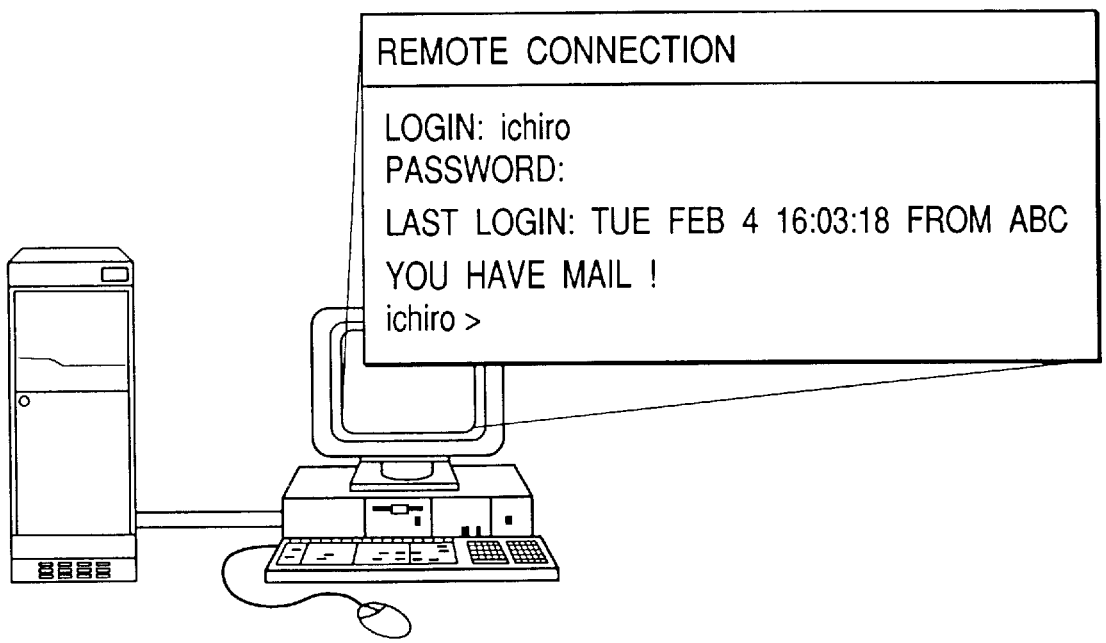
Figure 161:
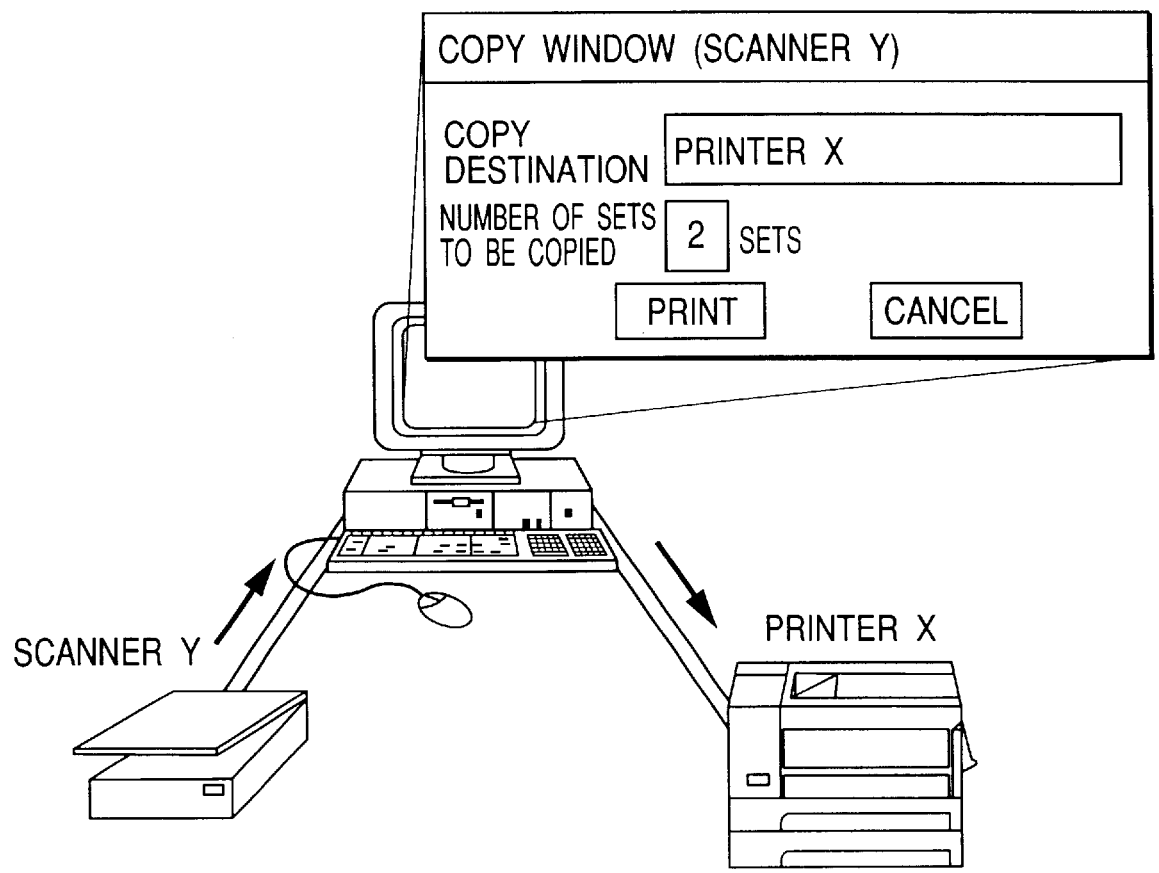
Figure 162:
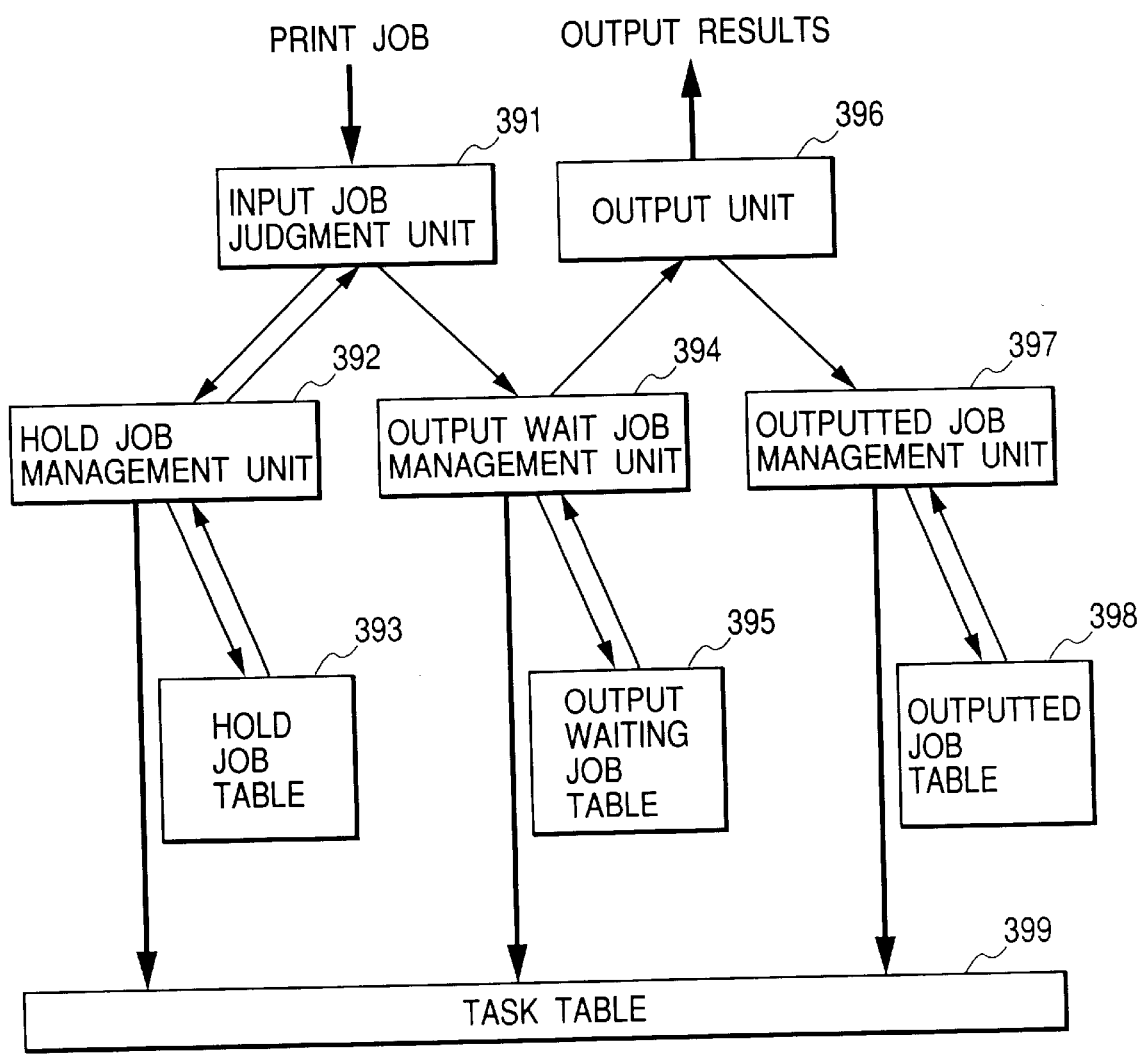
Figure 163:
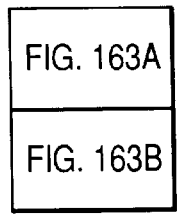
Figure 163A:
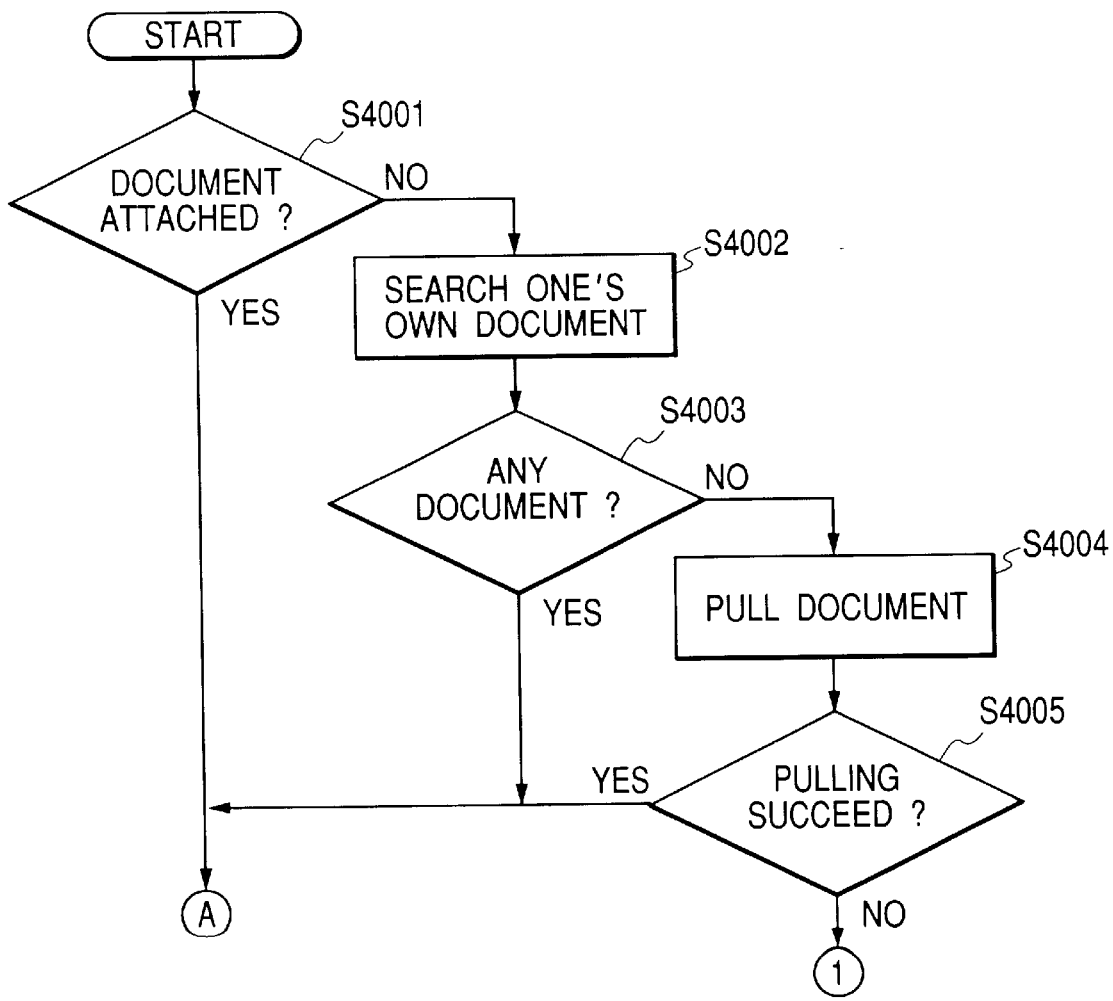
Figure 163B:
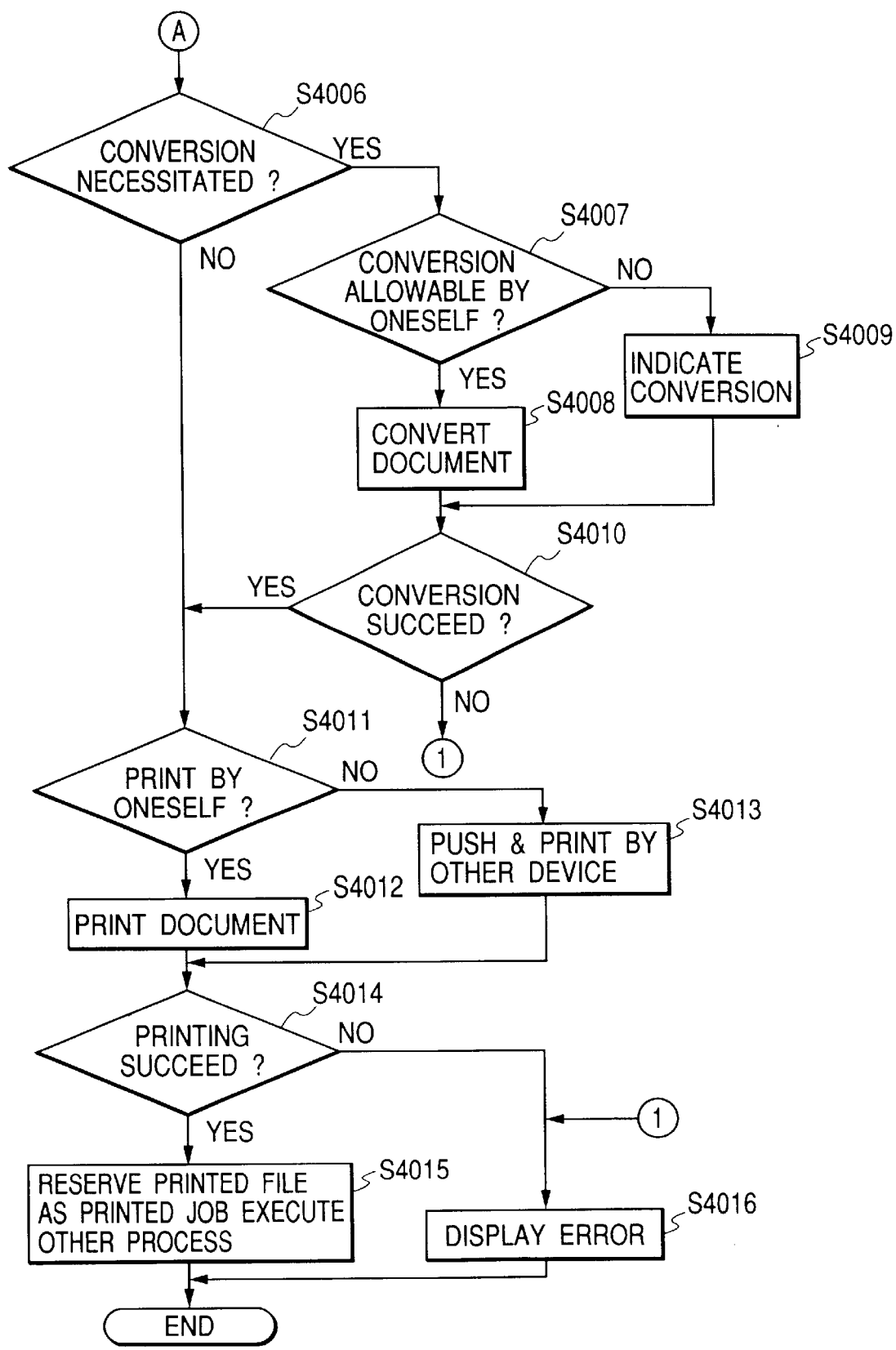
Figure 164:
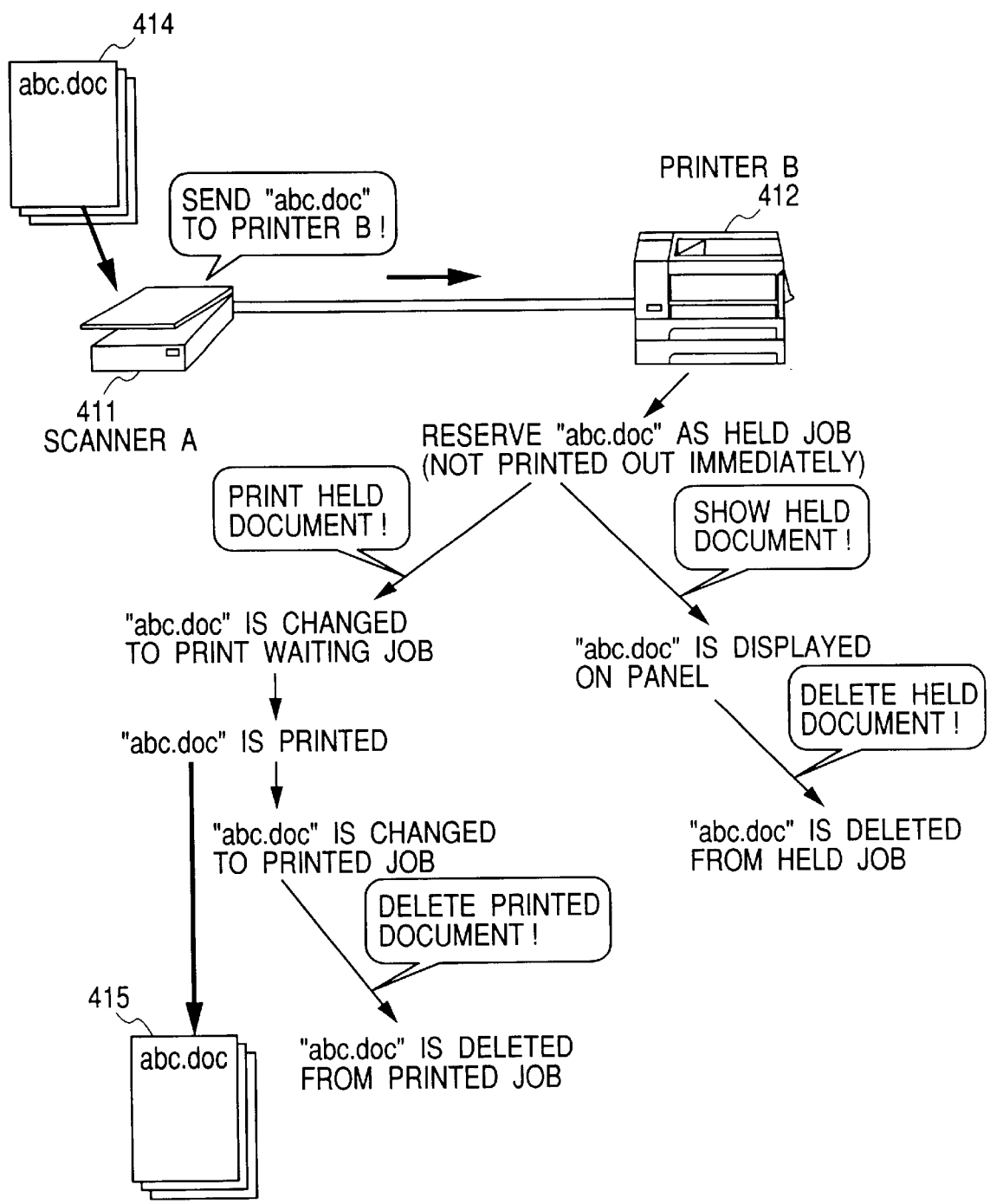
Figure 165:
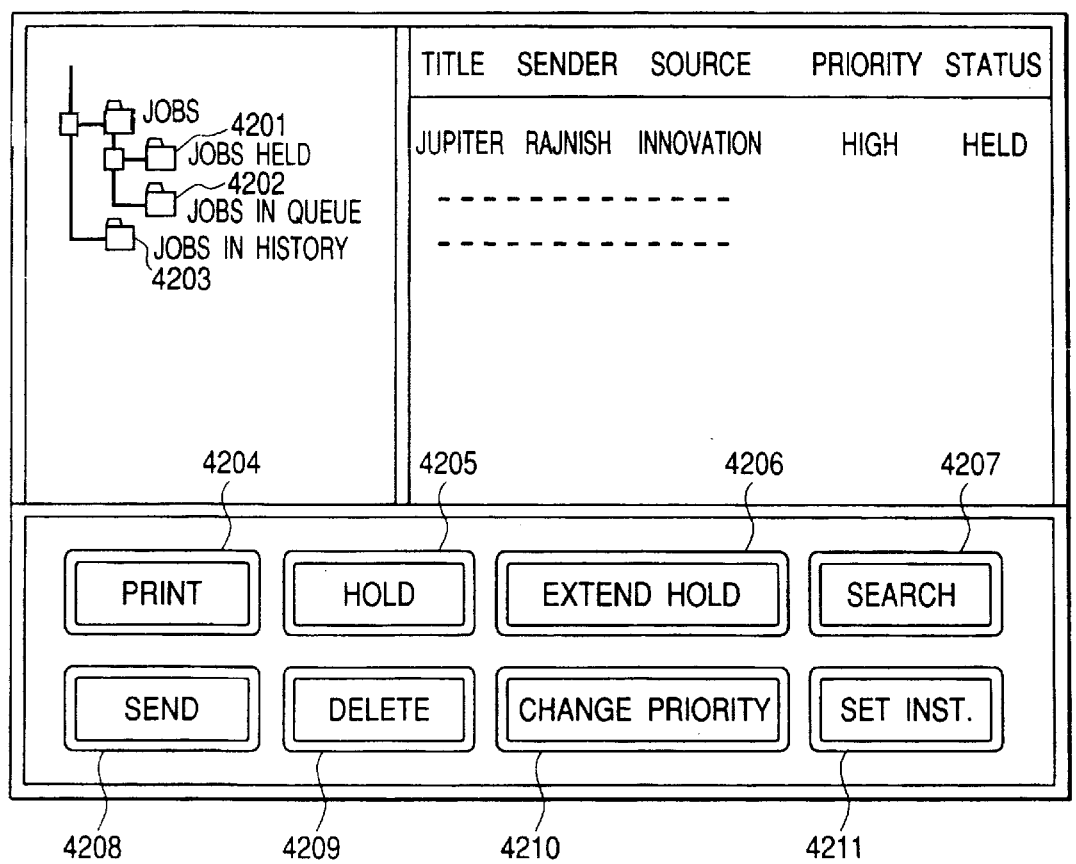

FIG. 132 is a diagram illustrating example input/output apparatuses that can communicate with each other;

FIG. 133 is a diagram illustrating an example input/output apparatus that can acquire information from another apparatus;

FIG. 134 is a diagram illustrating an example input/output apparatus that can store information in another apparatus;

FIG. 135 is a diagram illustrating an example input/output apparatus that can send an instruction to another apparatus;

FIG. 136 which is composed of FIGS. 136A and 136B are flowcharts showing the processing for the task <COMMUNICATE>;

FIG. 137 which is composed of FIGS. 137A and 137B are flowcharts showing the processing for the task <PULL>;

FIG. 138 which is composed of FIGS. 138A and 138B are flowcharts showing the processing for the task <PUSH>;

FIG. 139 which is composed of FIGS. 139A and 139B are flowcharts showing the processing for the task <INDICATE>;

FIG. 140 which is composed of FIGS. 140A and 140B are flowcharts showing the processing for the task <RESPOND>;

FIG. 141 is a flowchart showing the processing for a response task relative to an information request type request;

FIG. 142 is a flowchart showing the processing for a response task relative to an information storage type request;

FIG. 143 is a flowchart showing the processing for a response task relative to an instructions type request;

FIG. 144 is a diagram illustrating an example pull session;

FIG. 145 is a diagram illustrating another example pull session;

FIG. 146 is a diagram illustrating an additional example pull session;

FIG. 147 is a diagram illustrating an example Hear On Demand session;

FIG. 148 is a diagram illustrating a further example pull session;

FIG. 149 is a diagram illustrating another example pull task;

FIG. 150 is a diagram illustrating an additional example pull task;

FIG. 151 is a diagram illustrating a session for a further example pull task;

FIG. 152 is a diagram illustrating an example push task;

FIG. 153 is a diagram illustrating an example push session;

FIG. 154 is a diagram illustrating an example mail transmission;

FIG. 155 is a diagram illustrating example instructions task INDICATE session;

FIG. 156 is a diagram illustrating another example instructions task INDICATE session;

FIG. 157 is a diagram illustrating additional example instructions task INDICATE session;

FIG. 158 is a diagram showing the flow of an operation following the operational procedures performed for another apparatus;

FIG. 159 is a diagram illustrating an example wherein a PC transmits a printing instruction to a printer;

FIG. 160 is a diagram for explaining an example wherein a PC is employed as a server terminal;

FIG. 161 is a diagram for explaining an example wherein a scanner and a printer are controlled by a PC;

FIG. 162 is a diagram showing a relationship between a print job status change and a process associated with each status;

FIG. 163 which is composed of FIGS. 163A and 163B are flowcharts showing printing processing;

FIG. 164 is a diagram showing a relationship between a print job and its processing, and a user's operation; and FIG. 165 is a diagram showing an example display screen for a user for operating a print job.

DETAILED DESCRIPTION OF THE PREFERRED EMBODIMENTS

The preferred embodiments of the present invention will now be described while referring to the accompanying drawings.

[First Embodiment]

Figure 1:
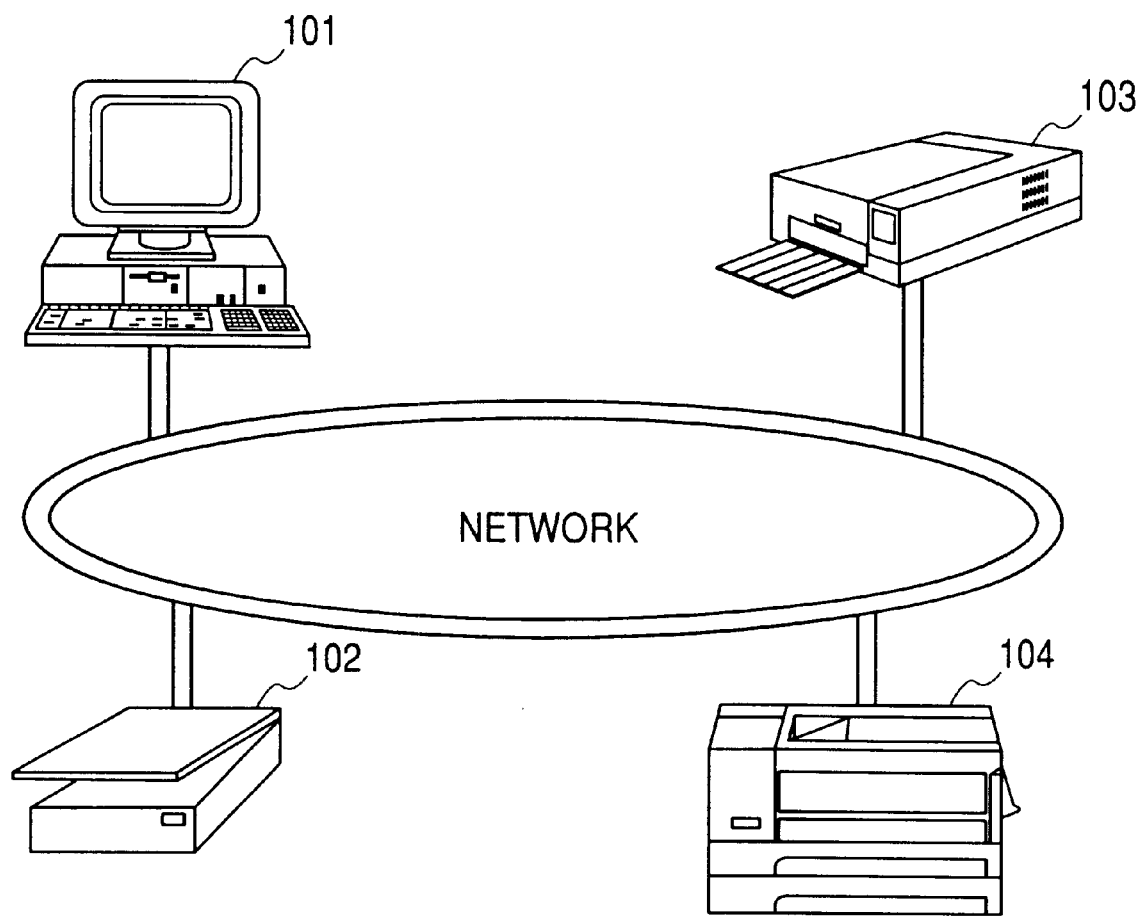
FIG. 1 is a block diagram illustrating the arrangement of an information processing system according to a first embodiment of the present invention.

FIG. 1 is a diagram illustrating a system arrangement according to a first embodiment in which a PC (Personal Computer) 101, a scanner 102, a color printer 103 and a monochrome printer 104 are connected to a network.

In this embodiment, when an apparatus in a system wherein a plurality of apparatuses are connected together is instructed to execute a specific job, the apparatus analyzes the object of the job by examining its contents, and thus ascertains which job to execute. As a result of the analysis, the apparatus acquires necessary information concerning the job and thereafter executes it.

If for the execution of a job there is available a more effective method or another and better apparatus than an instructed method or an assigned apparatus, an instruction is issued to the better apparatus or a notice is transmitted to a user to propose the use of the more effective method. Further, as a consequence of the examination of the contents of the job the instruction may be rejected.

Job types are an operation input by a user, an execution of an instruction received from another apparatus, the acquisition of results by analyzing a job, or a job that is newly generated by an owned apparatus during an idling period. When, for example, a document is to be read by a scanner and printed by a printer, the following jobs are generated.

(1) Analysis of the contents of an instruction that is transmitted from a user to a scanner and that is related to a document set in the scanner;

(2) A reading and analyzation process for a document, and an instruction process for instructing a printer to print a document that has been read, both of which are generated by analyzing an instruction from a user that is received by the scanner (and the fact that the document has been set in the scanner).

(3) Generation by the scanner of a printing instruction for a printer during the instruction process.

(4) Generation of a printing process by the printer as a result of an analysis of the printing instruction received from the scanner.

A method for generating and managing these jobs will later be described in detail by referring to an eleventh and following embodiments.

The procedures according to which a plurality of apparatuses execute the above described processes will be specifically described while referring to the drawings.

Figure 2:
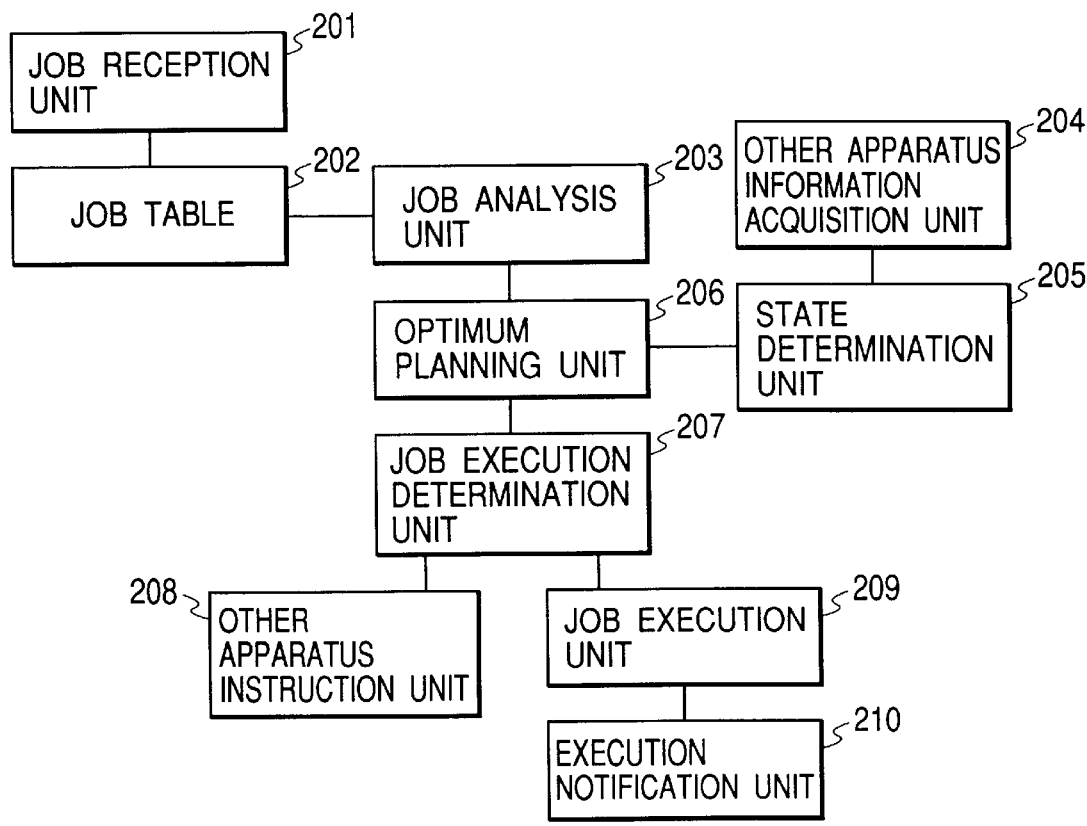
FIG. 2 is a diagram illustrating the functional arrangement according to the first embodiment.

FIG. 2 is a diagram illustrating the functional arrangement for performing the processing in this embodiment. A job reception unit 201 receives a job from a user or another apparatus. The received job is registered in a job table. A job analysis unit 203 reads and analyses a job registered in the job table 202. Another apparatus information acquisition unit 204 acquires the attributes and the current states of the other apparatuses that are connected. A state determination unit 207 determines the state from the current states of the other apparatuses.

An optimum planning unit 206 makes an optimal plan for the execution of a job. A job execution determination unit 207 determines whether a job should be executed, or when the job is to be executed, and determines whether an owned apparatus or another apparatus will execute the job. When another apparatus executes the job, another apparatus instruction unit 208 sends an instruction to another apparatus for the job execution. When the owned apparatus executes the job, a job execution unit 209 executes the job. An execution notification unit 210 notifies a user that the execution instruction has been issued to another apparatus.

Figure 3:
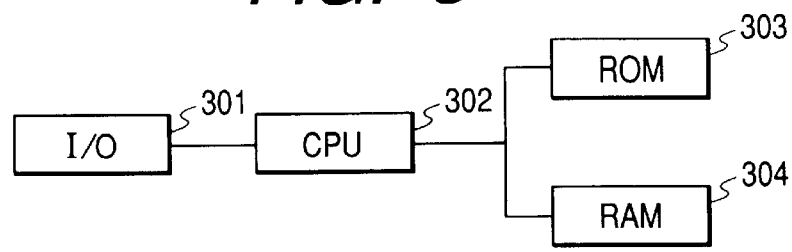
FIG. 3 is a diagram illustrating the hardware arrangement of the individual units according to the first embodiment.

FIG. 3 is a diagram showing the hardware arrangement of the units that perform the processing in this embodiment.

An I/O 301 exchanges input/output data with external apparatuses. A CPU 302 executes a program and controls the individual units. A ROM 303 is used to store programs, which correspond to individual flowcharts that will be described later and which are to be executed by the CPU 302, and fixed data. A RAM 304 is used to temporarily store variables and intermediate data, such as the attributes and the current states of the other apparatuses acquired by the other apparatus information acquisition unit 204, that are generated during the processing. A program from an external source may be loaded into the RAM 304 and stored therein.

Figure 4:
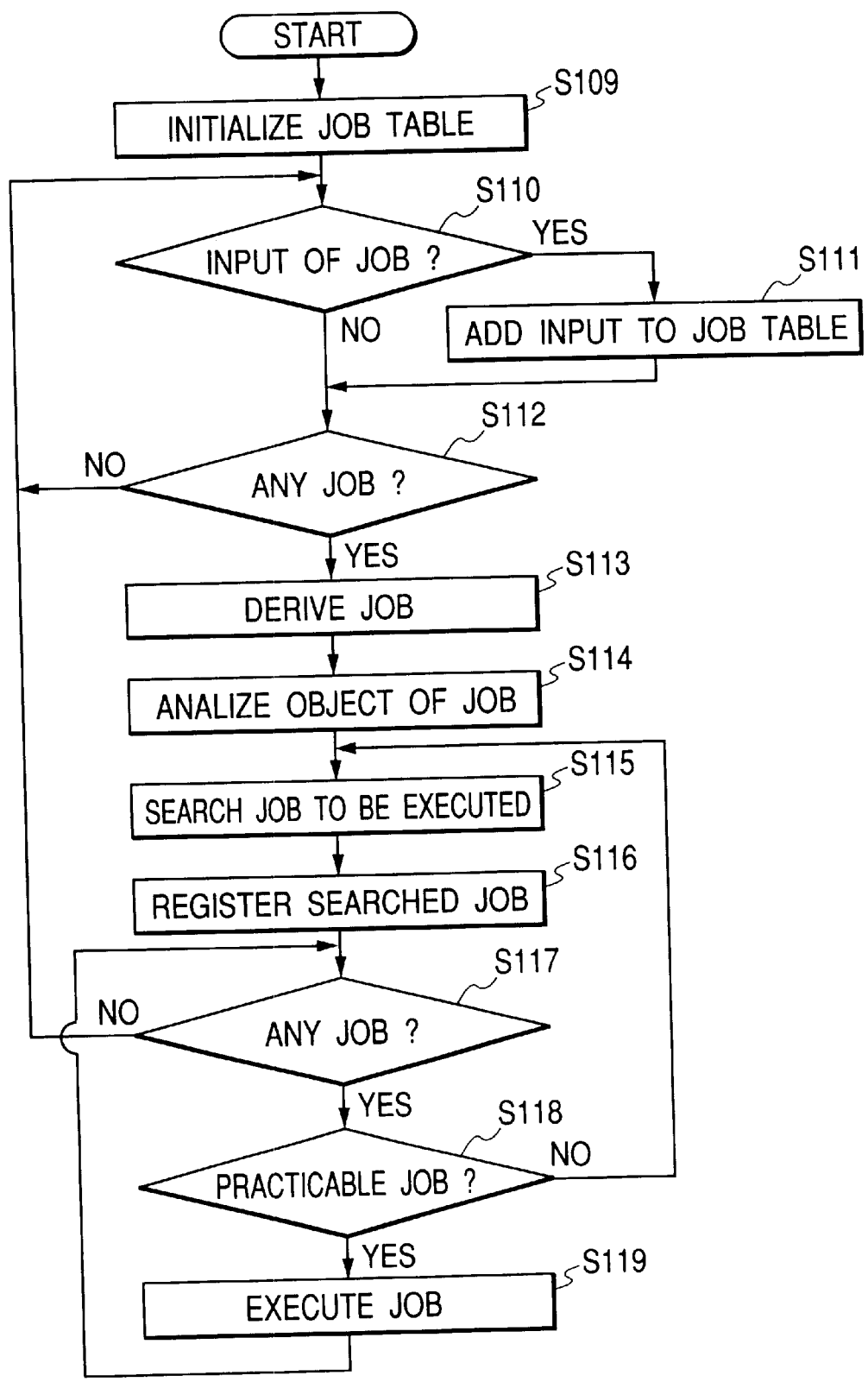
FIG. 4 is a flowchart showing the processing performed for the first embodiment.

FIG. 4 is a flowchart showing the processing performed for the first embodiment.

At step S109, the contents of the job table are initialized. At step S110, in order to determine whether a job has been input, a check is performed to determine whether or not a job has been input by a user, a job has been input by a device that can be detected by the system, from results obtained by analyzing the job, or a new job has been generated by an owned apparatus during idling. When a job has been input, at step S121, the input job is added to the job table. At step S112, the job table is examined to determine whether there is job. If there is a job, at step S113 the job is extracted. At step S114 a received instruction is analyzed, and from the information thus obtained, the object of the job is acquired. At step S115, the analyzed instruction is employed to search for a job that is to be executed.

At step S116 a job that is searched for at S115 is registered.

At step S117 a check is performed to determine whether or not there is a job that has not yet been executed. If there is such a job, program control advances to step S118. At step S118 a check is performed to determine whether or not the job can be executed. When it is ascertained that the job can not be executed, program control returns to step S115 and a job that must be executed is searched for. At step S119 the job is executed and program control returns thereafter to step S117.

If a user sends an instruction, for example, to read a document using a scanner and to print the document using a printer, it is assumed that, as a result of the analysis, the acquisition of a printed document is the object of a user. In this case, a document reading and analysis process, which is generated by analyzing information received by the scanner from the user, and a process for instructing a printer to print the document that has been read are searched for as jobs. These processes will be described in detail during the course of the eleventh and the following embodiments while referring to specific examples.

Figure 5:
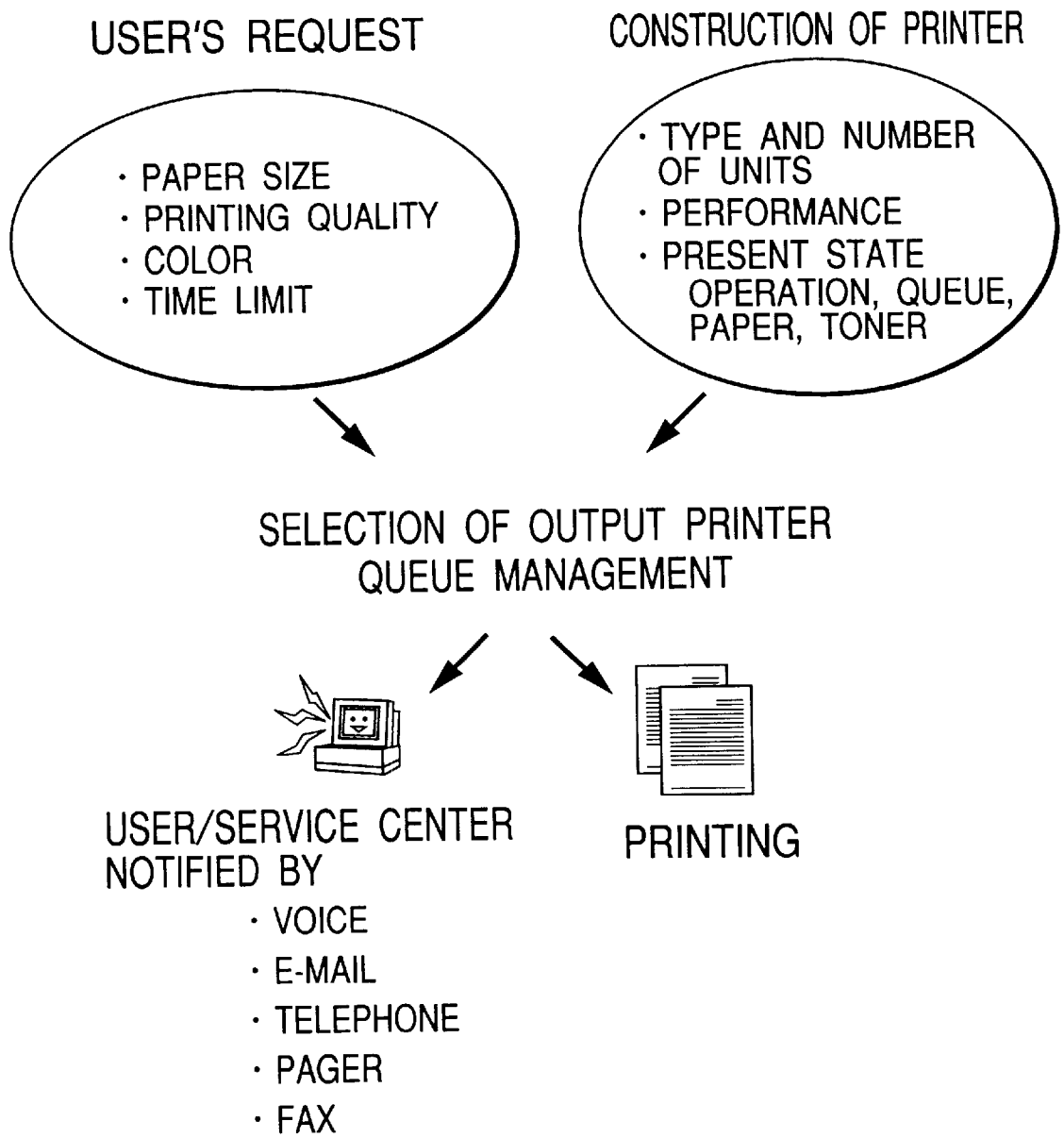
FIG. 5 is a diagram showing a process for selecting an optimal printer from a plurality of printers and performing a printing job with it.

FIG. 5 is a diagram showing a process for selecting from among a plurality of printers an optimal printer for performing printing.

In FIG. 5, job information is input/transmitted as a command from a host computer or an instruction from a remote controller, or is obtained by analyzing a voice command issued by a user using natural language, or from bar code or a sentence read from a cover page.

A device that has received the job information analyzes the job, and then selects a printer that can execute a process suitable for the job and outputs the data to the printer. Further, when there is an instruction for notification, the device selects an optimal medium and dispatches a notice thereto.

Therefore, upon the receipt of a request from a user, the structure of the printer is referred to, and an appropriate printer is selected to perform the printing. At this time, in consonance with the situation, the processing can be allocated for a plurality of printers. Further, when there is an instruction for notification, an optimal medium is selected to dispatch a notification that the printing has been terminated along with the name of the printer that has performed the printing.

A request submitted by a user concerns paper sizes, printing quality, colors and time limit (e.g., completion of printing by 5 o'clock). The printer configuration covers the printer types and the number of printers in the system, and their performances or their current statuses (whether the printers are normally operated, whether there is a printing queue, or whether paper or toner is insufficient). As for a medium and a method used for notification, a notification is transmitted by voice through a user's terminal or by telephone, or a notification message is transmitted to a pager, or a document describing the contents of a notification is transmitted by electronic mail or by facsimile.

A situation where the individual units perform the processing shown in FIG. 5 will now be described while referring to the flowchart in FIG. 4.

First, if, at step S110, an urgent instruction for outputting a specific document by five o'clock is transmitted to a host computer, at step S111 a job is added to a job table. At step S113, the job is extracted from the job table and at step S114 the received instruction is analyzed to obtain the object of the job.

At step S115, the following jobs are searched for following the analysis of the instruction.

(1) Acquisition of specifications (paper size, printing quality, color document, etc.) to be used for selecting a suitable printer for outputting a document, and of other information, such as time limit.

(2) Selection from among the connected printers of a suitable printer for specifications (1).

(3) Examination of the selected printer to determine whether or not any obstacle to printing output exists.

(4) Output data to a selected printer.

(5) Issuance of the selected printer and a notification that the data has been output.

At step S116, the job found at step S115 is registered. The above process is repeated until, at step S117, there are no jobs to be searched for. At step S118 a check is instituted to determine whether or not the job can be performed. When the performance of the job is not possible, another job that must be executed is searched for. At S119, the jobs that have been searched for are sequentially performed.

[Second Embodiment]

Figure 6:
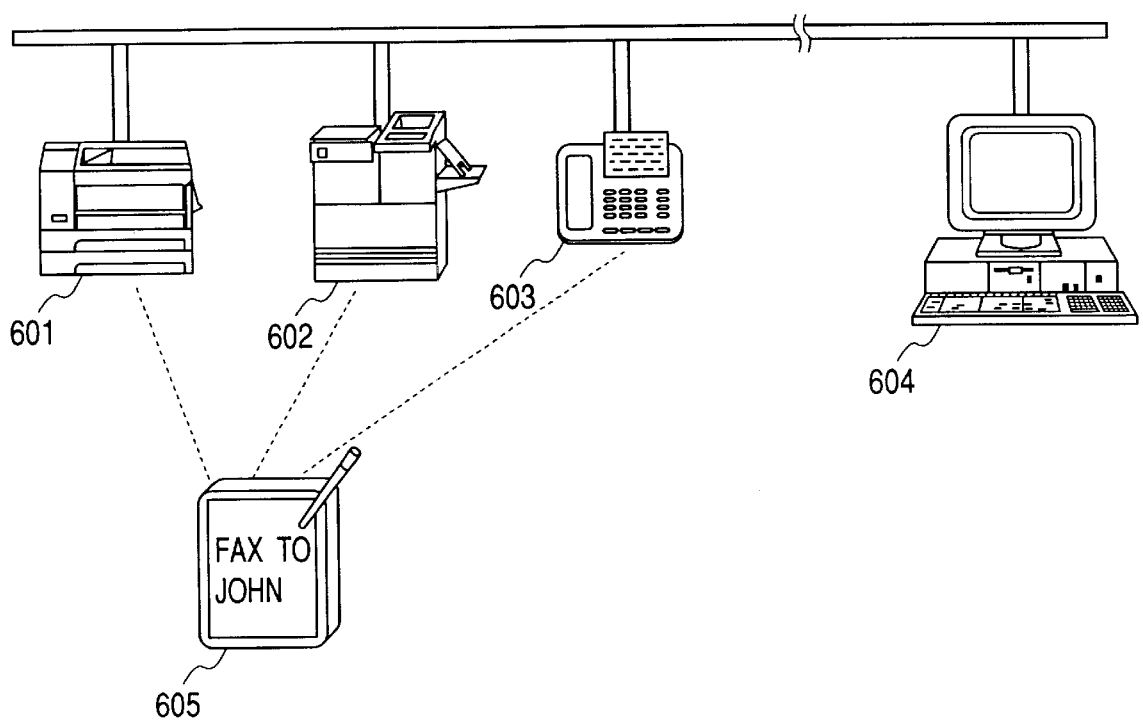
FIG. 6 is a diagram for explaining a case where a controller is used.

FIG. 6 is a diagram for explaining an example wherein a remote controller (hereinafter referred to merely as a controller) is employed as a means for sending instructions to various devices.

A controller 605, which has a display, displays a control panel for, or information concerning a device, such as a printer 601 or 602, a facsimile machine 603 or a PC 604, only by approaching the device, and sends instructions to the device to control it. Further, the controller 605 can control a remote device across a network via the device that is near the controller 605.

The controller 605 can also monitor and display the status of each device, and can acquire the status of a remote device on the network via a device that is near the controller 605.

[Third Embodiment]

Figure 7:
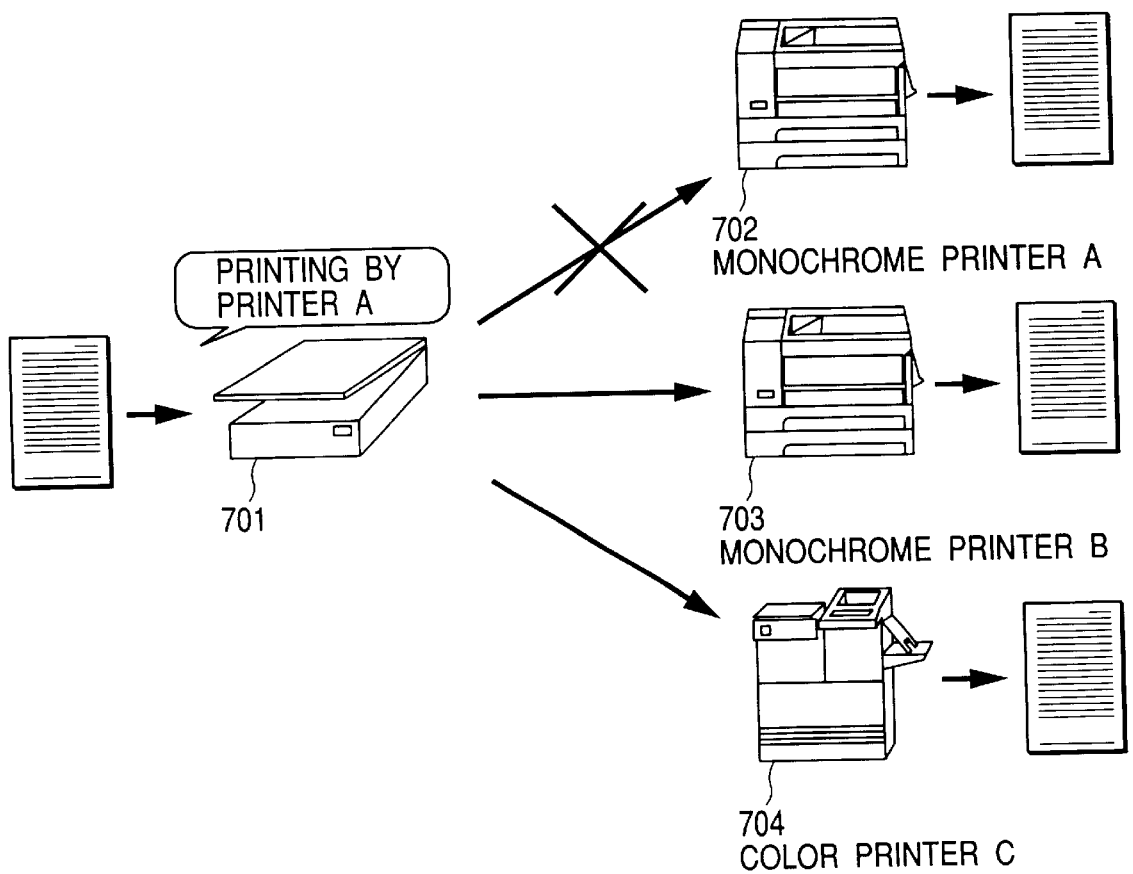
FIG. 7 is a diagram showing a case where a document is read by a scanner for transmission to a specific printer.

FIG. 7 is a diagram showing an example where a document is read by a scanner and is transmitted to a specific printer.

When a document has been read by a scanner 701, a user designates an addressee by voice, etc., or a destination transmission is designated on a cover sheet, and is thus automatically determined. When a monochrome printer 702 is determined as an addressee, (1) if the addressee is not in the ready for printing state, the document data is transmitted to another printer (e.g., a monochrome printer 703) for printing;

(2) if a printer designated as an addressee can not print the document because of the conditions specified, such as color and paper size, data for only for the pertinent page is transmitted to another printer (e.g., a color printer 704 if color printing is requested);

(3) data for a document having a large number of pages are allocated to a plurality of printers to print; or (4) if a transfer destination is designated at the addressee, the data is transferred to the transfer destination.

[Fourth Embodiment]

Figure 8:
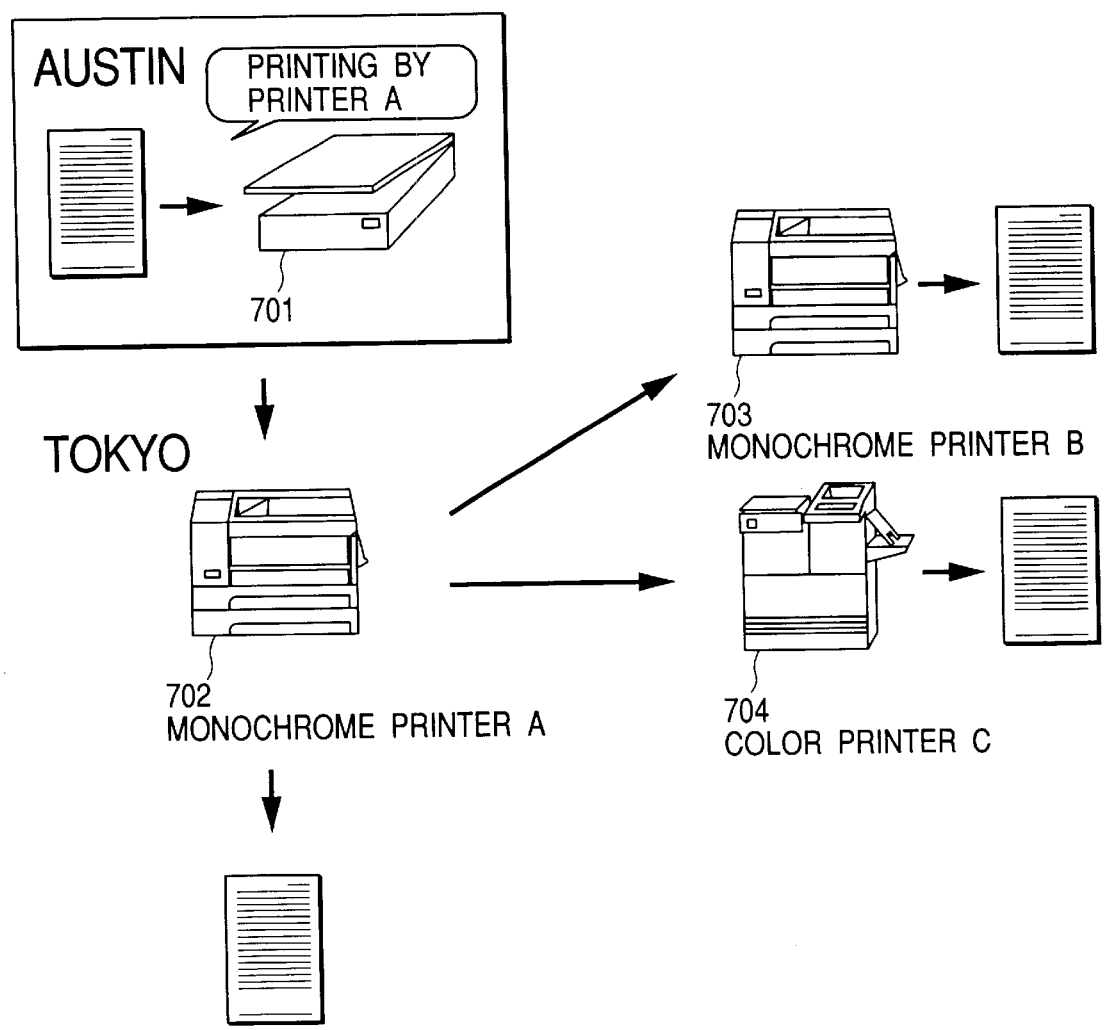
FIGS. 8, 9 and 10 are diagrams illustrating a case where a document is read by a scanner for transmission to a specific printer that the scanner can not control.

FIG. 8 is a diagram showing an example where a document is read by a scanner and is transmitted to a specific printer that the scanner can not manage because it is in a different network domain, etc.

When a document is read by a scanner 701 in Austin, a user designates an addressee by voice, etc., or an addressee that is described using a character string or a bar code on a cover sheet is read and recognized/interpreted to determine the addressee. As a result, a monochrome printer 702 in Tokyo is determined to be the addressee. After the document data are transmitted to the monochrome printer 702:

(1) when the monochrome printer 702 is not ready for printing, it transmits the data to another printer (a monochrome printer 703) for printing;

(2) if the monochrome printer 702 is not ready for printing the received document data because of specified conditions, such as color and paper size, it transmits either all the data for the received document or only data for pertinent pages to another printer (e.g., a color printer 704, if color printing is requested);

(3) if a document has a large number of pages, the monochrome printer 702 prints part of the data and also allocates printing data to a plurality of other printers; or (4) if a transfer destination is designated at the monochrome printer 702, the printer 702 transfers the data to the transfer destination.

A difference between the third and the fourth embodiments is that in the third embodiment the scanner 701 determines the addressee, and in the fourth embodiment the printer 702 that received the document from the scanner 701 determines the transfer destination.

[Fifth Embodiment]

Figure 9:
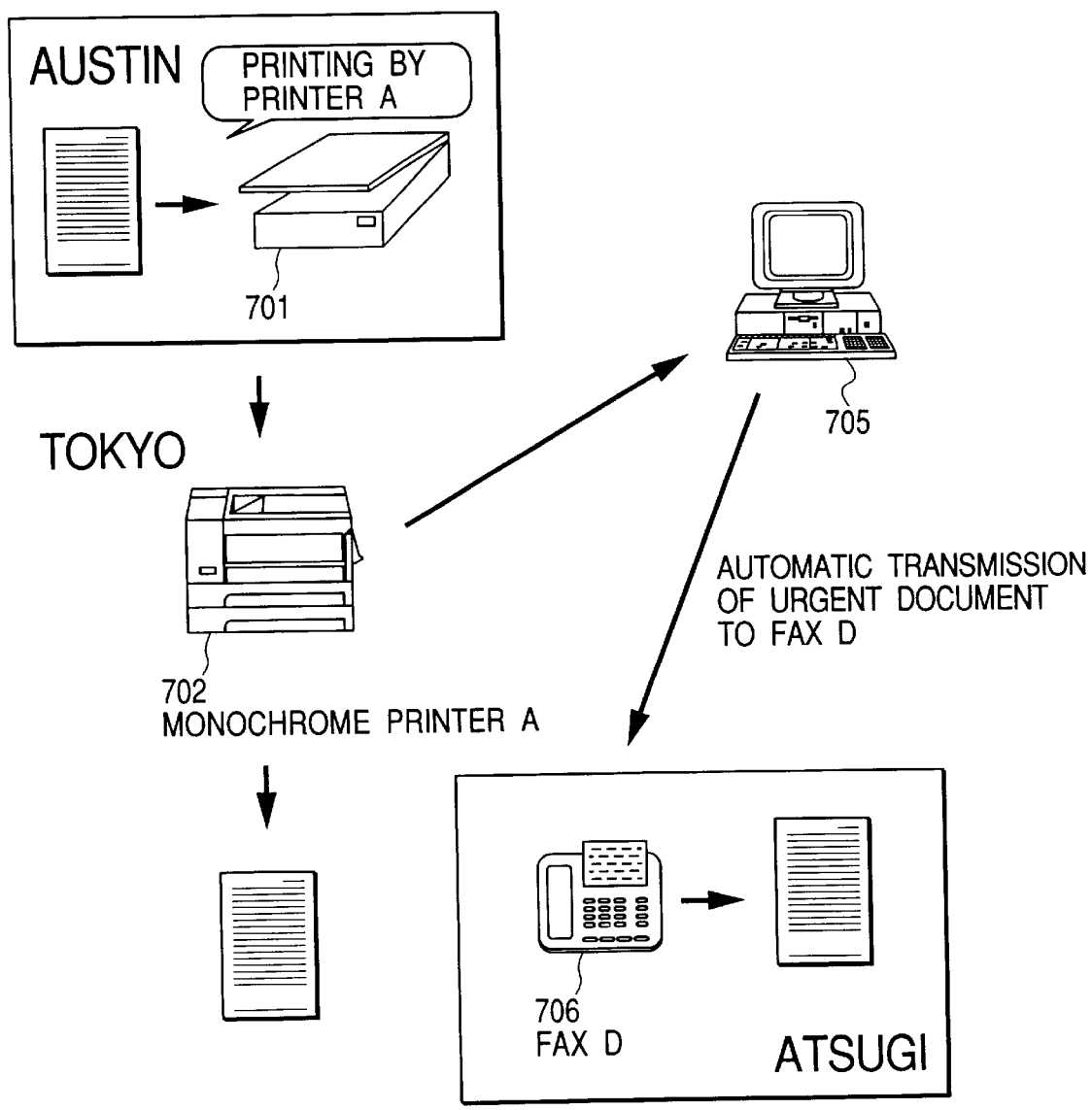

FIG. 9 is a diagram showing an example wherein a document is read by a scanner and is transmitted to a specific printer that the scanner can not manage because it is in a different network domain, etc.

When, a document is read by a scanner 701 in Austin, a user designates an addressee by voice or using a keyboard, or an addressee that is described using a character string or a bar code on a cover sheet is read and recognized/interpreted to determine the addressee. As a result, a monochrome printer 702 in Tokyo is determined as the addressee. After document data are transmitted to the monochrome printer 702, they are further transferred to a personal computer 705 that can perform a higher level operation.

As a result, the personal computer 705 determines, from the entry "urgent" on the cover letter, for example, that the document is an urgent document. The personal computer 705 examines schedule data to find the location of the recipient of the document, and transfers the data to that location, for example, Atsugi. At this time, if the transfer destination is not a printer but is a different medium, such as a facsimile machine 706, medium conversion is performed before transmission.

[Sixth Embodiment]

Figure 10:
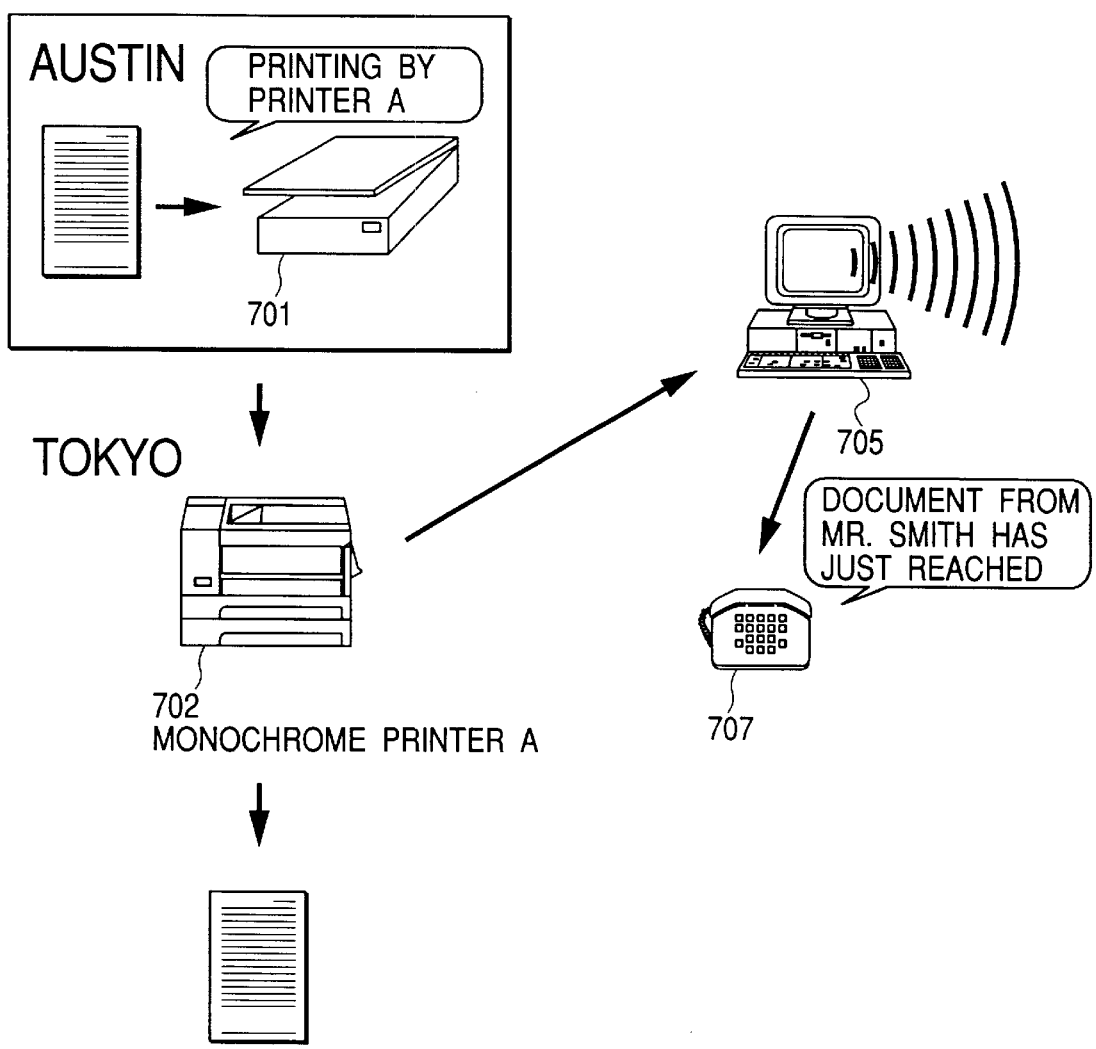

FIG. 10 is a diagram showing an example wherein a document is read by a scanner and is transmitted to a specific printer that the scanner can not manage because it is in a different network domain, etc.

When, a document is read by a scanner 701 in Austin, a user designates an addressee by voice, etc., or an addressee that is described using a character string or a bar code on a cover sheet is read and recognized/interpreted to determine the addressee. As a result, a monochrome printer 702 in Tokyo is determined as the addressee. After document data are transmitted to the monochrome printer 702, they are further transferred to a personal computer 705 that can perform a higher level operation. As a result, the personal computer 705 identifies the recipient, prepares a notification sentence, and notifies the recipient of the arrival of the document.

[Seventh Embodiment]

Figure 11:
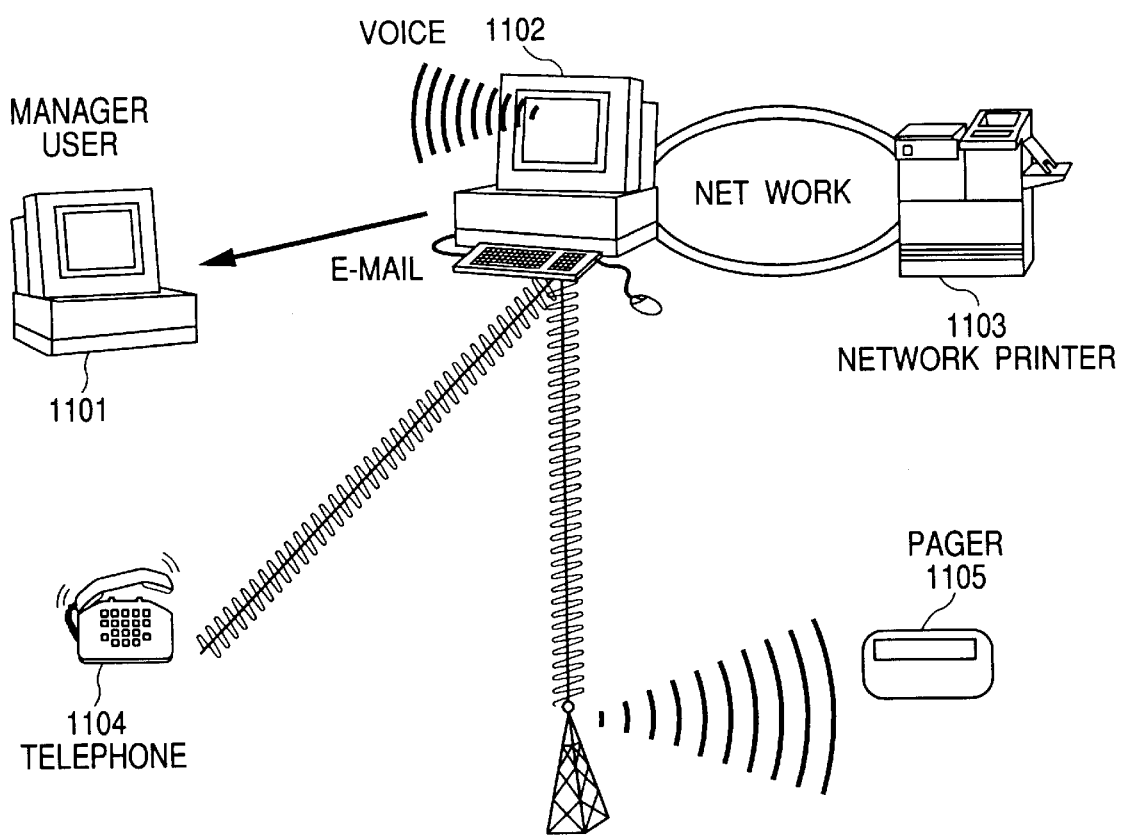
FIG. 11 is a diagram illustrating a case where information concerning the state of a printer is distributed.

FIG. 11 is a diagram showing an example wherein a notification concerning the status of a printer is transmitted.

When a PC 1102 acquires the status of a printer 1103 across a network and detects a change in the status, such as the occurrence of an error or an event, the PC 1102 determines a notification destination, such as a user or a manager, in consonance with the contents of the change, and employs a medium corresponding to the determined destination to transmit a notification. For example, to transmit a notification to a terminal 1101 of a user or a manager, the PC 1102 uses electronic mail, or a telephone 1104, or transmits a message to a pager 1105.

Therefore, in the example in FIG. 10, for example, a notification of the reception of the document may be issued using electronic mail or a pager, instead of the telephone 707.

[Eighth Embodiment]

In this embodiment, before executing an instructed job an apparatus notifies a user of the contents of the job in accordance with the type or the condition of the job, or cancels a job that is determined to be unnecessary for a user.

Figure 12:
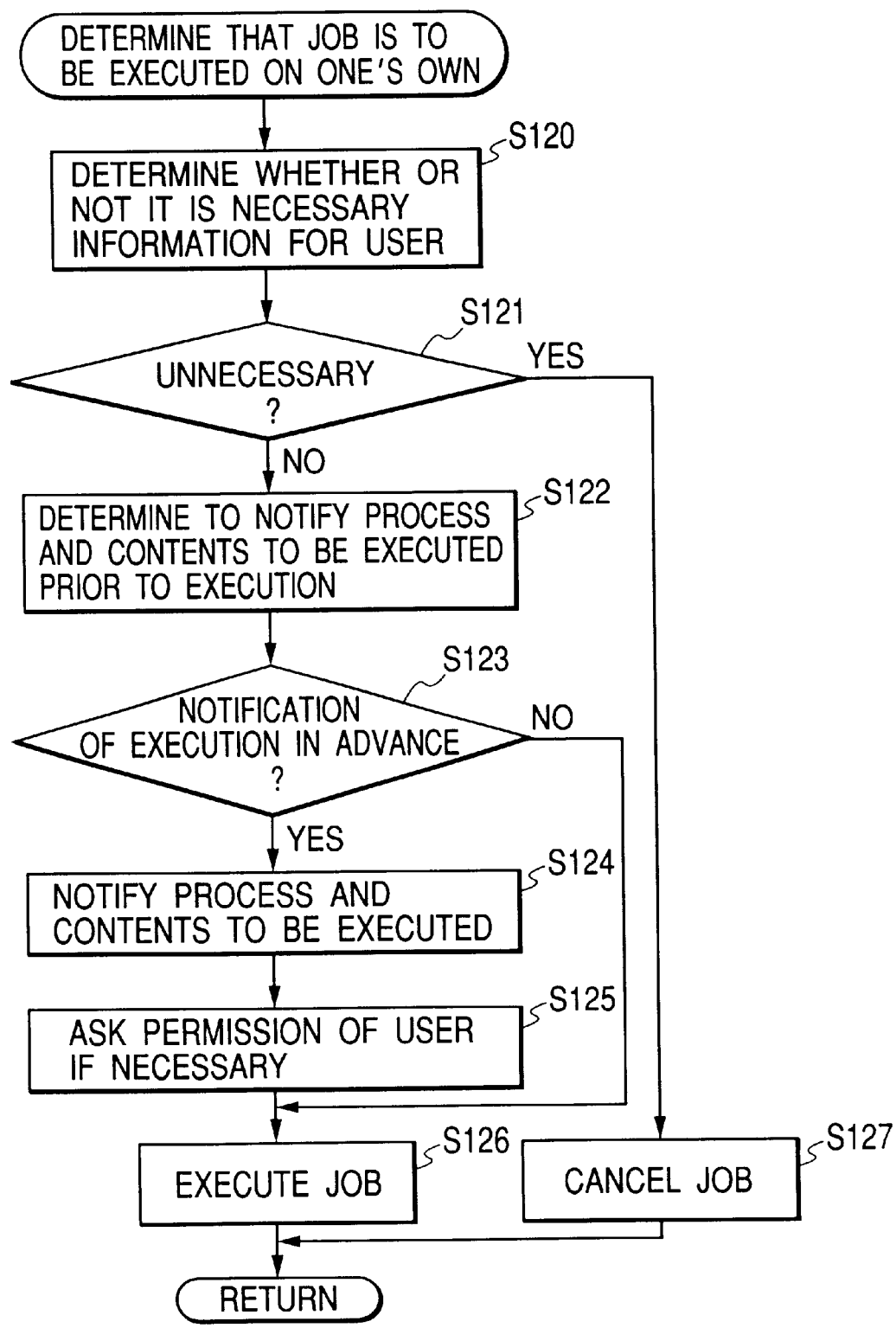
FIG. 12 is a flowchart showing the processing performed an eighth embodiment.

FIG. 12 is a flowchart showing the processing in this embodiment. FIG. 13 is a table showing, in consonance with the types and conditions of jobs, whether or not an advance notice should be issued.

In FIG. 12, first, at step S120 a check is performed to determine whether or not a job constitutes necessary information for a user. If this is true, the processes at step S122 and the following steps are performed. If not, at step S127 the job is canceled. At step S122, information concerning the advance notice that corresponds to the job type and conditions in FIG. 13 is referred to, or the contents described on a cover sheet are analyzed to determine whether or not a notice for the process to be executed and the contents of the process should be issued to a user prior to the performance of the instructed job. When advance notice is not required, program control moves to step S126. When advance notice is issued, program control moves to step S124, whereat a user is notified of the process to be performed and its contents. At step S125, the permission for the performance is received from a user, if necessary. At step S126 the job is performed.

An explanation will be given for an example wherein, when the contents of a job call for the filing of information, an analysis of the system contents is performed prior to the filing of information, and information concerning the contents is transmitted to a user.

Figure 14A:
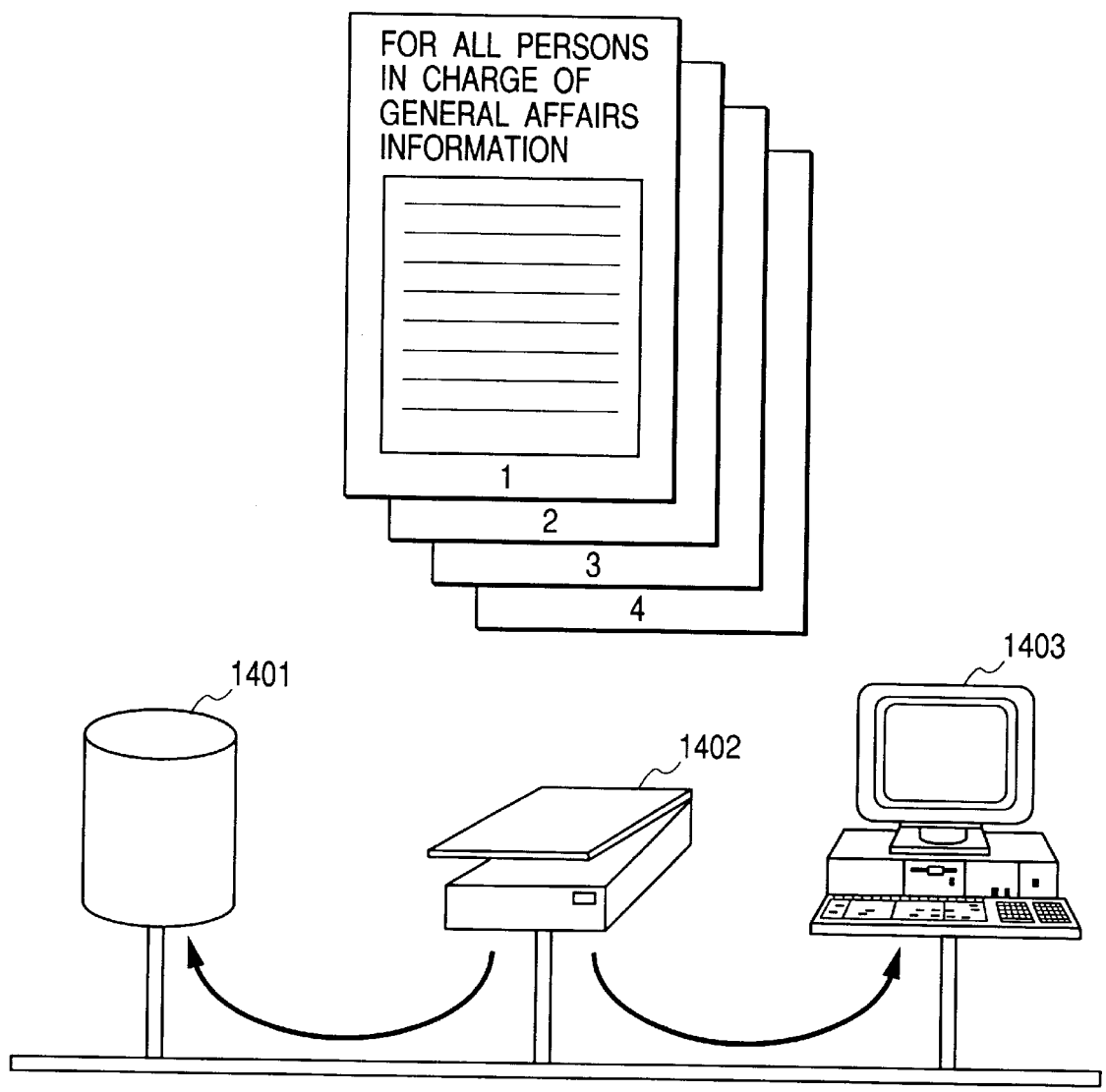
FIGS. 14A and 14B are respectively diagrams of a case where a user is informed in advance of information to be filed and a case where unnecessary information is abandoned.

FIG. 14A is a diagram showing an example wherein filing process information to be filed is transmitted to a user in advance. A file storage unit 1401, a scanner 1402 and a user terminal 1403 are provided in this system. The processing performed by the scanner 1402 in FIG. 14A will now be described while referring to the flowchart in FIG. 12.

At step S120, since an instructed job is for information filing, it is assumed that this is necessary for a user. At step S122, while information designated in FIG. 13 is referred to, it is ascertained that a notice concerning information to be filed should be issued before the filing, and that the information should then be scanned. Program control then moves to step S124 to issue a notice concerning information to be filed. At step S124 the scanned information is transmitted to the user terminal 1403 via a network. At step S126, the filing job is performed.

Next, an explanation will be given for an example wherein the information on the first page is received and analyzed, and when the information is not at all related to a user, the following information is not received.

Figure 14B:
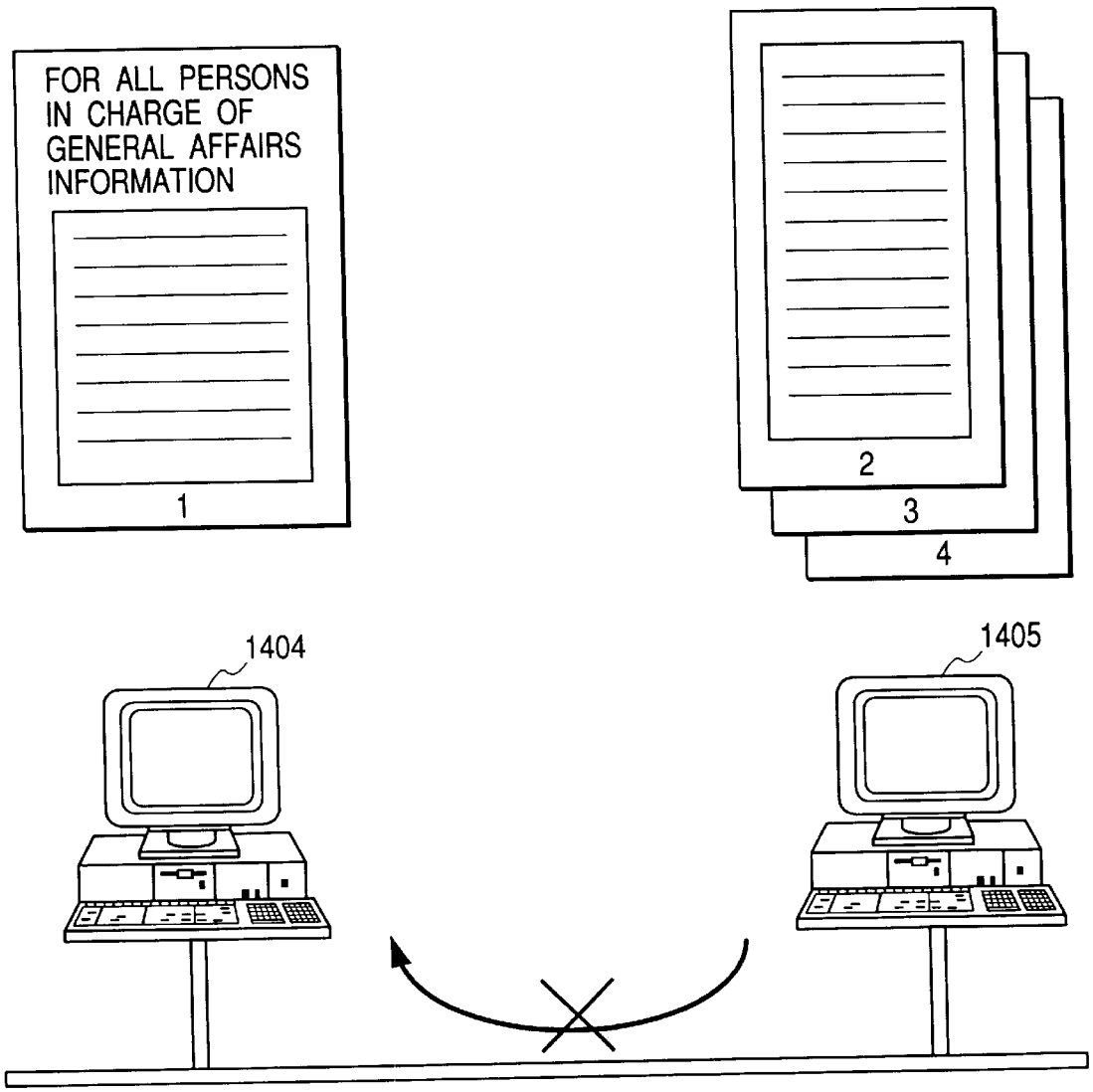

FIG. 14B is a diagram showing an example wherein whether or not a large amount of data to be received is required by a user is determined by examining the first page, and the receipt of information for the following pages is canceled. A reception PC 1404 and a transmission PC 1405 are provided.

The processing performed by the PC 1404 in FIG. 14B will be explained while referring to the flowchart in FIG. 12.

At step S120, the first page of the received data is analyzed. Since "For All Persons In Charge Of General Affairs Information" is entered on the first page, it is apparent that this document is not intended for a user who is not in charge of general affairs information, and the receipt of the information is determined to be unnecessary. Program control therefore moves to step S127. At step S127, the first page, which has been received, is canceled, and information for the second and the following pages is not received. The processing is thereafter terminated.

[Ninth Embodiment]

Figure 15:
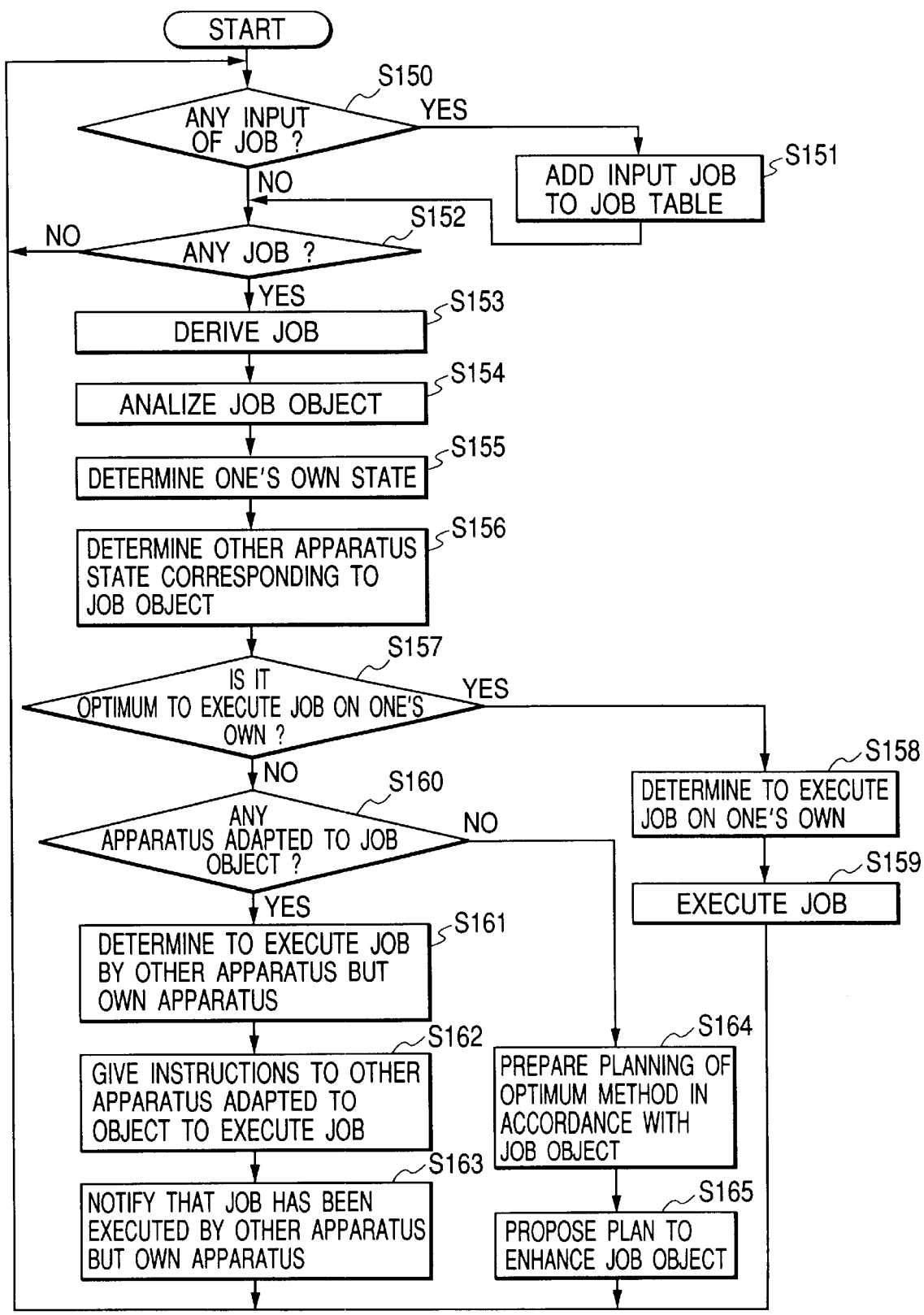
FIG. 15 is a flowchart showing the processing for a ninth embodiment.

FIG. 15 is a flowchart showing the processing for a ninth embodiment. In this embodiment, an apparatus that is designated to perform the processing determines whether it or another apparatus should perform the processing, and as a result of the determination, either performs the processing itself or sends an instruction to another apparatus to perform the processing.

At step S150 a check is performed to determine whether or not a job has been input. If a job has been input, at step S151 the input job is entered in a job table. At step S152 the job table is examined to determine whether any jobs have been entered. If they have been, at step S153 a job is extracted from the table. At step S154 a received instruction is analyzed and the object of the job is apprehended using the result. At step S155 the status of the apparatus is examined. At step S156 the status of another apparatus consonant with the object of the job is examined.

When, as the result of a comparison of the statues of the locally owned apparatus and other apparatuses, it is found that the locally owned apparatus is optimal for the performance of the job, program control moves from step S157 to step S158, whereat it is determined that the owned apparatus will perform the job, and at step S159 the job is performed by the locally owned apparatus. If there is an optimal apparatus other than the locally owned apparatus that has capabilities consonant with the object of the job, program control goes from step S160 to step S161, whereat it is determined that the other apparatus will perform the job, and at step S162 the locally owned apparatus sends a job execution instruction to the apparatus having capabilities consonant with the object of the job. At step S163 the locally owned apparatus notifies a user that another apparatus has executed the job.

If there is no apparatus having capabilities consonant with the object of the job, program control moves from step S160 to step S164, whereat a plan is prepared for the use of an optimal method that does not depart from the object of the job, and at step S165 the plan is proposed to a user.

Figure 16A:
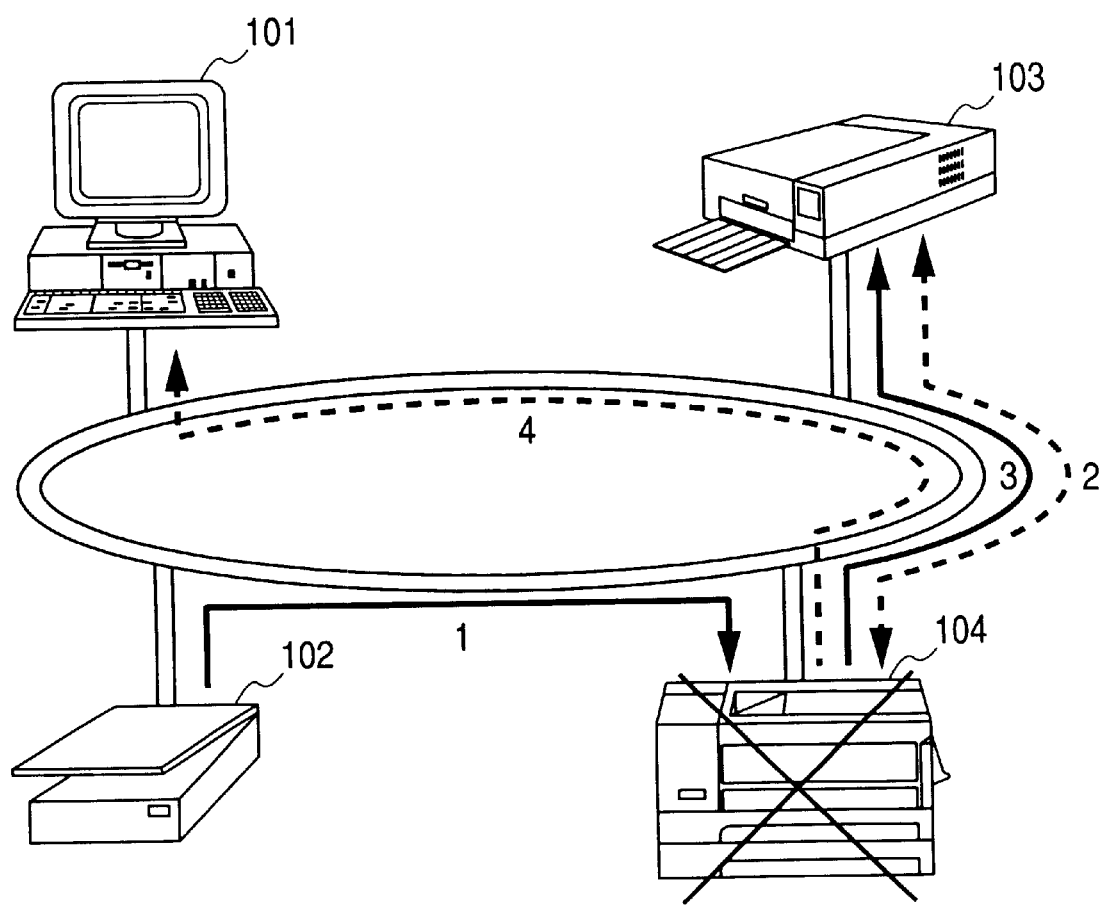
FIG. 16A is a diagram showing the transmission of information for the ninth embodiment.

FIG. 16A is a diagram showing the transmission of information in this embodiment.

When a user of a PC 101 provides for a printer 104 a job for the output of information input by a scanner 102, and when the printer 104 has, for example, a printing malfunction, the printer ascertains that it can not perform the instructed job, and by communicating with other apparatuses, it finds a printer 103 that can perform the instructed job. Thus, the printer 104 determines that the printer 103 can act for it and perform the job, and so instructs the printer 103. Further, the printer 104 transmits a notification to the PC 101 to inform the user of the action that it took. In FIG. 16A, the process flow for these activities is described by arrows.

The processes performed by the individual units in FIG. 16A will be described while referring to the flowchart in FIG. 15.

First, the process performed by the scanner 102 will be explained. At step S150 the scanner 102 scans a document and acquires a job, information concerning which is to be transmitted to the printer 104. At step S151 this job is entered in the job table, and at step S153 the job is extracted. At step S154, the scanner 102 scans additional data and determines that the data is a job to be transmitted. At step S155, the scanner 102 ascertains that it is operating normally and that no problem exists in the scanning and transmission of instructed information.

At step S156 it is ascertained that the job can not be transmitted to another apparatus. At step S157, since optimally the scanner 102 should execute the job, program control moves to step S158. At step S158 the scanner 102 determines that it should scan the information, and at step S159 the scanner 102 scans the information and transmits it to the printer 104 via a route 1 on a network.

At step S150, the printer 104 receives the job for the output of received information. At step S151, the printer 104 enters the job in the job table, and at step S153, it extracts it. At step S154, the printer 104 ascertains from the information it receives that the information for the user from the PC 101 is to be printed on paper. At step S155 the printer 104 determines that it is out of toner and disables printing. At step S116 the printer 104 searches, via the network, for printers that can output the received information, and finds the printer 103 (route 2).

Since, at step S157, the printer 104 can not execute the job, program control moves to step S160. Then, as at step S160 it is determined that the job for the output of information can be performed by the printer 103, at step S161 it is determined that the received information should be transmitted to the printer 103. At step S162 the printer 104 sends an instruction to the printer 103 to print the information that is to be received (route 3). At step S163 to notify the user that the instructed job. was performed by the printer 103 electronic mail for the user is transmitted to the PC 101 (route 4).

Figure 16B:
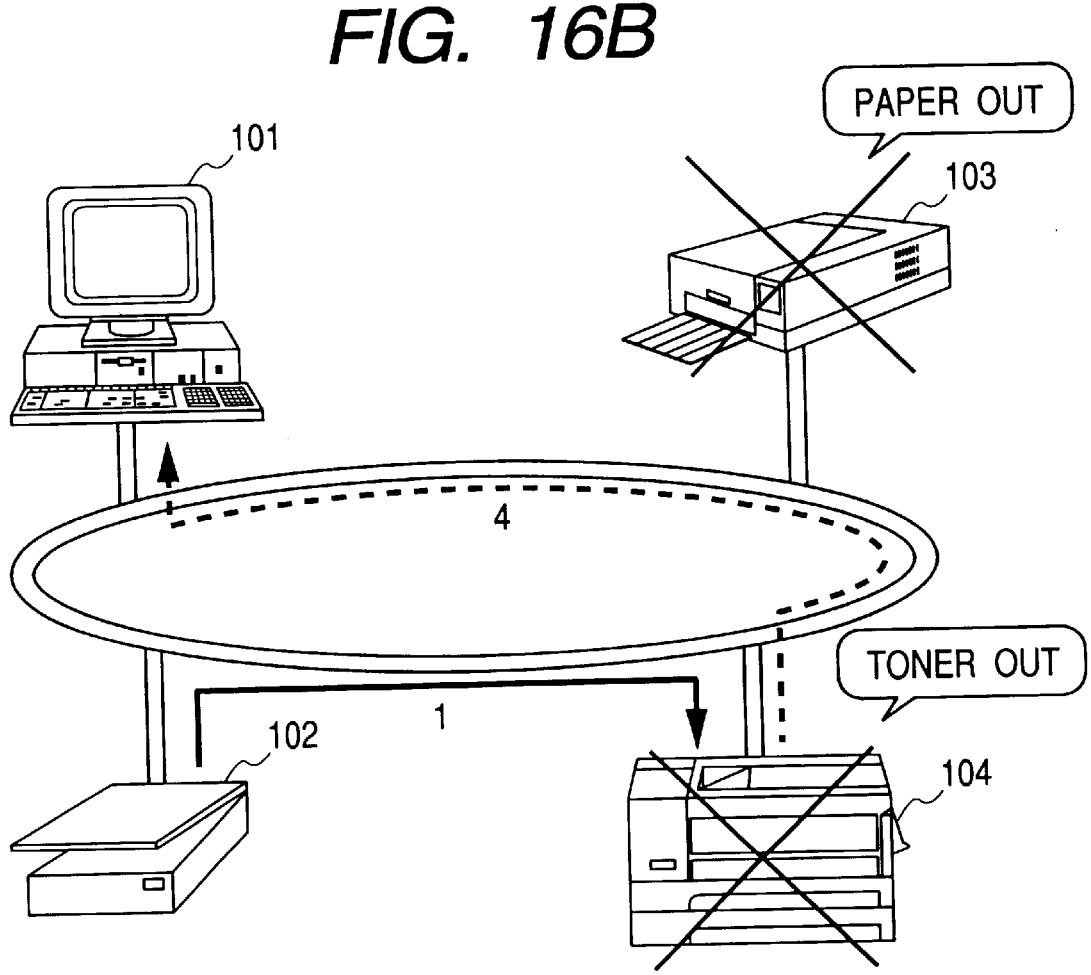
FIG. 16B is a diagram showing the transmission of information when an apparatus corresponding to the object of a job is not present.

FIG. 16B is a diagram showing the transmission of information for a case where no apparatus having capabilities consonant with the object of a job is available.

When the user of the PC 101 provides a job for the output to the printer 104 of information input by the scanner 102, and when the printer 104 disables printing because it is out of toner, the printer 104 communicates with other apparatuses, finds the printer 103, which is suitable for the object of the job, and determines its status. Then, since the printer 103 disables printing because it is out of paper, and as there is no other printer available that is suitable for the object of the job, a notice is issued to the PC 101 to propose to the user an optimal plan whereby when either the printer 103 or 104 has recovered to the printing enabled state, that printer will perform the job. In FIG. 16B, the process flow for these actions is indicated by arrows.

The procedures performed by the individual units in FIG. 16B will be explained while referring to the flowchart in FIG. 15.

The process whereby the scanner 102 reads a document and transmits it to the printer 104 is performed in the same manner as was described previously.

At step S150 the printer 104 receives a job for the output of received information. At step S151, the job is entered in the job table, and at step S153, it is extracted. At step S154, the printer 104 ascertains from the information it receives that the information for the user from the PC 101 is to be printed on paper. At step S155, the printer 10 ascertains that it is out of toner and printing is disabled. At step S156, the printer 104 communicates across the network with other printers to find one that can print the received information. The printer 104 determines that the printer 103 has also disabled printing because it is out of paper, and that no other appropriate apparatus is available.

Since, at step S157, the printer 104 disables the performance of the job, program control moves to step S160. At step S160, as there is no apparatus that can perform the job for the output of information, program control goes to step S164. At step S164, planning is begun to prepare an optimal method for performing the printing, which is the object of the job for the output of information. As a result, it is determined that the optimal method involves the return of a printing apparatus to its normal operating status. At step S165, the proposed method, whereby either the printer 104, which is out of toner, or the printer 103, which is out of paper, is to be recovered to the printing enabled state, is presented in a window shown in FIG. 17 for approval by the user.

Then, a response received from the user, or a change in the printer status is identified as an input job, and the same processing is again performed. In this fashion, the object of the user can be achieved.

The above described planning will be described later in detail during the course of the explanation of specific examples for an eleventh and subsequent embodiments.

[Tenth Embodiment]

In the processing for the ninth embodiment, wherein, at steps S158 and S159, a locally owned apparatus determines to perform a job itself, and performs the job, before another instructed job is performed, the possibility of the occurrence of a problem is analyzed in detail, as in the procedures in FIG. 17. When it is ascertained, in consonance with environmental conditions or the status of the job performance, that performing the job is not advisable, a notice concerning the problem may be issued, or the request for the performance of the job may be rejected.

When, for example, an instruction for printing a secret document is issued and a user is not identified as an authorized user, the instruction is rejected.

Figure 18:
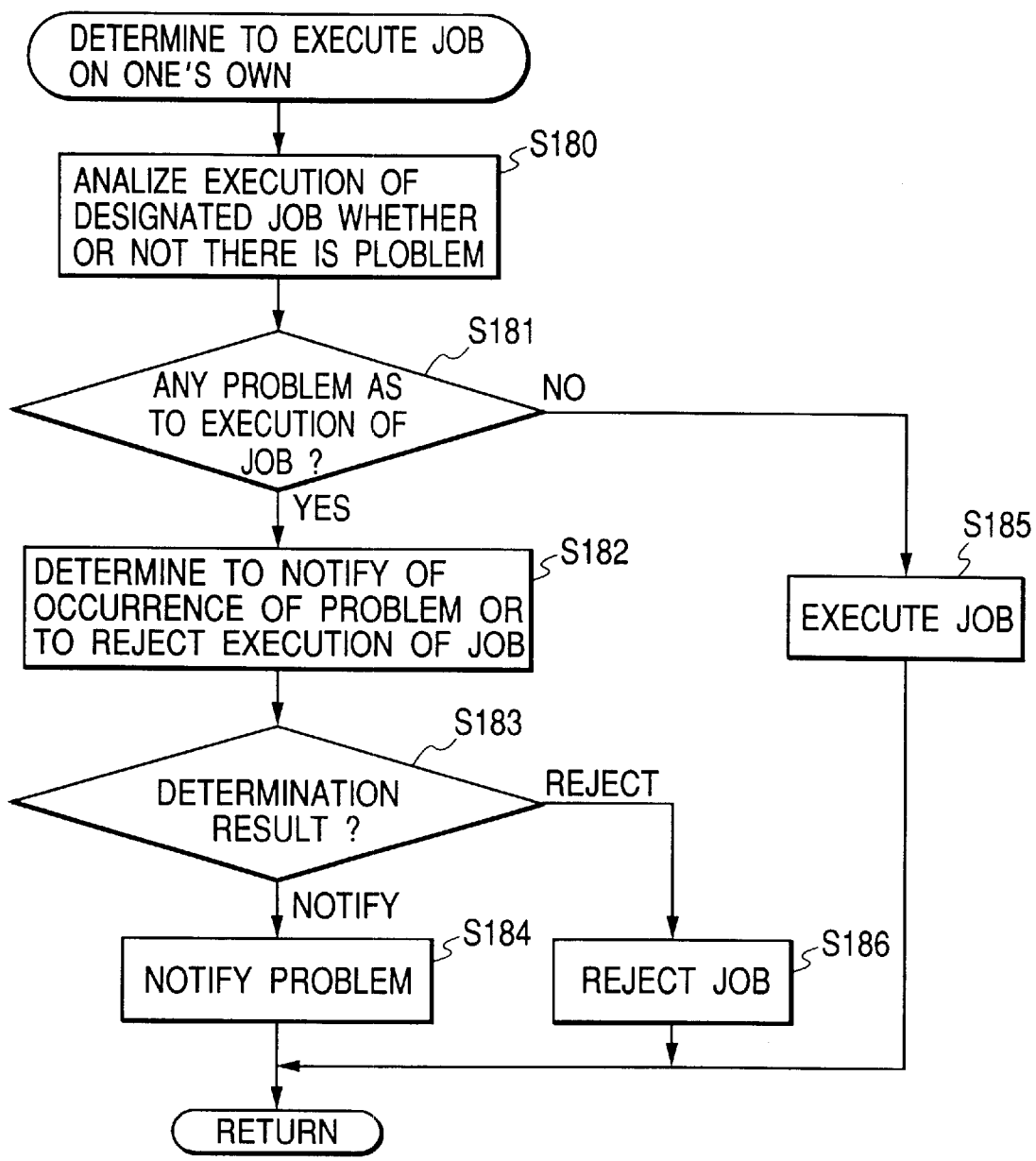
FIG. 18 is a flowchart showing the detailed procedure for job execution.

FIG. 18 is a flowchart showing the detailed procedures for the performance of a job.

At step S180 a check is performed to determine whether or not a problem exists concerning the performance of the instructed job. At step S181 no problem affecting the performance of a job is found, at step S185 the job is performed. If a problem is found, at step S182 a check is performed to determine whether a notice concerning the problem that was discovered should be transmitted to a user, or whether the request for the performance of the job should be rejected. When it is ascertained that such a notice should be transmitted to a user, at step S184 the notice is transmitted to the user. When it is determined that the request for the performance of the job is to be rejected, at step S186 the request for the performance of the job is rejected and a notice of rejection is transmitted to the user.

Figures 19, 20, 21:
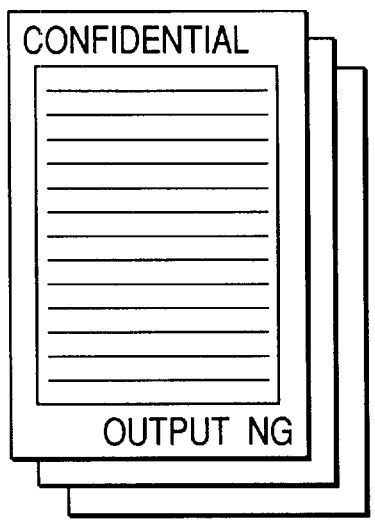
FIG. 19 is a diagram showing an example of classified information to be read.
FIG. 20 is an example job table.
FIG. 21 is a diagram showing an example printing window.

An example wherein a user of the PC 101 issues an instruction to output to the printer 104 confidential information read by the scanner 102 will now be described while referring to FIGS. 15 and 18. FIG. 19 is a diagram showing example confidential information to be read.

First, at step S150 the scanner 102 scans available information and receives a job for the transmission of information to the printer 104. At step S151 the job is entered in the job table, and at step S153, the job is extracted therefrom. At step S154 data are scanned, and it is ascertained the data constitute a job to be transmitted. At step S155, the scanner 102 determines that it is operating normally and that there is no problem affecting the scanning and transmission of the instructed information.

At step S155 it is ascertained that the job can not be transmitted to another apparatus. Since, at step S157, it is ascertained that optimally the scanner 102 should perform the job itself, program control moves to step S158, whereat the scanner 102 determines that it should scan the information itself.

At step S180, as a result of the scanning of the information, it is determined to be confidential information whose output is inhibited. Since a problem affecting the performance of the job exists, at step S182 it is determined that the job (the scanning and the outputting of information) should be rejected. At step S183 the job is rejected, and program control thereafter goes to step S186. At step S186, a notice is issued that the job was rejected.

Similarly, when a plurality of users employ the same system, the current user can be identified by a log-in name, and an instruction for the output of the contents of files belonging to other users can be rejected. When, instead of an instruction from a user, a document is received from the outside and the destination user differs from the current user, the output of the received document and the notice of the receipt of the document are rejected, or the processing is halted until the destination user begins to employ the system.

[Eleventh Embodiment]

The processing for an eleventh embodiment will now be described while referring to FIG. 4. At step S109 the job table is initialized. Then, at step S110 a check is performed to determine whether there is input from a user or from an apparatus that can be detected by the system. At step S111 an input analysis job is entered in the job table to analyze the contents input at step S110. At step S112 a check is performed to determine whether there is a job to be performed. If there is such a job, it can be acquired at step S113. At step S114, the object comprising the background for the performance of the job is understood.

At step S115 a possible process is planned by using the contents that are input, the status of a device that can be detected by the system, and the knowledge that the system has currently acquired. At step S116 a new job is added if necessary. At steps S117 to S119 the process as planned at step S115 is performed in consonance with the contents. The processing is repeated until no more jobs remain, and program control thereafter returns to step S110.

Figures 22, 23:
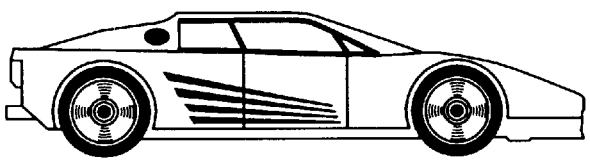
FIG. 22 is an example job table.
FIG. 23 is a diagram showing the contents of <file A>.

A case where a user is to print <file A> will now be explained. FIG. 23 is a diagram showing the contents of <file A>, the colored picture of a car. FIG. 1 is a diagram showing the structure of the system in this embodiment. A user sends an instruction from a PC 101, and a monochrome printer 104 is set as a normally used printer. A color printer 103 is also set.

At step S109 the job table is initialized. At step S111 a job that is to be performed when there is no input is added to the job table (FIG. 20). When file name <file A> is designated in a window in FIG. 21 and printing for it is selected, at step S110 it is determined that there is input, and program control advances to step S111. At step S111, as is shown in FIG. 22, an input analysis job is entered in the job table. Since, at step S112, there is a job to be executed, program control advances to step S113. At step S113 an analysis of the job to be performed (input "print <file A>") is acquired. At step S114 it is ascertained that the object of the input "print <file A>" is the printing of the <file A>.

At step S115 planning is performed, based on the following conditions and statuses, for proposing, to a user that the printing be performed by a color printer.

<file A> includes a colored portion (the portion comprising the car in FIG. 23)

the color printer 103 that can be used is present (FIG. 1).

At step S119 a query "Perform printing by a color printer?" is directed to a user (FIG. 24). At the same time, a job corresponding to an event is added to the job table when no response is received from the user (FIG. 25). Program control thereafter returns to step silo.

When, at step S110, there is no input for ten minutes, at step S112 it is assumed that there is a job to be performed, and program control advances to step S113. At step S113, a job to be performed (when no response is received from a user) is acquired.

At step S114 it is ascertained that the object for a job when there is no response from a user is to determine whether a proposal can be accepted. At step S115 it is determined from the flow condition and the status that the user should be queried by telephone.

The telephone number of the current location of the user is acquired (schedule data in FIG. 26)

The printing priority is urgent (according to the schedule data in FIG. 26, file A is to be used at the business talk at 13:00).

At step S119 a query, "Perform printing with a color printer?" is directed to the user (FIG. 27). At the same time, a job corresponding to an event is added to the job table when no response is received from the user (FIG. 28). Program control thereafter returns to step S110.

When, at step S110, a user responds with "Yes, please" as is shown in FIG. 27, it is assumed that data input is to be performed, and program control moves to step S111. At step S111 an input analysis job is added to the job table (FIG. 21). At step S112 it is assumed that there is a job to be performed, and program control moves to step S113. At step S113, a job to be performed, the input, "Yes, please" is analyzed. At step S114 it is ascertained that the object of the input, "Yes, please" is the acceptance of the proposal.

At step S115 it is determined that <file A> is to be transmitted to and printed by the color printer 103. At step S118 <file A> is transmitted to and printed by the color printer 103. At the same time, a job for confirming whether or not the printing has been terminated normally is added to the job table (FIG. 29). Program control thereafter returns to step S110.

If, at step S110 there is no data input and at step S112, as is shown in FIG. 30, the printer status is changed from "Printing" to "Printed document in tray" it is assumed that there is a job to be executed, and program control advances to step S113. At step S113 a process corresponding to the job to be executed, printer status, is acquired. At step S114, from a printer status entry in FIG. 31, the status "Printed document in tray" means that there is a printed document in a printer tray, and the object of the job is understood to be the delivery of the printed document to a user.

At step S115, a waiting state is specified because the user may soon come to pick up the printed document. At step S116, a job for confirming whether the user has come and has picked up the printed document is added to the job table (FIG. 32). Program control thereafter returns to step S110. If, at step S110, there is no input for ten minutes and at step S112 the printed document is still on tray, there is a job to be executed, and program control therefore advances to step S113. At step S113 a process corresponding to the job to be executed, when the printed document is still on hand, is acquired. At step S114, from the table in FIG. 31 the status "Printed document on tray" means that a printed document is still in the printer tray, and it is assumed that the object is the delivery of the printed document to the user. Since at step S115 the printed document has not been picked up for ten minutes, it is assumed that the user has forgotten to collect the document, and it is determined that a notice, "Printed document is in color printer tray" is to be issued (FIG. 33). Also, a job corresponding to the failure of the user to respond and a job corresponding to the collection of the printed document by the user are added to the job table (FIG. 34). Program control thereafter returns to step S110.

When at step S110 there is no input and at step S112 the printer status is changed from "Printed document in tray" to "Normal" as is shown in FIG. 28, there is a job to be executed and program control advances to step S113. At step S113 a job corresponding to the job to be executed, printed document in tray, is re-evaluated. At step S114 the object for the rechecking of the job corresponding to the "Printed document in tray" is understood to be the deletion of an unnecessary job. At step S115, it is determined that the job of waiting for a response from the user should be deleted, and at step S119 the job of waiting for the user's response is deleted. A new job is not added. While the job table is in its initial state, program control returns to step S110.

FIGS. 36 and 37 are tables showing plans, actions and rules.

When a user presses the button "Print" in the printing window in FIG. 21, it is determined by referring to the plans and actions in FIG. 36 that the object of the user is the changing of the current state to the "Printed document in tray". In addition, since "Printed document in tray" is the assumption for the object "Acquire printed document" the final object of the user is determined to be "Acquire printed document".

When a user expresses agreement or disagreement by voice or by the manipulation of the mouse in response to the query in the inquiry window in FIG. 24 or the window-in FIG. 33, or the telephone query in FIG. 27, it is determined that the object of the user is the statement of the agreement or disagreement relative to the query.

In FIG. 37 the final object of the system is the thus constitutes the achievement of the object of the user. As the basis for this, the system must be stable. In addition, the system must (1) apprehend the object of the user and (2) must make a plan for the achievement of the object and execute it.

To stabilize the system, not only an abnormal timing for the system must be adjusted to the normal condition, but also the system must be powered off when it is not required in order to reduce costs and to prevent the system from becoming unstable.

Figure 38:
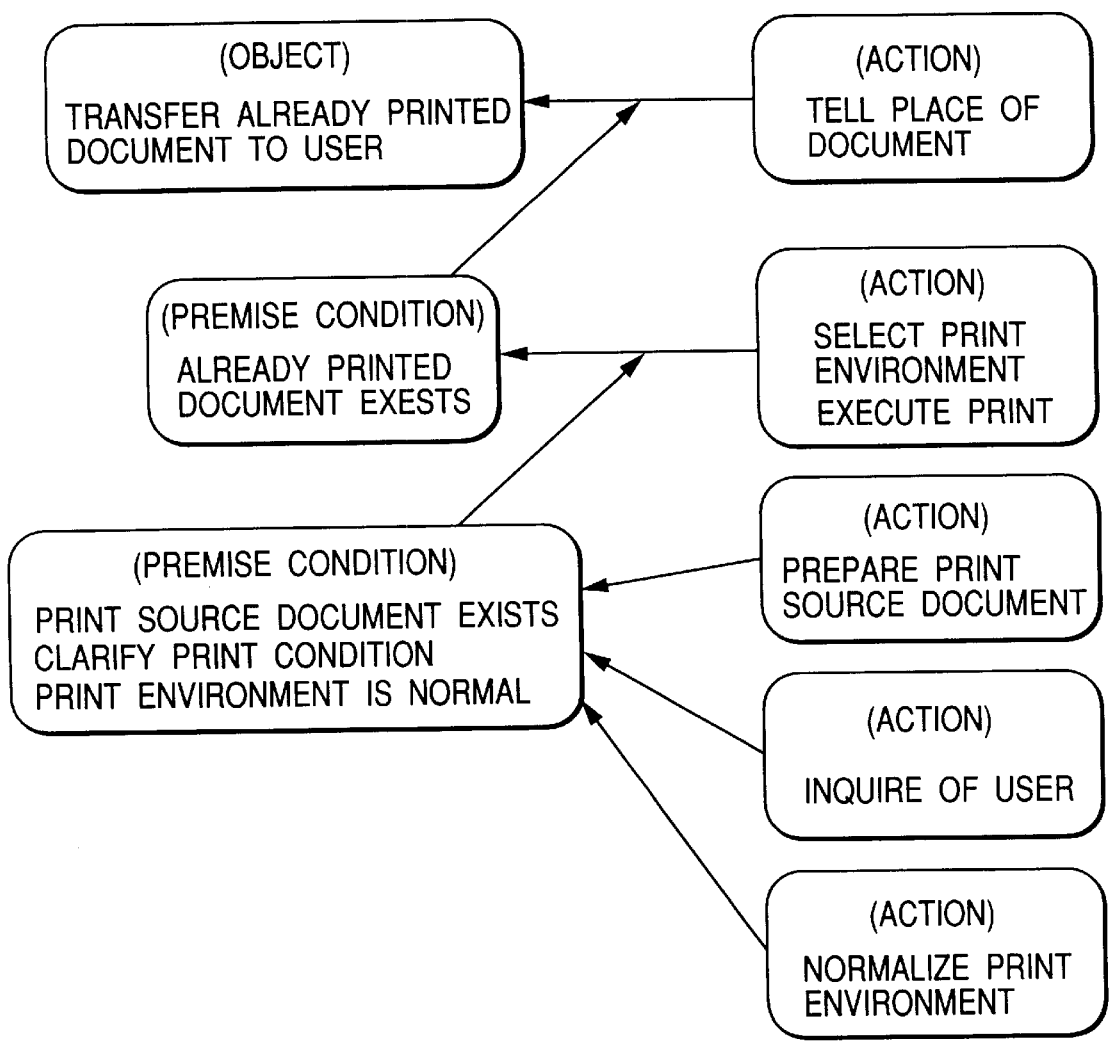
FIG. 38 is a diagram showing actions and premise conditions for an object.

FIG. 38 is a diagram that for easier understanding shows only one part of the table in FIG. 37.

In order to understand the object of the user, data that is input is identified. Further, corresponding to "acquire printed document" which is the object of the user in FIG. 36, "Transfer printed document to user" which is the object of the system.

The presence of a printed document is the premise for the transfer of the printed document to a user, and the object is achieved by notifying the user of the location of the document. Of course, the user must collect the document or the document must be delivered to the user by some means in order for the user to acquire the document; in this embodiment, it is determined that when the printed document is no longer in the printer tray, that is the equivalent of the user having acquired the document.

The presence of an original document and the printing conditions are required in order to obtain a printed document, and it is premised that a corresponding printing environment normally exists. In this situation, a corresponding printing environment is selected to perform printing. The original document must be so prepared that its existence is constant. In addition, to clarify the printing conditions, only when there is a question concerning a condition need ask a user queries. When a printing environment is abnormal, the printing environment is normalized to maintain normal environment. When no response is received from a user within a predetermined period of time, additional planning must be performed to ascertain the intent of the user.

The properties of each device are stored in a memory in each device, or in the memory of the server that manages each device. FIG. 39 is a table showing the properties of the devices. The statuses of the devices are held in the devices, and are voluntarily transmitted to other apparatuses by the devices, or by the passive transfer of them when requested by another server.

In this system, the properties are inherent to the individual devices and do not change; they are acquired when the system is activated or when a connection across the network is altered. In the planning process, the statuses are acquired, as needed, or at a specific time interval, and are updated as information intended for the internal memory.

[Twelfth Embodiment]

An explanation will now be given for the processing performed in a case where, as in the eleventh embodiment, a color printer is busy when <file A> is to be printed.

First, when "Print <file A>" is input, it is entered in the job table, and its object is understood to be a request that printing be performed. Assume as the condition/situation that the colored portion is included in a document and a color printer is busy. A plan is devised to query a user concerning whether the job can wait until the color printer is not busy, or whether the data can be printed in monochrome. The query, "The color printer is busy. Wait, or print in monochrome?" is presented to a user. When the user selects "Wait" the process is placed on standby until the color printer is no longer busy.

[Thirteenth Embodiment]

When "<file A> was changed to <file A'>" is input, it is ascertained that the updating of the job table is the object. As the condition/situation, the <file A> printing job is stored in the job table. Thus, a plan is made to query a user concerning the changing of the printing target to <file A'>. Then, the query "Print <file A'> instead of <file A> before amended?" is presented to the user.

[Fourteenth Embodiment]

According to this embodiment, in a system wherein a plurality of apparatuses are connected together (in this case, they are connected across a network), when a job for an individual apparatus is instructed, an analysis of the object of the job is performed by the appearance. When the apparatuses determine from their statuses and the status of the instructed apparatus, that the instructed apparatus should not execute the job, the performance of the job is transferred to another apparatus.

Figure 41A:
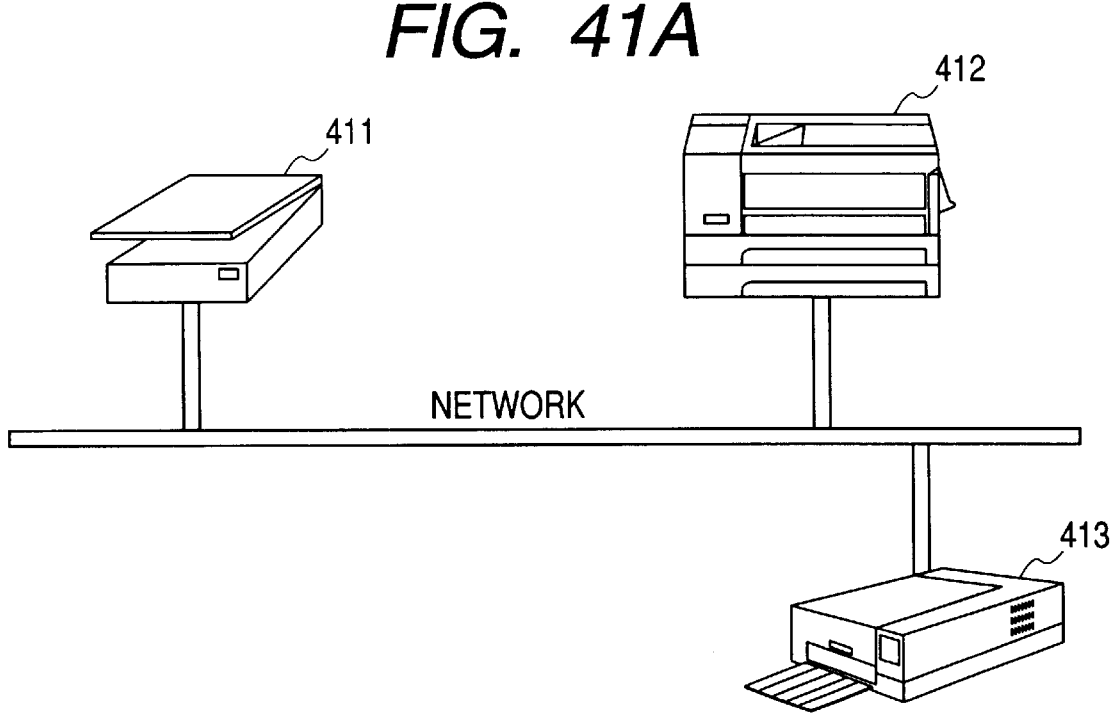
FIGS. 41A and 41B are diagrams showing states where a plurality of apparatuses are connected to a network.
Figure 41B:
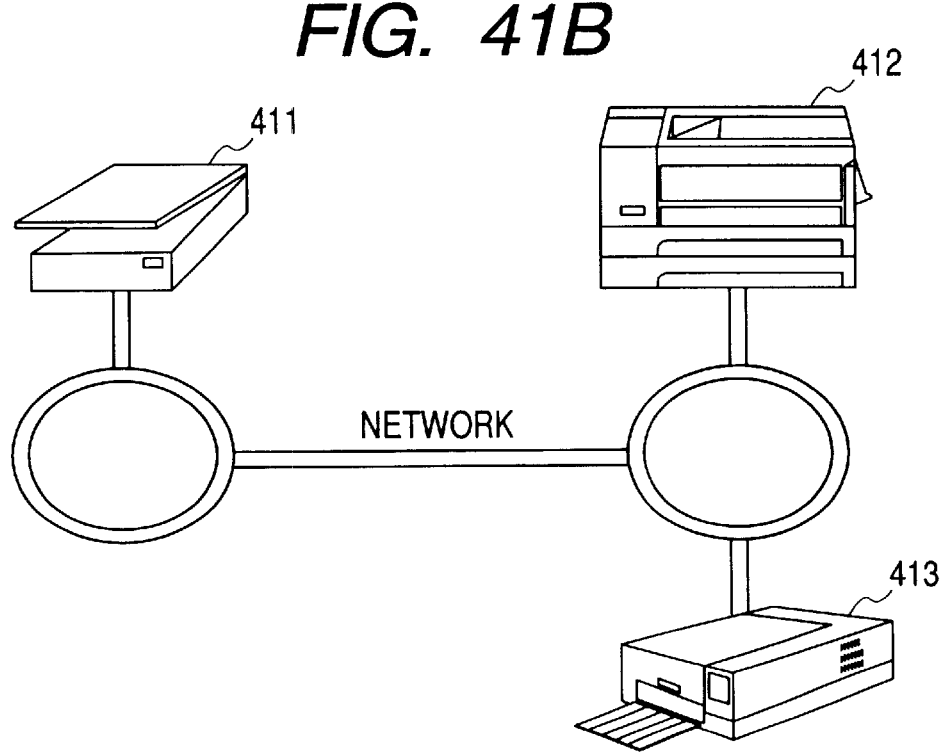

FIGS. 41A and 41B are diagrams in each of which is shown the condition where a plurality of apparatus are connected to a network. A network in FIG. 41A provides an environment wherein a scanner 411 and printers 412 and 413 can determine the states of the other apparatuses. A network in FIG. 41B provides an environment wherein the scanner 411 and the printers 412 and 413 can not determine the states of the other apparatuses.

Figure 42:
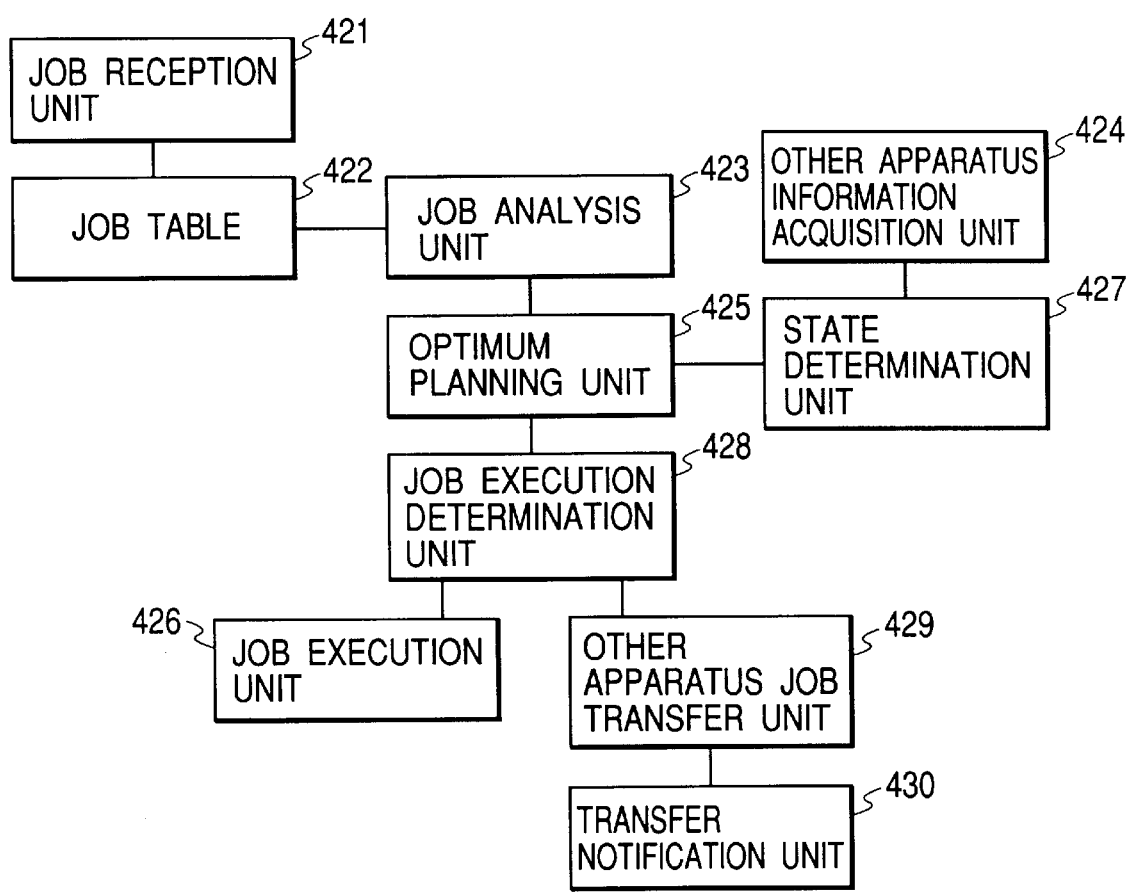
FIG. 42 is a diagram showing a functional arrangement for performing the processing for a fourteenth embodiment.

FIG. 42 is a diagram illustrating a functional arrangement for performing the processing in this embodiment. A job reception unit 421 receives a job from a user or from another apparatus. A received job is registered in a job table 422. A job analysis unit 423 extracts the job from the job table 422 and analyzes it. Another apparatus information acquisition unit 424 determines the attributes and the current statuses of other connected apparatuses. A self state determination unit 427 determines the attribute and the current state of the self apparatus.

Figure 43:
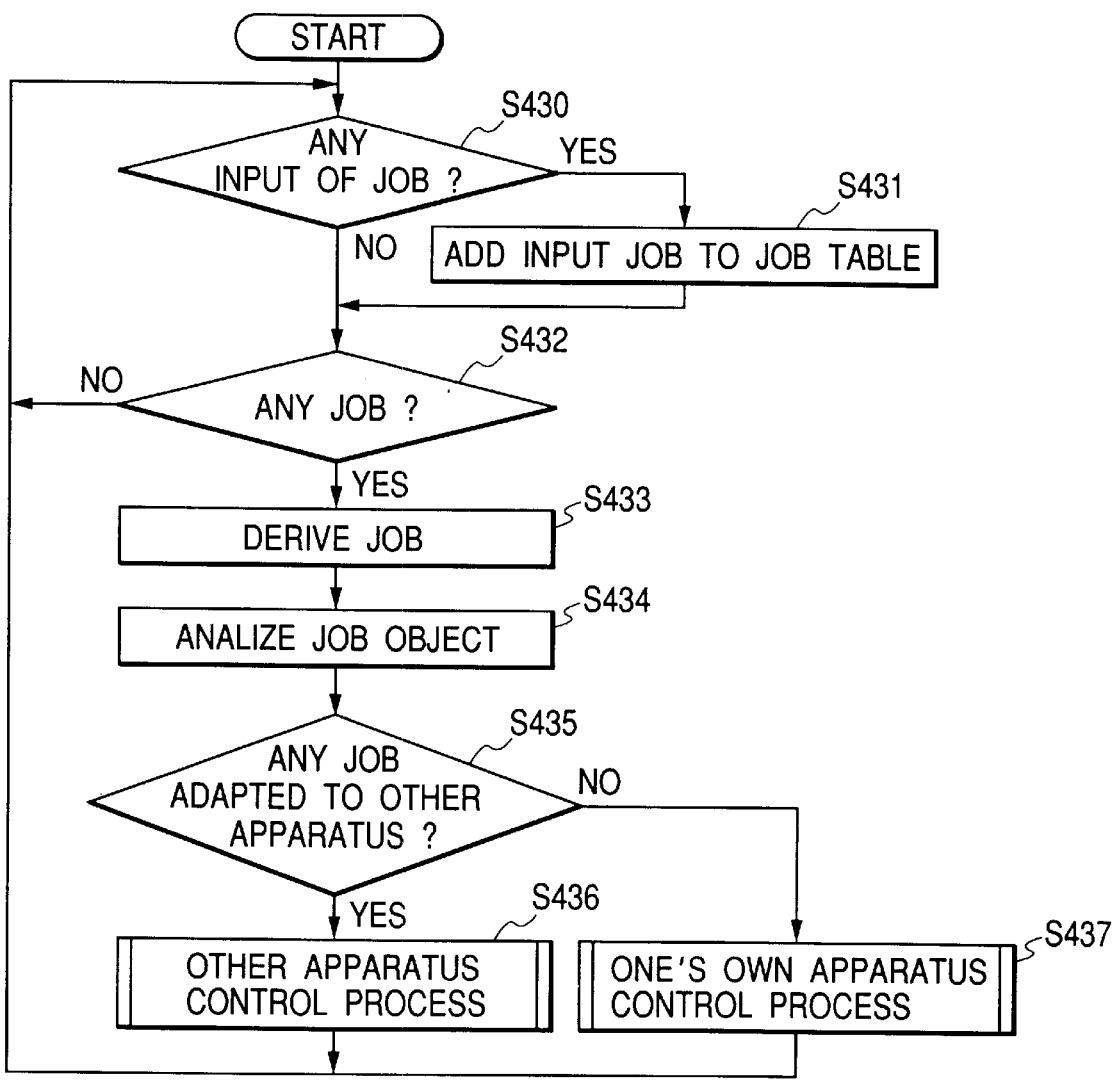
FIG. 43 is a main flowchart showing the processing for the fourteenth embodiment.

An optimum planning unit 425 prepares an optimal plan for the performance of a job. A job performance determination unit 428 determines whether or not a job is to be performed, and whether the locally owned apparatus or another apparatus should perform the job. When the job is to be performed by the locally owned apparatus, a job performance unit 426 performs it. When another apparatus is to perform the job, another apparatus job transfer unit 429 transfers the job to another apparatus. A transfer notification unit 430 notifies a user of the results obtained by the job performance or the transfer of the job to another apparatus. FIG. 43 is a main flowchart showing the processing performed for this embodiment.

At step S430, in order to determine whether a job has been input, a check is performed to determine whether or not a job has been input by a user, a job has been input by a device that can be detected by a system, based on the results obtained by analyzation of the jobs, or a new job that has been generated by the locally owned apparatus while idling. When a job has been input, at step S431, an input job is added to the job table. At step S432, the job table is examined to determine whether there is a job. If there is a job, at step S433 the job is extracted. At step S434 a received instruction is analyzed, and from the information attained by the analyzation, the object of the job is obtained. At step S435 a check is performed to determine whether or not a job for another apparatus is present. If there is such a job, at step S436 control of another apparatus is initiated. If there is no such job, at step S437 a control process the locally owned apparatus is initiated.

Figure 44:
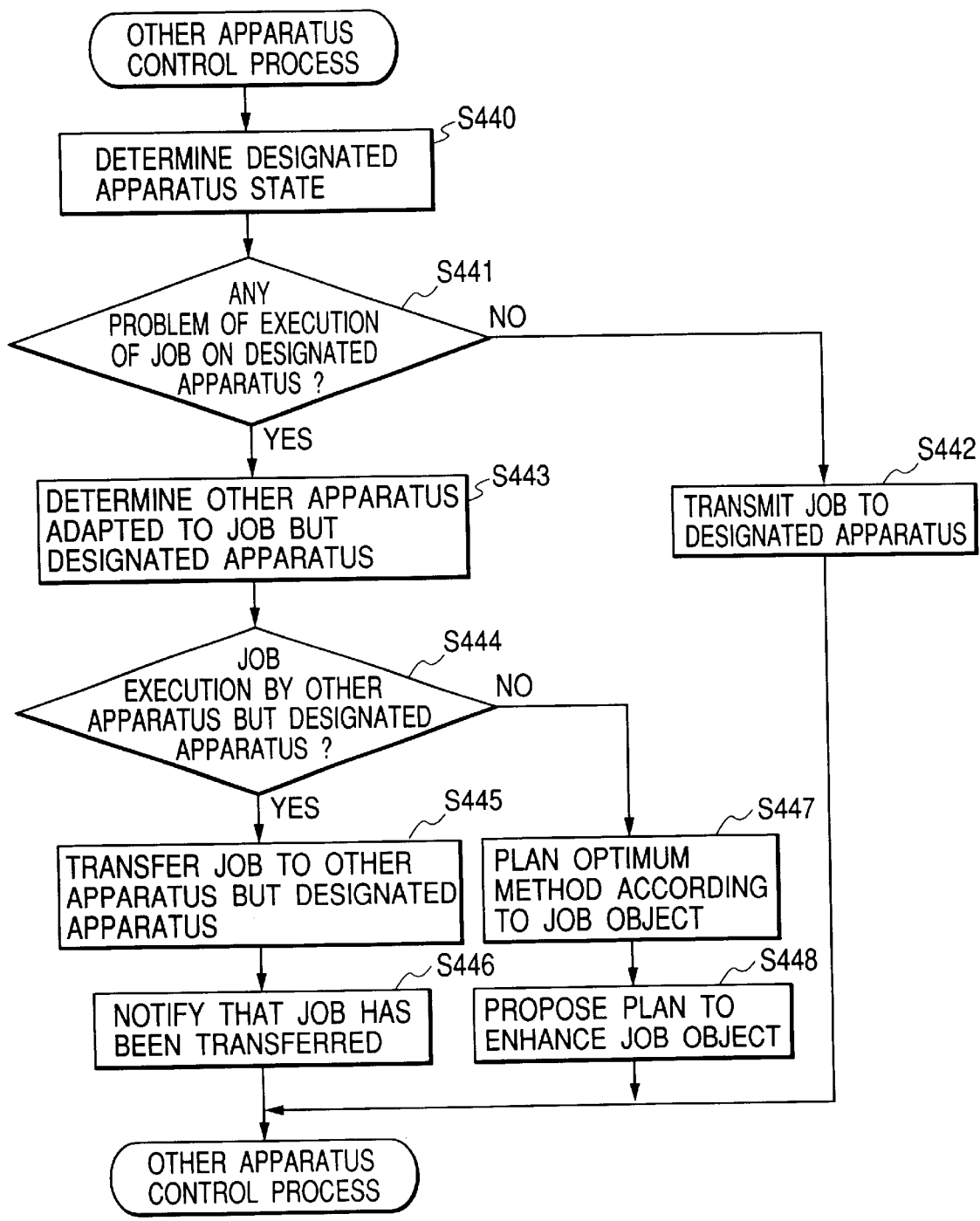
FIG. 44 is a flowchart showing the processing for controlling other apparatuses.

FIG. 44 is a flowchart for the process for controlling another apparatus performed at step S436 in the main flowchart.

At step S440 the status of an apparatus that is designated in the job is examined, and at step S441, based on the status, a check is performed to determine whether a problem affecting the performance of the job by the designated apparatus exists. If no such problem exists, at step S442 the job is transmitted to the designated apparatus. If a problem affecting the performance of the job by the designated apparatus exists, at step S443 a check is performed to determine whether or not there is an apparatus other than the designated apparatus that is suitable for the performance of the job. If there is such an apparatus, its status is examined. As a result, if there is another apparatus that can execute the job, at step S445 the job is transferred to that apparatus, and at step S446 the user is notified of that the job was transferred to that apparatus. When there is no apparatus other than the designated apparatus that can perform the job, or when another suitable apparatus can not be used at that time, at step S447 an optimal plan is devised that will not degrade the object of the job, and at step S448, the plan is proposed to the user.

Figure 45:
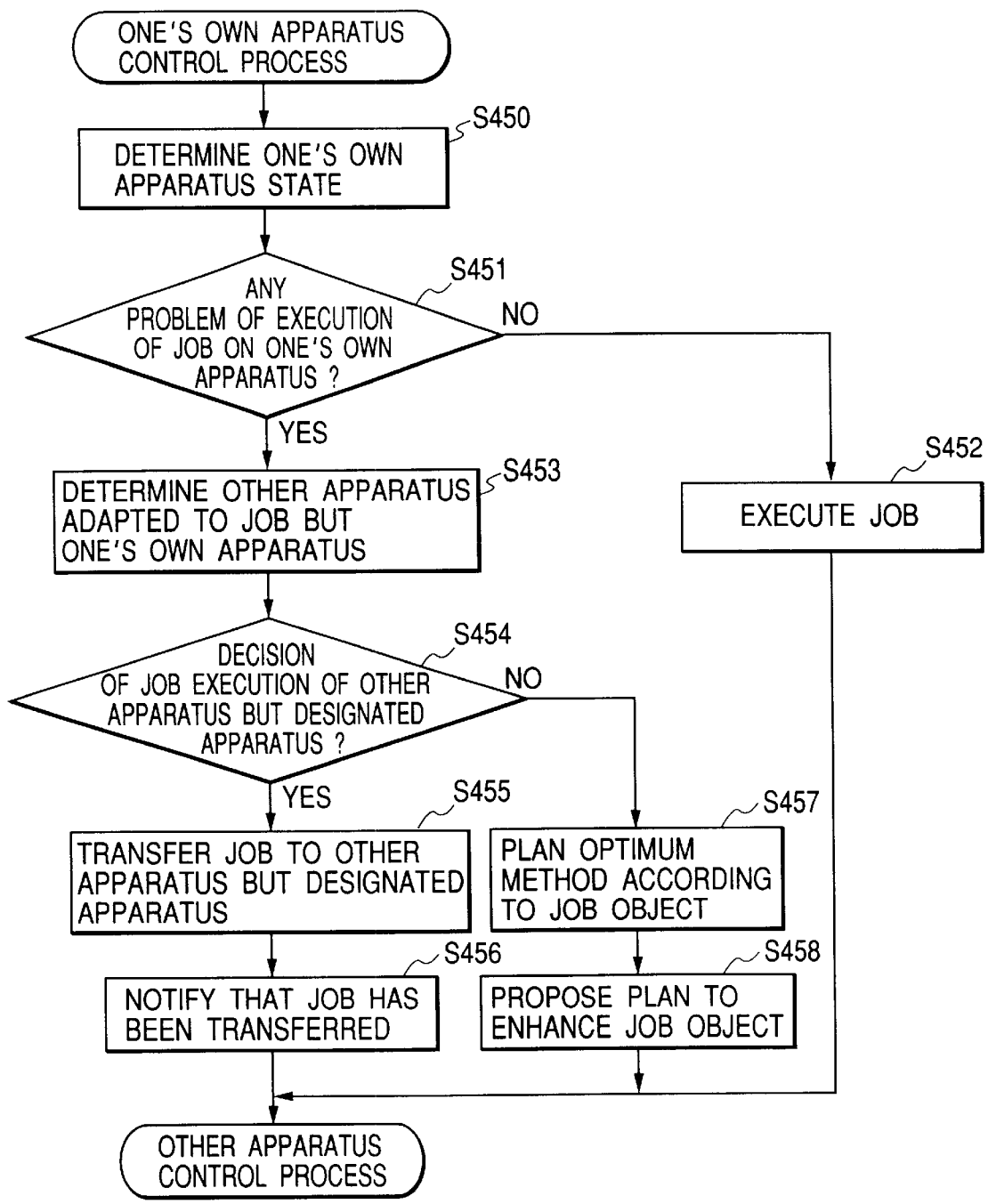
FIG. 45 is a flowchart showing the processing performed by one's own apparatus.

FIG. 45 is a flowchart for the process for controlling the locally owned apparatus performed at step S437 in the main flowchart.

At step S450 the status of the locally owned apparatus is examined, and at step S451, based on the status, a check is performed to determine whether a problem affecting the performance of the job by the locally owned apparatus exists. If no such problem exists, at step S452 the job is performed by the locally owned apparatus. If a problem affecting the performance of the job by the locally owned apparatus exits, at step S453 a check is performed to determine whether or not there is an apparatus other than the locally owned apparatus that is suitable for the performance of the job. If there is such an apparatus, its status is examined. As a result, if there is another apparatus that can execute the job, at step S455 the job is transferred to that apparatus, and at step S456 the user is notified that the job was transferred to that apparatus. When there is no apparatus other than the locally owned apparatus that can perform the job, or when another suitable apparatus can not be used at that time, at step S457 an optimal plan is devised that will not degrade the object of the job, and at step S458, the plan is proposed to the user.

Figure 46:
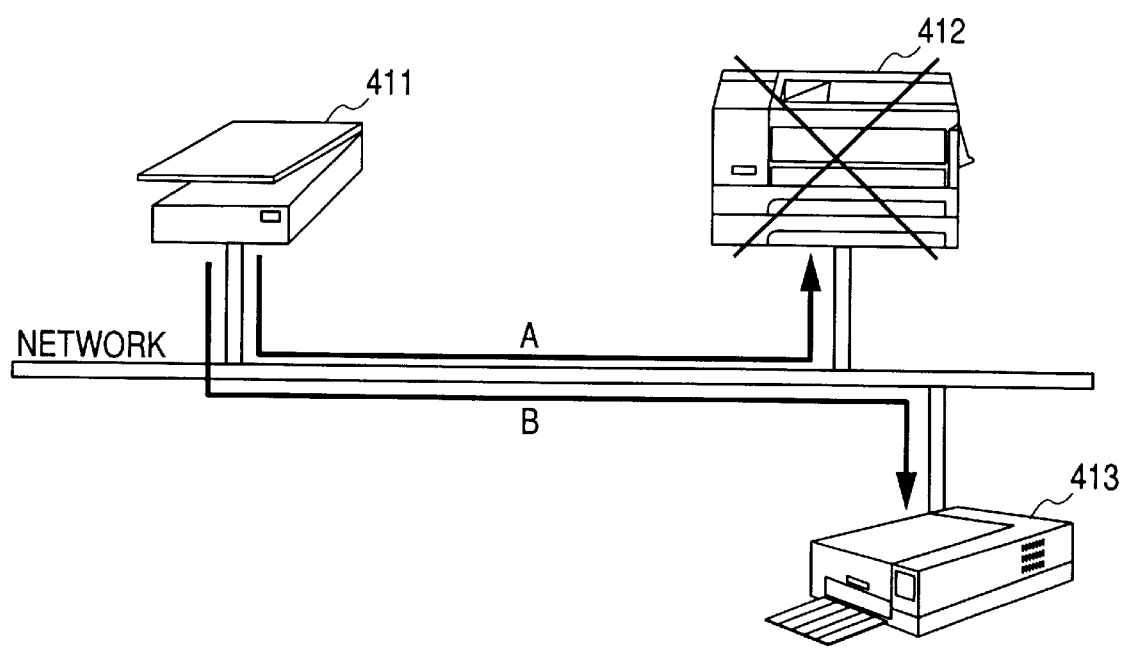
FIG. 46 is a diagram showing an example where a printer other than a designated printer is employed for output.

FIG. 46 is a diagram showing the condition that exists when, while, in FIG. 41A, an instruction is issued to output to the printer 412 along route A information that has been read by the scanner 411, the other apparatus information acquisition unit 424 of the scanner 411 discovers a malfunction at the printer 412, and this information is output to the printer 413 along route B.

Figure 47:
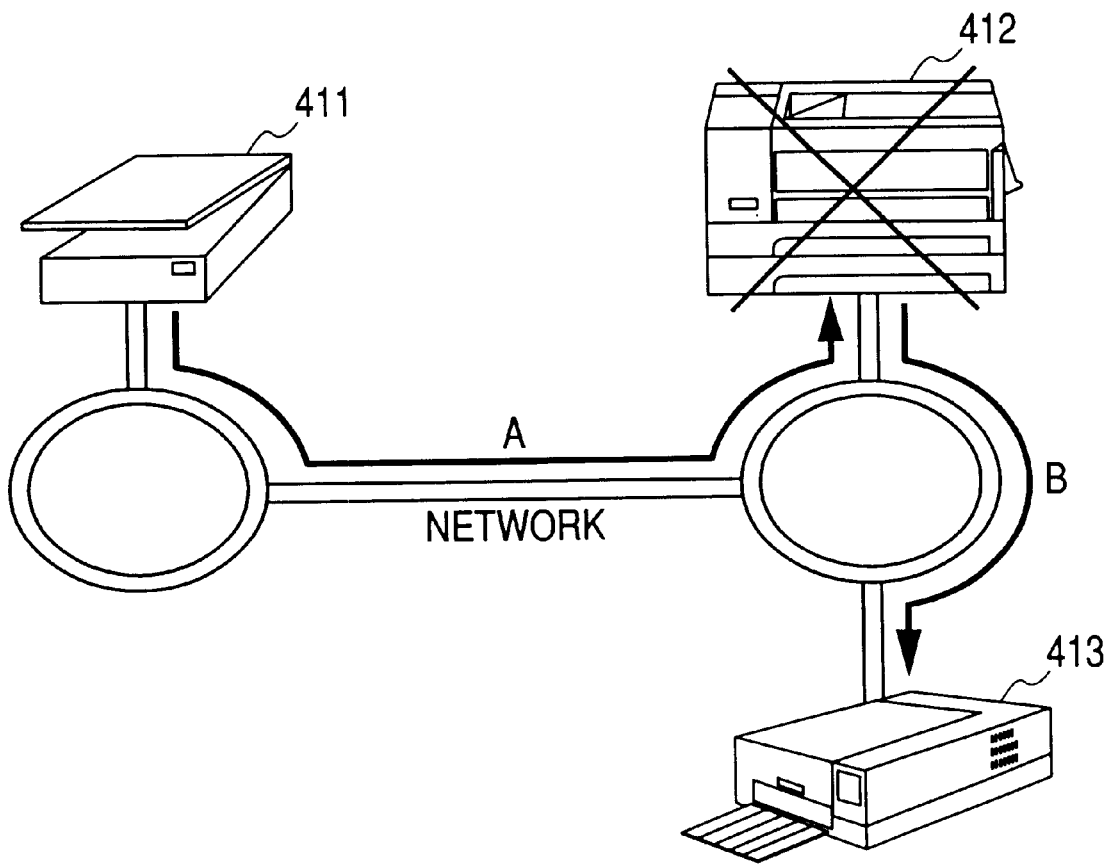
FIG. 47 is a diagram showing an example where a designated printer transfers a job to another printer.

FIG. 47 is a diagram showing the condition that exists when, while, in FIG. 41B, the scanner 411 is instructed to output the information that is read to the printer 412 along route A and to confirm the status of the printer 412, since the printer 412 is located in a remote area, the scanner 411 takes the status of the network into account and unconditionally transmits the information to the printer 412, which then, because a malfunction has occurred there, transfers the received information (job) to the printer 413.

The processing performed in FIGS. 46 and 47 will be described while referring to the flowcharts shown in FIGS. 43 to 45.

When in FIG. 46 a job is to be output by the scanner 411 and transferred to the printer 412, the scanner 411 performs the following process.

First, at step S430 the scanner 411 receives a job for the scanning of information and the transmission of it to the printer 412. At step S431 the job is entered in the job table, and at step S433, it is extracted therefrom. At step S434 the scanner 411 scans the data and ascertains the job involves the transmission of data to a designated printer. At step S435 it is determined that there is a job, which is to be executed by another apparatus, for the output of the scanned information by the printer 412. Based on this determination, at step S436 program control moves to another apparatus control process in FIG. 44.

At step S440 the current state of the printer 412 is acquired. Then, information that the printer 412 has malfunctioned is received, and at step S441 it is determined that printing by the printer 412 is disabled. In this case, besides a malfunction, the printer 412 can also be in an out of paper or out of toner disabled state. At step S443, it is assumed that the designated printer 412 can not execute the job, and another apparatus that can execute the job is searched for by communicating with the other apparatuses across the network. At step S444 it is found that the printer 413 can execute the job and the performance of the job is assigned to it.

At step S445 the scanned information is transmitted to the printer 413. And at step S446, since a process other than the one instructed is being performed, the user is notified of the job alteration. Since the process for the instructed job has been terminated, the system waits for the next job.

Following this, a process in FIG. 47 where a job is to be output by the scanner 411 and transmitted to the printer 412 will now be explained.

First, at step S430 the scanner 411 receives a job for the scanning of information and the transmission of the information to the printer 412. At step S431 the job is entered in the job table, and at step S433, it is extracted therefrom. At step S434 the scanner 411 scans the data and ascertains the job is for the transmission of data to a designated printer. At step S435 it is determined that there is a job, which is to be executed by another apparatus, for the output of the scanned information by the printer 412. Based on this determination, at step S436 program control moves to another apparatus control process in FIG. 44.

At step S440, while the scanner 411 communicates with the printer 412 and attempts to acquire its status, it is found that the printer 412 is in a remote area and the scanner 411 decides to transmit the information, regardless of the status of the printer 412. At step S441 it is determined that there is no problem with the printer 412 since it is in a remote area, and at step S442 the scanned information is transmitted to the printer 412, which is the designated apparatus, and the job is transferred thereto. Since the instructed job has been terminated, the scanner 411 waits for the next job.

At step S430 the printer 412 receives the job for outputting the received information. At step S431 the job is entered in the job table, and at step S433, it is extracted therefrom. At step S434 the printer 412 understands that the job is for the printer 412 to output the received information. At step S435 it is determined that there is no job for another apparatus, and at step S437 program control moves to an own apparatus control process in FIG. 45.

At step S450 the current state of the printer 412 is examined, and at step S451 the printer 412 judges by itself that the printer 412 has a malfunction and is in a printing disabled state. In this case, besides the malfunction, the printer 412 can be in such an output disabled state as out of paper or out of toner. At step S453, another apparatus that can execute the job is searched for by communication with the other apparatuses across the network.

At step S454 the printer 413 that can execute the job is found, and the execution of the job at the printer 413 is determined. At step S455, the printer 412 transmits the received information to the printer 413. At step S456, since the process other than being instructed is performed, the user is notified of the alteration of the job. In this embodiment, such a notice is issued to the instruction source user. Since the output destination is far away from the instruction source, the notice may be issued to a recipient. Since the instructed job has been terminated, the system waits for the next job. As at the printer 413 there is no processing problem and the printer 413 can perform the job for the output of the received information, the printer 413 performs the job.

In the above embodiment, the individual units automatically transfer the job. If there is a problem at each apparatus, a user may provide a transmission order for the transfer of the job by the apparatuses. In this embodiment, a user inputs as a job the employment of a designated printer to print a scanned document; however, a second and a third printer may at the same time be set for the job, so that if the designated printer malfunctions they can replace it and perform the printing. Thus, at step S443 or S453, the second or the third printer can be selected as a suitable apparatus for the job and its status is examined. A second or a third printer may be set as a printer to receive a job and to replace a designated printer when it is in a printing disabled state. However, even when a second or the third printer is not set for the job, the printer that receives the job can transfer it in consonance with destinations that are set internally.

In addition to a malfunction and an operation disabled state, the following conditions can cause the performance of a job to be canceled: the specifications may be inappropriate for the performance of the job, e.g., a case where a job for the printing of color data is issued to a monochrome printer; or immediate processing of the job may not be possible because there are too many jobs in a queue.

[Fifteenth Embodiment]

In this embodiment, in a process for determining the status of the locally owned apparatus at step S450 in FIG. 45, schedule information for a user, which is the object, is examined as a factor that is used to determine whether a problem exists that will affect the performance of a job involving the output to a user of urgent information received by a printer.

Figure 48:
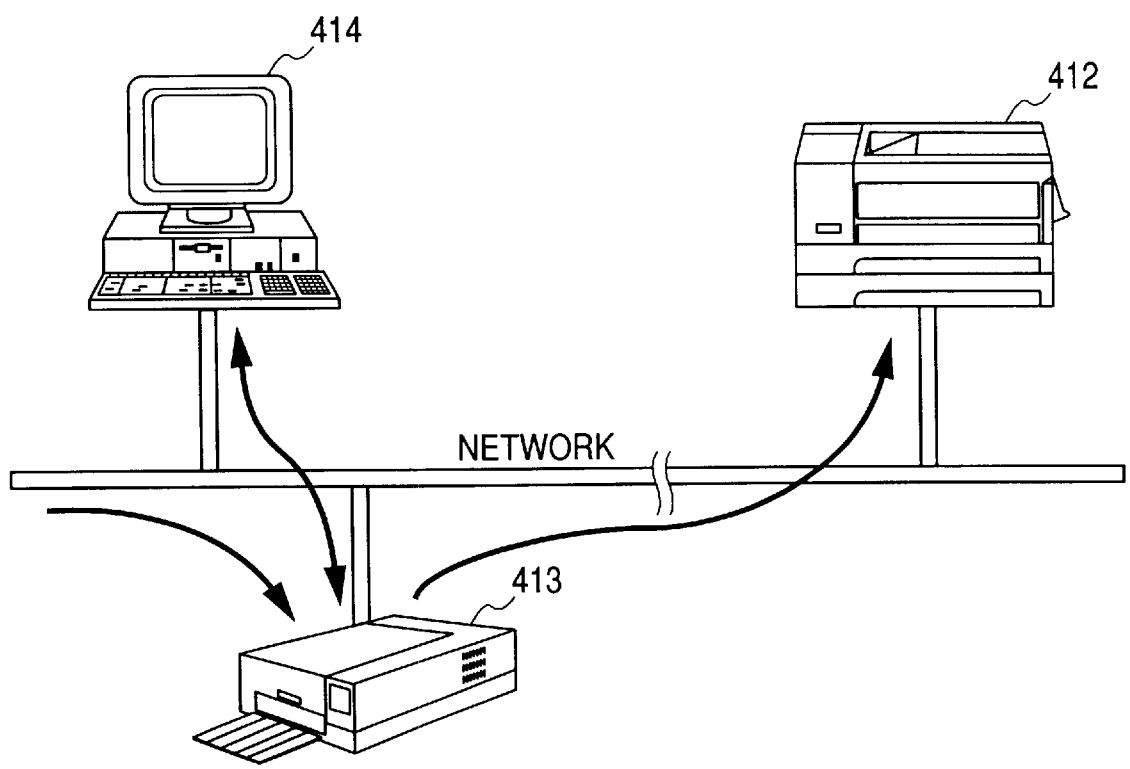
FIG. 48 is a diagram showing an example where a user's printer transfers a job to a printer at a user's destination.

An explanation will be given for a process that is to be performed in the environment shown in FIG. 48, where a user, to whom urgent information is to be transmitted, is currently at an outside location at which a printer 412 is available that is connected to a network.

In the procedures in FIG. 43, at step S434 it is ascertained that the object of the job is the transmission to a user of urgent information that has been received. At step S435, since at this time there is no job for another apparatus, program control moves to step S437. At step S437 the process advances to the locally owned apparatus control process in FIG. 45.

At step S450, in order to determine the status of the locally owned apparatus, the schedule of a user who is designated as a transmission source is confirmed by the PC 414, and it is ascertained that the user is at an outside location. Since the user is at an outside location, at step S451 it is determined that a problem related to making urgent contact exists at the locally owned apparatus. At step S453 a check is performed to determine whether or not a printer that can output information is present at the user's destination. At step S454 it is confirmed that there is a printer 412 that can output information, and it is determined that the printer 412 will be used to output the information. At step S455 the information is transmitted to the printer 412. At step S456 the users at the transmission source and at the reception destination are notified that the job has been transferred.

When, at step S443, there is no printer available to which to transfer the job but there is another apparatus that can be employed by the user, such as a PC, a facsimile machine or a telephone, at step S444 it may be determined to perform the job by using one of the available apparatuses. Since the information can not be transmitted unchanged, at step S445 the information to be output to the printer is converted into an electronic mail document or a facsimile document, or is changed to voice information for the output.

At step S446, depending on the medium used for the output, a notice that the job was transferred to another medium need not be issued, and can be transmitted by using the same medium. For example, when a telephone is used to transmit the information, it is better to notify a user of the job transfer before or after the transmission of the information.

Instead of the telephone, at step S443, the above PC, the facsimile machine or the telephone may be determined to be a suitable apparatus to replace the printer for the job. At step S447 the employment of such an apparatus may be determined to be an optimal plan that does not degrade the object of the job, and at step S448 the plan may be proposed to a user.

[Sixteenth Embodiment]

Figure 49:
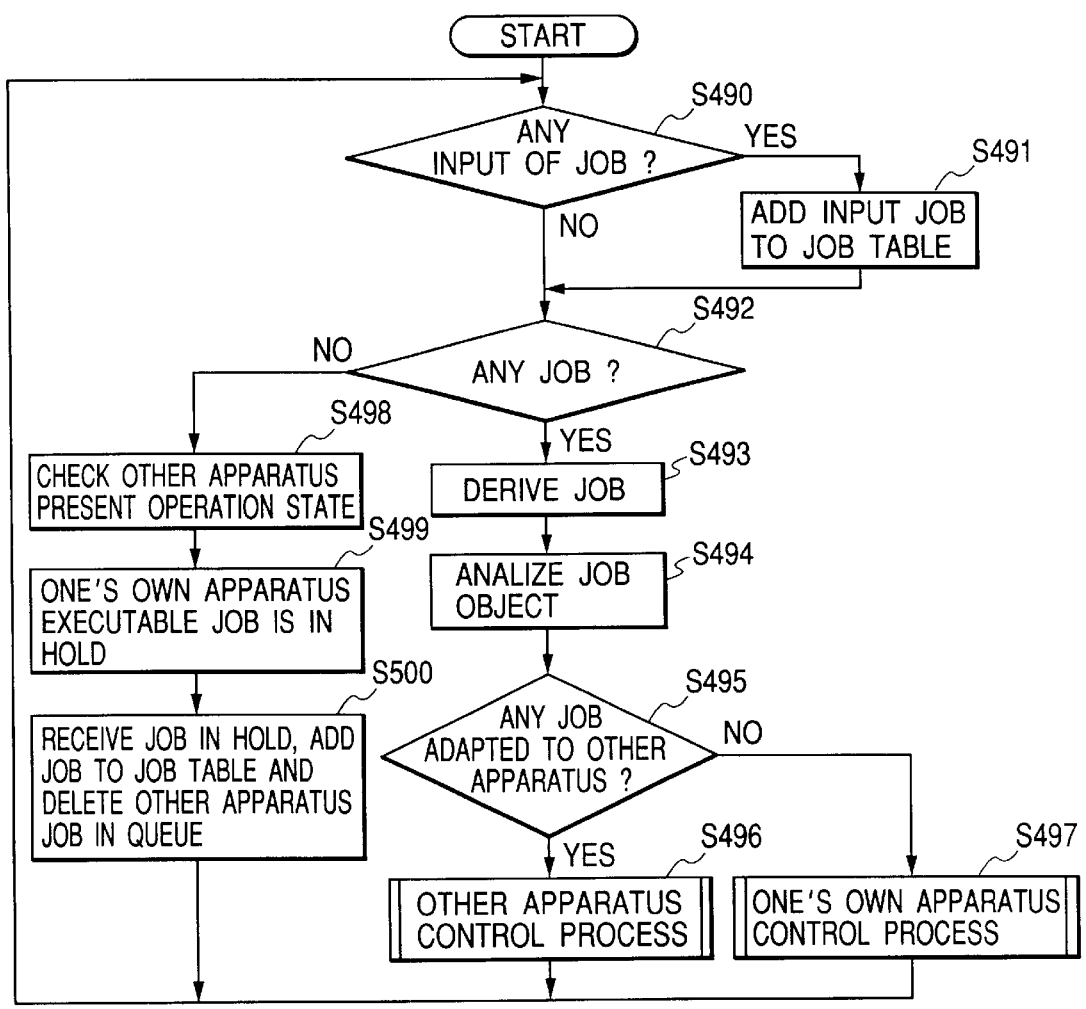
FIG. 49 is a flowchart showing the processing for a sixteenth embodiment.

FIG. 49 is a flowchart showing the processing for this embodiment. Steps S498 to S500 are additionally provided for the flowchart in FIG. 43 as a process to be performed when there is no job. At step S498 the current operating statuses of other apparatuses are examined, and at step S499 a check is performed to determine whether or not a job that the locally owned apparatus can perform is being held in another apparatus and not being performed. If such a job is being held in another apparatus, at step S500 the job is extracted from the pertinent apparatus and is entered in the job table for the locally owned apparatus, while it is deleted from the job table for the pertinent apparatus. In this embodiment, therefore, an apparatus finds a job by itself and processes it.

Figure 50:
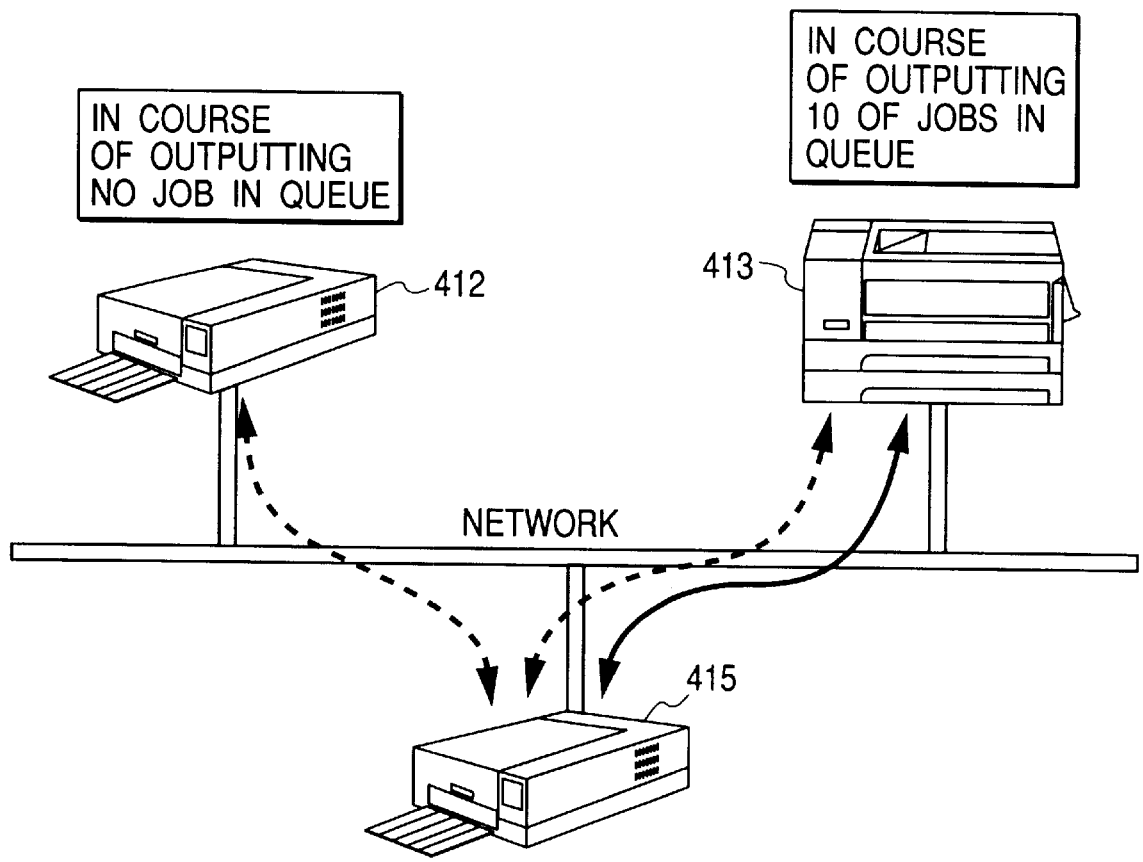
FIG. 50 is a conceptual diagram showing the processing for the sixteenth embodiment.

FIG. 50 is a conceptual diagram showing the situation for this processing. Since no job is present in a printer 412, and a printer 413 has ten jobs in a queue, a printer 415 acquires a job from the printer 413 and processes it.

The process performed by the printer 415 is as follows. At step S492 there is no job, and program control moves to step S498. At step S498 the current statuses of the other printers, 412 and 413, are examined. At step S499 it is determined that at the printer 413 there is a job that the printer 415 can execute. At step S500 the printer 415 extracts that job from the printer 413, and enters it in its job table. Then, the extracted job is deleted from the job table for the printer 413. Since at step S490 there is no job input, and at step S492 there is a job that was entered previously, program control moves to step S493 to execute the job.

The operations for the performance of the job by the locally owned apparatus, which were explained in the fourteenth and the fifteenth embodiments, are performed, and the processing is thereafter terminated.

[Seventeenth Embodiment]

Figure 51:
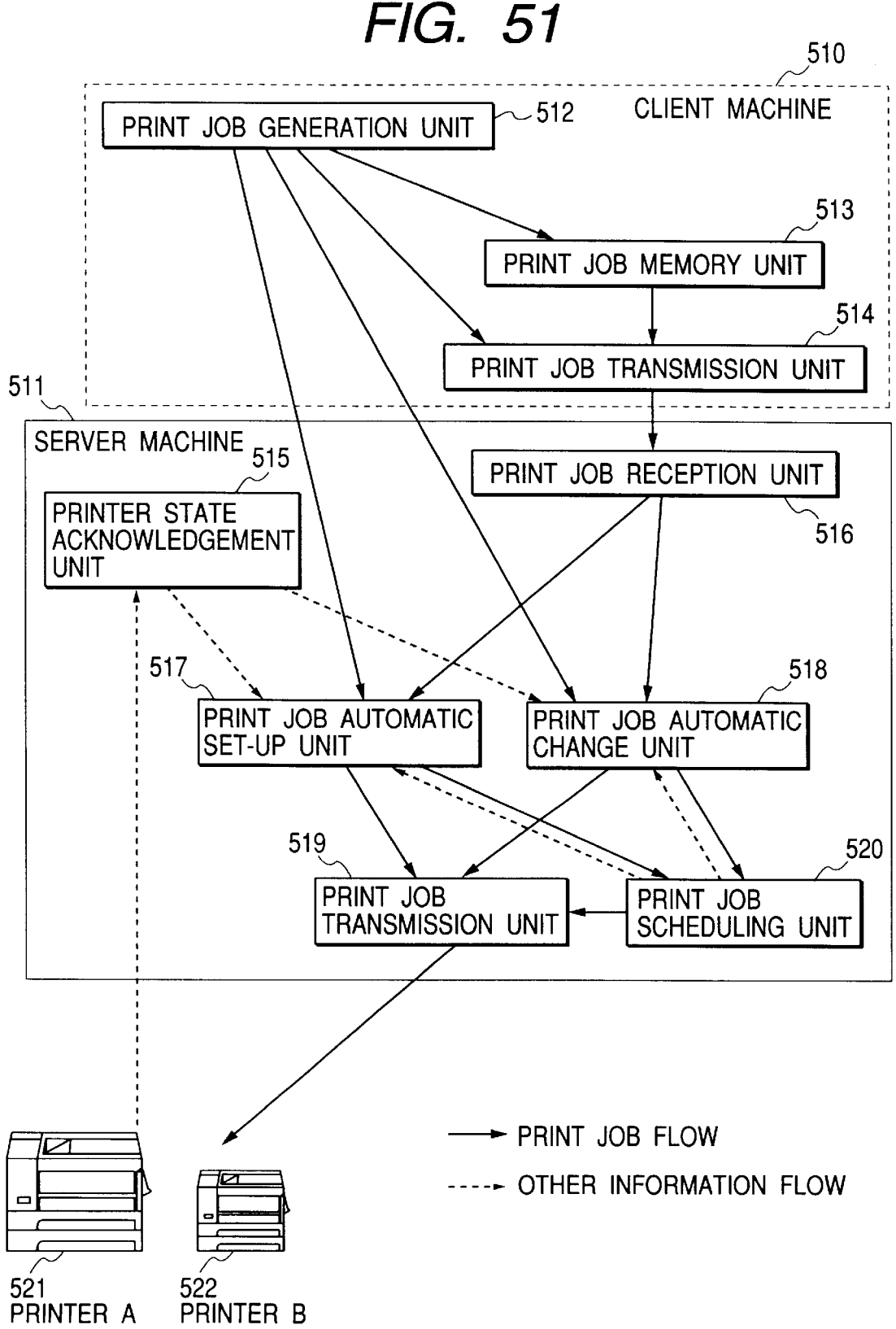
FIG. 51 is a diagram showing transmission of a job for a seventeenth embodiment.

FIG. 51 is a diagram showing the transmission in this embodiment of a print job and other information in a system employing apparatuses. The heavy arrows are used to depict the transmission routes for the print jobs, and the broken line arrows are sued to depict the transmission routes for other information.

The print job in this embodiment includes parameters that are referred to during printing: the document to be printed; the number of print copies; the print quality; and the print size. The other information includes the statuses, such as printing, normal, or out of paper, of individual printers, and a schedule for a print job processed by a print job scheduling unit.

In FIG. 51, in a client machine 510, a print job generation unit 512 generates a print job, and stores it in a print job memory unit 513. Then, the print job is transmitted by a print job transmission unit 514 in the client machine 510 to a server machine 511 for managing printers.

In the server machine 511, a print job reception unit 516 receives the print job. When the parameters of the print job have not yet been set, the print job is transmitted to a print job automatic setup unit 517, and when the parameters have already been set, the print job is transmitted to a print job automatic change unit 518.

The print job automatic setup unit 517 sets print parameters while taking into consideration the urgency, economy and the quality that are acquired by the print job. The print job automatic change unit 518 can perform the same process for changing parameters that have previously been set. The print jobs that are set or altered are registered in a print job schedule included in a print job scheduling unit 520 and are sequentially read to a print job transmission unit 519, or the print job may be directly transmitted to the printer job transmission on the unit 519 from the print job automatic setup unit 517 or the print job automatic change unit 518. The printing is then performed.

The status, such as in printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 51, a print job may be transmitted along a different route. When a machine for generating a print job is the same as a machine for managing printers, the print job may not be transmitted via the print job transmission unit 514.

Figure 52:
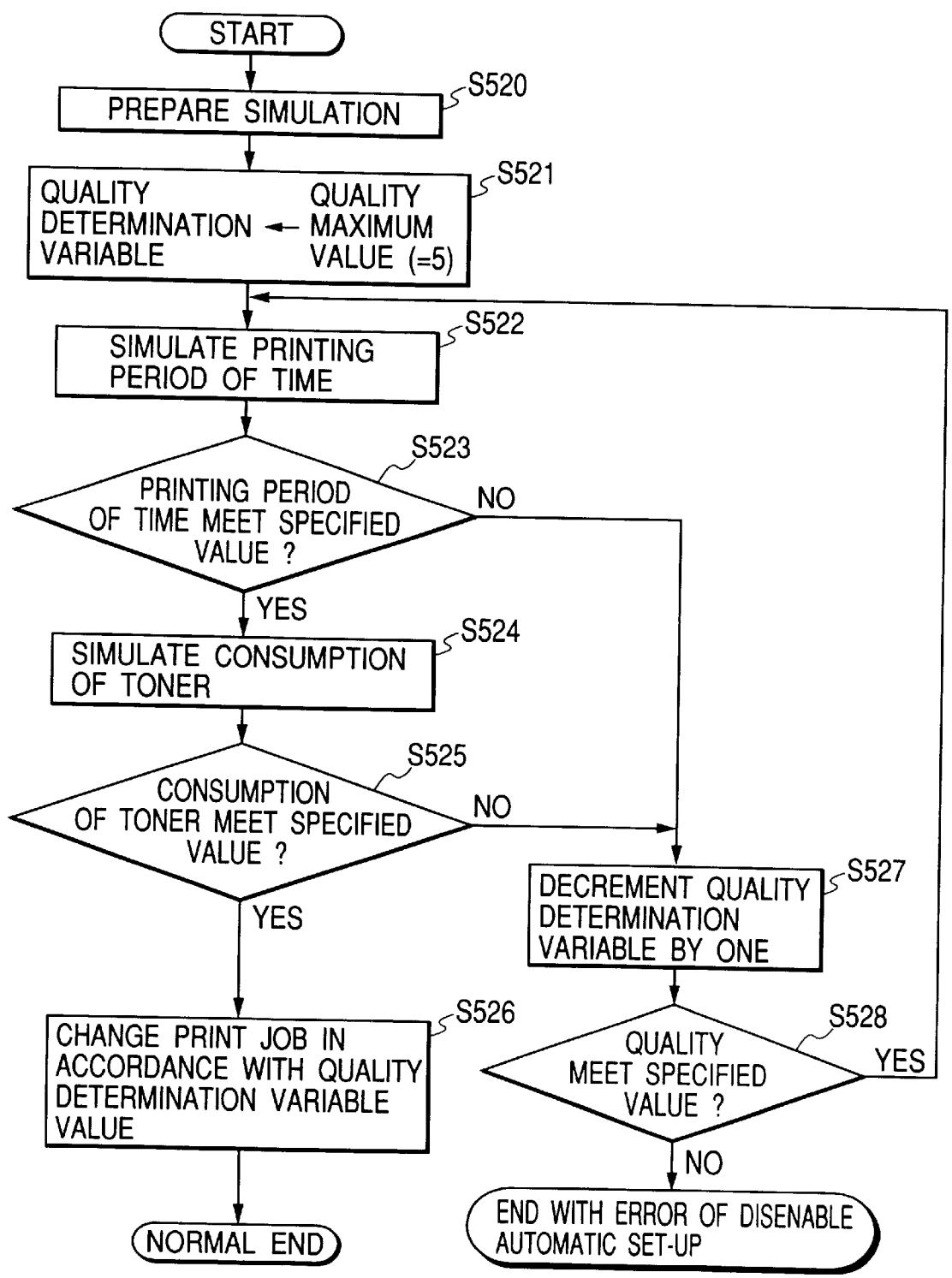
FIG. 52 is a flowchart showing the processing performed by a print job automatic setup unit.

FIG. 52 is a flowchart showing the processing performed by the print job automatic setup unit 517. The print job automatic setup unit 517 automatically sets parameters within a range that satisfies a designated quality and the printing can be performed as rapidly and as economically as possible.

In FIG. 52, at step S520 a factor for determining the printing time and the amount of consumed toner is initialized in preparing for the simulation. Then, at step S521 a quality determination variable is initialized to a maximum quality value (e.g., 5), and at step S522 the period of time for the printing is simulated. At step S523 a check is performed to determine whether the simulated period of time for the printing equals a specified value. When the time period for the printing equals a specified value, at step S524 the consumption of toner is simulated. At step S525 a check is performed to determine whether the simulated consumption of toner equals a specified value. When the consumption of toner equals a specified value, the job is changed to the current quality determination variable value at step S526.

When, at step S523 or S525, the period of time for the printing or the consumption of toner is not equivalent to its specified value, at step S527 the quality determination variable is decremented by one. At step S528 a check is performed to determine whether or not the resultant quality determination variable satisfies is equivalent to a designated quality. When the designated quality is satisfied, program control returns to step S522. When the designated quality is not satisfied, the processing is terminated with an automatic setup disabled state.

FIG. 53 is a table showing the period of time for the printing and the consumption of toner for one character corresponding to different specified qualities for the printers A521 and B522. These values may be fixed values inherent to individual printers, or may be dynamic variable values, which are averages obtained for printing periods or for consumption of toner that were measured in the past.

Figure 54:
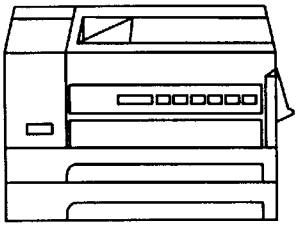
FIG. 54 is a diagram showing the contents of a print job and parameters designated by a user.

FIG. 54 is a diagram showing the contents of a print job that is to be output in this embodiment, and parameters that were designated by a user. In the system for the embodiment, the contents of a print job in FIG. 54 and the set-up parameters are collectively called a print job. In this embodiment, calculated in terms of characters 500 characters are employed as the printing quantity for the print job in order to simulate the period of time for the printing and the consumption of toner. In addition, it is assumed that for urgency a user will designate a period of only one minute, and will keep the default values for economy and quality.

In the example shown in FIG. 54, when the print job automatic setup unit 517 is activated, at step S520 in preparing of simulation, a factor for determining the period of time for the printing and the consumption of toner is initialized. As defined in the table in FIG. 53, for example, the periods of time required for the printing of one minimum quality (=1) character by the printer A521 and the printer B522 are, on average, 100 mS and 200 mS respectively, and the consumption of toner for one character are 100 mg and 200 mg.

Following this, at step S521 the quality determination variable is initialized to the maximum quality value (e.g., 5), and at step S522 the printing period of time for the printing is simulated. If, for example, the printers A521 and B522 are prepared for printing and no print job is scheduled in the print job scheduling unit 520, printing can be initiated immediately, and no waiting time is required. Thus, when the target print job includes 500 characters, as simulation, printer A takes 250 seconds to print the characters and printer B takes 500 seconds.

Then, at step S523 it is determined that this condition does not satisfy the one minute urgency period that is specified by the parameter in FIG. 54, and at step S527 the quality determination variable value is decremented by one.

Since the quality is not specified in the parameter in FIG. 54, program control returns to step S522 for simulation of the period of time for the printing. When, as the result of the repetition of the above process, the quality is set to the minimum quality of 1, the period of time for the printing by the printer A521 is 50 seconds, which satisfies the urgent figure. Therefore, the quality is set to the minimum quality determination variable value (=1), and the processing is normally terminated.

If the quality is set to 2 or higher, it does not meet the parameters set by the user, and the processing is terminated as an automatic setup disable error.

[Eighteenth Embodiment]

Figure 55:
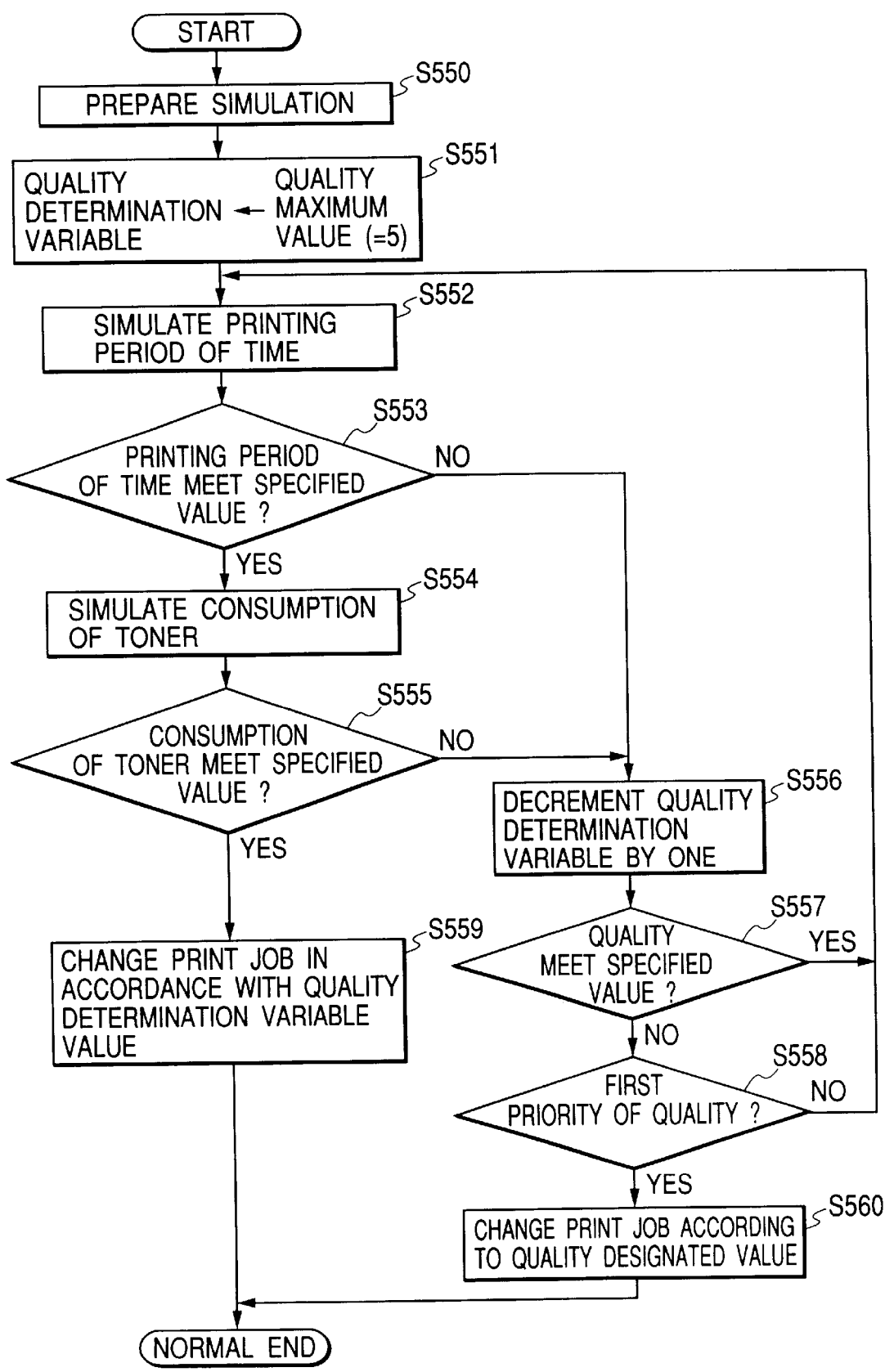
FIG. 55 is a flowchart showing the processing performed by a print job automatic change unit.

FIG. 55 is a flowchart showing the processing performed by a print job automatic change unit 518. The print job automatic change unit 518 automatically changes a parameter within a range that satisfies a specified urgency and economy so as to print data having as high a quality as possible. When all the specified parameters can not be satisfied, the most important designated parameter is satisfied and the others are changed as slightly as possible.

FIG. 56 is a diagram showing the contents of a print job that is to be output in this embodiment, and parameters designated by a user. In the system of the embodiment, the contents of a print job in FIG. 56 and the set-up parameters are collectively called a print job. In this embodiment, calculated in terms of characters, 500 characters are employed as the printing quantity for the print job in order to simulate the period of time for the printing and the consumption of toner. In addition, it is assumed that a user designates all of the parameters and particularly specifies that the quality is the most important.

In the example shown in FIG. 55, when the print job automatic change unit 518 is activated, at step S520 in preparing for the simulation, a factor for determining the period of time for the printing and the consumption of toner is initialized. As is defined in the table in FIG. 53, for example, the period of time required for the printing of one minimum quality (=1) character by the printer A521 and the printer B522 are, on average, 100 mS and 200 mS respectively, and the consumption of toner for one character are 100 mg and 200 mg.

Following this, at step S551 the quality determination variable is initialized to the maximum quality value (e.g., 5), and at step S552 the period of time for the printing is simulated. If, for example, the printers A521 and B522 are prepared for printing and no print job is scheduled in the print job scheduling unit 520, printing can be initiated immediately, and no waiting time is required. Thus, when the target print job includes 500 characters, as simulation, printer A takes 250 seconds to print the characters and printer B takes 500 seconds.

Then, at step S553 it is determined that this condition does not satisfy the one minute urgency period that is specified by the parameter in FIG. 56, and at step S556 the quality determination variable value is decremented by one.

Since, at step S557, the quality in the parameter in FIG. 56 is not satisfied, program control returns to step S552 for simulation of the period of time for the printing. As a result of the repetition of the above process, even when the quality is the one (=3) designated by the user, the urgency period can not be satisfied. When, at step S556, the quality determination variable value is decremented by one, at step S557 the quality specified by the user is still not satisfied, and program control therefore moves to step S558. At step S558 a check is performed to determine whether the quality is the most important parameter. When the quality is the most important parameter, at step S560 the print job is changed in accordance with the specified quality, and the processing is normally terminated.

For a case where the urgency is specified as the most important, when the quality is set to the minimum quality of 1, the printing period for the printer A521 is 50 seconds, which conforms to the urgency setting. Therefore, the quality is set to the quality determination variable value (=1), and the processing is normally terminated.

[Nineteenth Embodiment]

Figure 57:
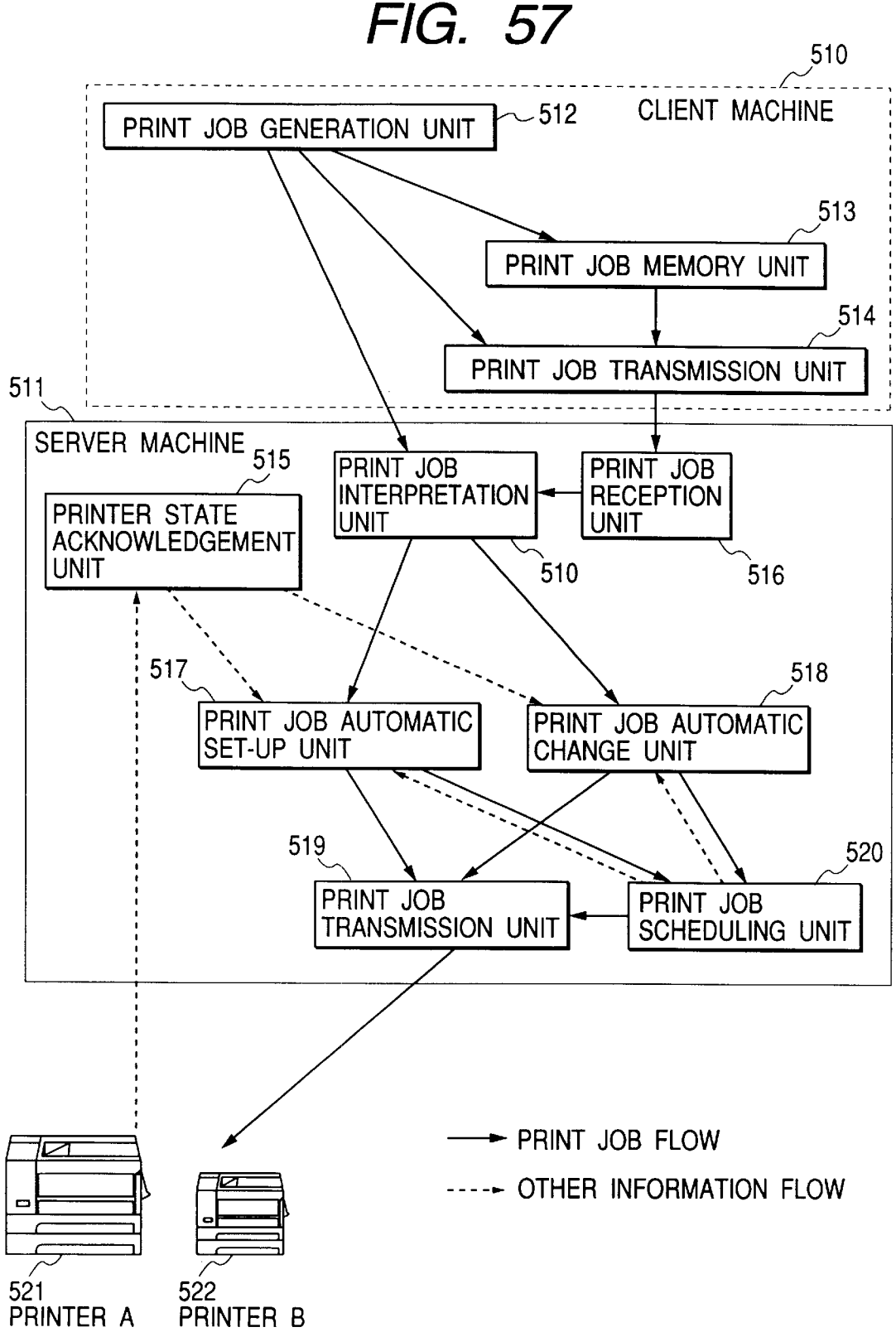
FIG. 57 is a diagram showing transmission of a job for a nineteenth embodiment.

FIG. 57 is a diagram showing the transmission of a print job and other information in a system in this embodiment employing apparatuses. The thick arrows describe the transmission routes for print jobs and the broken line arrows describe the transmission routes for other information.

The print job in this embodiment includes parameters that are referred to during printing: a document to be printed; the number of print copies; the print quality; and the print size. The other information includes statuses, such as printing, normal, or out of paper, of individual printers, and a schedule for a print job that is included in a print job scheduling unit 520.

In FIG. 57, in a client machine 510, a print job generation unit 512 generates a print job and stores it in a print job memory unit 513. Then, the printjob is transmitted by a print job transmission unit 514 in the client machine 510 to a server machine 511 for managing printers.

In the server machine 511, a print job reception unit 516 receives the print job and transmits it to a print job interpretation unit 571. The print job interpretation unit 571 interprets an instruction from a user that is included in the received print job, and converts the instruction into information, such as a parameter, that can be processed by the system. When the parameters of the print job have not yet been set, the print job is transmitted to a print job automatic setup unit 517, and when the parameters have already been set, the print job is transmitted to a print job automatic change unit 518.

The print job automatic setup unit 517 sets print parameters while taking into consideration the urgency, economy and quality values that are acquired from the print job. The print job automatic change unit 518 can perform the same process to change the parameters that have been set. The print jobs that are set or altered are registered in a print job schedule included in a print job scheduling unit 520 and are sequentially read to a print job transmission unit 519, or the print job is directly transmitted to the print job transmission unit 519 from the print job automatic setup unit 517 or the print job automatic change unit 518. The printing is then performed.

The status, such as in printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 57, a print job may be transmitted along a different route. When a machine for generating a print job is the same as a machine for managing printers, the print job may not be transmitted via the print job transmission unit 514.

Figure 58A:
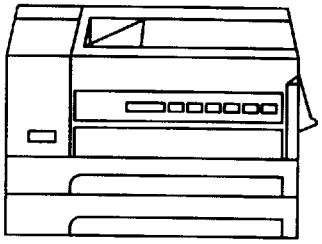
FIG. 58A is a diagram for explaining an example where parameters are set for a print job by employing a natural language.

In this embodiment, as is shown in FIG. 58A, the parameters of the print job are set ambiguously by using natural language. FIG. 58B is a diagram showing, relative to an input character string in the natural language, the meanings represented by character strings according to the parameters and the items required to complete the meanings. The print job interpretation unit 571 refers to the meaning corresponding to an input character string in the natural language in FIG. 58B and the item required to complete the meaning, and interprets the instruction given in the natural language that is received as a print job setup parameter as follows.

From the character string "Print" in the input natural language, "printing" is the action that is the object of the user according to the meaning of the character string. Further, it is assumed that the required item "object" indicates the contents of a print job that was input at the same time, and that "quality" and "number of sheets" should be designated at a portion in the input natural language that has not yet been interpreted. Thus, the character string "one copy for client and five copies for members" is interpreted as an instruction to print one "sheet" having a high "quality" and five "sheets" having a desired "quality".

The processes hereinafter performed by the print job automatic setup unit 517 and the print job automatic change unit 518 are the same as those in the seventeenth and the eighteenth embodiments.

[Twentieth Embodiment]

In this embodiment, as is shown in FIG. 59, the print job parameters are set based on the distribution destination described in a document, which is the contents of the print job, and on the number of sheets.

The action of the job is printing.

Printing for a "client" is interpreted as high quality printing, and the number of sheets is one.

"ABC project" is interpreted as a "member use" and the printing quality is arbitrary, the number of sheets being five. A user acquires in advance information that he or she is a member of the ABC project.

The processes hereinafter performed by the print job automatic setup unit 517 and the print job automatic change unit 518 are the same as those in the seventeenth and the eighteenth embodiments.

[Twenty-first Embodiment]

Figure 60:
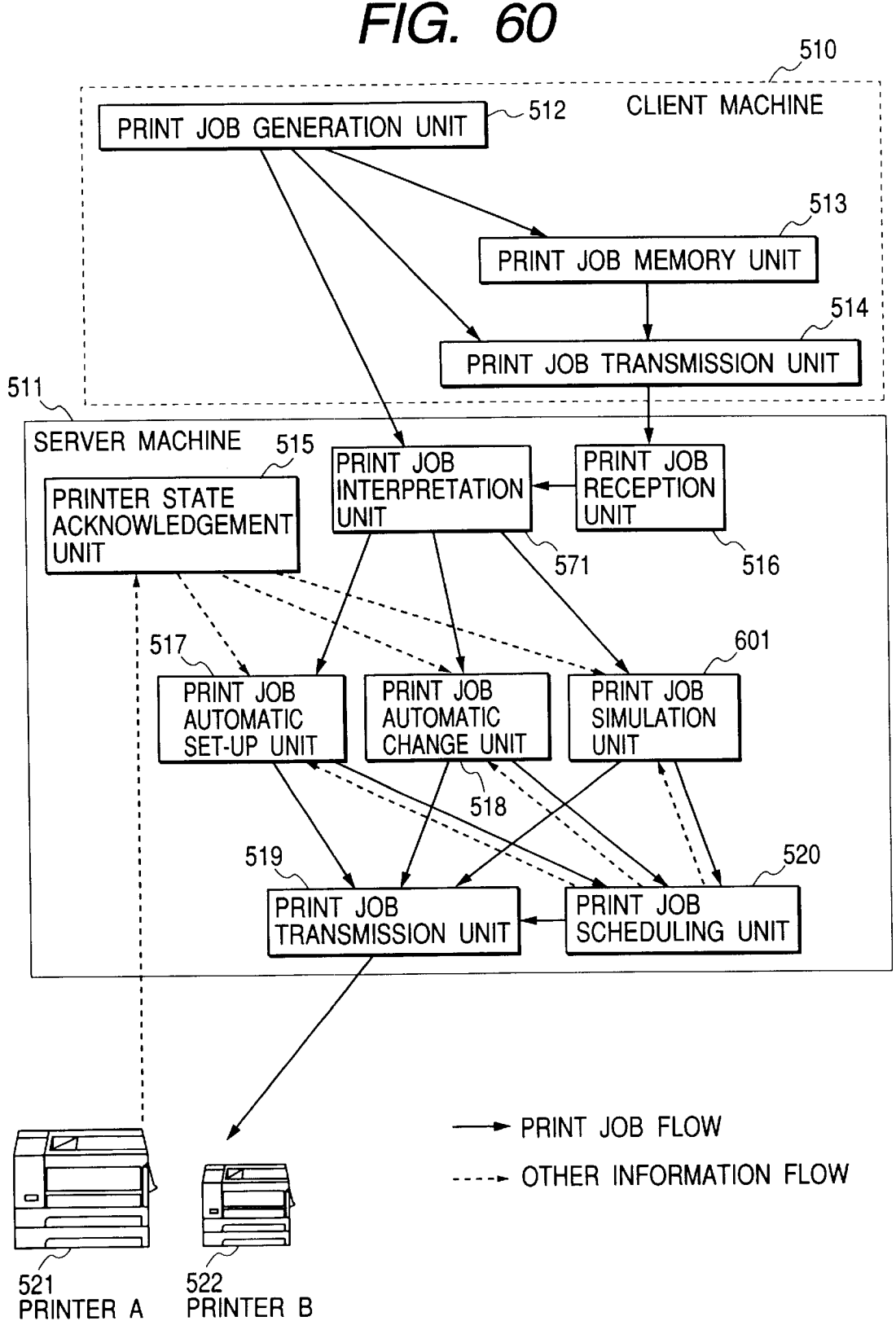
FIG. 60 is a diagram showing transmission of a job for a twenty-first embodiment.

FIG. 60 is a diagram showing the transmission of a print job and other information in a system in this embodiment employing apparatuses. The heavy arrows describe the transmission routes for print jobs and the broken line arrows describe the transmission routes for another information.

The print job in this embodiment includes parameters that are referred to during printing: the document to be printed; the number of print copies; print quality; and print size. The other information includes statuses, such as printing, normal, or out of paper, of individual printers, and a schedule for a print job that is included in a print job scheduling unit 520.

In FIG. 60, in a client machine 510, a print job generation unit 512 generates a print job, and stores it in a print job memory unit 513. Then, the print job is transmitted by a print job transmission unit 514 in the client machine 510 to a server machine 511 for managing printers.

In the server machine 511, a print job reception unit 516 receives the print job and transmits it to a print job interpretation unit 571. The print job interpretation unit 571 interprets an instruction from a user that is included in the received print job, and converts the instruction into information, such as a parameter, that can be processed by the system. When the parameters of the print job have not yet been set, the print job is transmitted to a print job automatic setup unit 517, and when the parameters have already been set, the print job is transmitted to a print job automatic change unit 518. A print job simulation unit 601 simulates printing at the setup that is specified by the print job to acquire the period of time for the printing and the consumption of toner.

The print job automatic setup unit 517 sets print parameters while taking into consideration the urgency, economy and quality values that are acquired from the print job. The print job automatic change unit 518 can perform the same process to change the parameters that have been set. The print jobs that are set or altered are registered in a print job schedule included in a print job scheduling unit 520 and are sequentially read to a print job transmission unit 519, or the print job is directly transmitted to the print job transmission unit 519 from the print job automatic setup unit 517 or the print job automatic change unit 518. The printing is then performed.

The status, such as printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 60, a print job may be transmitted along a different route. When a machine for generating a print job is the same as a machine for managing printers, the print job may not be transmitted via the print job transmission unit 514.

Figure 61:
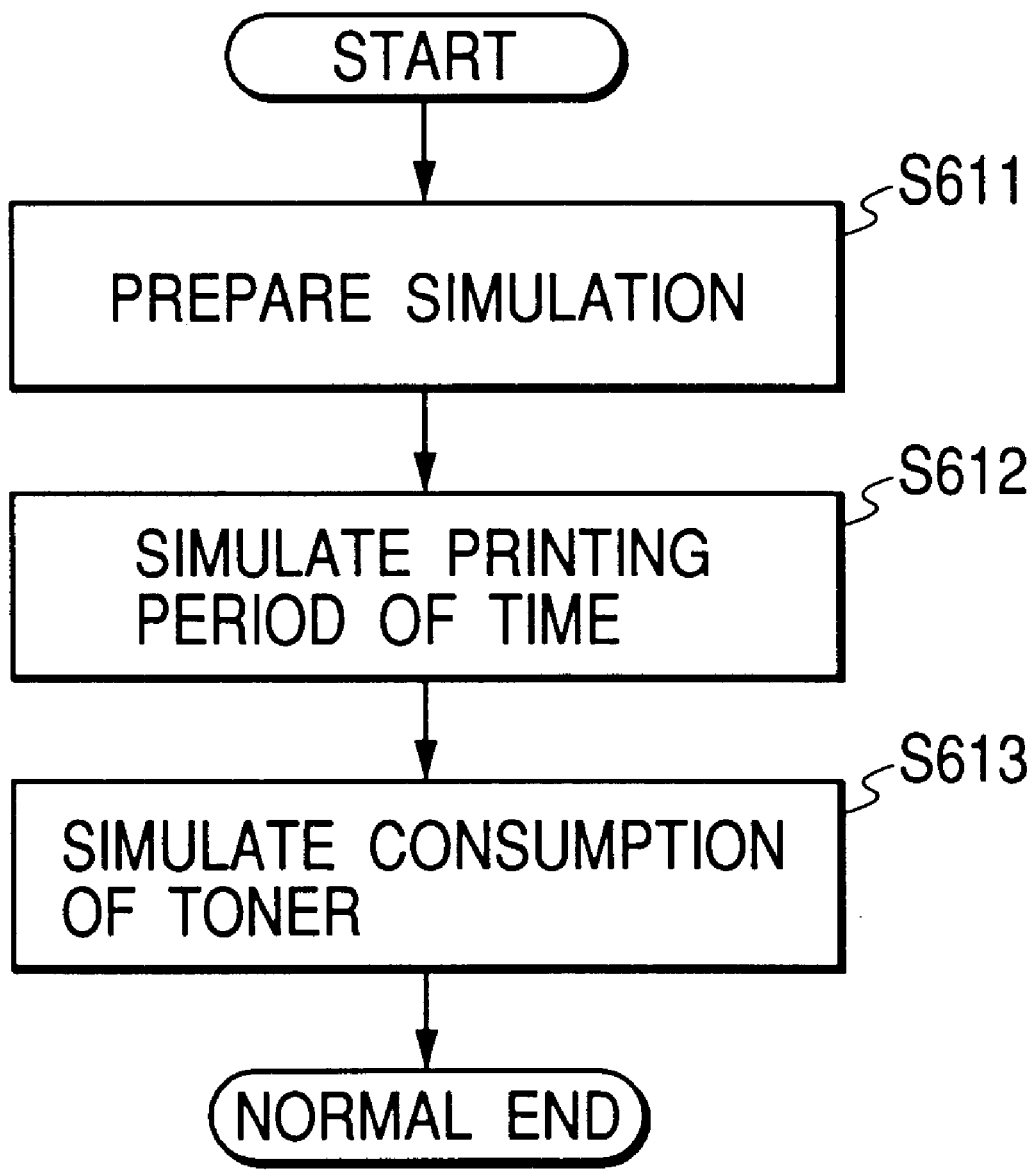
FIG. 61 is a flowchart showing the processing performed by a print job simulation unit.

FIG. 61 is a flowchart showing the processing performed by the print job simulation unit 601. First, at step S611, the print job simulation unit 601 initializes, in preparing for the simulation, a factor for determining the printing period and the consumption of toner. At step S612 the period of time for the printing is simulated at the setup that is also specified by the print job, and at step S613 the consumption of toner is simulated at the setup designated by the print job. In this manner, the period of time for the printing and the consumption of toner are acquired.

A specific method is the same as that explained in the seventeenth and the eighteenth embodiments.

[Twenty-second Embodiment]

In this embodiment, a plurality of output trays are provided for a printer, and a tray is selected in consonance with a user.

Figure 62:
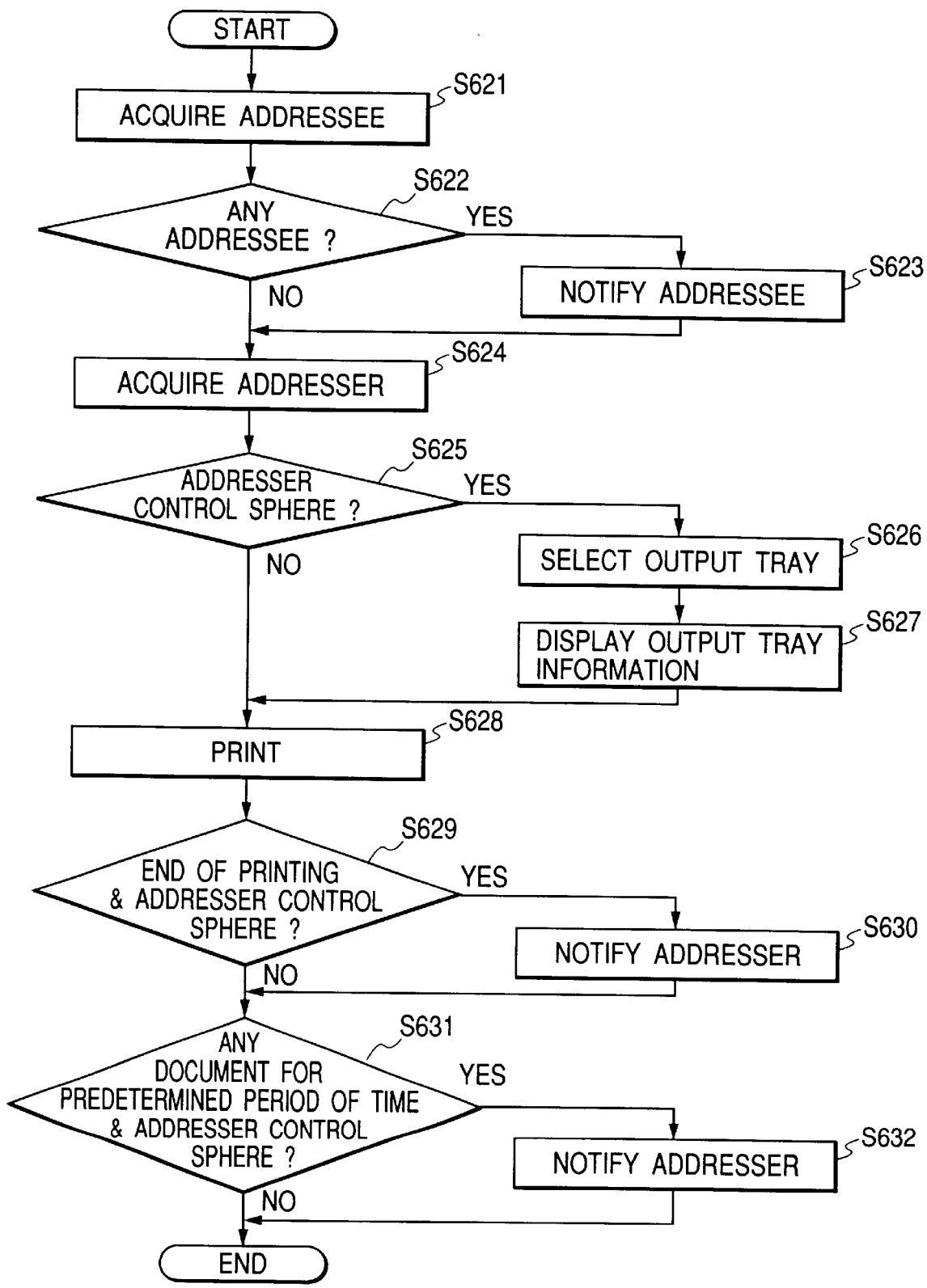
FIG. 62 is a flowchart showing the processing performed by a printer system according to a twenty-second embodiment.

FIG. 62 is a flowchart showing the processing for a printer system in this embodiment. When a printer system receives a print job, first it performs a process for coping with a case where a plurality of print jobs are received at the same time, and then it initiates the processing shown in FIG. 62.

Figure 63A:
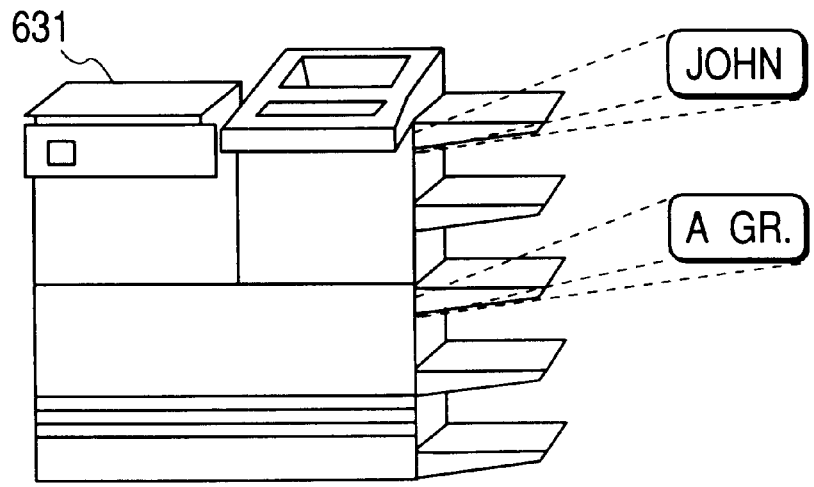
FIGS. 63A and 63B are diagrams illustrating the external appearance of the printer system according to the twenty-second embodiment.
Figure 63B:
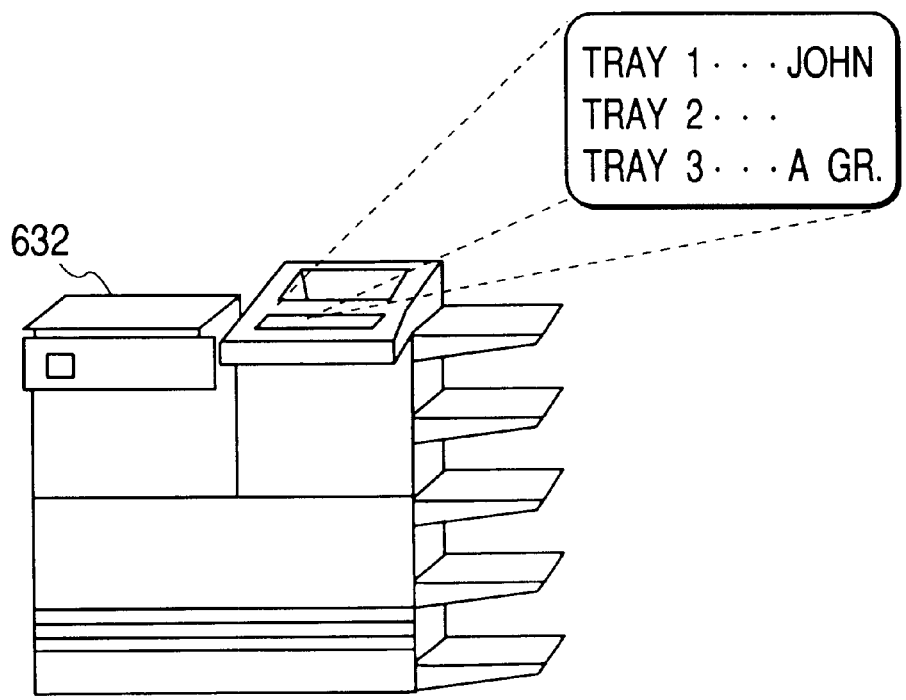

FIGS. 63A and 63B are diagrams showing the external appearances of the printer systems in this embodiment. As is shown, printers 631 and 632 each have a plurality of output trays: for the printer 631, each output tray is provided with a screen for displaying the name of the person to whom a document on the tray belongs; and for the printer 631, the names of the persons whose document remain on which trays are displayed on a common screen. When a user is set in advance for each output tray, the individual trays are user dedicated trays. When the trays are not specifically assigned, the users of the output trays are changed as needed.

The printer system in this embodiment implements the functions of notifying a user of the receipt of a document, the termination of printing, and the failure to collect a printed document (uses a sensor).

The above processing will now be described. In FIG. 62, at step S621 information concerning a destination is acquired from information included in a print job. The information concerning the destination is obtained, as is explained in the twenty-ninth embodiment, either by interpreting the setup described in the print job, or by extracting it from information, such as E-mail, that is set separately from the contents of the print job. At this time, when, as in conventional use, a printer is employed as an output device for a personal computer, usually an addressee is not designated. When the printer is employed as a facsimile machine or for transmission of E-mail, as in the system in this embodiment, an addressee is normally designated.

At step S622 a check is performed to determine whether or not an addressee is designated. At step S623 the addressee is notified of the arrival of a document. At step S624 the addresser information is acquired from the information included in the print job. The addresser information is acquired, as is explained in the twenty-ninth embodiment, either by interpreting the designation described in the print job, or by extracting it from information, such as E-mail, that is set separately from the print job. When, as in conventional use, a printer is employed as an output device for a common personal computer, normally the addresser falls within the control sphere of the system. However, when the printer is used as a facsimile machine, as in the system in this embodiment, usually the addresser is not within the control sphere. At step S625 a check is performed to determine whether the addresser is in the control sphere. At step S626 when the addressee is designated, a corresponding output tray is selected. When the addressee is not specified and only the addresser is specified, an output tray corresponding to the addresser is selected. At step S627 the addresser or the addressee information is transmitted to the corresponding output tray, as is shown in FIG. 63A. Or, as is shown in FIG. 63B, the addresser or the addressee information and the output tray that is employed are displayed on the common display. When the user is set for each output tray, the individual trays are user dedicated trays. When the trays are not specifically assigned, the users of the output trays are changed as needed.

At step S628 printing is executed. At step S629 a check is performed to determine whether the printing has been terminated and whether the addresser is within the control sphere. At step S630 the addresser is notified of the termination of the printing. At step S631 a check is performed to determine whether a document has been left for a predetermined period of time and whether the addresser is in the control sphere. At step S632 the addresser is notified that a printed document has been left in the tray for an extended time period.

[Twenty-third Embodiment]

Figure 65:
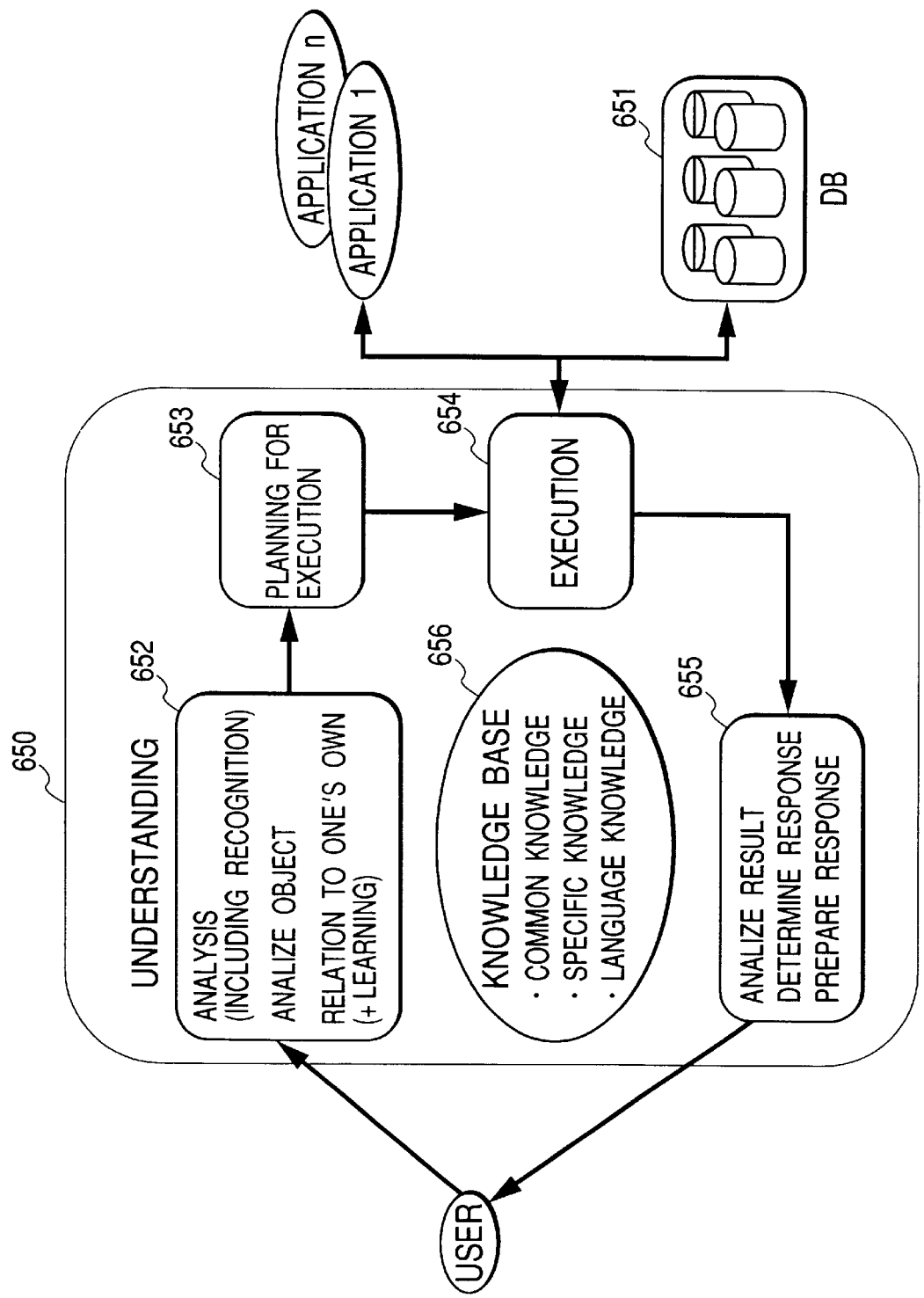
FIG. 65 is a diagram showing the functional arrangement of a system according to the twenty-third embodiment.

In this embodiment, information concerning the time is handled. FIG. 65 is a diagram showing the functional arrangement of a system according to the embodiment. A processor 650 includes an understanding unit 652, a planning unit 653, an execution unit 654, a response unit 655 and a knowledge base 656, and is connected to a database 651.

Figure 64:
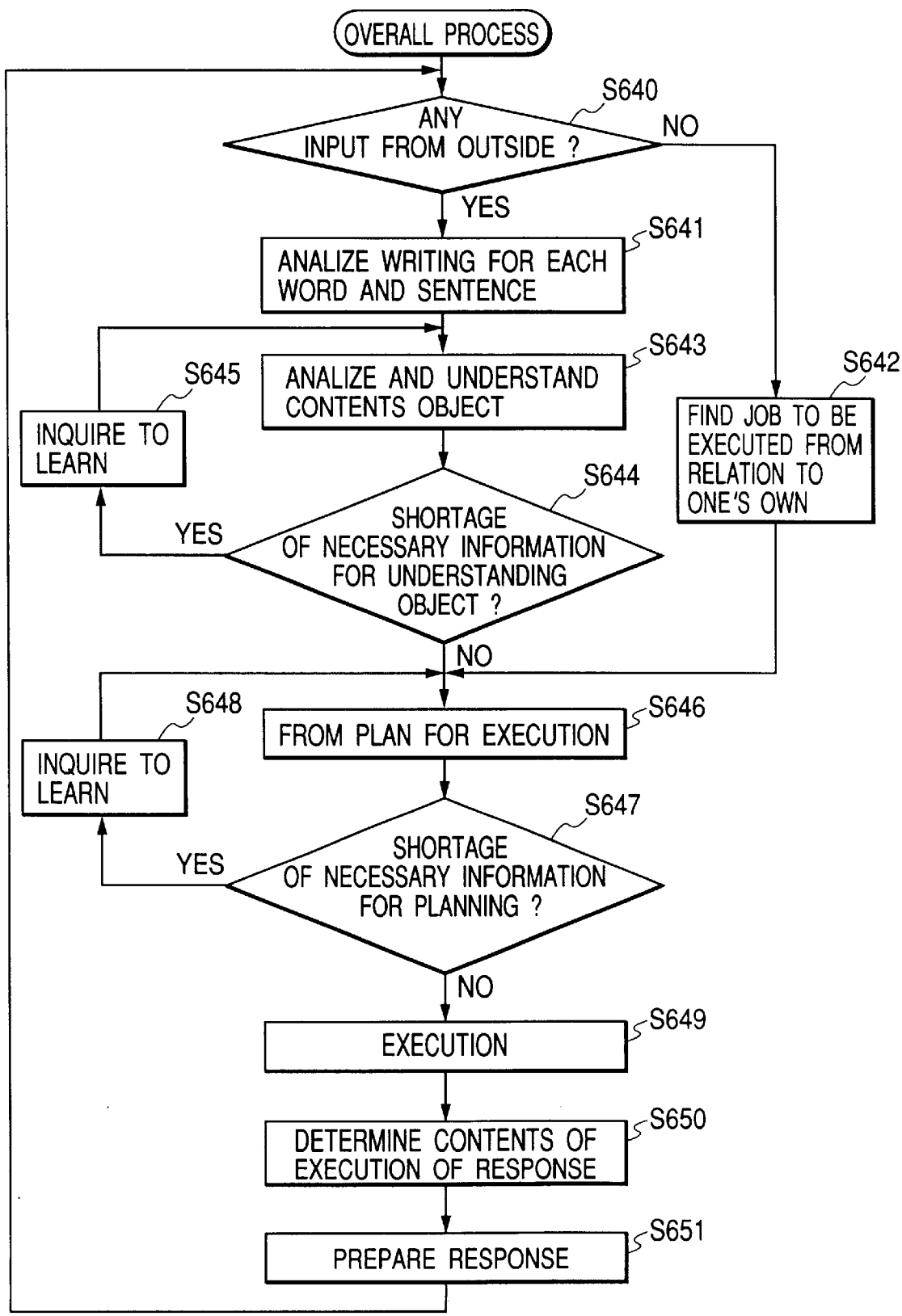
FIG. 64 is a flowchart showing the processing performed for a twenty-third embodiment.

FIG. 64 is a flowchart showing the processing performed by the functional arrangement in FIG. 65 in this embodiment.

At step S640 a check is performed to determine whether or not there is external input. If so, at step S641 the understanding unit 652 employs the knowledge base 656 to analyze an input document as the units of words and sentences, and at step S643 the object of the input contents is analyzed and ascertained. At step S644 a check is performed to determine whether information required for an understanding of the object is insufficient. If the information is unsatisfactory, at step S645 a query is issued to a user, and a response from the user is studied in the knowledge base 656. Program control thereafter returns to step S643. If the information is adequate, program control moves to step S646. When, at step S640, there is no input, at step S642 a job to be executed is found and program control advances to step S646.

At step S646 the planning unit 653 prepares a plan to achieve the object. At step S647 a check is performed to determine whether information required for planning is insufficient. If the information is unsatisfactory, at step S648 a query is issued to the user, and a response from the user is studied in the knowledge base 656. Program control thereafter returns to step S646. If the information is adequate, at step S649 the execution unit 654 executes the plan. At this time, the execution unit 654 accesses the database 651 or communicates with another application, as needed. At step S650 the response unit 655 determines whether or not a response should be made. If a response should be made, a decision is made concerning the selection of the contents for the response. Further, at step S651 a response is prepared in accordance with the selected contents, and is transmitted to the user.

The understanding unit 652 acknowledges, as needed, externally input information, such as keyboard input, voice input, E-mail or facsimile or news information, analyzes the received information and also the time concept contained in the words in sentences, and obtains an understanding of the contents of the sentences that are concerned with time.

Figure 67:
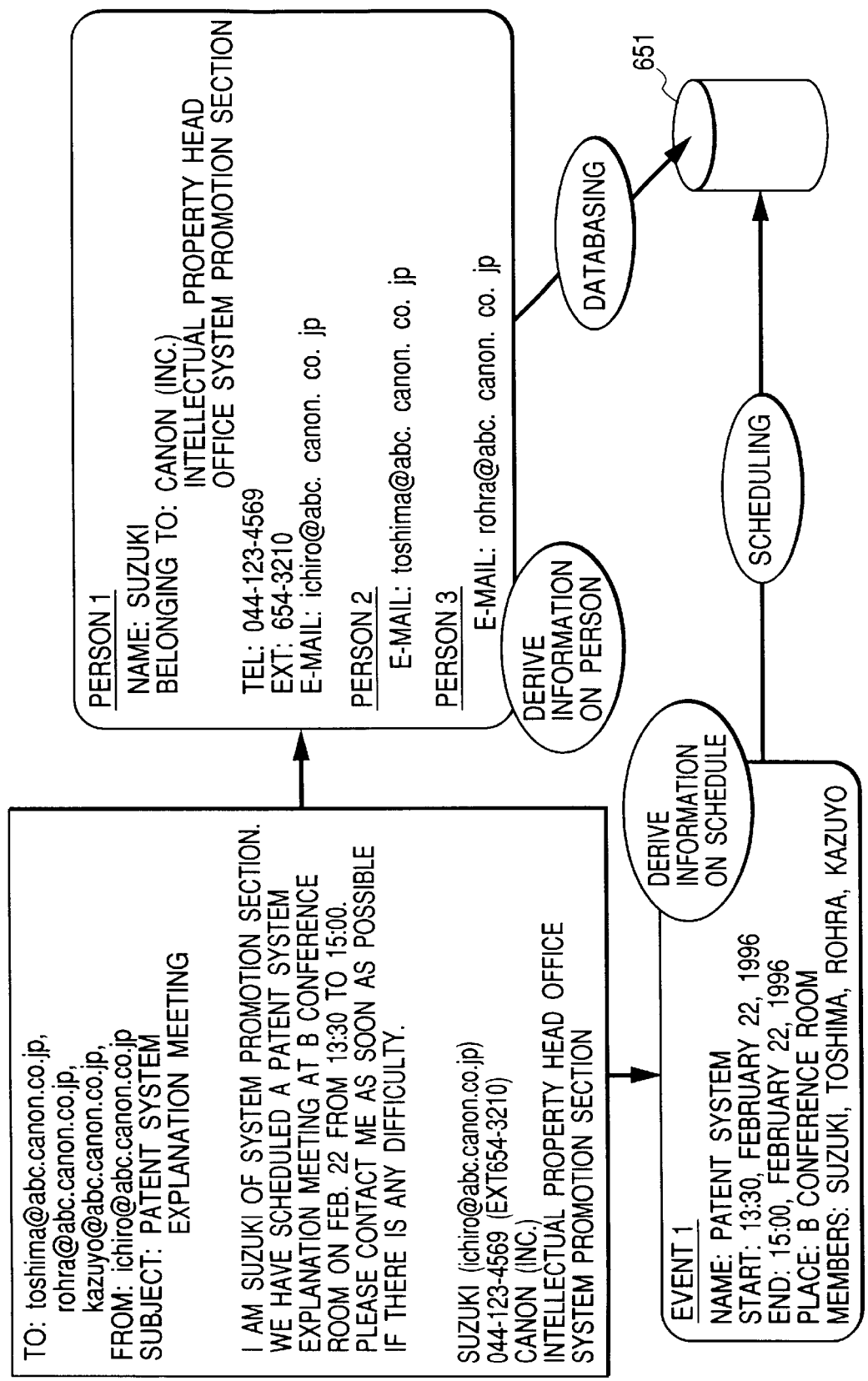
FIG. 67 is a diagram showing an example where a schedule is extracted from electronic mail.

FIG. 67 is a diagram showing an example where schedule information is extracted from electronic mail. In the above process, specifically, as is shown in FIG. 67, the contents of a document received by E-mail are analyzed, and the time concepts such as "February 22nd", "13:00" and "15:00" are found and analyzed. Then, an understanding of the sentence concerning the concept, "We have scheduled a patent system explanation meeting at conference room B from 13:00 to 15:00 on February 22" is obtained, and an action associated with the time can be correlated with the schedule.

The analyzed time concept is compared with the current time. If the time concept describes the future, a corresponding action is registered in the schedule, but if the time concept describes the past, it is abandoned without being registered or it is registered as an information of a type other than that for a schedule, such as information for a personal data base, that is used to record past events.

The understanding unit 652 analyses the contents of externally input information, such as keyboard input, voice input, E-mail, facsimile or news information. When the understanding unit 652 finds in the sentences a term (a word or a concept) that is unknown to the system, or a plan that the system has not yet executed, and when the word or the plan that is detected is not urgent, the understanding unit 652 studies the term or the plan by sequentially searching for information concerning it, and stores it as knowledge in the knowledge base 656.

Specifically, when, for example, the unknown term XYZ appears, the presence of XYZ is memorized, and sentences "XYZ is very delicious" and "XYZ is hard" are analyzed to extract the concept that XYZ is hard, delicious food.

Similarly, when a new plan is instructed and when from the current situation it is understood to be a plan for use when a user is absent, the understanding unit 652 studies the plan as an example of how to make a plan for when a user is absent.

In addition, when, for example, a system has been acquiring information concerning a user from news and notifying the user each time such information is found, and then upon the receipt of a notification that the user responds by sending the system an instruction in natural language that "from now on, there is no need to take notice of this information" the system can ascertain that transmission of the information is no longer necessary.

As is described above, in the system, the understanding unit 652 analyzes the contents of externally input information and also analyzes the object. The planning unit 653 prepares a plan of an action for the system to take to achieve the object. The execution unit 654 performs the processing. And the response unit 655 notifies a user of the results of the processing. When, for example, it is ascertained, from information concerning an addresser, upon the receipt of the E-mail message shown in FIG. 67 that the mail is from an addresser who is not registered in the database, information concerning the addresser is extracted from the message and is registered in the personal database in the database 651. Further, when more information is obtained concerning the addresser who is not registered in the personal database, the information may be registered in the personal database.

Figure 69:
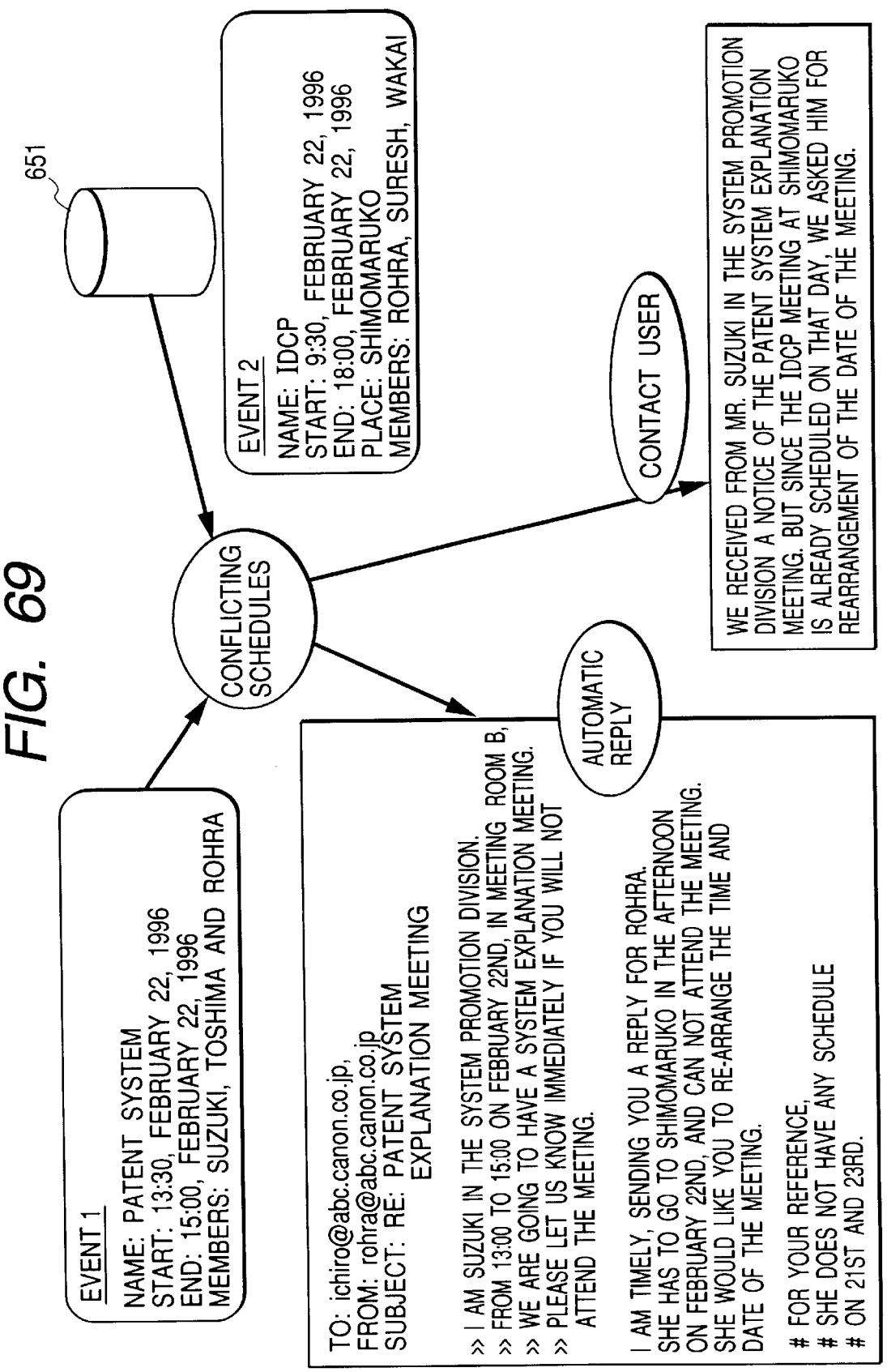
FIG. 69 is a diagram showing an example schedule conflict.

Since the understanding unit 652 understands the message is for a notice for an explanation meeting, it accesses the schedule of a user in the database 651, and compares new schedule data with the current schedule data. When the new schedule data and the current schedule data do not conflict, the new data are additionally registered in the schedule. However, as is shown in FIG. 69, when the schedule data conflict, a reply to the addresser and a notice for a user are prepared.

As is described above, since this system understands the contents of received information, the system can prepare a response in consonance with the situation and execute it.

In the above explanation, the system prepares a reply to a user who sent the E-mail without confirming it with a user, and transmits the reply. This is because the sentence, "Please contact me as soon as possible if there is any difficulty" is in the message, and as a result of the analysis of this sentence, it is determined that a response is very urgently required. If the urgency of a response is determined to be low because a date for the holding the meeting is fairly advanced and the attendance at the meeting is arbitrary, the system confirms it with a user before transmitting a response. In other words, the system determines in which action to take in consonance with the degree of urgency.

In addition, the schedule or the personal database can be accessed to transmit a response, relative to the input of the natural language by a user, as well as a natural language instruction received from a user.

For example, the personal database can be accessed by asking the natural language question, "What is the telephone number of Mr. XX?". Or the schedule can be accessed when the natural language question, "Where will the meeting on the 16th be held?" is received, to send a reply to a user.

Figure 66:
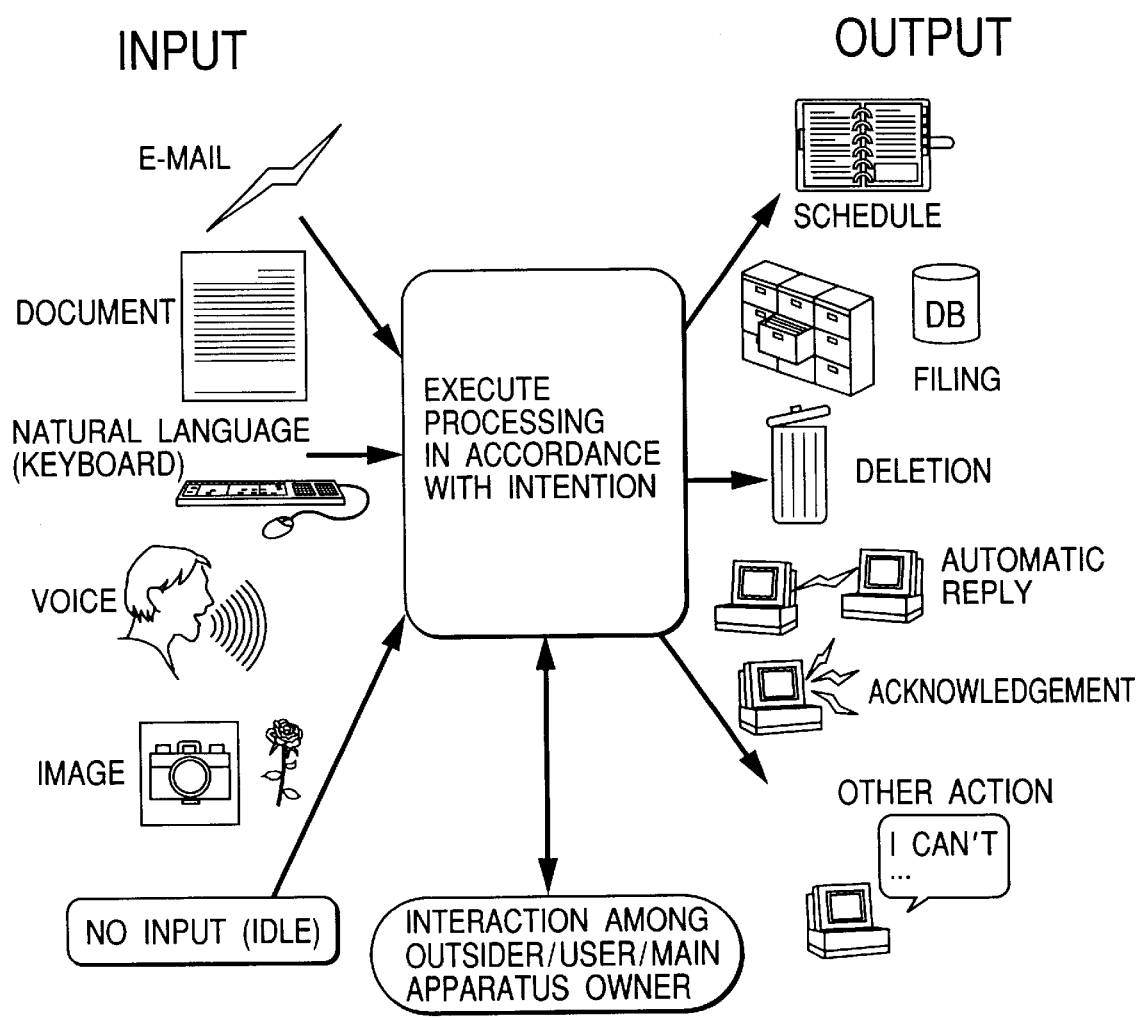
FIG. 66 is a diagram showing a system for performing the overall process according to the twenty-third embodiment and input/output types relative to an external apparatus.

FIG. 66 is a diagram showing the input/output types between the system that performs the overall processing in this embodiment and external devices.

Input data can be data input via a keyboard, natural language information received by E-mail, documents or pictures input as images by a scanner, voice input via a microphone or images input by a camera. A character recognition process is preformed for a document that is read by the scanner, or a voice recognition process is performed for speech, so that input information in natural language can be obtained.

As for when there is no input (idle state), as is shown at step S642 in FIG. 64, when there is no external input the system searches for a job that it should execute and regards it as input. In the idle state, when no job is given to the system, the system, for example, accesses news and aggressively acquires as input information concerning the user.

As for output, there are the registration of a schedule in a database, the filing or erasure of data relative to a file memory device, or the dispatch of a notice to a user or a reply to an addresser. The importance of the output is that it can be determined that a process can not be performed within the control range of a system, and another action, such as transmitting a response to that effect, can be performed.

An input/output destination is a user or an external device, or a different processor in the system or another application.

In addition, input documents are analyzed, and data concerning a person and data concerning the time are extracted and stored in the personal database and the schedule database. Also, data required for the anticipation of an action is extracted to use for planning.

In the example in FIG. 67, as a result of analysis of an E-mail document that is input, the following description concerning a person is acquired:
To: toshima@abc.canon.co.jp,
    rohra@abc,canon.co.jp,
    kazuyo@abc.canon.co.jp
From ichiro@abc.canon.co.jp
I am Suzuki of system promotion section.
Suzuki (ichiro@abc.canon.co.jp) 044-123-4569 (ext. 654-3210) Canon Inc. Intellectual Property Head Office System Promotion Section Assuming that a person whose mail address is "kazuyo@abc.canon.co.jp" is already registered in the personal database and the other persons are not registered, as is shown in FIG. 67, data for PERSON 1, 2 and 3 are extracted and registered in the database 651.

Since there is a description concerning the time, "We have scheduled a patent system explanation meeting at conference room B from 13:00 to 15:00 on February 22" data for EVENT1 is extracted.

Figure 70:
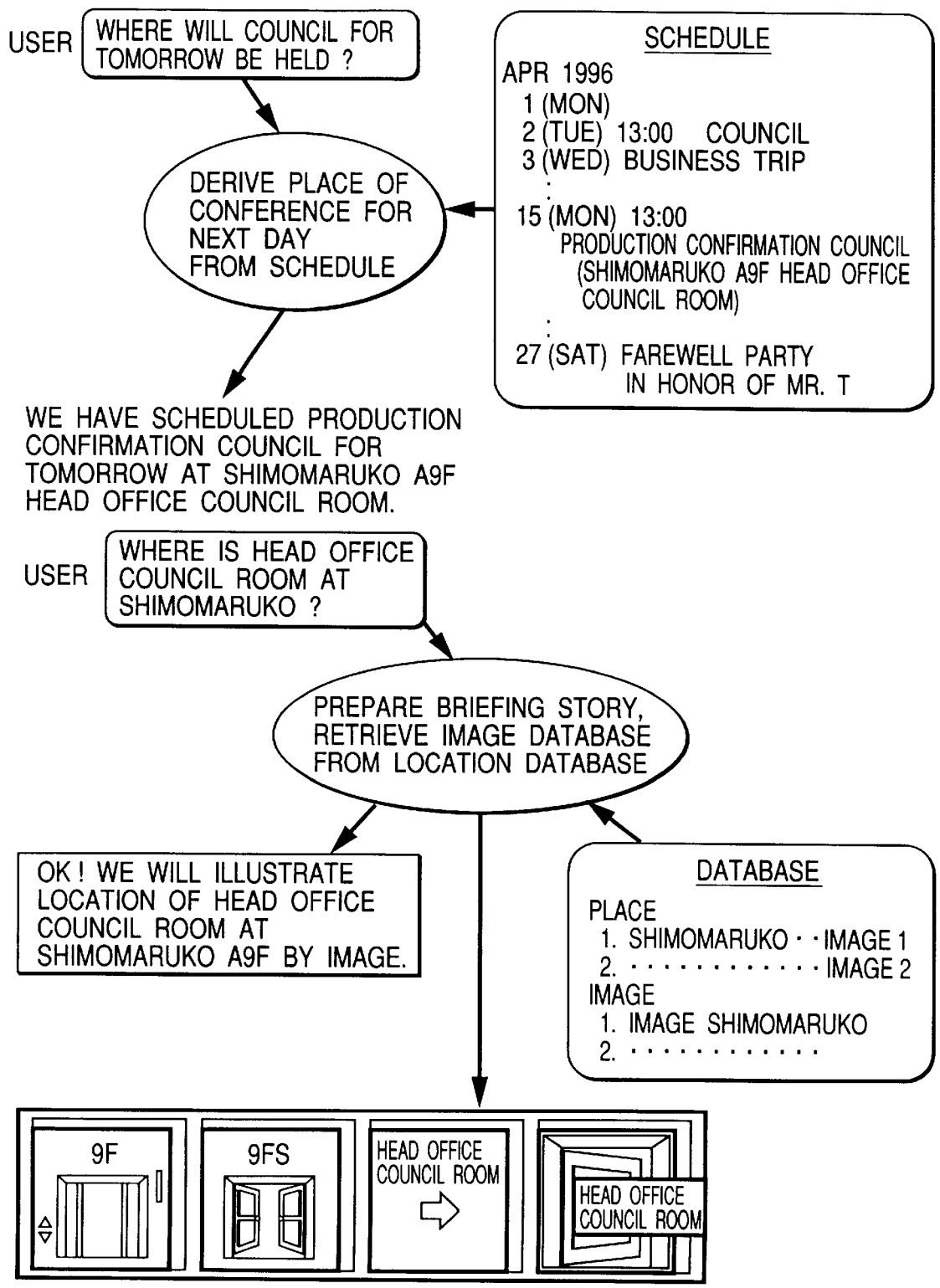
FIG. 70 is a diagram showing an example where a user aurally queries a system.

Further, since there is a description used for estimating an expected action, "Please contact me as soon as possible if there is a difficulty" this is used for the processing to be explained while referring to FIG. 70.

Figure 68:
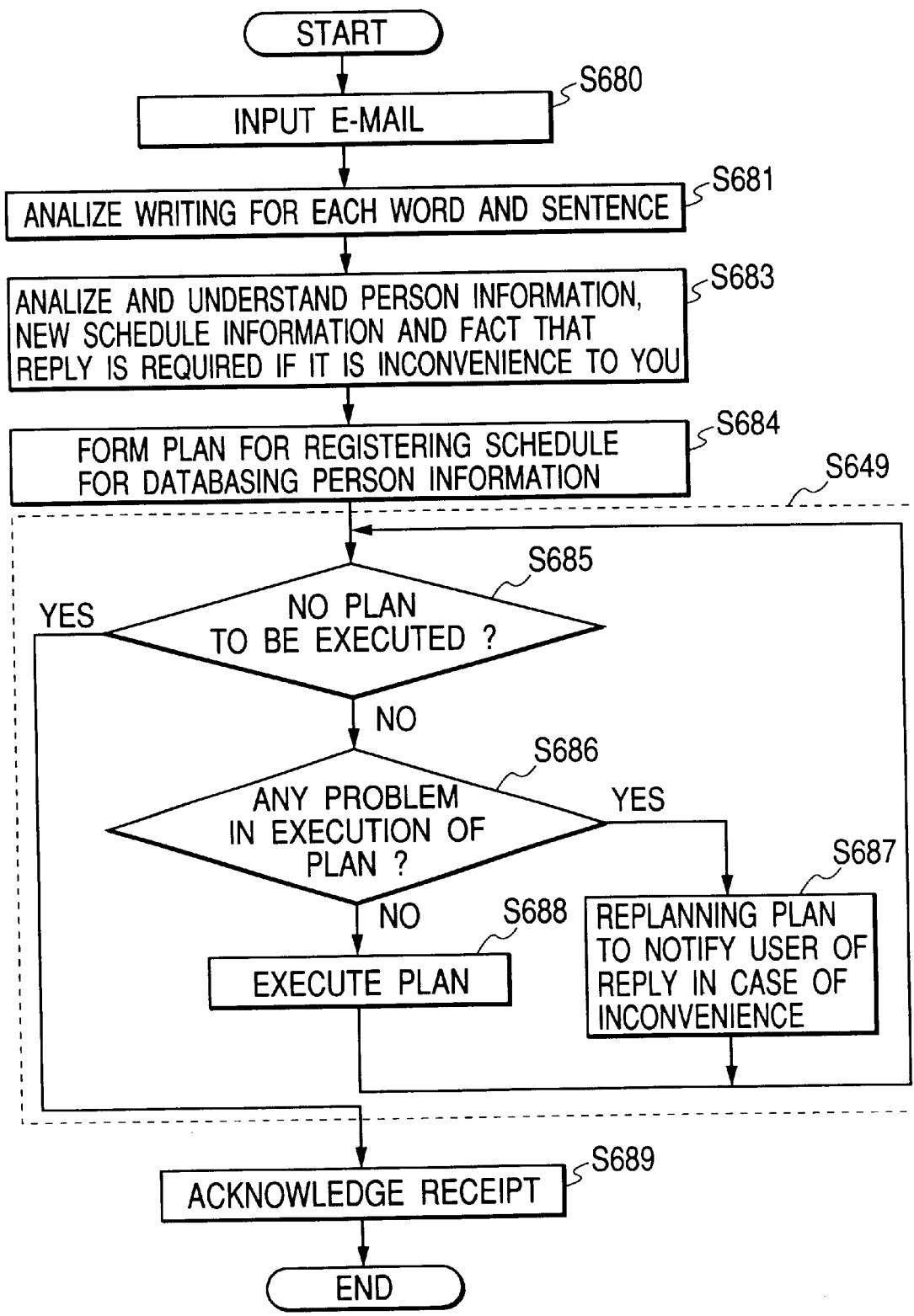
FIG. 68 is a flowchart showing specific processing performed for the twenty-third embodiment.

FIG. 68 is a specific flowchart for step S649 prepared by extracting the portions from the flowchart in FIG. 64 that are required for performing the processes in FIGS. 67 and 69.

The processing will now be explained while referring to FIGS. 67 and 69.

At step S680 E-mail is input and at step S681, of each word and sentence, the input E-mail document is analyzed. At step S683 it is ascertained from a signature and a header that "there is information concerning persons" and "an event, an explanation meeting, will be held". Further, it is ascertained that "a reply is requested if there is a difficulty".

At step S684 the data concerning a person is extracted and a plan for registering the data in a database and a plan for registering the explanation meeting event in the schedule are made. At step S685, it is ascertained that there is a plan to be executed. At step S686 it is found that there is no problem with the plan, and program control thereafter moves to step S688. At step S688 the data concerning the person is extracted and registered in the database, and program control returns to step S685.

In FIG. 67, at step S685 there is a plan to be executed: registration of the explanation meeting event in the schedule. At step S686 it is assumed that the event can be registered in the schedule with no problem, and program control goes to step S688. At step S688 the event is registered in the schedule, and program control returns to step S685. At step S685 there is no other plan to be executed, and at step S689 no acknowledgement receipt is required. The processing is thereafter terminated.

In FIG. 69, at step S685 there is a plan to be executed: registration of the explanation meeting event in the schedule, and at step S686 a conflict is found in the schedule. Since there is a problem with the execution of a plan, at step S687 a reply to that effect is transmitted and a plan is made to notify a user that there is a problem. At step S685 there is a plan for writing a reply and transmitting it, and at step S686 no problem concerning the execution of the plan is found. At step S688, therefore, a reply indicating that the timing is inconvenient is prepared and transmitted to the addresser. At step S685 there is a plan for preparing a document for notification of a user. At step S686, there is no problem in execution, and at step S688 a response to a user is prepared describing that a reply was sent for re-consideration because of the contents of the E-mail and the conflict of the schedules. At step S685 there is no plan to be executed and at step S689 since there is an notice to a user, it is transmitted to the user. The processing is thereafter terminated.

In the example in FIG. 69, when the schedule information EVENT1 that is extracted is compared with the schedule EVENT2 that is planned previously, it is found that the two events conflict. Further, according to the information extracted in the example in FIG. 69, it is apparent that a reply is necessary if there is a difficulty. In the system in this embodiment, the knowledge for preparing letter is employed to write a letter describing that a user can not attend the meeting because the schedules are conflicting, and the reply is automatically transmitted.

In addition, the user of the system in this embodiment is notified that the system automatically has transmitted a reply for the user.

[Twenty-fourth Embodiment]

FIG. 70 is a diagram showing an example where a user sends a question by voice to a system according to this embodiment.

When a user asks by voice "where will tomorrow's conference be held?", the system can examine the schedule information of the user and tell the location of the conference.

When the user does not know how to get the location for the conference and asks "In which area in Shimomaruko?", the system examines the database, performs planning for an explanation to make a user understand, prepares a briefing story, and uses graphical images and sounds to explain how to get the location.

Figure 71:
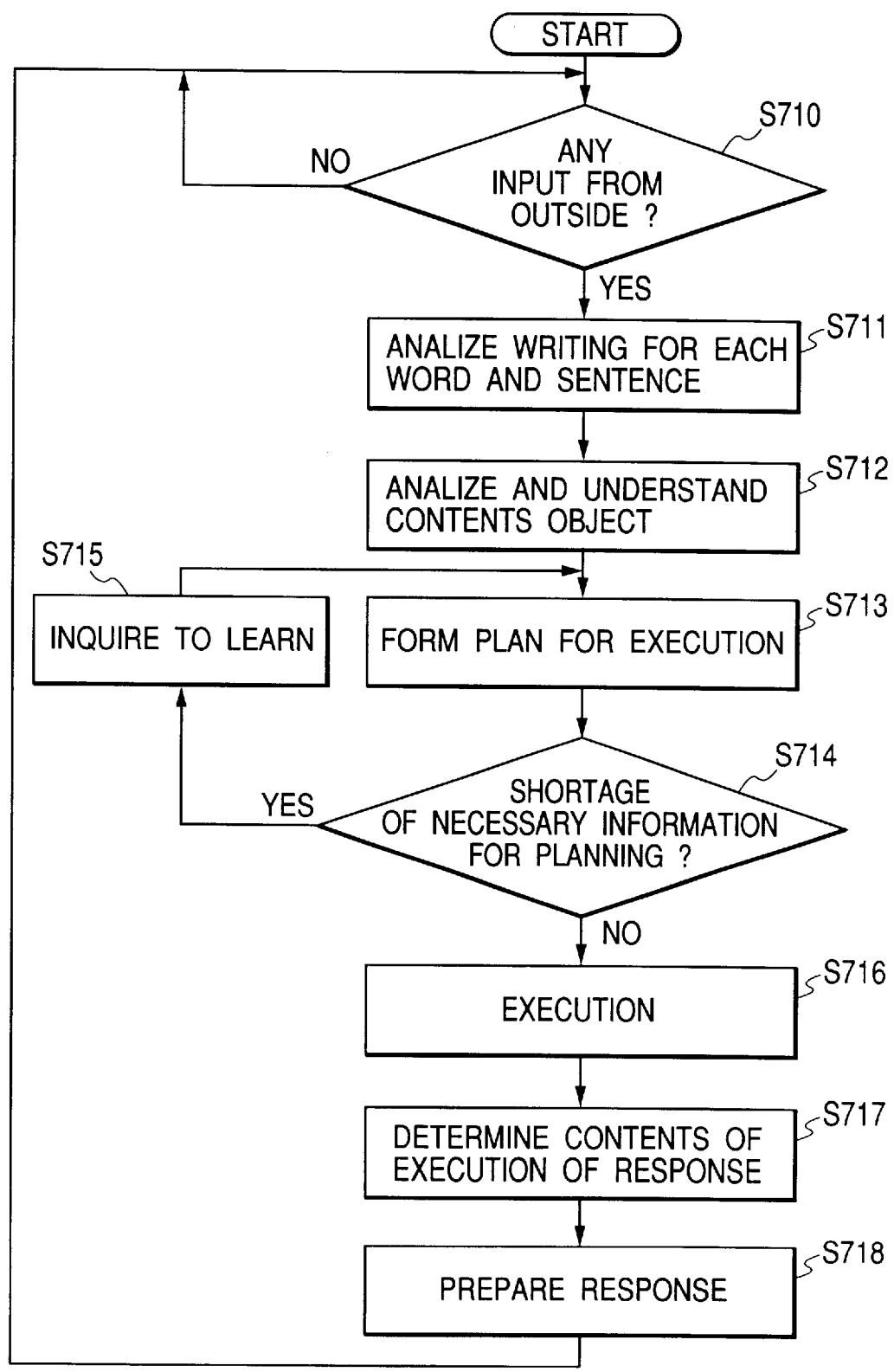
FIG. 71 is a flowchart showing the processing for a twenty-fourth embodiment.

FIG. 71 is a flowchart showing the processing performed in FIG. 70 by referring to the basic flowchart in FIG. 64. An external input is regarded as a query.

The processing relative to a first inquiry will be explained. At step S710 voice (where will tomorrow's conference be held?) is externally input, and at step S711 the input sentence is analyzed. At step S712 it is understood that the input sentence is an inquiry for the conference, and that the object of the user is to know the location of the conference. At step S713 the following planning is performed to answer the inquiry. (1) Tomorrow's schedule is extracted. (2) The location registered in the schedule is acquired. (3) A reply is prepared to tell the acquired location.

At step S714 information is sufficient and program control moves to step S716. If the schedule show a plurality of conferences, the system does not identify which conference is. Therefore, at step S715 a query is sent to a user to remake a plan. At step S716 the plan made at step S713 is executed, and a reply document to the user is prepared. At step S717 it is ascertained that there is a response to the user, the system determines the transmission of the response. At this time, since it is understood that the input was done by voice, transmission of the reply by voice is also determined. At step S718 the response, which is voice data obtained by conversion, is transmitted to the user.

The processing is temporarily terminated, and following this, an inquiry from the user is input. The process relative to the second inquiry will now be described.

At step S710, voice (In which area in Shimomaruko?) is input externally, and at step S711 the input sentence is analyzed. At step S712 it is understood that this inquiry is a continuous question of the first one, and also that a specific location of the place name that was answered is being asked.

At step S713 the following plans are made to respond the question: (1) a plan for explaining that it is difficult to explain the location by writing; (2) a plan for explaining the location by sequentially sending images; (3) a plan for acquiring necessary images from an image database and a location database; and (4) a plan for preparing sentences corresponding to images.

At step S714 the information is adequate, and at step S716 the plans made at step S713 are sequentially executed and a reply to a user consonant with the images is prepared. At step S717, since there is a reply document to be transmitted to the user, the transmission of the response is determined. At this time, it is understood that the input was done by voice, so that it is also determined that explanation will be given by voice while displaying images on a monitor. At step S718 the response is transmitted to the user. The processing sequence in FIG. 70 is thereafter terminated.

[Twenty-fifth Embodiment]

Figure 72:
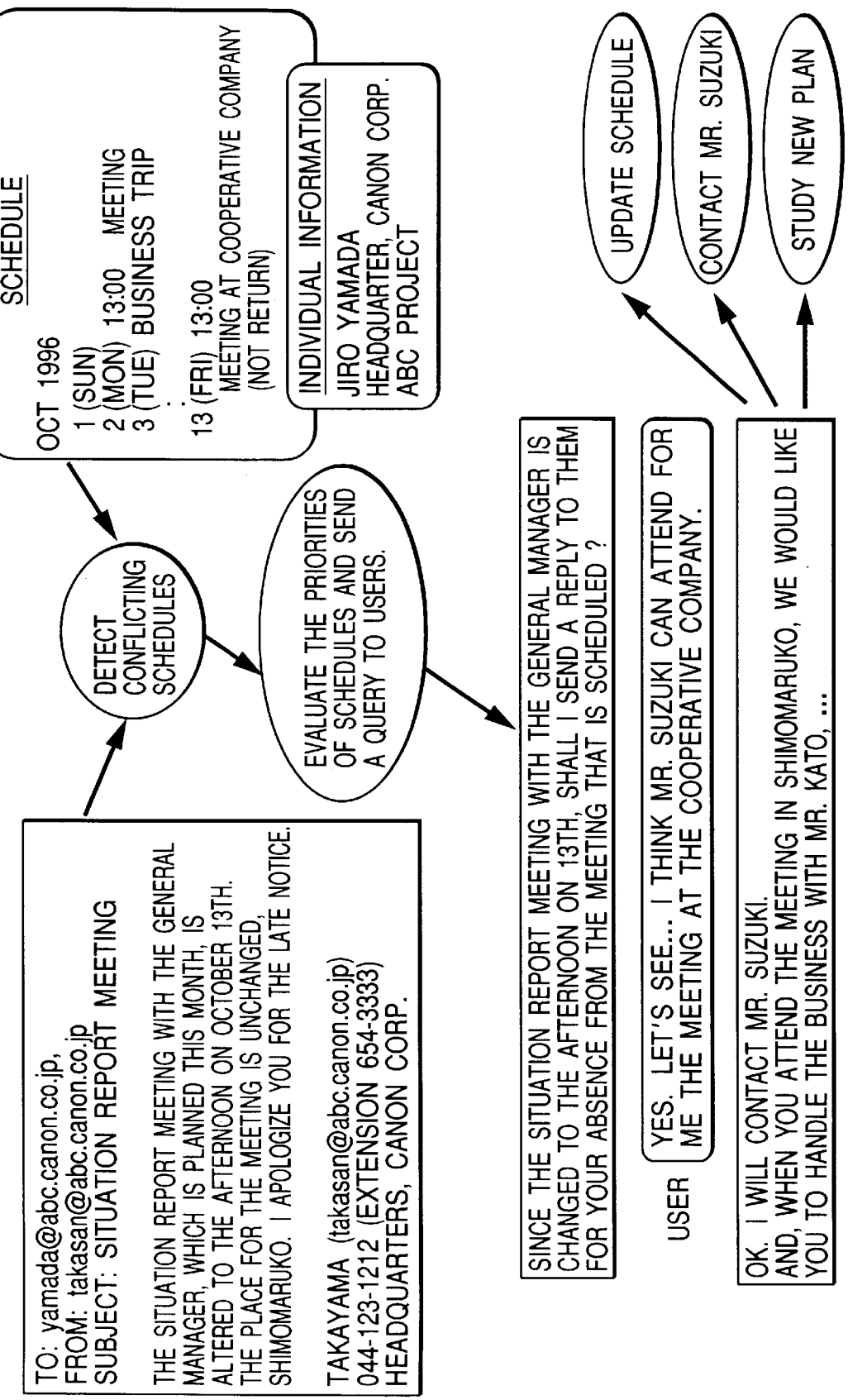
FIG. 72 is a diagram showing an example rearrangement of conflicting schedules.

In an example shown in FIG. 72, when two scheduled events conflict, the order of priorities of the two events is obtained from a comparison, and a plan to handle this problem is prepared and proposed to a user.

That is, in this example, when one schedule is found to be more important than the other, it is proposed that the less important schedule be canceled.

If the user knows somebody to send as his or her proxy to the scheduled event for which cancellation is proposed, the user can send the system a response to that effect. The system can then perform an action in consonance with the response. Also, the system can study a plan for despatching another person as a proxy.

In FIG. 72 is shown a combination of other methods performed at step S646 in FIG. 64 to make plans when the schedule conflict is found at step S686 in the flowchart in FIG. 68.

The processing in FIG. 68 has been explained for unconditionally transmitting to a user a response for an inconvenience. In this embodiment, the processing for a plurality of plans is employed as the re-planning method at step S646.

Figure 73:
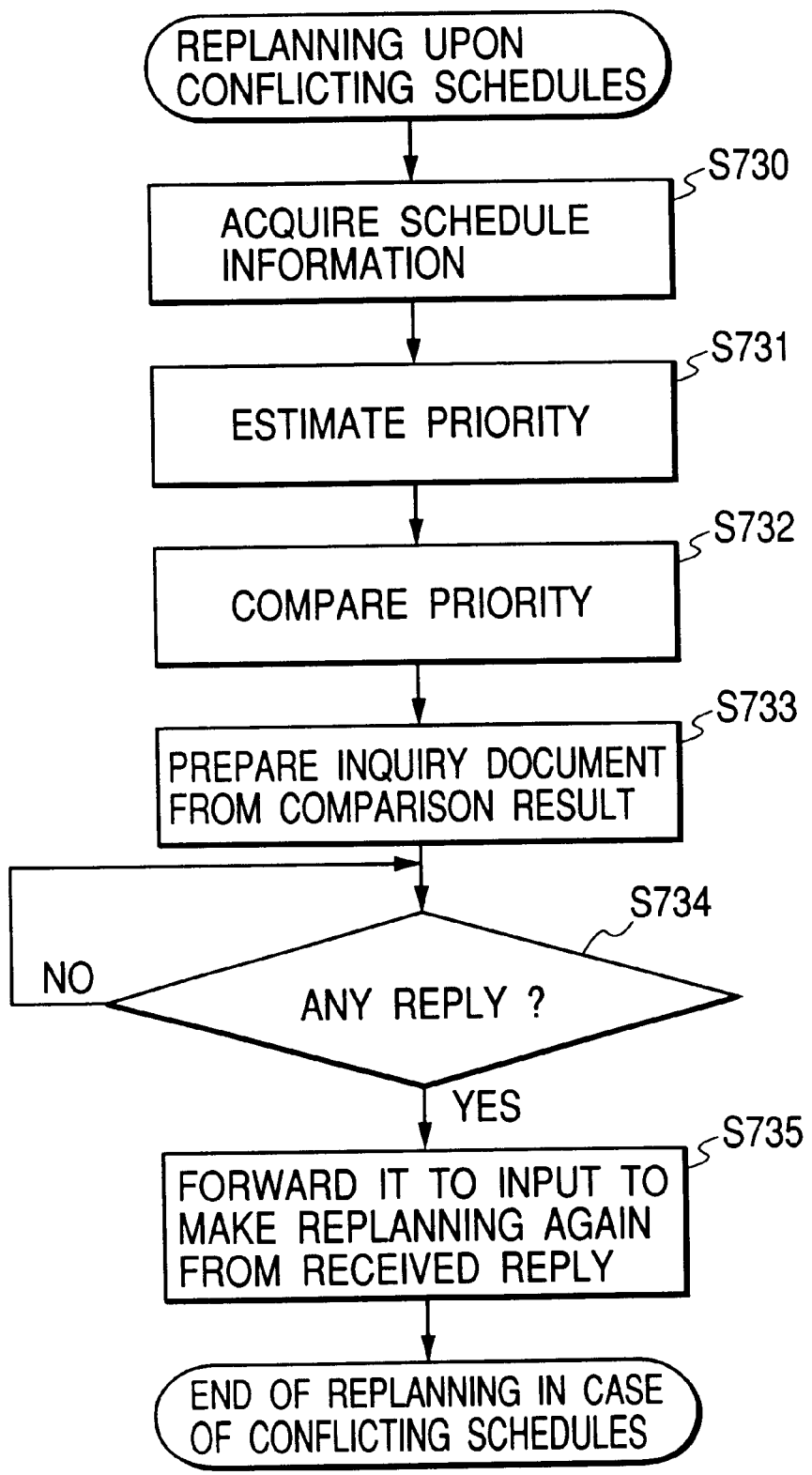
FIG. 73 is a flowchart showing the processing for re-planning conflicting schedules.

FIG. 73 is a flowchart for evaluating a priority extracted from the contents of a document and for proposing it to a user. The processing will now be explained.

The priorities of the scheduled events is determined by using information that the user has set in advance for each schedule, attendance at an event included in the schedule, the object of a scheduled event and the result obtained as a result of the analysis of the received document. A user may set the priorities of persons that are expected to attend the pertinent event.

The priority determined according to the object of the schedule may be set in advance by a user, or may be determined while taking into account the object or the field that the system understands, from the study of the past, that the user is interested in. That is, when the user engages in computer associated work, the schedule for a computer associated event priority over an event associated with real estate. Of course, if a user plans to purchase a house and that data is stored as information concerning the user, the schedule of an event associated with real estate may take priority.

For the priority determined from the result of the analysis of the document, when a document including the sentence "Please be sure to attend the meeting" and a document including the sentence "Please attend the meeting if possible" setup a conflict, the first document received is determined to take priority.

In FIG. 73, at step S730 the current schedule information is acquired. At step S731 the priority for new schedule information is evaluated. At step S732 the priorities of both schedules are compared. At step S733 from the result of the comparison, a plan is made to prepare a notice for querying a user (e.g., display two conflicting scheduled events and ask whether the event having the lower priority can be canceled). At step S734 the prepared notice is transmitted to the user. At step S735 a response from the user relative to the inquiry concerning the plan is acquired. The same re-planning process as in FIG. 68 is performed to again prepare a plan by using the response obtained from the user so that an action consonant with the response of the user can be taken.

Figure 74:
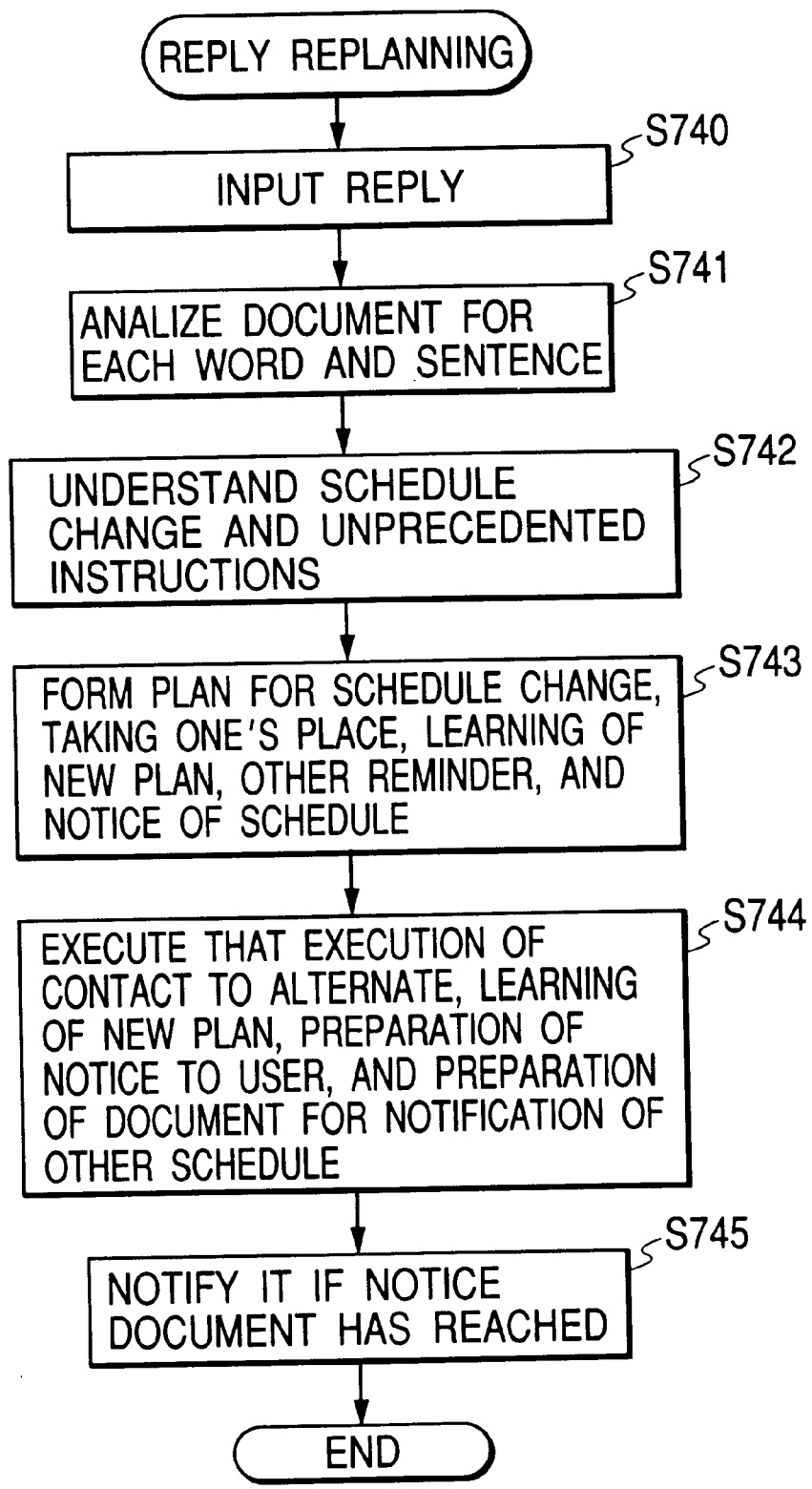
FIG. 74 is a flowchart showing the processing for re-planning responses.

FIG. 74 is a flowchart showing the re-planning process.

At step S740 the response finally obtained in FIG. 73 is regarded as input. At step S741 the input sentence is analyzed. At step S742 it is ascertained that the schedule is to be changed and that this is the first instructed plan. At step S743 the following plans are made: (a) the changing of the schedule; (b) the preparation of a document to transmit the schedule to a proxy; (c) the study of a new plan; (d) the preparation of a document to transmit the new plan to the user; and (e) the notification sent to a user concerning another schedule that should be recalled.

At step S744 the plans made at step S743 are executed: (a) the schedule is changed; (b) a document is prepared to transmit the schedule to a proxy; (c) a new plan is studied; (d) a document is prepared to transmit the new plan to the user; and (e) a user is notified of another schedule that should be recalled.

At step S745 the notification document is transmitted to the user. The processing for performing the process in FIG. 72 is thereafter terminated.

[Twenty-sixth Embodiment]

Figure 75:
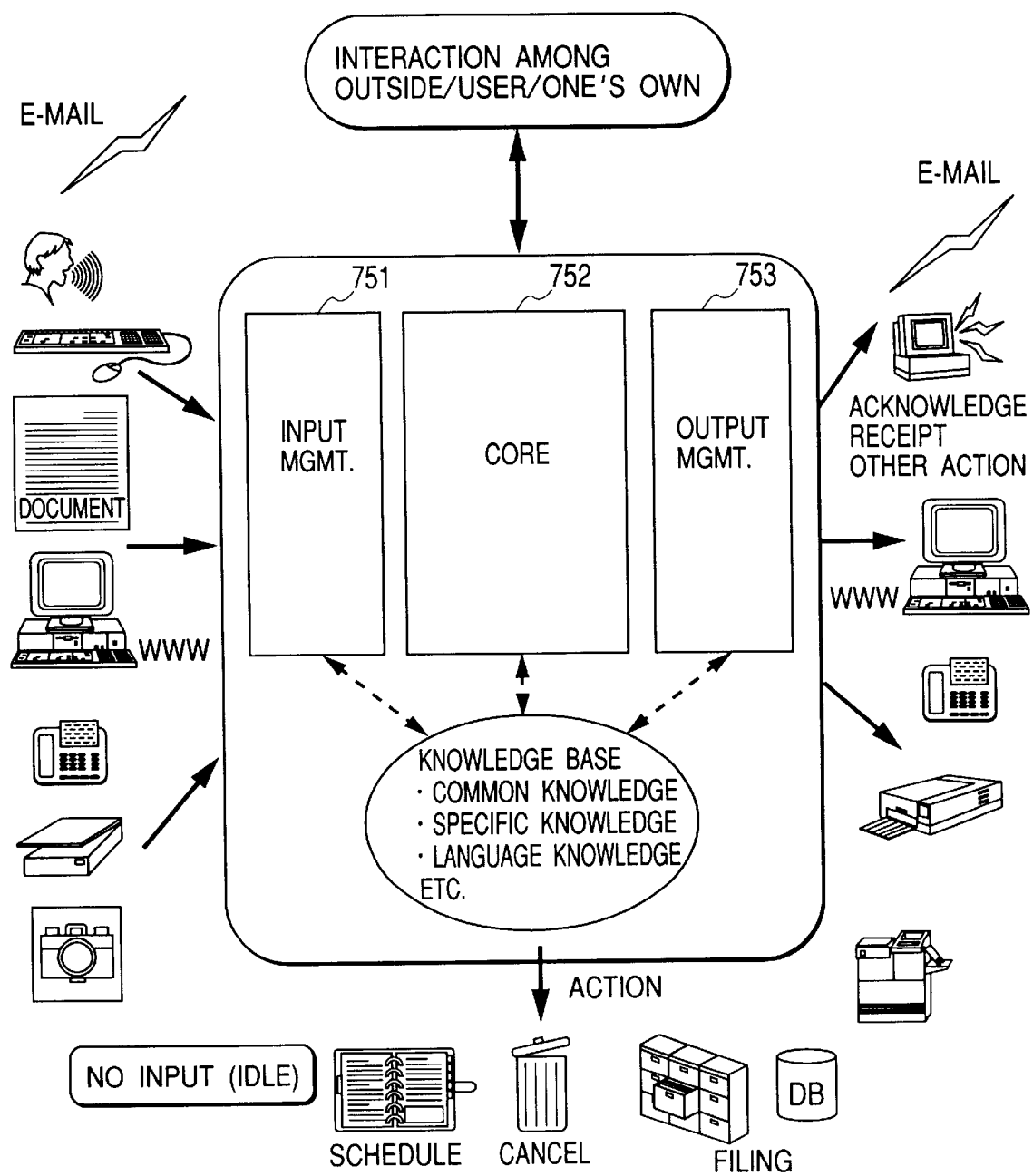
FIG. 75 is a diagram showing an overall image including the input/output of a system according to a twenty-sixth embodiment.
Figure 76:
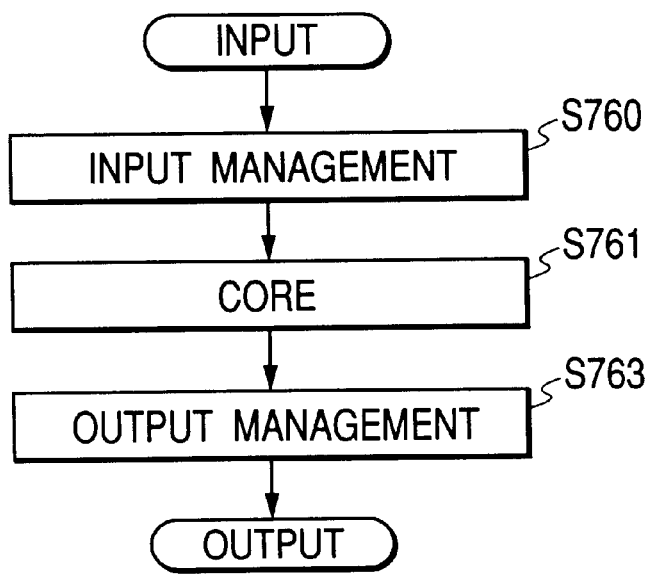
FIG. 76 is a flowchart showing the overall processing performed by the system according to the twenty-sixth embodiment.

FIG. 75 is a diagram illustrating the overall image of a system according to this embodiment, including input/output devices. FIG. 76 is a flowchart showing the processing performed by the system in FIG. 75.

Information input by E-mail, by voice, via a keyboard, across the WWW, and by input devices, such as a telephone, a facsimile machine, a scanner and a camera, is analyzed by an input management unit 751 (step S760). A core unit 752 ascertains the contents of the information and plans an appropriate process (step S761). An output management unit 753 determines an output medium and prepares the contents to be output and an output route (step S763). Then, the information is output by E-mail, by voice, across the WWW, or by output devices, such as a telephone, a facsimile machine, a printer and a copier.

Figure 77:
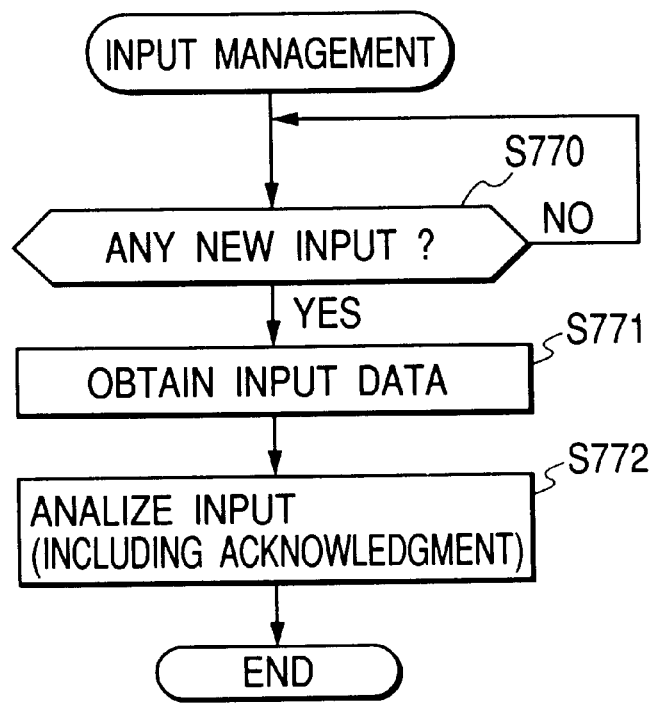
FIG. 77 is a flowchart showing the processing performed by an input management unit.
Figure 78:
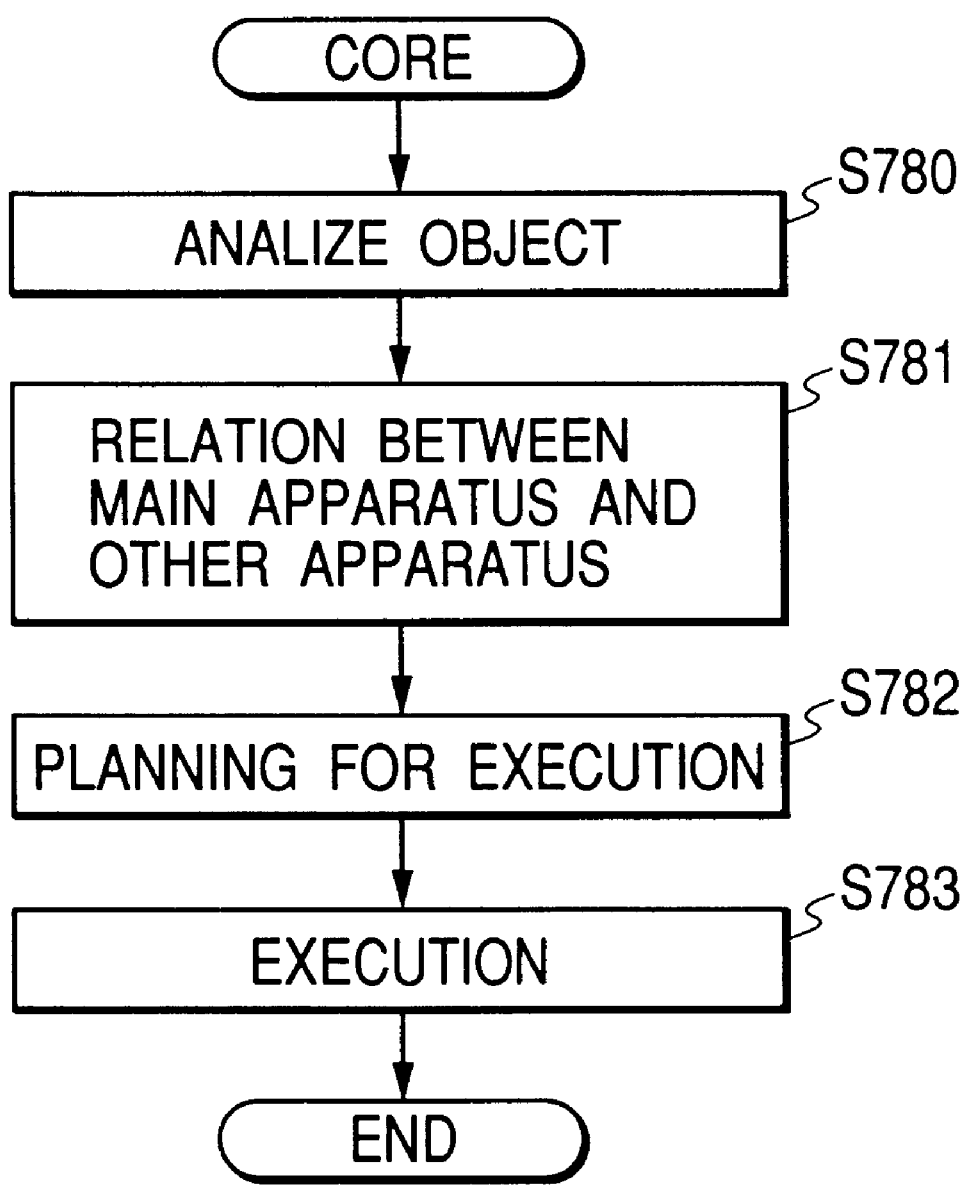
FIG. 78 is a flowchart showing the processing performed by a core unit.
Figure 79:
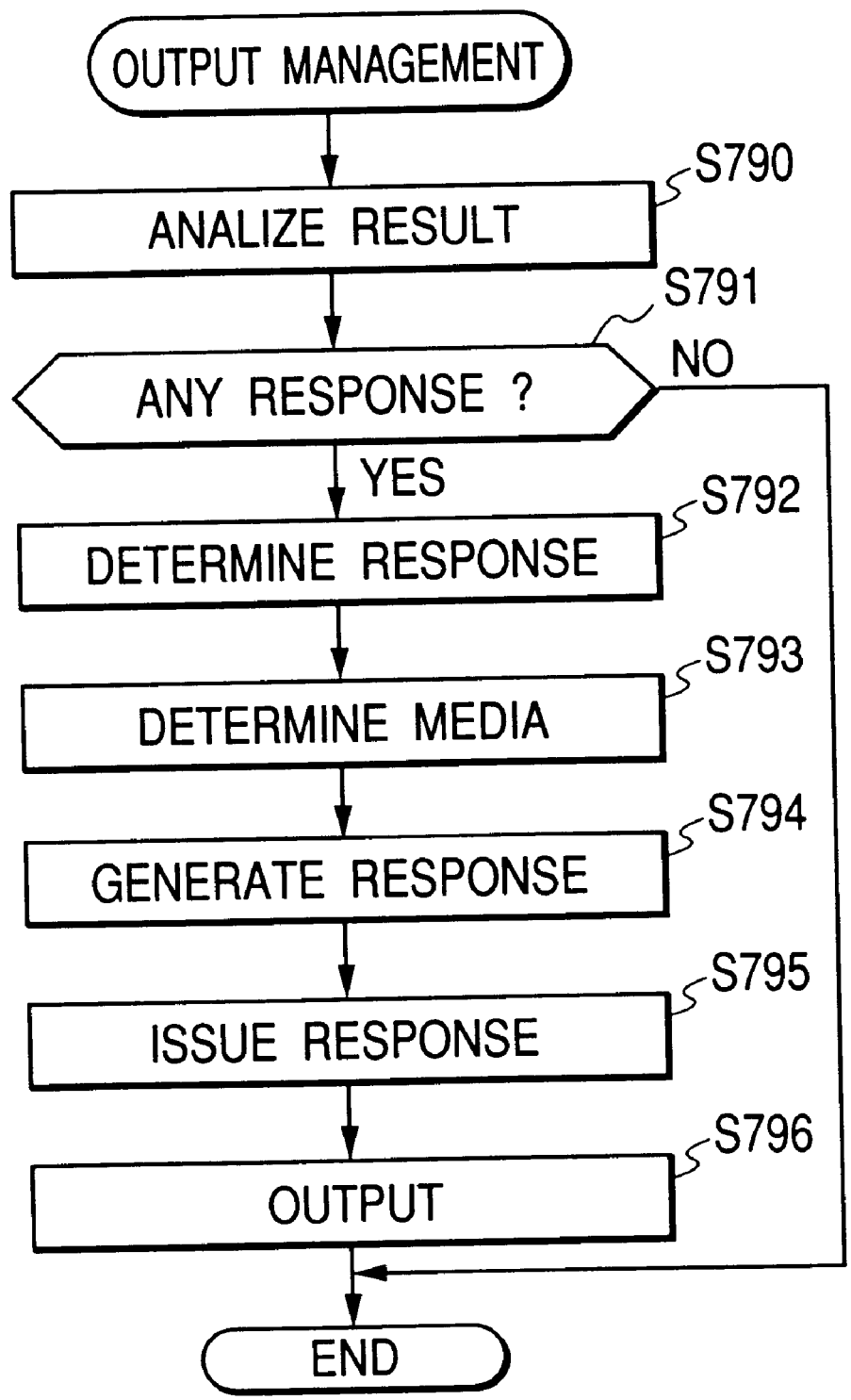
FIG. 79 is a flowchart showing the processing performed by an output management unit.

FIGS. 77 to 79 are specific flowcharts showing the process at step S760 (the process performed by the input management unit 751), at step S761 (the process performed by the core unit 752) and at step S763 (the process performed by the output management unit 753).

In FIG. 77, when, at step S770, it is determined that there is new input, at step S771 the input information is obtained.

At step S772 the input information is analyzed, as needed, after the information has been identified. At this time, the input management unit 751 accepts information from various media and identifies or analyzes the data using methods corresponding to the individual media.

In FIG. 78, the core unit 752 receives the information that is analyzed in FIG. 77.

At step S780 the object of the input information is analyzed and ascertained from the result of the analysis. At step S781 how the object of the input information is related to the main apparatus (the system or the user) is examined. At step S782, from the relationship with the main apparatus, planning for what to execute is performed in consonance with the object. At step S783 the plan made at step S782 is executed.

In FIG. 79 the output management unit 753 employs the results obtained in FIG. 78 to determine whether a response is needed. If a response is required, it is prepared and output.

At step S790 the result obtained in FIG. 78 is analyzed. At step S791 a check is performed to determine whether or not there is a response relative to the results. When there is no response, the processing is thereafter terminated. If there is a response, at step S792 a response relative to the external response is determined. At step S793 a medium for the response is determined. At step S794 a response is prepared in consonance with the designated medium. At step S795 the prepared response is issued by the designated medium. At step S896 the response is actually output. The processing performed by the arrangement in FIG. 75 has been explained.

When, for example, E-mail is received that notifies the user of the holding of a conference, the input management unit 751 analyses the input information according to the procedures in FIG. 77. From the obtained result, the core unit 752 prepares a plan, according to the procedures in FIG. 78, as to how the user and the system should handle the information. The plan is transmitted to the output management unit 753, which in turn performs the process according to the procedures in FIG. 79. When a response should be transmitted with the plan, a response is actually prepared and transmitted.

Depending on the contents of the conference described in E-mail message and the status of the schedule of the user, at step S782 a plan is prepared for the aggressive transmission of the response to the user, so that preparation of the response is required. At step S791, therefore, it is determined that a response is to be transmitted. At step S792 the contents of the response are determined. When the schedules conflict and when it is uncertain which schedule should be selected or whether a user intends to attend a specific conference, the contents of a response asking for a decision are determined. At step S793 a medium is selected by which the contents of the response can be transmitted most effectively. When, for example, the user is outside the office, a medium, such as a telephone or a facsimile machine, is selected that can issue a notice to the user. When the user is being operating a personal computer, a medium, such as a personal computer, is selected that can effectively display various reference materials. At steps S794 and S795 a document and an image are prepared in consonance with the contents and the medium that are decided above, and a response is prepared using a method for converting the data into voiced natural language in consonance with a specific medium, and is issued.

Figure 80:
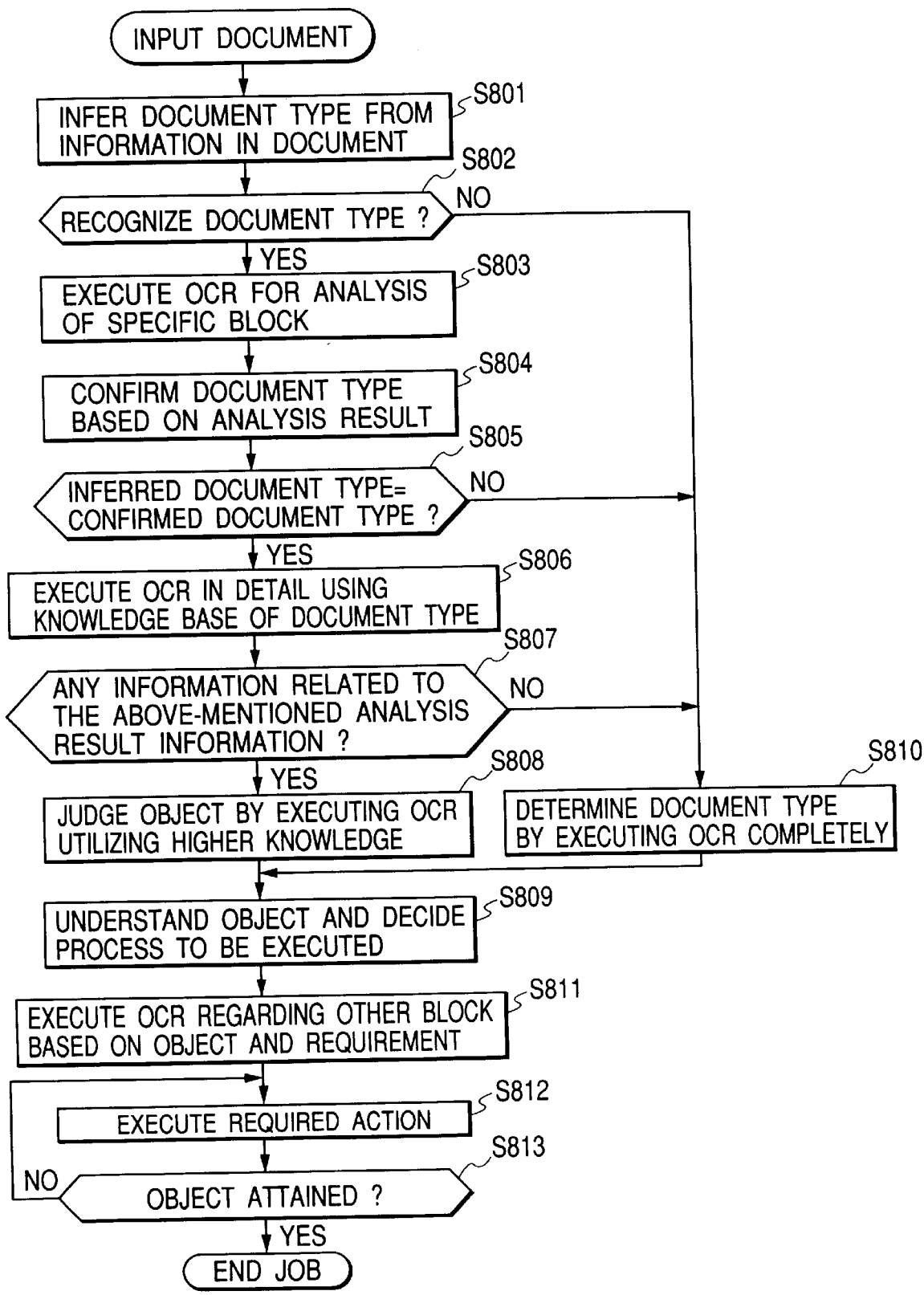
FIG. 80 is a flowchart showing data derivation processing.

FIG. 80 is a detailed flowchart for FIG. 75 to explain the processing for extracting data from input information. In this system according to the embodiment, when a document is input, at step S801 type identification symbols, such as the layout and a bar code of a document, are employed to infer the document type. If the document is inferred to be a letter, a report or a patent publication, program control moves to step S803. When no identification of the document is possible, program control goes to step S810 whereat OCR is thoroughly performed to ascertain the document type.

Figure 82A:
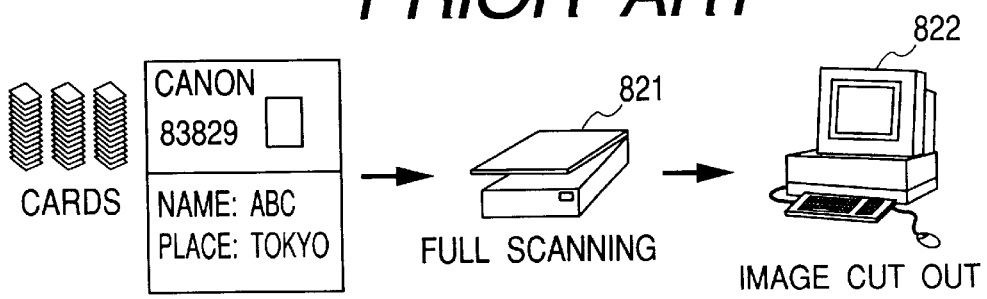
FIGS. 82A and 82B are diagrams for explaining a specific block reading process.
Figure 82B:
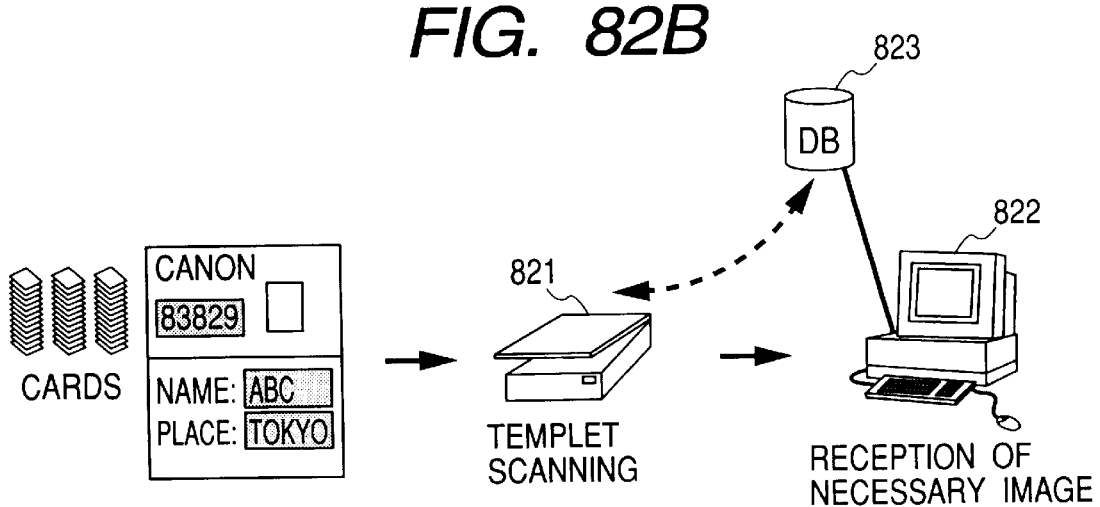

At step S803, in order to confirm the inferred document type is correct, a characteristic block is interpreted by the OCR to identify the document type (see FIGS. 82A and 82B). At step S804 the addressee of a letter and the patent serial number of the patent publication are found and the document type is confirmed. When the confirmed document type matches the inferred document type, program control advances to step S806. If the document types do not match, program control moves to step S810. For slips, at the top of which character strings describing the slip type are printed, the document type can be easily determined by the OCR on the employing upper portion of the sheet.

At step S806 the knowledge base of the document type that has been confirmed is employed to read and interpret a specific block using OCR. At step S807 a check is performed to determine whether there was information in the past that concerns the resultant information. If such information was present, program control moves to step S808. If such information was not present, program control goes to step S810. As a result, the addressee or the patent number is found and whether the information is a reply to a letter that was sent in the past can be ascertained.

At step S808, based on the identified status, the object is decided from the contents of the important text, and at step S809 a process to be executed is determined.

At step S811, because of the above object, the information is analyzed in another range where OCR has not yet been performed. At step S812 a required process is actually performed. As a result, a filing process, etc., is performed as needed.

In the above process, the OCR can be performed while inferring the contents of the information, more efficient and precise OCR results can be obtained than when, as in the conventional case, the OCR use is effected from the beginning. Accordingly, the process based on the OCR results can be performed precisely. FIG. 81 is a diagram showing an example letter/facsimile that is a target for data extraction.

In this example, at step S801 the document type is inferred from the layout of a document. As a result, DocType1=letter/fax.

At step S803 a specific block is read by the OCR and is interpreted (see FIGS. 82A and 82B). Then, "From", "To" and "Dear Sir" are acquired, and at step S804 DocType2= letter/fax.

The process for reading a specific block by using OCR, which was explained at step S803 in FIG. 80, will be specifically described. FIGS. 82A and 82B are diagrams for explaining this process.

The system in this embodiment scans a specific block as follows:

(1) A specific block is read fast by pre-scanning with a low resolution.

(2) A form of the information that is read is compared with an information form stored in a DB 823. When the forms match, input information other than the form, or information in an area (e.g., inside the frame of a card in FIGS. 82A and 82B) specified for each form, is read at a high resolution.

(3) Only the area that is read is regarded as an OCR target and analyzed, and the processing is continued.

In addition, since in this example it is assumed that there are a plurality of cards having the same form, documents that are to be read at a predetermined interval probably have the same form. Therefore, first, the process is performed while it is assumed that the documents have the same form, and when a contradiction occurs, it is assumed that the documents have different forms and a re-analysis of them is performed.

As a result, the processing speed is considerably increased, the analysis range is limited, and an analysis domain is determined by specifying a form, and the analysis precision is drastically improved.

The determination of the object from the contents of the information, which was explained at step S808 in FIG. 80, will be specifically described.

Figures 83, 83A:
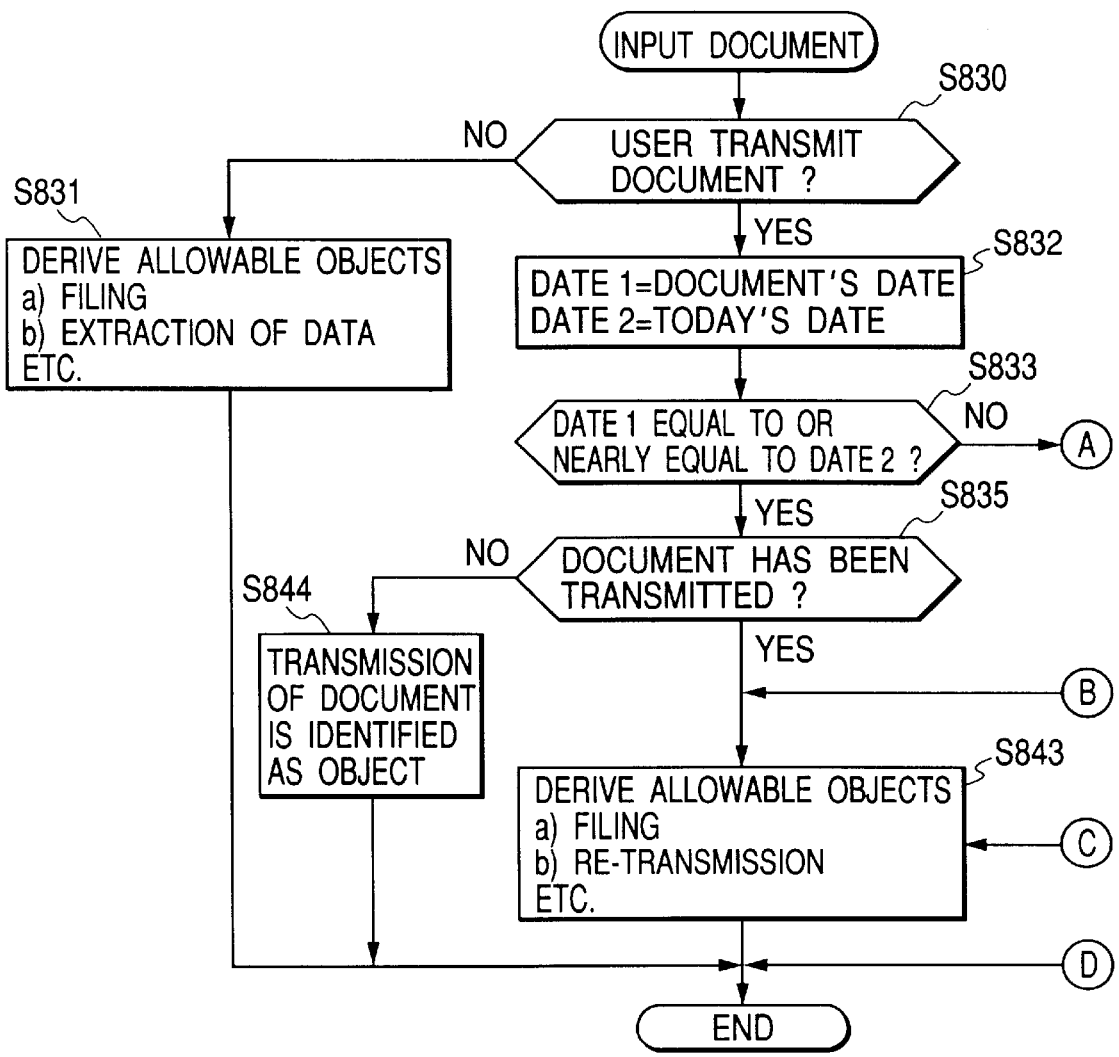
FIG. 83 which is composed of FIGS. 83A and 83B are flowcharts showing determination procedures in a process for referring to date data.
Figure 83B:
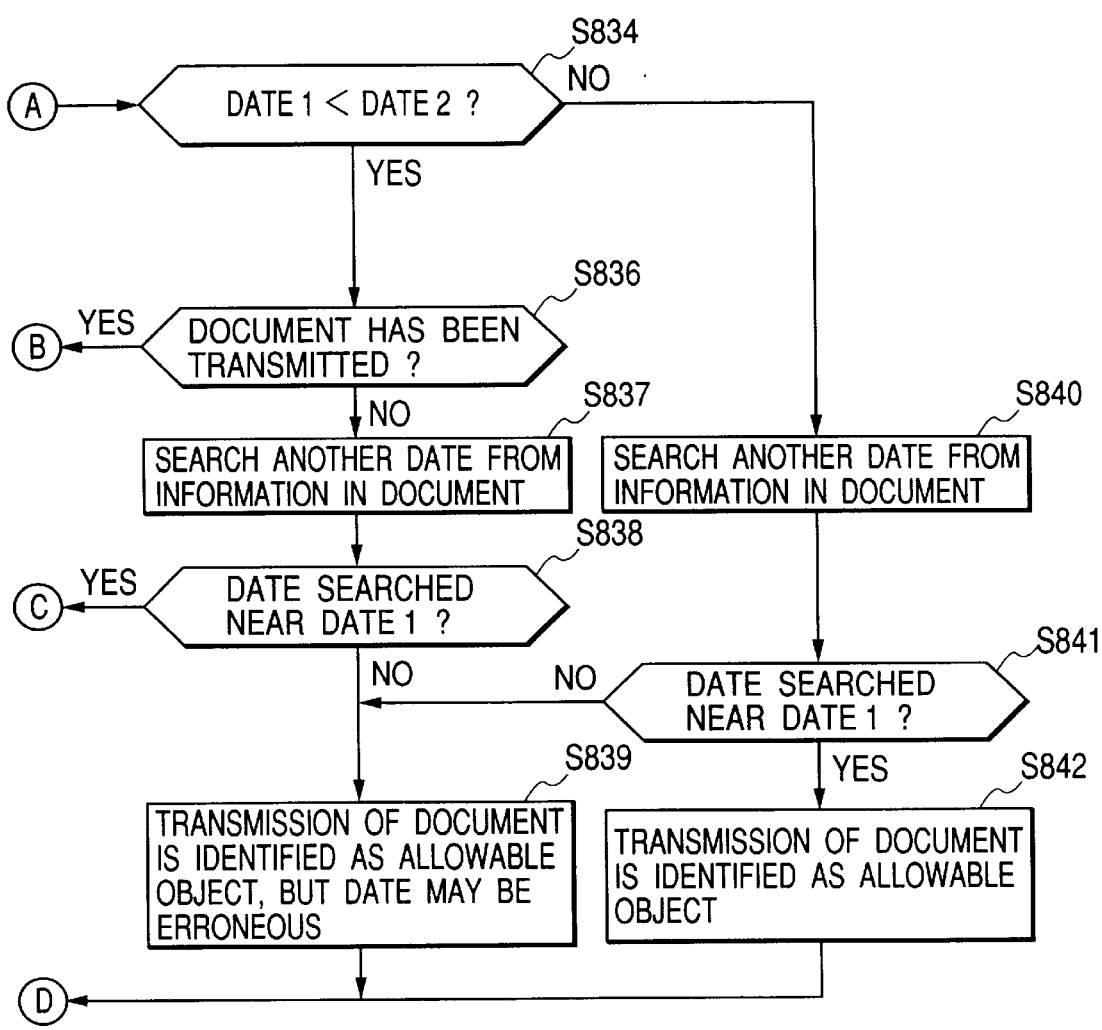

The system in this embodiment employs date data to perform the determination process according to the procedures in FIGS. 83A and 83B. When a sender is a user, the following process is performed.

(1) When the current date is today, transmission by facsimile is decided.

(2) When the date is yesterday or some time in the past, the user is queried as to whether the same document was received before or whether he or she has seen the same contents, in order to determine whether to perform filing, re-transmission, or whether the user made a mistake.

(3) When the date is tomorrow or some day in the future, the user is queried in order to determine whether the information should be held until the designated date, or whether the user made a mistake.

More specifically, assuming that in a document in FIG. 81, Date1 is the date of a document, Date2 is the today's date, (1) Date1=Nov. 25, 1996 & Date2=Nov. 25, 1996—send the document (2) Date1=Nov. 25, 1996 & Date2=Jul. 2, 1996—filed (3) Date1=Nov. 25, 1996 & Date2=Nov. 26, 1996

Date of contents=Dec. 18 and 22, 1996—mistake

FIGS. 83A and 83B are flowcharts showing the processing for analyzing the object extracted from an input document. When a document is input, at step S830 a check is performed to determine whether the sender is a user. If the sender is a person other than a user,the input document is determined to be a received document. At step S831 a corresponding object, such as filing or data extraction, is examined, and the processing is thereafter terminated.

When the sender is a user, program control advances to step S832 to analyze the type of the input document. At step S833 the date of the document is compared with the current date. When the two dates are close to each other, at step S835 a check is performed to determine whether the document was transmitted before. When the document was not transmitted before, its object is determined to be "transmission of a document". If the same document was transmitted before, at step S843 the object for filing or re-transmission is extracted.

When the date of the document is a fairly old date, program control moves to step S836, whereat a check is performed to determine whether or not the same document was transmitted before. When the document was transmitted before, program control moves to step S843. When the document was not transmitted, program control goes to step S837 whereat a check is performed to determine whether any other date is described in the information for the document. When there is another date, program control goes to step S843. When no other date is found, it is ascertained that the object can be transmission of the document, and also that the date may be wrong.

When the date of the document is a date fairly far in advance, at step S840 a check is performed to determine whether any other date is described in the information for the document. When, at step S841, there is another date, the object is determined to be "transmission of the document". When no other date is found, program control moves to step S839.

[Twenty-seventh Embodiment]

Figure 84:
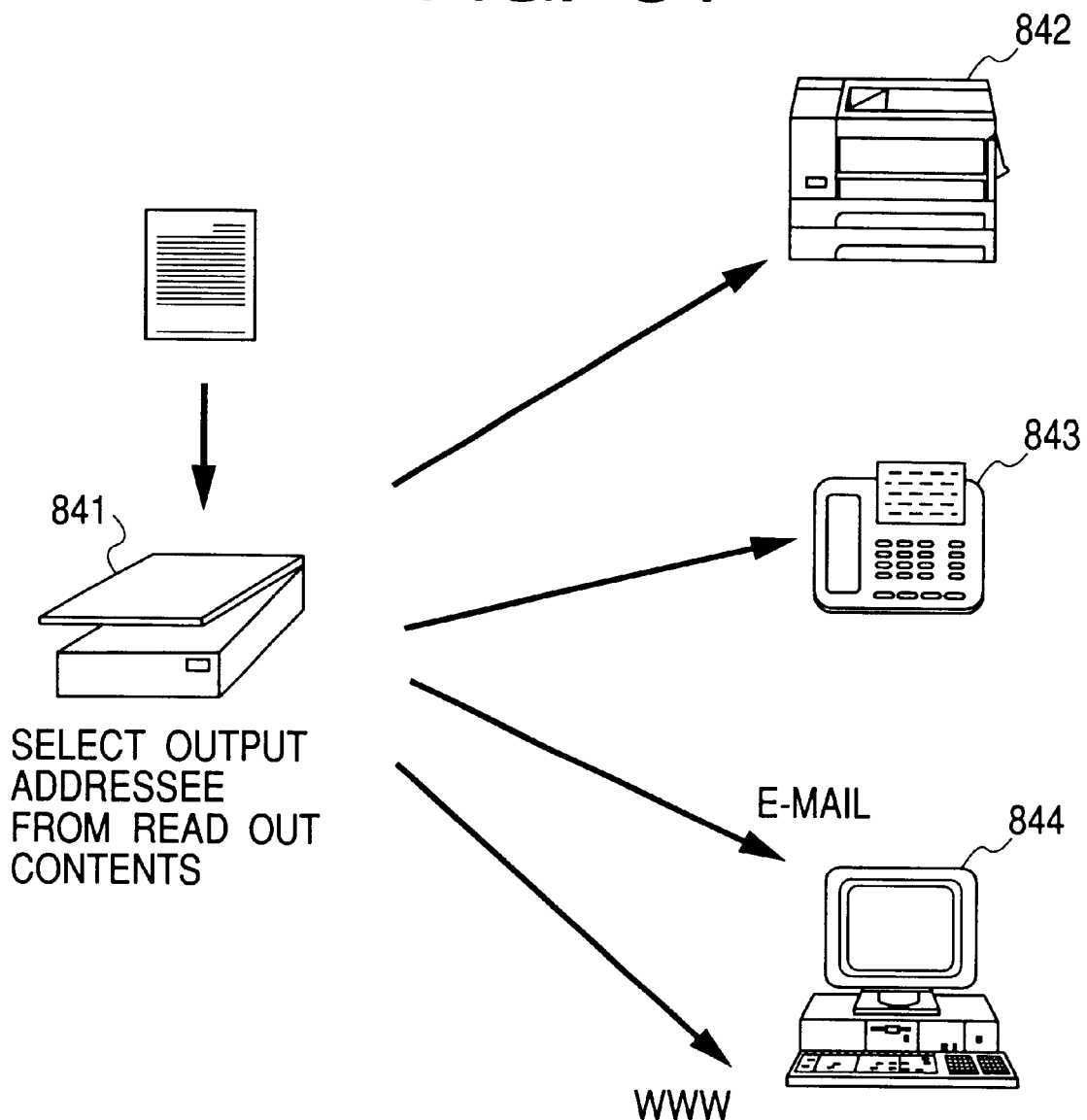
FIG. 84 is a diagram showing transmission of information according to a twenty-seventh embodiment.

FIG. 84 is a diagram showing an example arrangement of a system according to this embodiment. In this embodiment, the system serves as a current facsimile machine.

According to the system in this embodiment, without a user specifying an addressee, the addressee for a document is determined from bar code on a document that is read or information on a cover sheet, so that the document can be transmitted to a correct addressee.

As a result, appropriate information can be transmitted to a printer or a facsimile machine, by E-mail or via the WWW.

[Twenty-eighth Embodiment]

Figure 85:
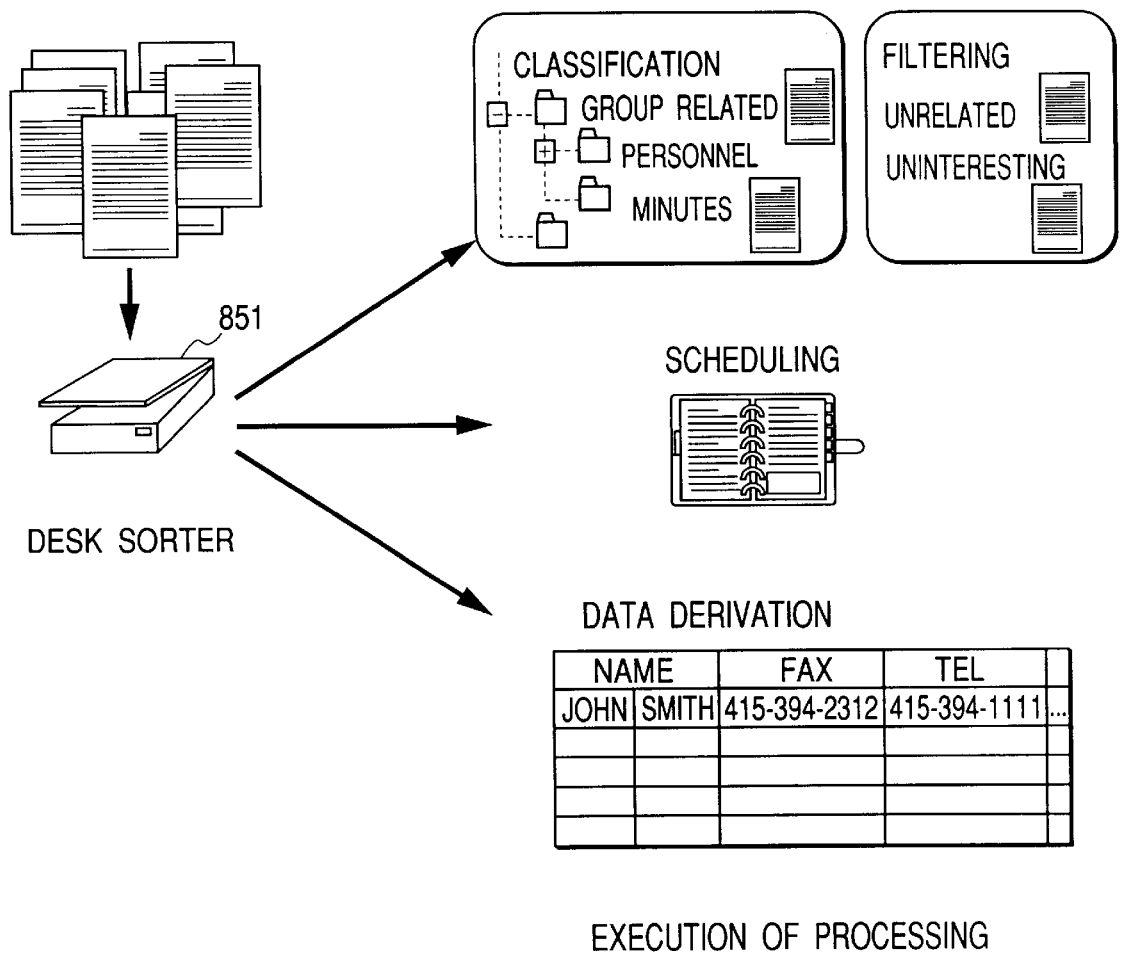
FIG. 85 is a diagram showing transmission of information according to a twenty-eighth embodiment.

FIG. 85 is a diagram illustrating an example arrangement of a system according to this embodiment. In this example, the system implements a desk sorter function for processing all the kinds of documents on the desk.

That is, in consonance with the contents of the document that is read, sorting, filing, scheduling, data extraction and automatic processing are performed.

[Twenty-ninth Embodiment]

Figure 86:
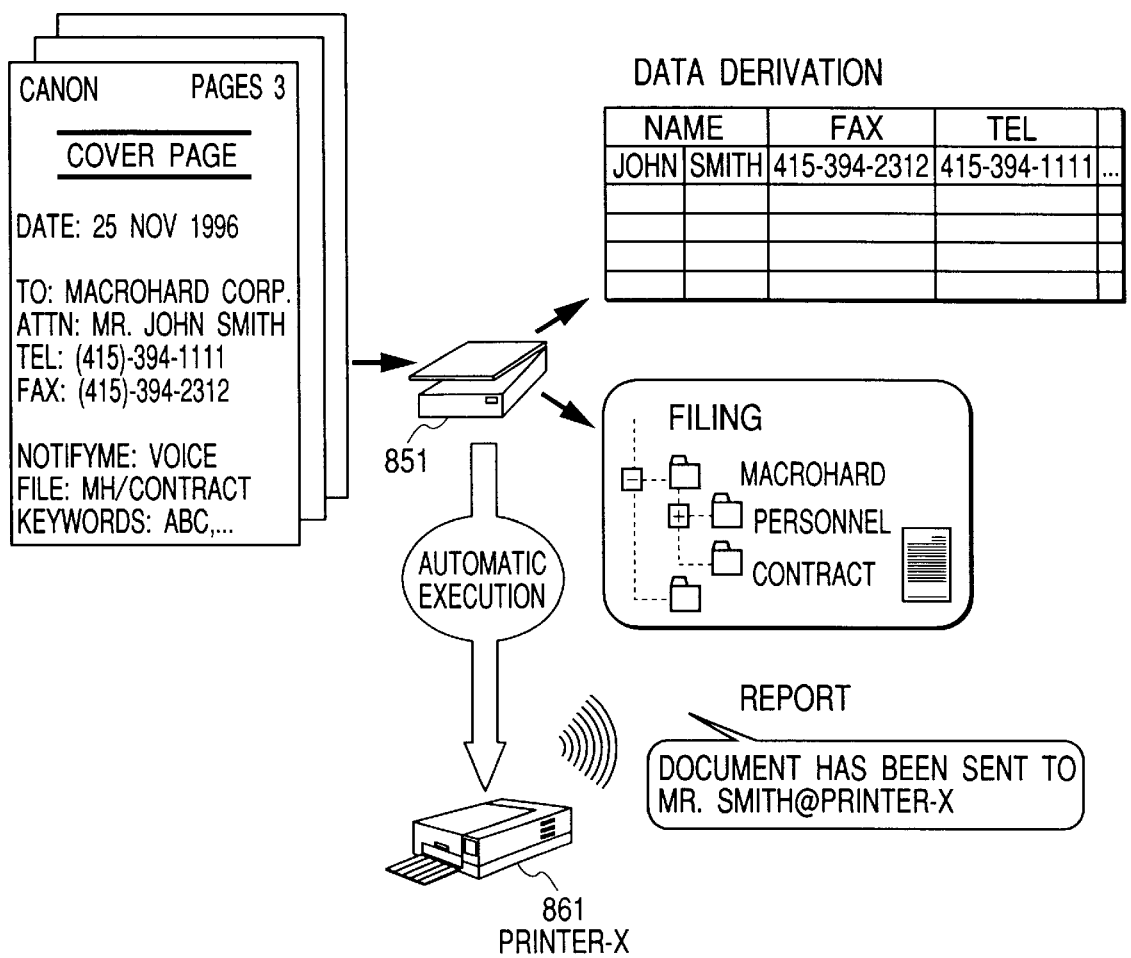
FIG. 86 is a diagram showing transmission of information according to the twenty-eighth embodiment.

FIG. 86 is a detailed diagram for explaining the system in FIG. 85. The processing performed by the system shown in FIG. 86 will be specifically described while referring to the flowchart in FIG. 87.

Figure 87:
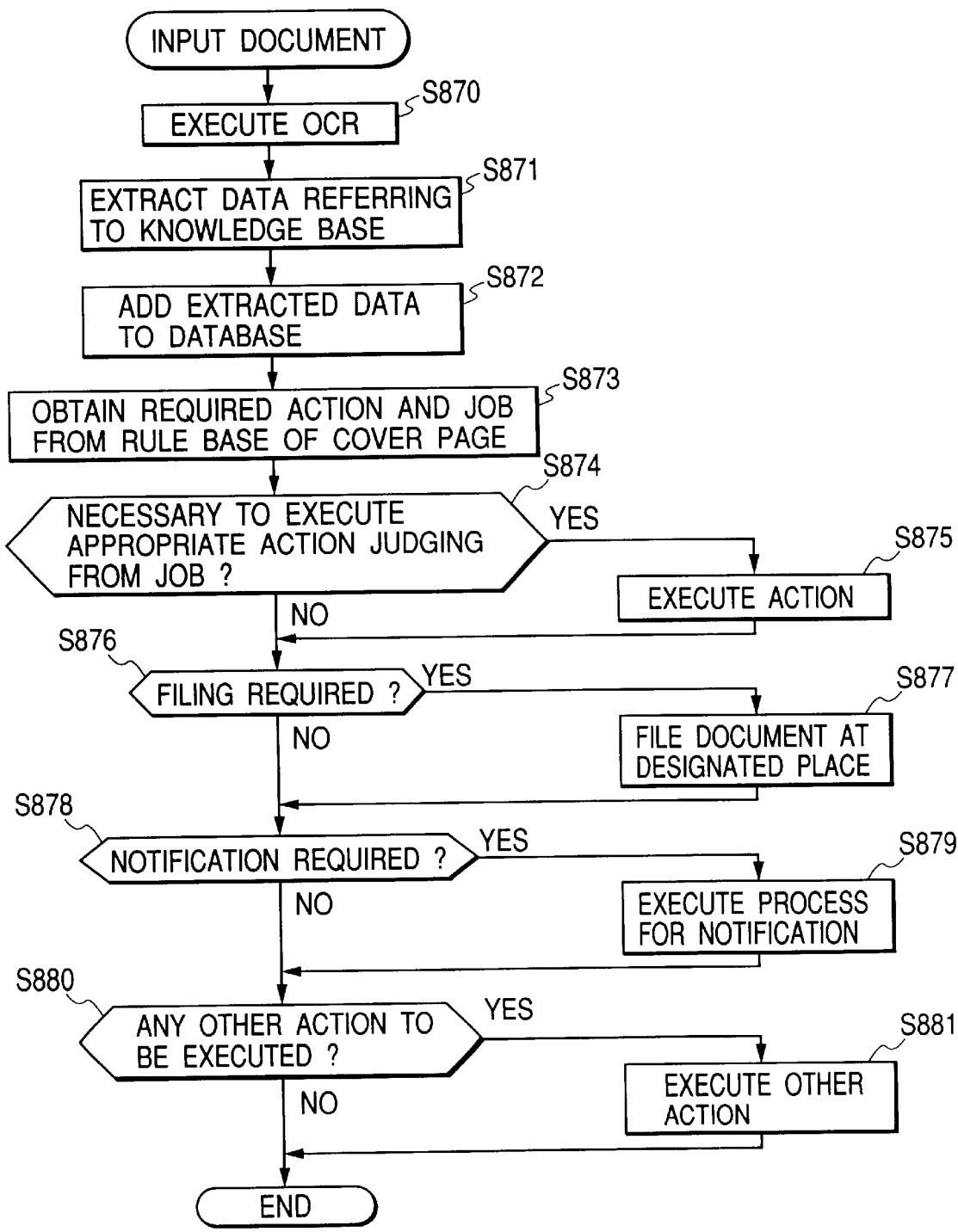
FIG. 87 is a flowchart showing the processing for the twenty-eighth embodiment.

FIG. 87 is a flowchart showing the processing for this embodiment. FIGS. 88 and 89 are tables for knowledge used during the processing; the table in FIG. 88 shows the knowledge in general knowledge base, and the table in FIG. 89 shows the knowledge in a knowledge base of a field specified on a cover sheet. In this embodiment, information defined in the tables in FIGS. 88 and 89 is employed to compare a character string included in an input document with a character string defined in a character string column in the table, and the conception in a corresponding column, a Role for further specifying the meaning, and a Condition for specifying succeeding information, or an instructed process Action are acquired, and analysis for them is performed.

In FIG. 87, at step S870 a cover page is scanned and an OCR process is performed. At step S871 the knowledge base in FIG. 88 is examined to extract from it data, such as the names of a sender and a receiver and their telephone numbers and facsimile numbers. At step S872 the obtained data are registered in a database. In the example in FIG. 86, character string "To: Macrohard Corp." is included in the cover page of a received document. When this character string is compared with an item defined in the character string column in FIG. 88. Then, matching item "To" is found and its Role is a reception company name or an individual name, so that "Macrohard Corp." is extracted as information concerning a receiver.

At step S873 a notification method and means, a filing job, an action for a place, and a job are extracted. In the example in FIG. 86, character string "File: MH/Contract" is included in the cover page of the received document. When this character string is compared with the items defined in the character string column in FIG. 89, matching item "File" is found, filing is extracted from the column as an instructed action, and "MH/Contract" is extracted from the document as information for a filing place.

Assuming that Date1=Nov. 25, 1996 and Date2=Nov. 25, 1996, as is explained in FIGS. 83A and 83B, it is determined that the object is transmission of a document.

At step S874 a check is performed to determine whether an action for the object of the processing is present. Since the transmission of the document to a receiver is the object, at step S875 a transmission action is performed. At step S876 the information on the cover page is employed to determine whether the filing is necessary. Since the filing is required in the example in FIG. 86, at step S877 the document is filed at the instructed place, "MH/Contract".

At step S878 as well as at step S876 the information on the cover page is employed to determine whether or not a notification for the transmission of the document should be issued to the sender. Since it is instructed to notify the sender, by voice, of the transmission of the document, at step S879 the sender is notified by voice of that the document has been transmitted to the receiver. At step S880 whether or not another action is determined. At step S881 a keyword is designated, and an index is prepared by using keyword ABC.

[Thirtieth Embodiment]

Figure 90:
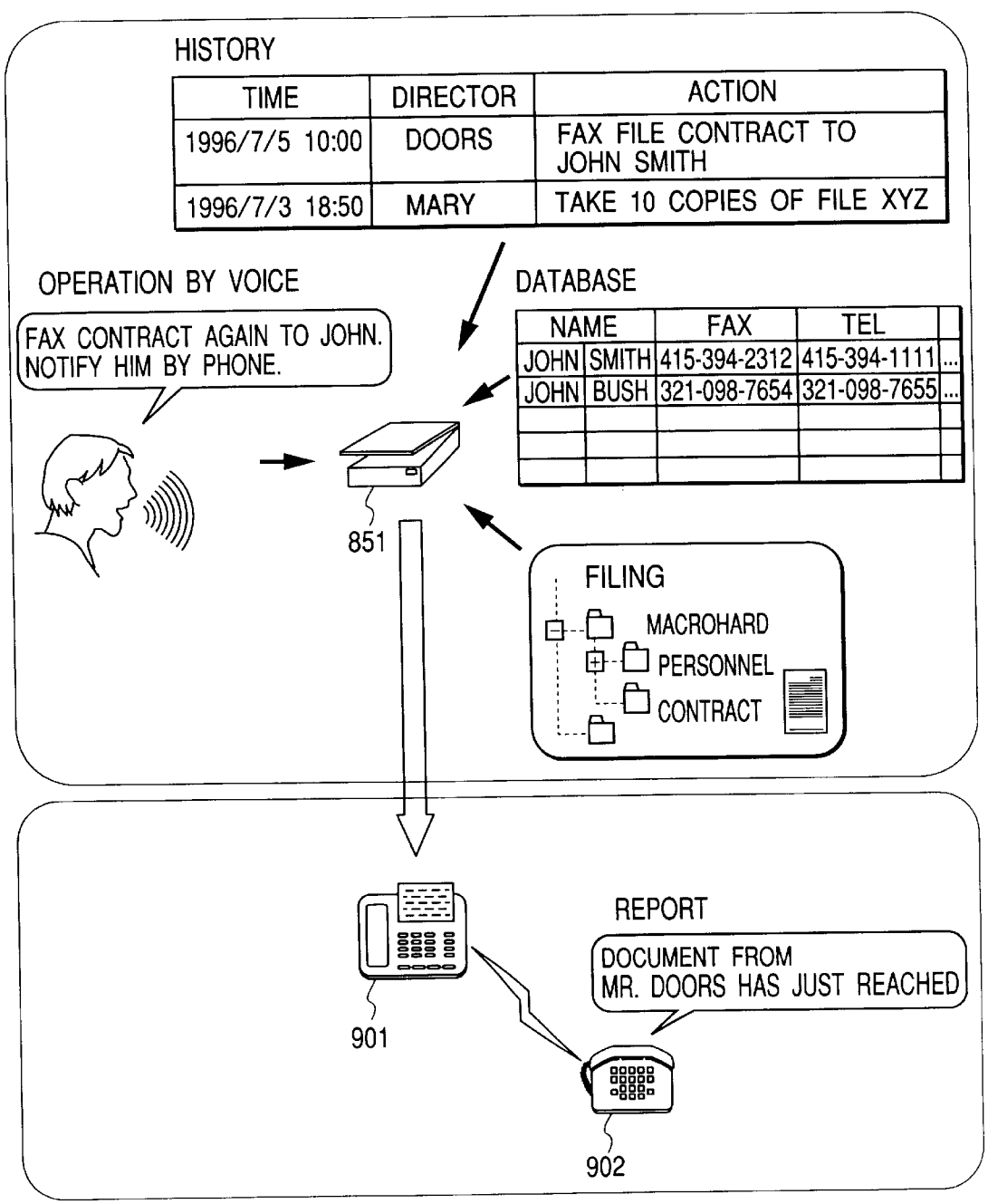
FIG. 90 is a diagram showing an example where voice is used to refer to processing history to perform a process.

FIG. 90 is a diagram showing an example processing where the history in the past is referred to based on an instruction by voice in natural language. The processing in FIG. 90 will be explained while referring to the flowchart in FIG. 91.

Figure 91:
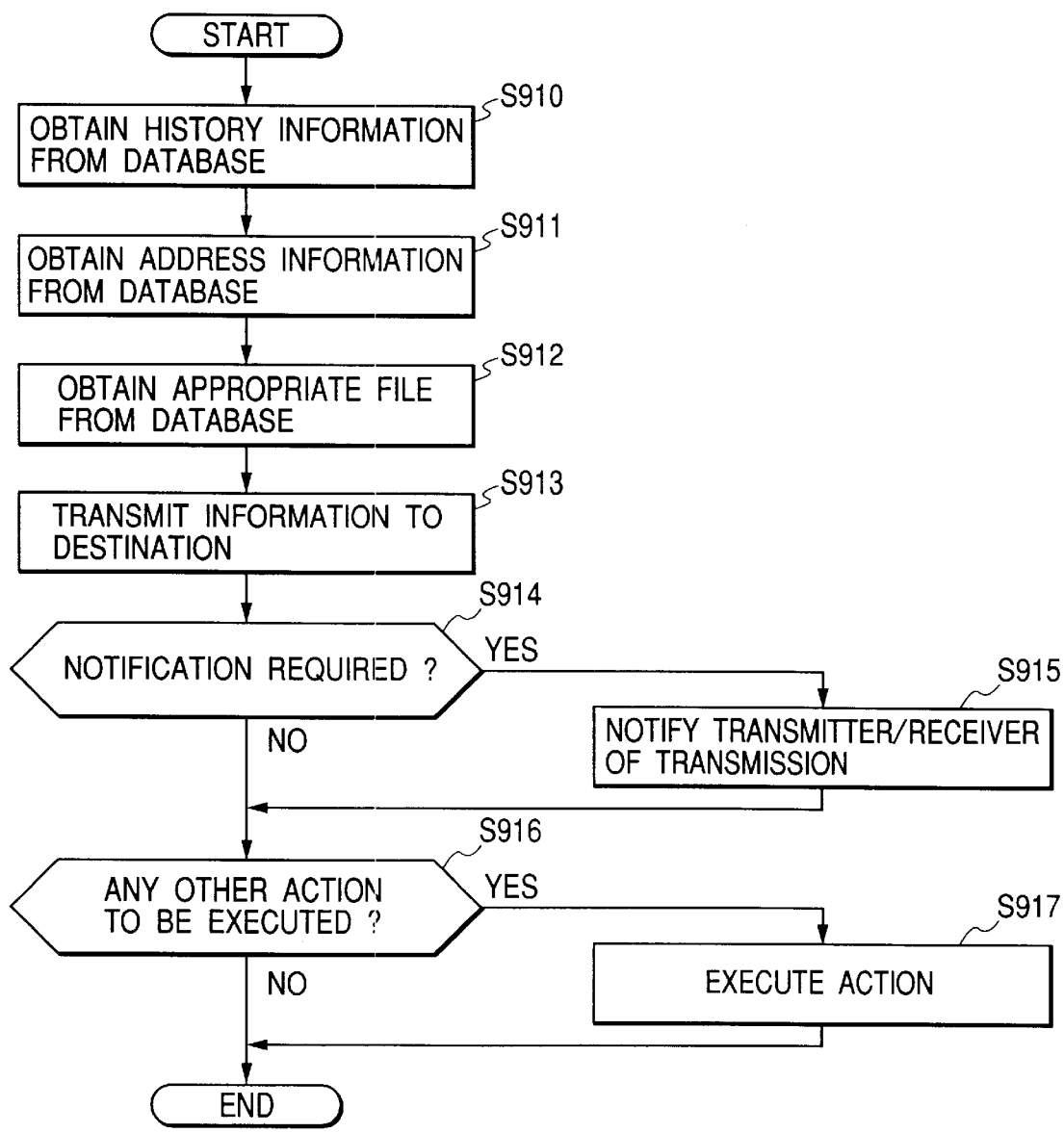
FIG. 91 is a flowchart showing the processing performed according to a thirtieth embodiment.

FIG. 91 is a flowchart showing the processing for this embodiment. When an aural instruction "Fax Contract again to John. Notify him by Phone" is received from a user, the system analyzes the object of the instruction in the natural language, and understands "Re-transmit document "Contract" to John, and Notify him of the transmission". Thus, the processing in FIG. 91 is initiated to specify the document Contract and the addressee John.

Since re-transmission means that the document was previously transmitted, at step S910 history information is acquired from the database. Then, the document Contract and the addressee John are specified from the history information. At step S911 the address of the John is obtained from the personal database. Since, in the database, there are two Johns, John Smith and John Bush, ordinarily the addressee can not be specified. Since at step S910 the history information is referred to, however, it is judged that John to whom the document Contract was transmitted is John Smith, and the addressee is thus specified. At step S912 the document "Contract" is acquired from the filing database. At step S913 the document is transmitted to addressee John. Since there is notice instruction "Notify him by Phone" at step S914 it is determined that transmission of the notice is necessary. At step S915, as well as in FIG. 89, according to the rule of the knowledge base, an instruction is issued to a facsimile machine 901 as a reception apparatus to send a notice to a receiver by phone. At step S916 the other actions are not instructed, and program control thereafter determined.

Upon the receipt of the document, according to the notification instruction, the facsimile machine 901 notifies John by phone of the receipt of the document from Mr. Doors. When the facsimile machine 901 can not notify the addressee by phone of the receipt of the document, the addressee may take its place.

[Thirty-first Embodiment]

Figure 95:
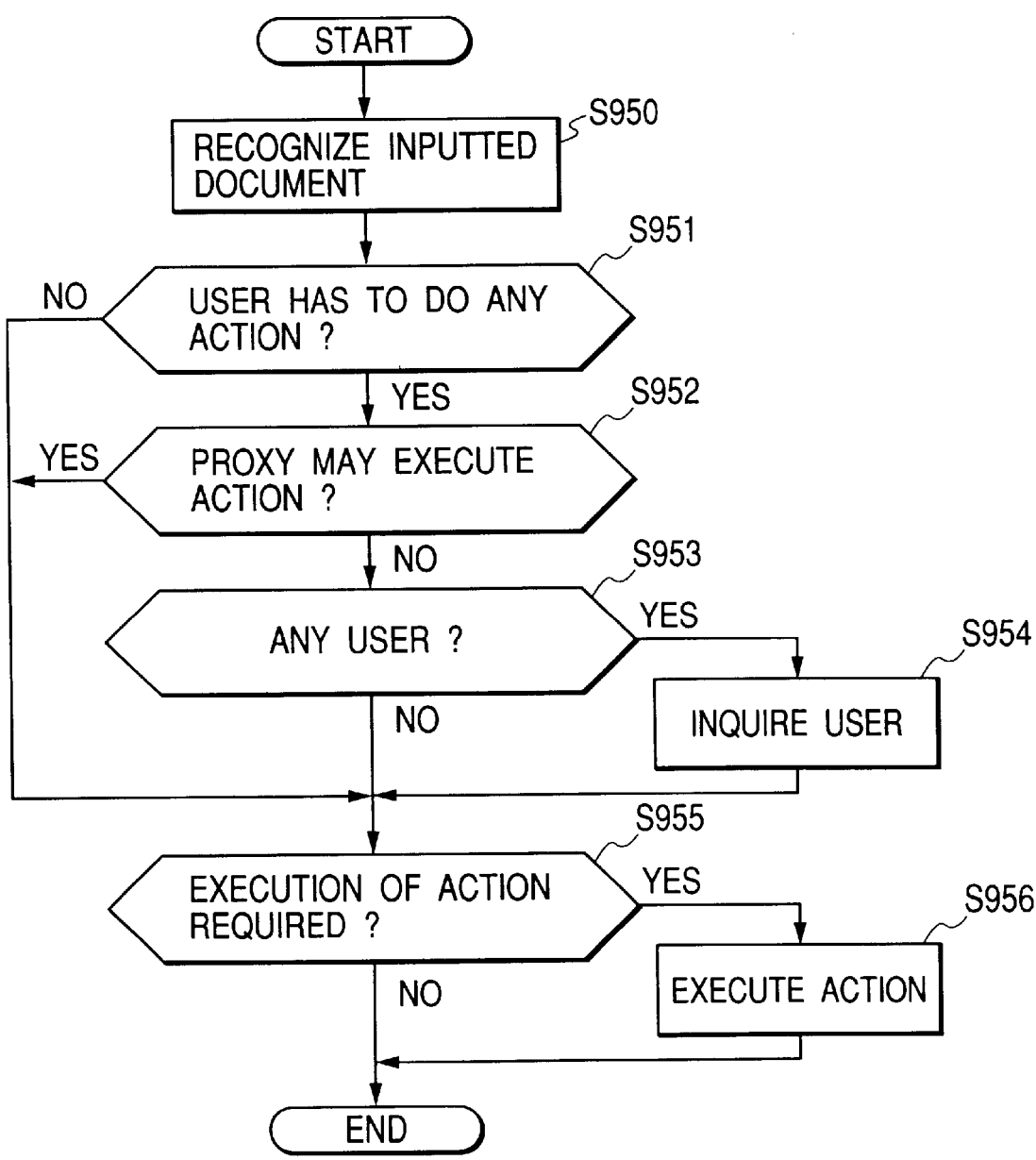
FIG. 95 is a flowchart for an example where a required process is automatically performed after a user is queried.

FIG. 95 is a flowchart showing example processing where, from the contents of a document that is input and analyzed, it is determined that a user should do something, a query is actually transmitted to the user, and a required process is preformed automatically. FIG. 92 is a diagram showing an example input document. FIG. 93 is a diagram showing the contents of a conversation between a system and a user. FIG. 94 is a diagram showing a document that is prepared by the system as the result of judgement of the conversation in FIG. 93.

The processing for preparing an output document in FIG. 94 from an input document in FIG. 92 will be described while referring to the flowchart in FIG. 95.

At step S950 the input document in FIG. 92 is analyzed and the following objects are understood: (a) Mr. John Smith arrives at Yokohama at three o'clock on November 28; (b) Mr. John Smith little understands Japanese; and (c) some one should meet him at the station.

At step S951 what the user should do is determined from the contents that are obtained. Since it is determined that some one must meet him at the station, program control advances to step S952. At step S952 a check is performed to determine whether a proxy (system) may execute the action. Since the system can not meet him at the station, program control goes to step S953. At step S953 a check is performed to determine whether an inquiry should be issued to the user, and if so, program control moves to step S954. In this example, since it is determined from the addressee of the input document that this is a request for Dr. Aruna Rohra, program control moves to step S954.

At step S954 a process for inquiring the user (Dr. Aruna Rohra) is performed. In this case, as the result obtained at step S951 the user must meet John at the station, and an inquiry what to do is issued to the user. At step S955 what to do next is determined from the result of the inquiry, and whether or not an action is to be initiated is determined. In this example, the user instructs to ask Mr. Tanaka to meet him, the action is initiated according to the instruction. Since there is a request for Mr. Tanaka to act as a proxy, it is assumed that the action must be initiated. At step S956 a document for requesting Mr. Tanaka as a proxy is prepared and a contact is made with Mr. Tanaka. In this example, an electronic mail document is prepared and transmitted. In this example, information that John arrives on 28th, an instruction for meeting him for the user and the original document that caused the request are attached to automatically form the document.

As is described above, processing has been explained for performing the matter (meeting John at the station) where from the input document the user must actually perform an action.

[Thirty-second Embodiment]

Figure 96:
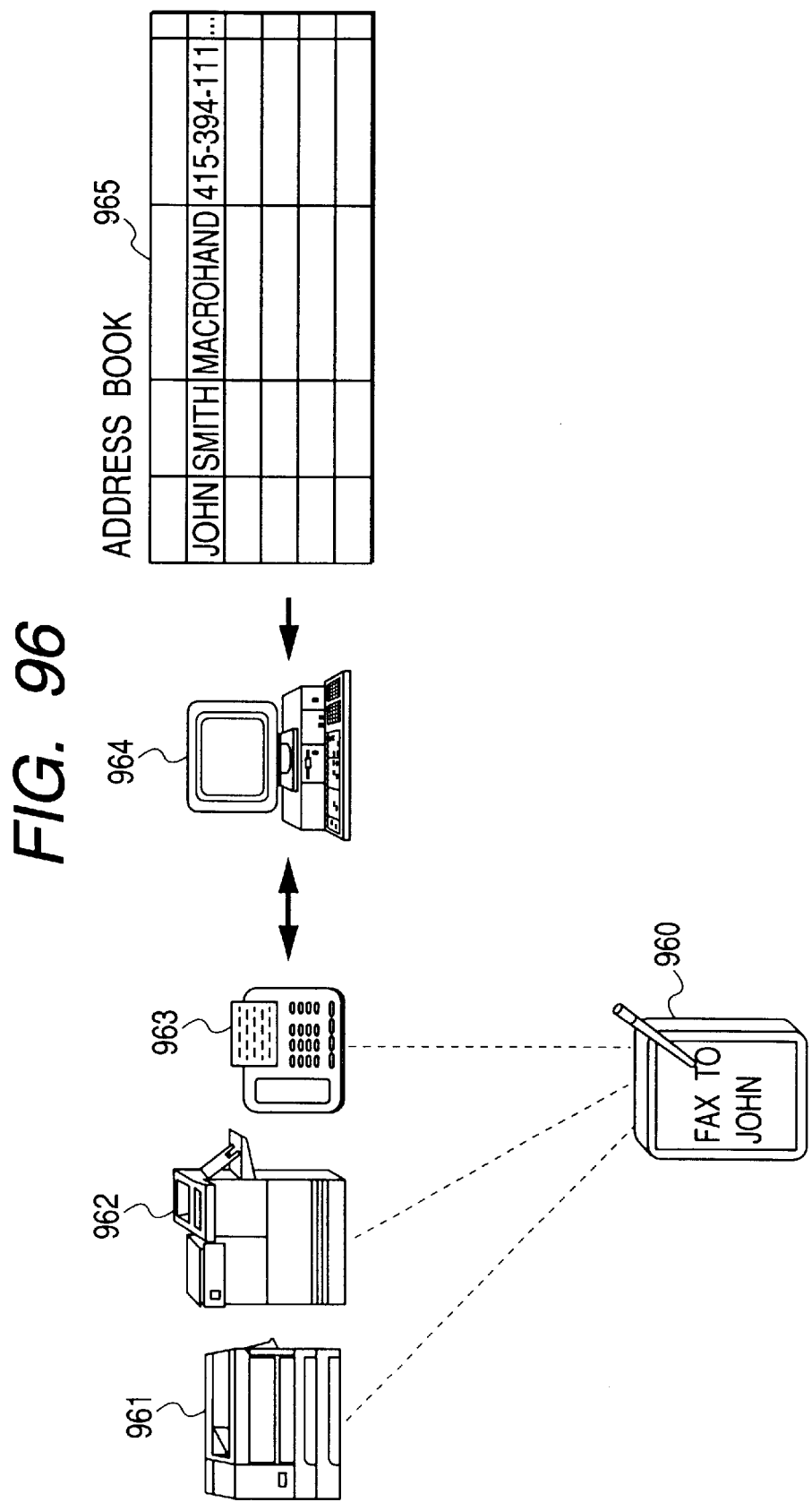
FIG. 96 is a diagram showing an example wherein a system is operated by a controller.

FIG. 96 is a diagram illustrating a thirty-second embodiment where a system is operated by a controller.

According to the system in this embodiment, devices and a controller directly or indirectly communicate with each other to specify the other.

Therefore, the following functions are provided:

(1) automatic specifying of a device; (2) acquisition of a device capability from the device; (3) a UI (User Interface) inherent to a device; (4) operation by voice; (5) common basic operation for all the devices; (6) a UI inherent to a user; and (7) a UI having a high degree of freedom in consonance with the status.

That is, (1) only when a controller faces an operating target device, it automatically recognizes the target device; (2) information for each device is acquired from the pertinent device via IrDA or via a wireless LAN; (3) a UI inherent to each device is provided from the information for the device; (4) an operation by voice can be performed; (5) common basic operation can be provided by using the same controller; (6) user identification information is employed to acquire necessary information for each user from the database or the address book and to implement the UI inherent to the user; and (7) the optimal UI is provided in consonance with the status.

In FIG. 96 since a controller 960 faces a facsimile machine 963, it acquires model identification information from the facsimile machine 963, and renders a UI, which corresponds to the model, active. Then, following the displayed "Fax to" character string "Fax to John" is input with a touch pen, and transmitted to the facsimile machine 963. John's facsimile number is read from an address book 965 in a personal computer 964, and a document set in the facsimile machine 963 or a document designated on a file in the personal computer 964 is transmitted to the fax number. The detailed processing will be described later.

[Thirty-third Embodiment]

Figure 97:
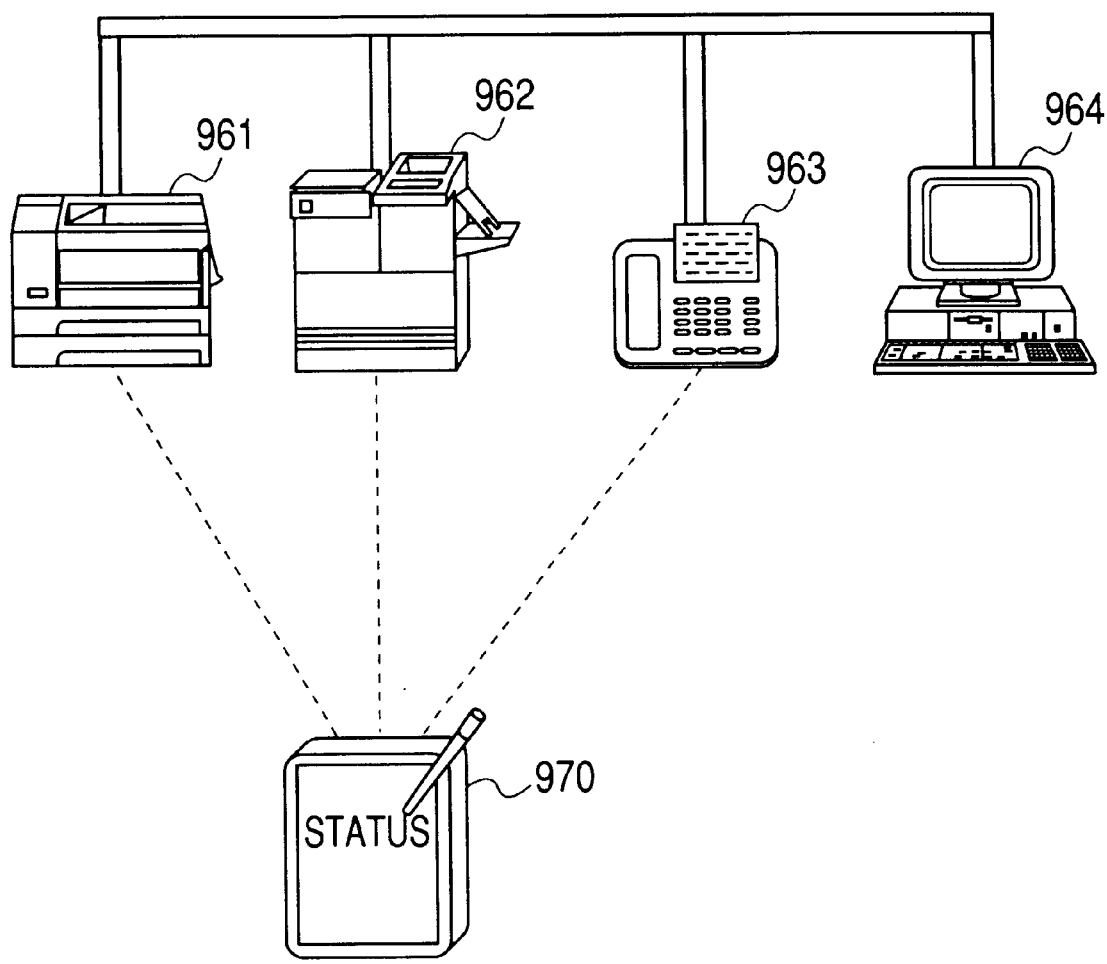
FIG. 97 is a diagram showing an example status monitor.

FIG. 97 is a diagram showing a status monitor.

In a system according to this embodiment, information of an apparatus that is other than the apparatus that a user directly operates can be referred to.

Therefore, the following functions can be provided: (1) remote and handy management; (2) specifying of automatic device; (3) common input/output for examining a status; (4) the same function as a portable telephone; (5) operation by voice; and (6) handling of all the devices that can input/output infrared rays.

That is, (1) required information can be acquired even from a remote area from a target device; (2) only when a controller faces the target device, it can automatically recognize the target device; (3) common basic operation can be provided by using the same controller; (4) the usability is enhanced by providing the portable telephone function for the controller; (5) operation by voice can be performed; and (6) the common protocol is employed to cope with all the devices that can input and output infrared rays.

In FIG. 97, a status monitor 970 selects a printer 961, a copier 962 or a facsimile machine 963, and character string "Status" is input with a touch pen and instructed. The status monitor 970 retrieves status information from the device that the status monitor 970 faces, so that the user of the status monitor 970 can confirm the statuses of the devices. Even when a personal computer 964 is located at an area where a command from the status monitor 970 can not reach, the status of the personal computer 964 is requested to a printer 961, which can communicate with the personal computer 964 via the network. Then, the status information can be retrieved to the status monitor 970 from the personal computer 964 via the network and the printer 961.

[Thirty-fourth Embodiment]

Figure 98:
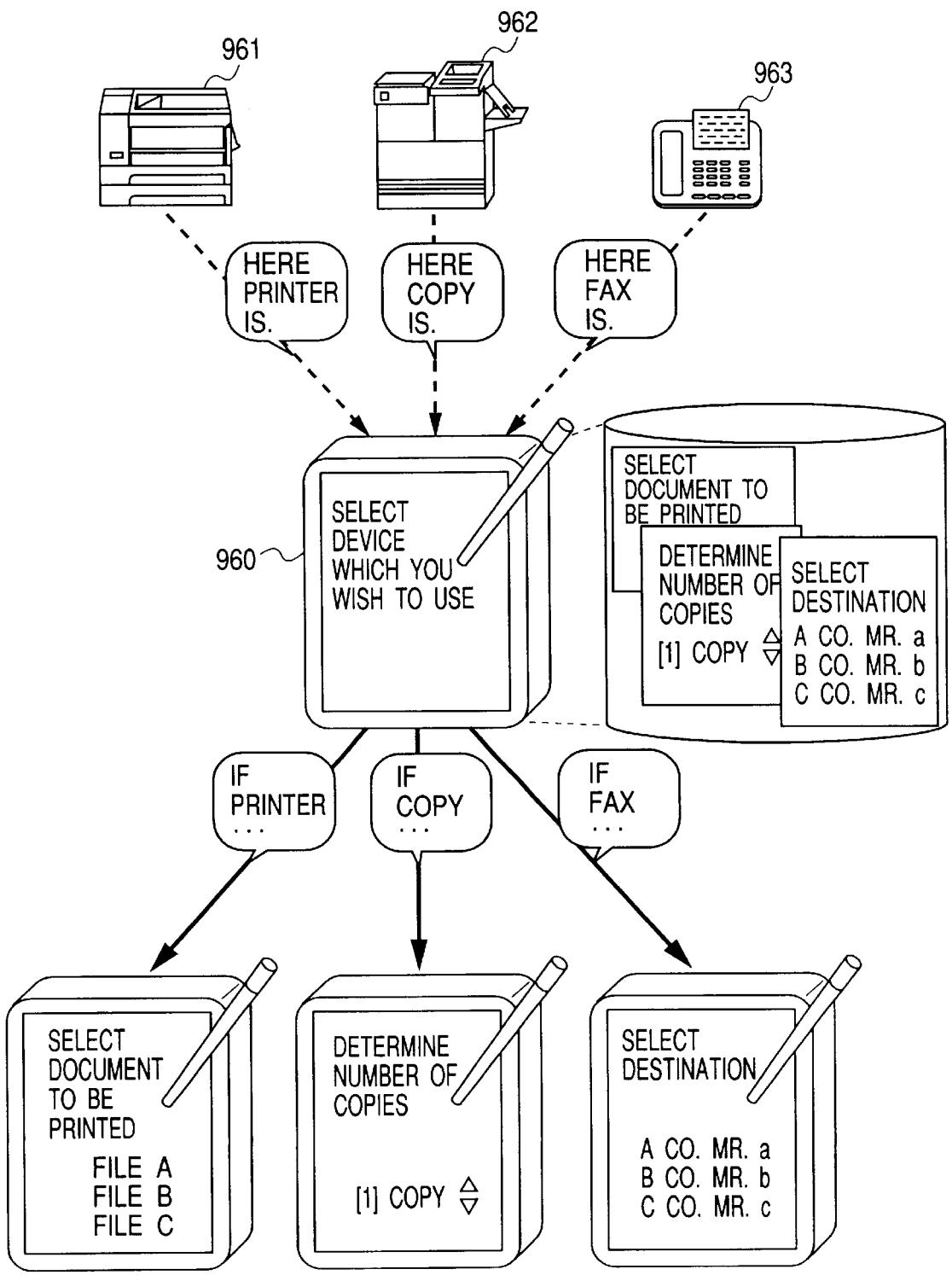
FIG. 98 is a diagram showing an example wherein a controller recognizes a target model and displays a corresponding UI.

FIG. 98 is a diagram showing an example where a controller 960 recognizes a target model, and a corresponding UI is read from the controller 960 and displayed. The controller 960, which does not face a target device, has a default screen on which message "Select a device which you would like to use" is displayed, as is shown in the center in FIG. 98.

The communication between the controller and the target model will now be described. It should be noted that (2) and (3) are not necessarily required. When, for example, in (4) a target model generates a signal to the controller at predetermined intervals, the same effect can be obtained. The positional relationship between the controller 960 and a target model may be employed to determine that the controller 960 selects the target model. Further, in (4) the controller 960 may identify a target model by examining the shape of the model, or by reading the bar code attached to the target model. In other words, only the essential portion is shown in FIG. 98.

(1) A user directs the controller 960 to a target model.

(2) The user touches a touch panel on the controller 960 in order to determine the timing at which the controller 960 transmits to the target model a target model identification signal request signal. Or, the controller 960 is set in advance to transmit a target model identification signal request signal at a predetermined interval.

(3) The controller 960 transmits a target model identification signal request signal to the target model.

(4) A target model identification signal is transmitted upon the receipt of the target model identification signal request signal from the controller 960, or according to the setup that a target model identification signal request signal at a specified interval.

(5) The controller 960 that receives the target model identification signal determines a UI in consonance with a target model indicated by the signal, and displays a corresponding UI internally stored. In this case, the identification signal is provided for each model; however, when an identification signal is provided for each device, a different UI can be employed for each of devices though they are the same model.

Figure 99:
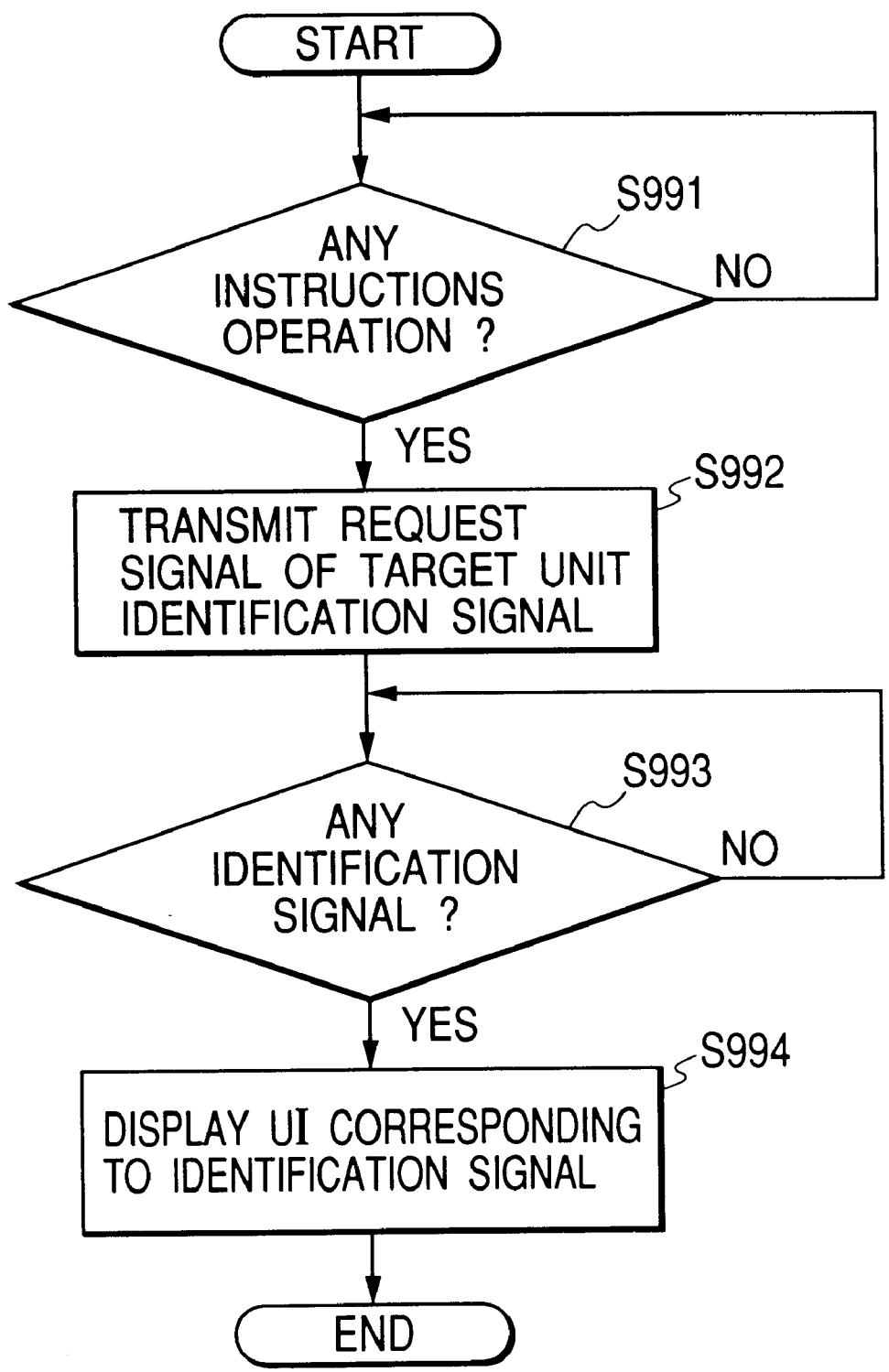
FIG. 99 is a flowchart showing the processing performed by a controller for the example wherein the controller recognizes a target model and displays a corresponding UI.

FIG. 99 is a flowchart showing the processing performed by the controller 960 when the controller recognizes a target model, and reads and displays a corresponding UI. The processing performed by the controller 960 will now be described.

At step S991 the controller 960 waits until an instruction from a user is input. At step S992 a target model identification signal request signal is transmitted by an infrared ray communication method in order to obtain a target model identification signal from the target model. At step S993 the controller 960 waits until the target model outputs a target model identification signal. At step S994, the UI corresponding to the received target model identification signal is acquired from internal memory and is displayed.

Figure 100:
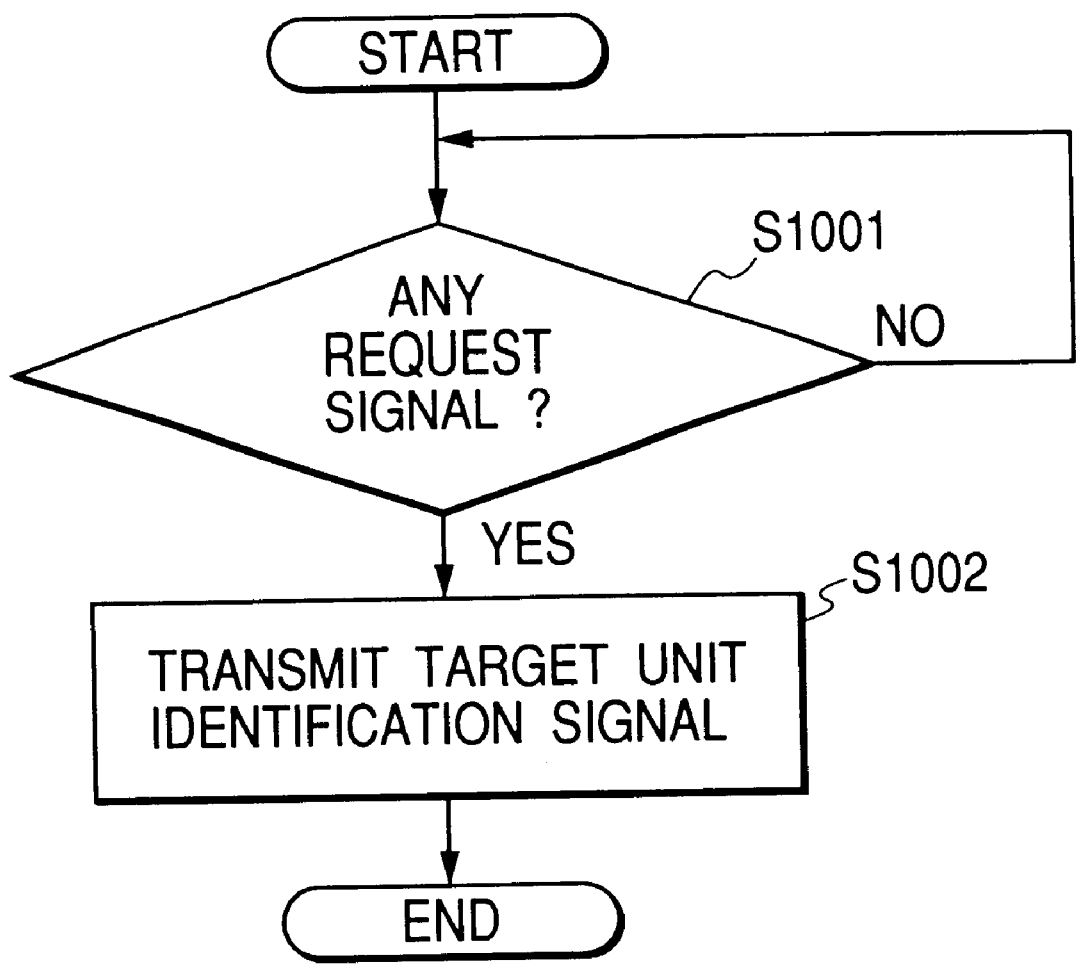
FIG. 100 is a flowchart showing the processing performed by a target model for the example wherein the controller recognizes a target model and displays a corresponding UI.

FIG. 100 is a flowchart showing the processing performed by a target model when the controller 960 recognizes a target model, and reads and displays a corresponding UI. The processing performed by the target model will now be described.

At step S1001, the target model waits for a request signal from the controller 960. At step S1002 the target model transmits a target model identification signal by an infrared communication method, etc.

[Thirty-fifth Embodiment]

Figure 101:
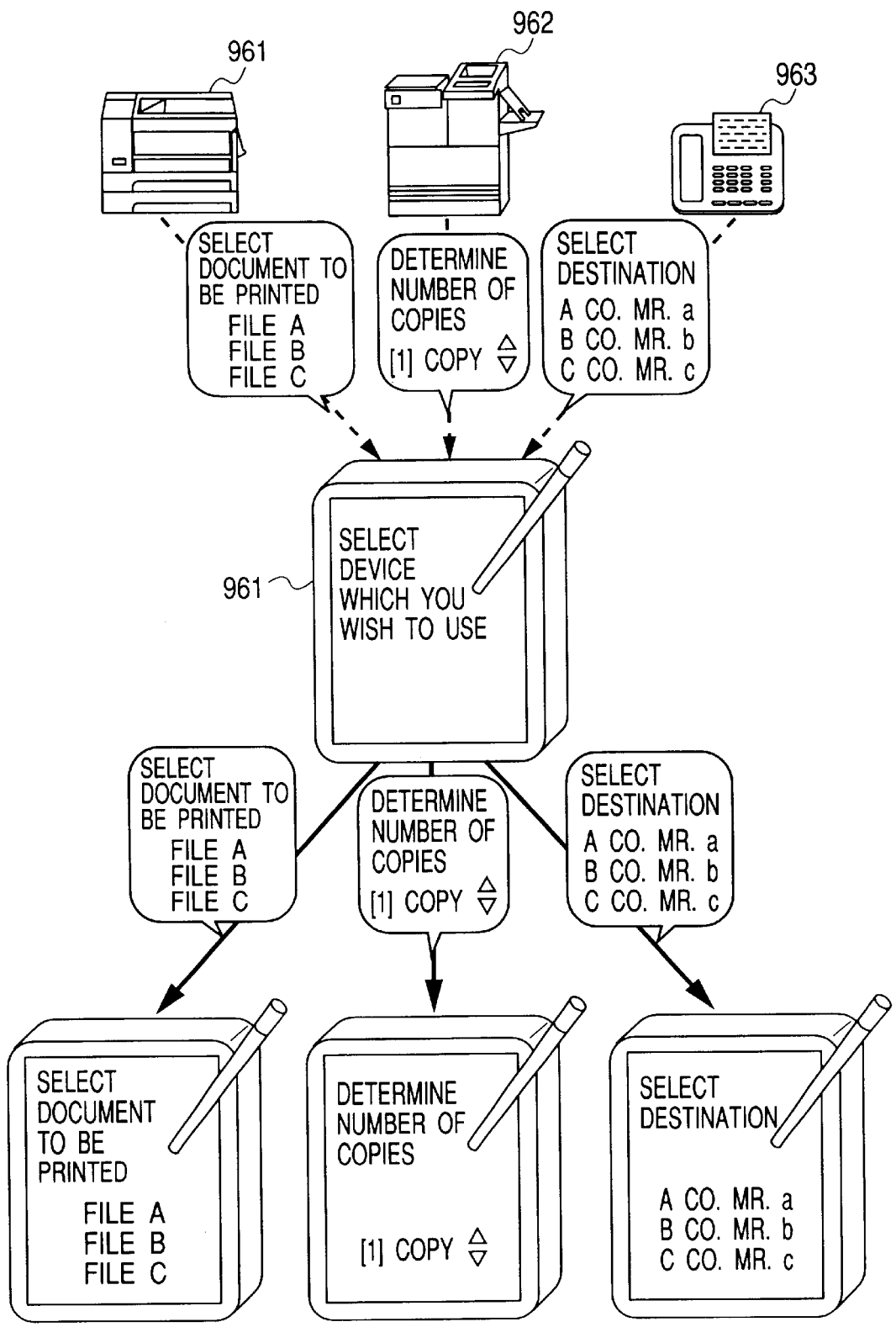
FIG. 101 is a diagram showing an example wherein a controller receives a UI from a target model and displays it.

FIG. 101 is a diagram showing an example where a controller 960 receives a UI from a target model and displays it. The controller 960, which does not face a target device, has a default screen, as is shown in the center in FIG. 101.

The communication between the controller and the target model will now be described. It should be noted that (2) and (3) are not necessarily required. When, for example, in (4) a target model generates a signal to the controller at predetermined intervals, the same effect can be obtained. The positional relationship between the controller 960 and a target model may be employed to determine that the controller 960 selects the target model. Further, in (4) the controller 960 may identify a target model by examining the shape of the model, or by reading the bar code attached to the target model. In other words, only the essential portion is shown in FIG. 101.

(1) A user directs the controller 960 to a target model.

(2) The user touches a touch panel on the controller 960 in order to determine the timing at which the controller 960 transmits a UI request signal to the target model. Or, the controller 960 is set in advance to transmit a UI request signal at a predetermined interval.

(3) The controller 960 transmits a UI request signal to the target model.

(4) A UI signal is transmitted upon the receipt of the UI request signal from the controller 960, or according to the setup that a UI request signal at a specified interval.

(5) The controller 960 that receives the UI signal displays the UI.

Figure 102:
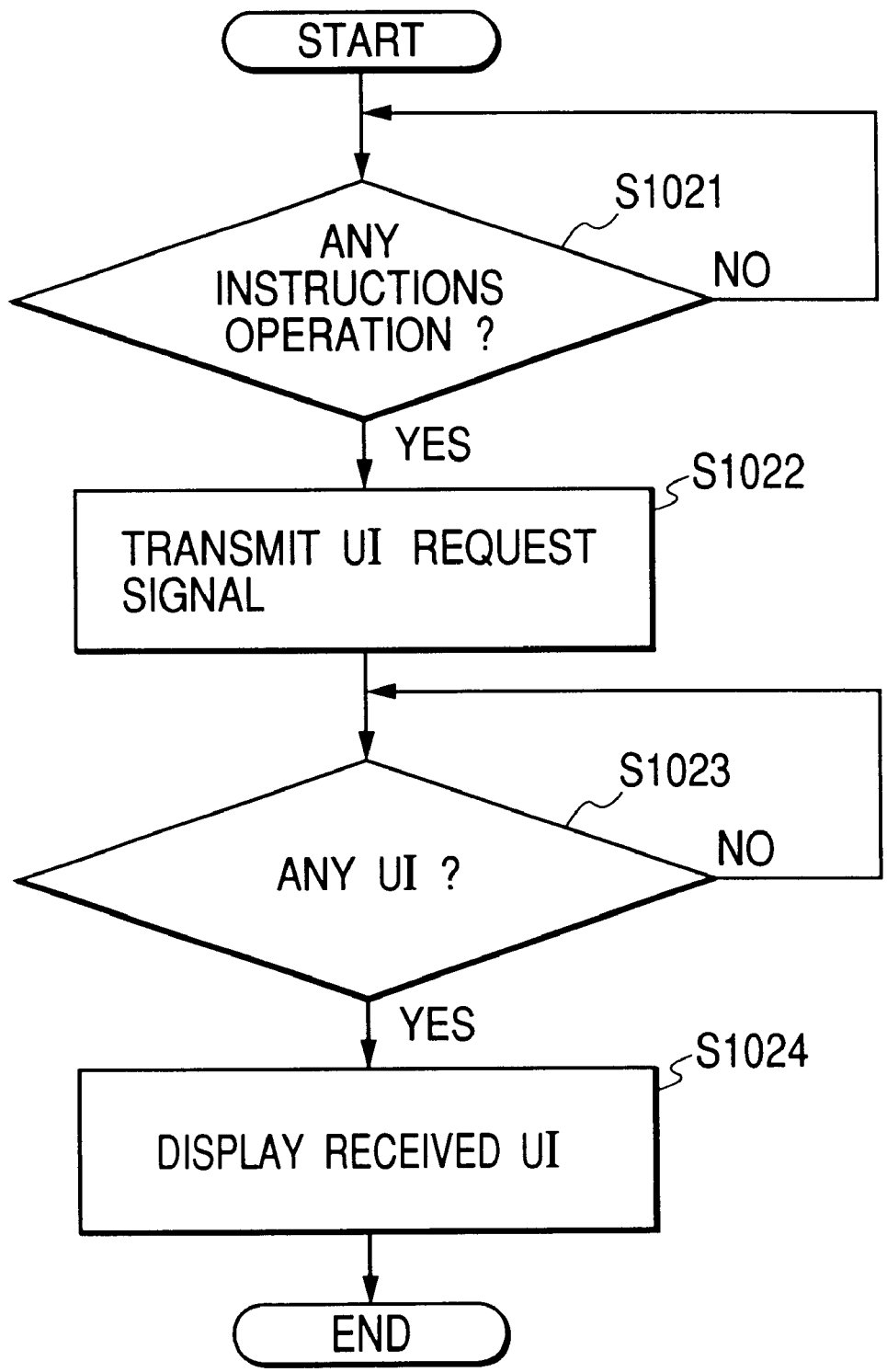
FIG. 102 is a flowchart showing processing performed by a controller for the example wherein the controller receives a UI from a target model and displays it.

FIG. 102 is a flowchart showing the processing performed by the controller 960 when the controller receives a UI from a target model and displays it. The processing performed by the controller 960 will now be described.

At step S1021 the controller 960 waits until an instruction from a user is input. At step S1022 a UI request signal is transmitted by an infrared ray communication method in order to obtain a UI signal from the target model. At step S1023 the controller 960 waits until the target model outputs a UI signal. at step S1024, the received UI is displayed.

Figure 103:
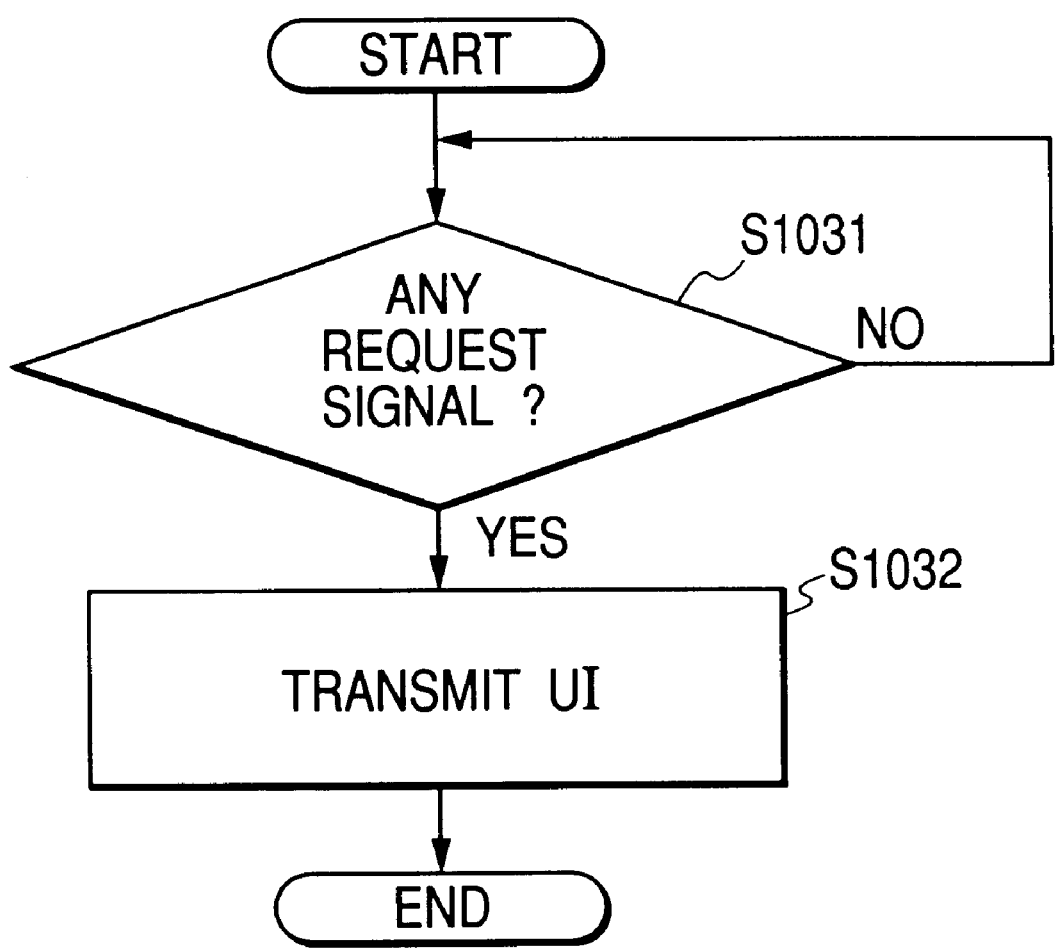
FIG. 103 is a flowchart showing processing performed by a target model for the example wherein the controller receives a UI from the target model and displays it.

FIG. 103 is a flowchart showing the processing performed by a target model when the controller 960 receives a UI from a target model and displays it. The processing performed by the target model will now be described.

At step S1031, the target model waits for a request signal from the controller 960. At step S1032 the target model transmits a UI signal by an infrared communication method, etc.

[Thirty-sixth Embodiment]

Figure 104:
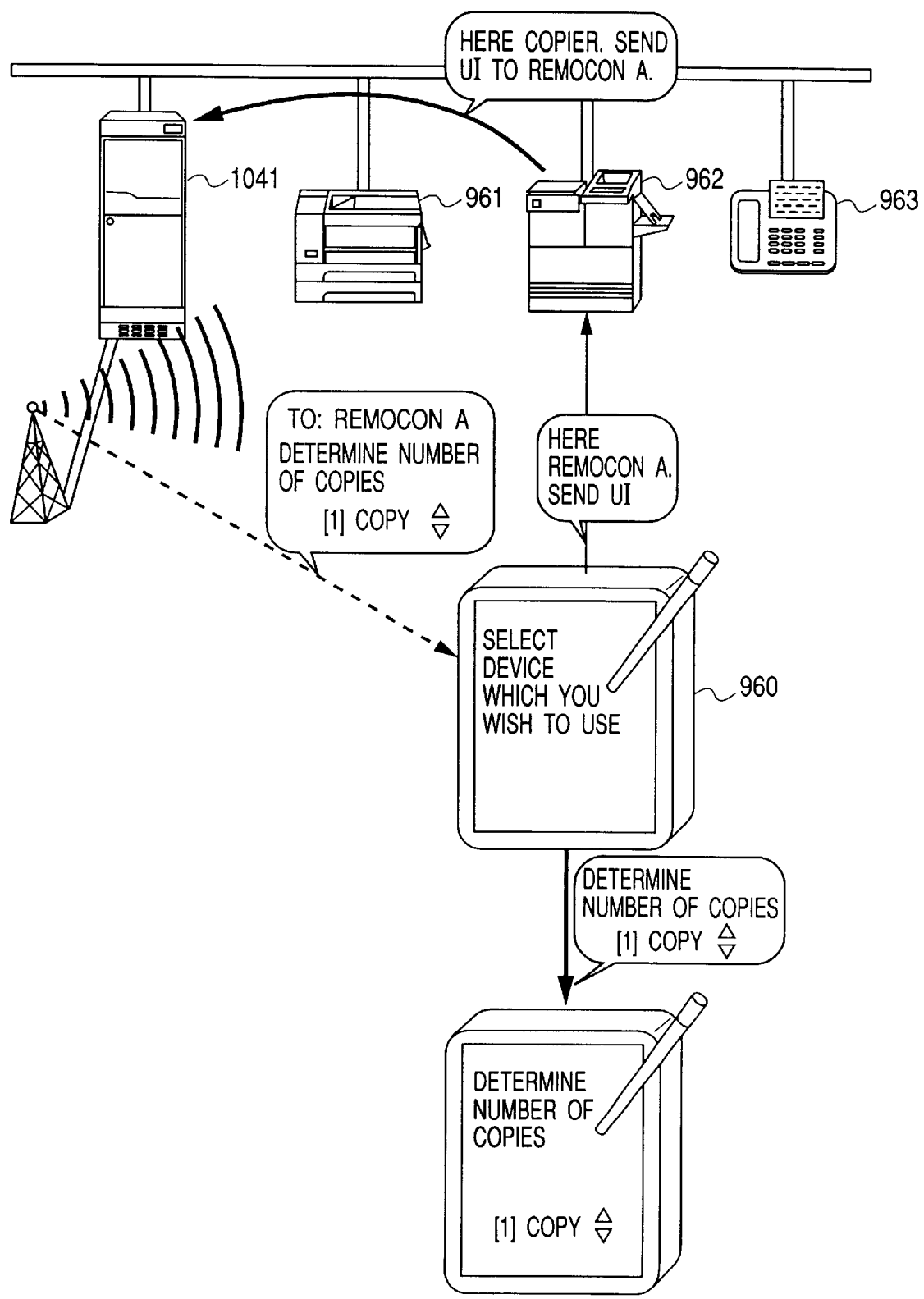
FIG. 104 is a diagram showing an example wherein a controller receives a UI from a target model via a wireless LAN rather than directly, and displays it.

FIG. 104 is a diagram showing an example where UIs of devices are stored in a wireless LAN server 1041 and when a controller 960 faces a copier 962 as a target model and requests a UI, a UI is transmitted, upon a request from the copier 962, from the wireless LAN server 1041 to the controller 960, and is displayed.

The controller 960, which does not face a target device, has a default screen, as is shown in the center in FIG. 104.

The communication between the controller and the target model will now be described.

(1) A user directs the controller 960 to a target model (a copier 962).

(2) The user touches a touch panel on the controller 960 in order to determine the timing at which the controller 960 transmits a UI request signal to the target model. Or, the controller 960 is set in advance to transmit a UI request signal at a predetermined interval.

(3) The controller 960 transmits controller identification data (controller A) to identify itself and a UI request signal to the target model.

(4) When the target model receives the controller identification data and the UI request signal from the controller, the target model transmits, to the server 1041 that manages the target model, the controller identification data (controller A) and target model identification data (copier) to identify itself, and requests the transmission of the UI.

(5) The server 1041 transmits the UI of the target model, which is indicated by the target model data, via a wireless LAN to the controller 960, which is indicated by the controller identification data.

(6) The controller 960 receives the UI addressed to itself, and displays the UI.

Figure 105:
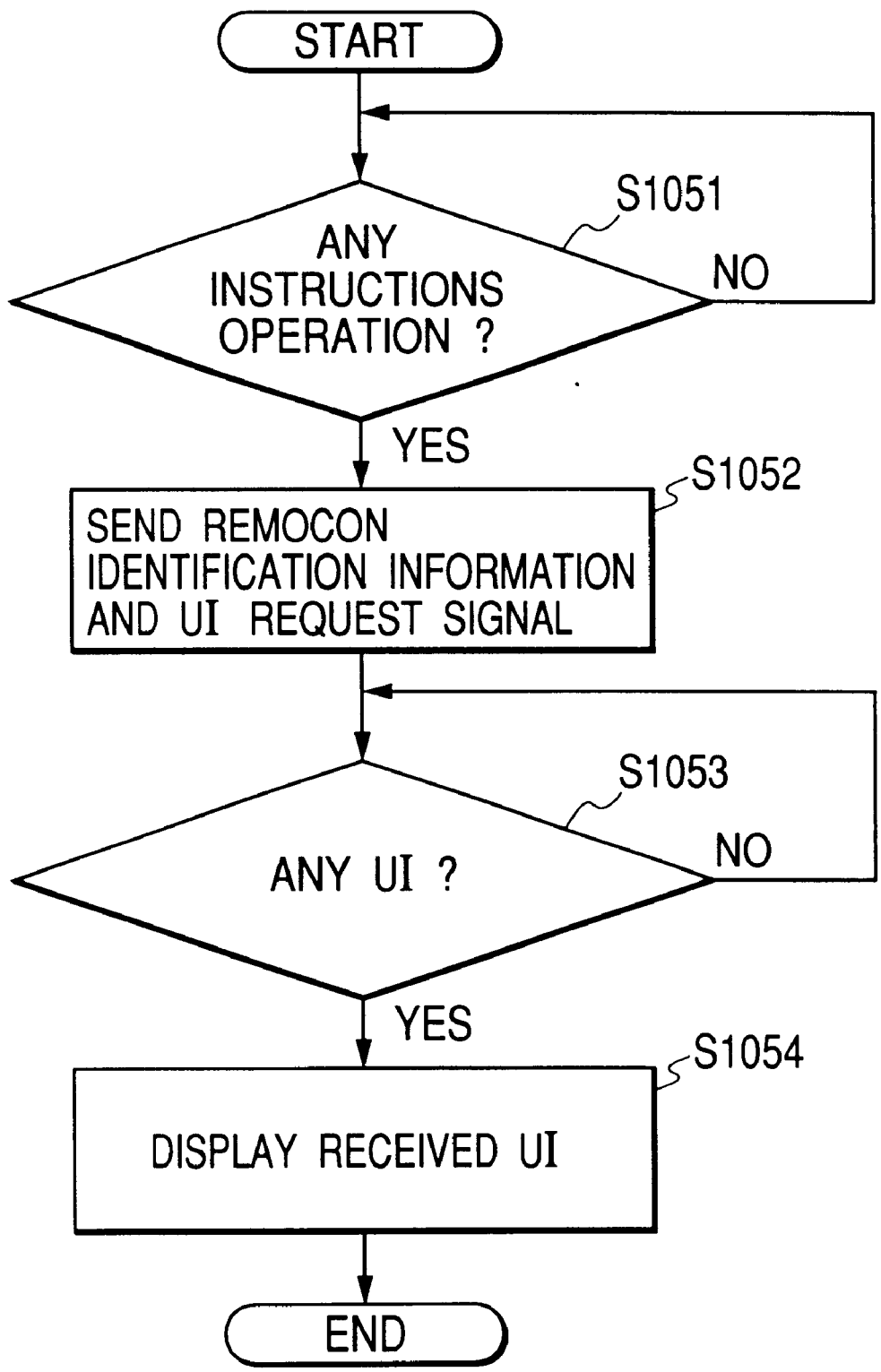
FIG. 105 is a flowchart showing the processing performed by a controller for the example wherein the controller receives a UI via a wireless LAN and displays it.

FIG. 105 is a flowchart showing the processing performed by the controller 960 when the controller receives a UI via the wireless LAN, instead of directly receiving it from a target model, and displays it.

The processing performed by the controller 960 will now be described. At step S1051 the controller 960 waits until an instruction from a user is input. At step S1052 a UI request signal for requesting a UI and controller identification data for identifying a controller are transmitted to the target model by an infrared ray communication method. At step S1053 the controller 960 waits until a UI signal is output by any device. At step S1054, the received UI is displayed.

Figure 106:
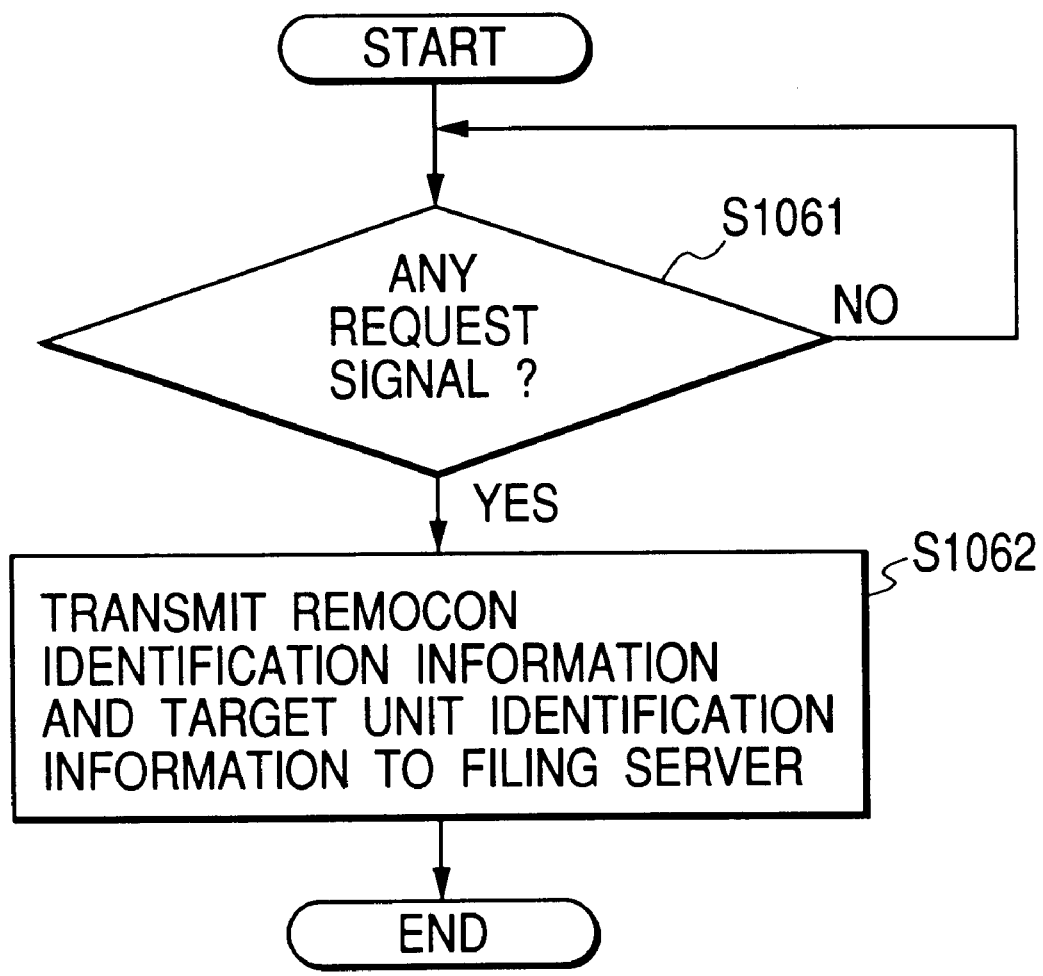
FIG. 106 is a flowchart showing the processing performed by a target model for the example wherein the controller receives a UI via a wireless LAN and displays it.

FIG. 106 is a flowchart showing the processing performed by the target model when the controller receives a UI via the wireless LAN, instead of directly receiving it from a target model, and displays it. The processing performed by the controller 960 will now be described.

At step S1061 the controller 960 waits until an instruction from a user is input. At step S1062 controller identification data received from the controller 960 and the target model identification data are transmitted to the server 1041, and issuance of the UI is requested.

Figure 107:
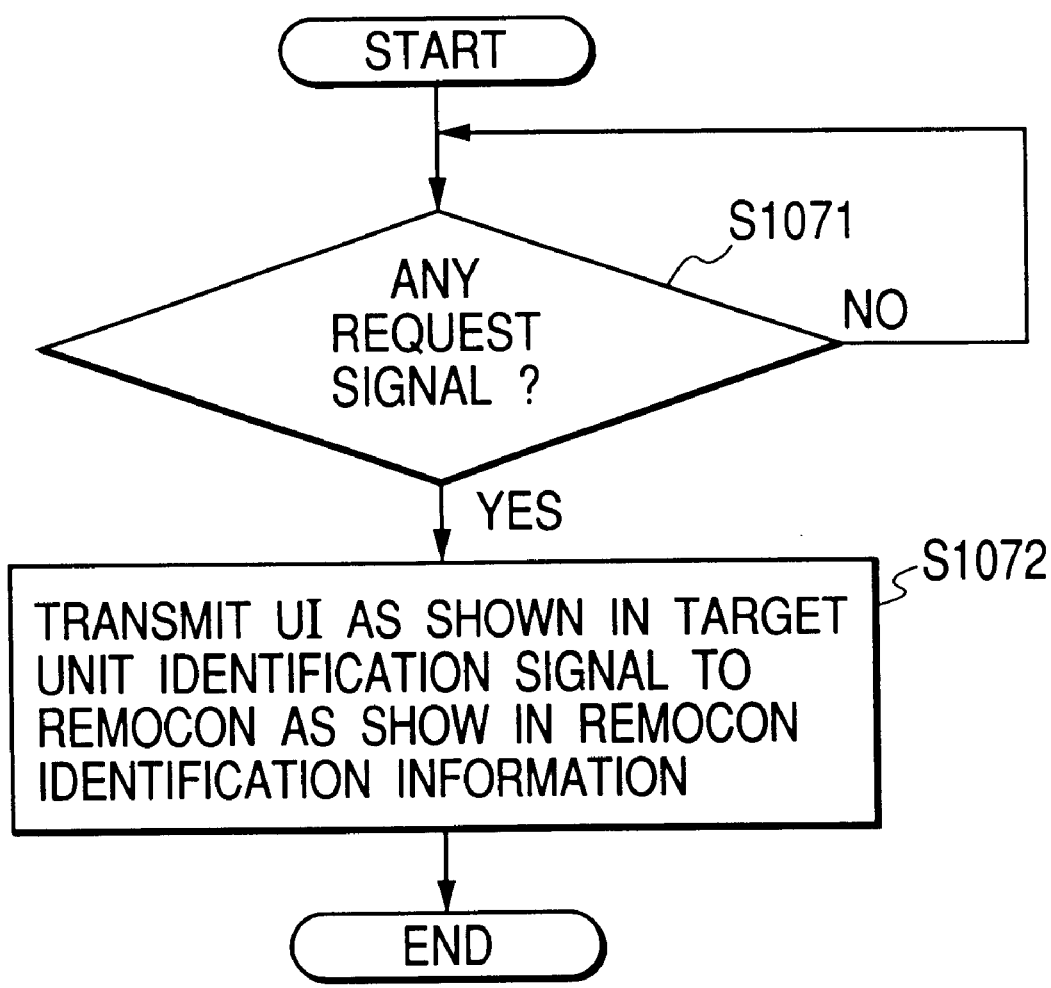
FIG. 107 is a flowchart showing the processing performed by a server for the example wherein the controller receives a UI via a wireless LAN and displays it.

FIG. 107 is a flowchart showing the processing performed by the server 1041 when the controller receives a UI via the wireless LAN, instead of directly receiving it from a target model, and displays it. The processing performed by the server 1041 will now be described.

At step S1071 the server 1041 waits until a UI transmission request signal is transmitted from the target model. At step S1072 the UI of the model, which is indicated by the target model identification data, is transmitted to the controller 960, which is indicated by identification data received from the target model.

[Thirty-seventh Embodiment]

Figure 108:
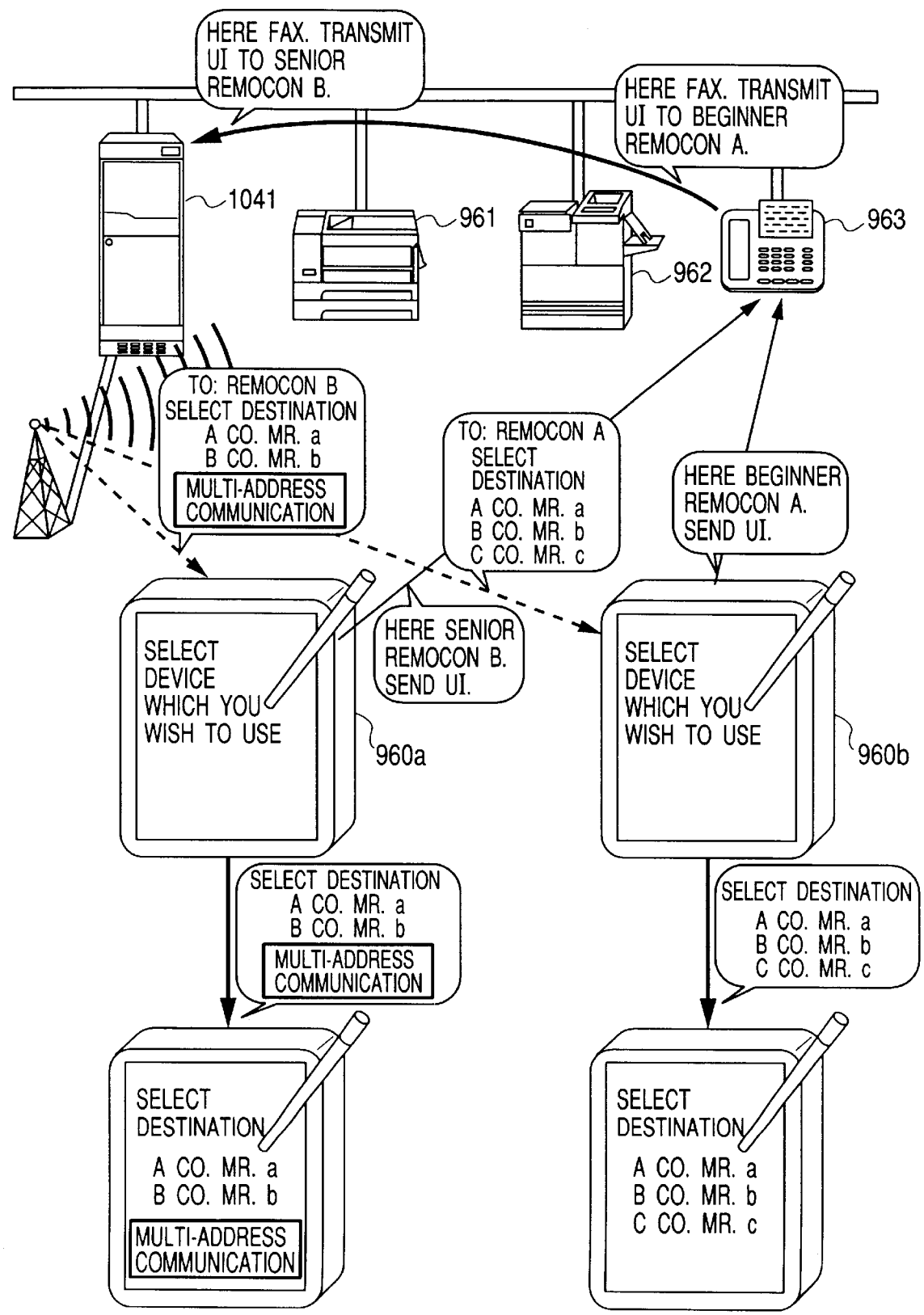
FIG. 108 is a diagram showing an example wherein via a wireless LAN a controller receives a different UI for each user and displays it.

FIG. 108 is a diagram showing an example where UIs of devices are stored in a wireless LAN server 1041 and when a controller 960a or 960b faces a facsimile machine 963 as a target model and requests a UI, a different UI for each user is transmitted, upon a request from the facsimile machine 963, from the wireless LAN server 1041 to the controller 960a or 960b, and is displayed.

The controller 960a or 960b, which does not face a target device, has a default screen, as is shown in the center in FIG. 108.

The communication between the user, the controller 960a or 960b and the target model will now be described.

(1) A user directs the controller 960a or 960b to a target model.

(2) The user touches a touch panel on the controller 960a or 960b in order to determine the timing at which the controller 960a or 960b transmits a UI request signal to the target model. Or, the controller 960a or 960b is set in advance to transmit a UI request signal at a predetermined interval.

(3) The controller 960a or 960b transmits controller identification data (controller A or controller B) to identify itself, user identification data (a senior or a beginner) for identifying the user, and a UI request signal to the target model.

(4) When the target model receives, from the controller 960a or 960b, the controller identification data, the user identification data and the UI request signal, the target model transmits, to the server 1041 that manages the target model, the received controller identification data, the user identification data and the target model identification data to identify itself.

(5) The server 1041 transmits the UI of the target model, which is indicated by the user identification data and the target model data, via a wireless LAN to the controller 960a or 960b, which is indicated by the controller identification data. In the example in FIG. 108, a UI that is used for multi-address communication, which is difficult for beginners, is transmitted only to seniors, not to beginners.

(6) The controller 960a or 960b receives the UI addressed to itself, and displays the UI.

In the above example, the controller transmits the level data for a user is transmitted as user identification data. However, the controller may transmit information, such as the names of users, to identify individual users, and the target device or the server may identify the level of a user from the received identification data. An independent UI may be prepared for each user.

The above example has been employed only for the UI. The contents of urgent mail addressed to the user or the schedule to be immediately informed are collected in, for example, the server, and they may be included in the UI while the user identification data that differs among the users is referred to, and the resultant data can be transmitted to the controller.

Figure 109:
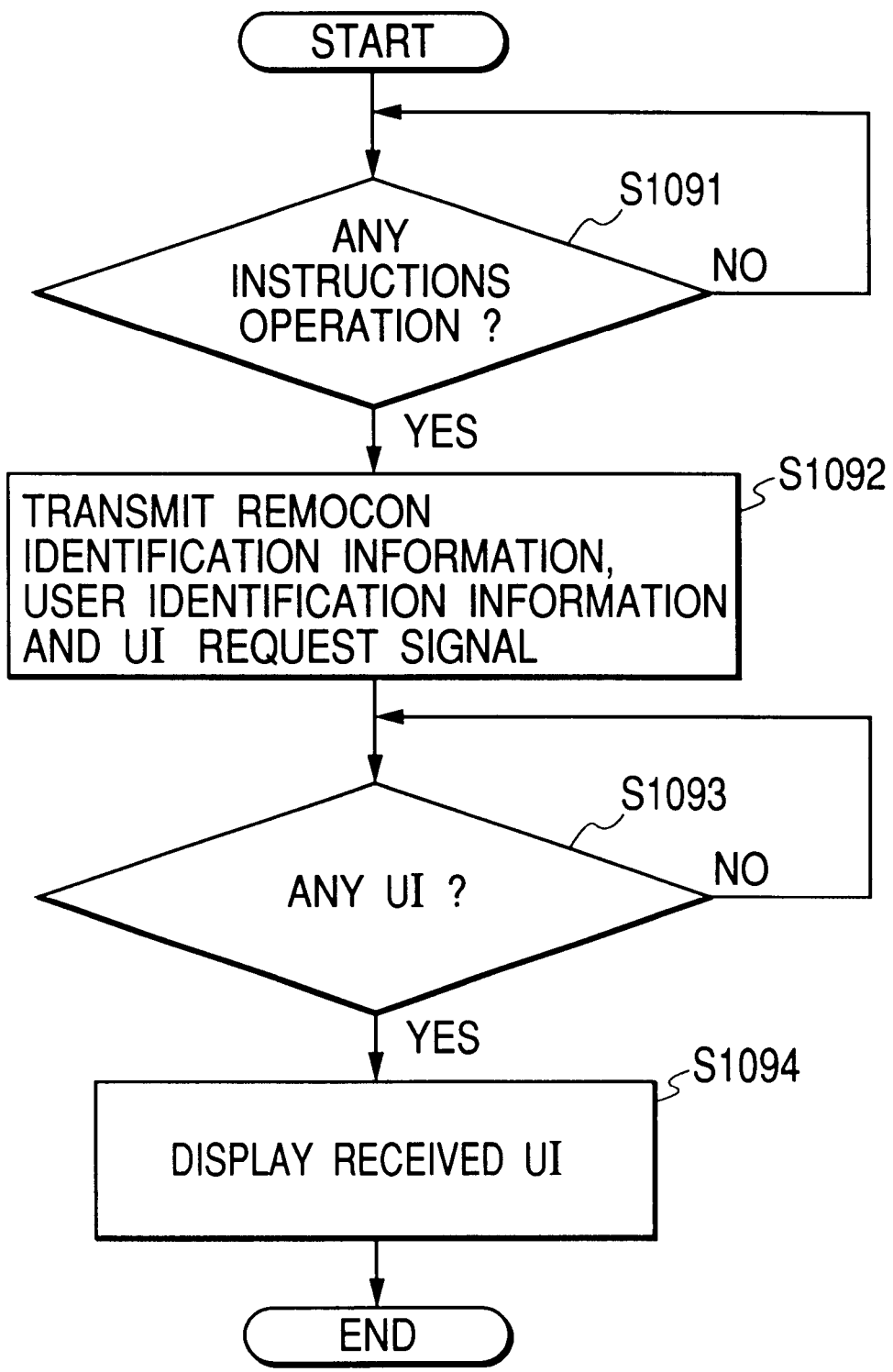
FIG. 109 is a flowchart showing the processing performed by a controller for the example wherein via a wireless LAN a controller receives a different UI for each user and displays it.

FIG. 109 is a flowchart showing the processing performed by the controller 960 when the controller receives a different UI for each user, via the wireless LAN, instead of directly receiving it from a target model, and displays it. The processing performed by the controller 960 will now be described.

At step S1091 the controller 960a or 960b waits until an instruction from a user is input. At step S1092 a UI request signal for requesting a UI, controller identification data for identifying a controller, the user identification data for identifying the user are transmitted to the target model by an infrared ray communication method. At step S1093 the controller 960a or 960b waits until a UI signal is output by any device. At step S1094, the received UI is displayed.

Figure 110:
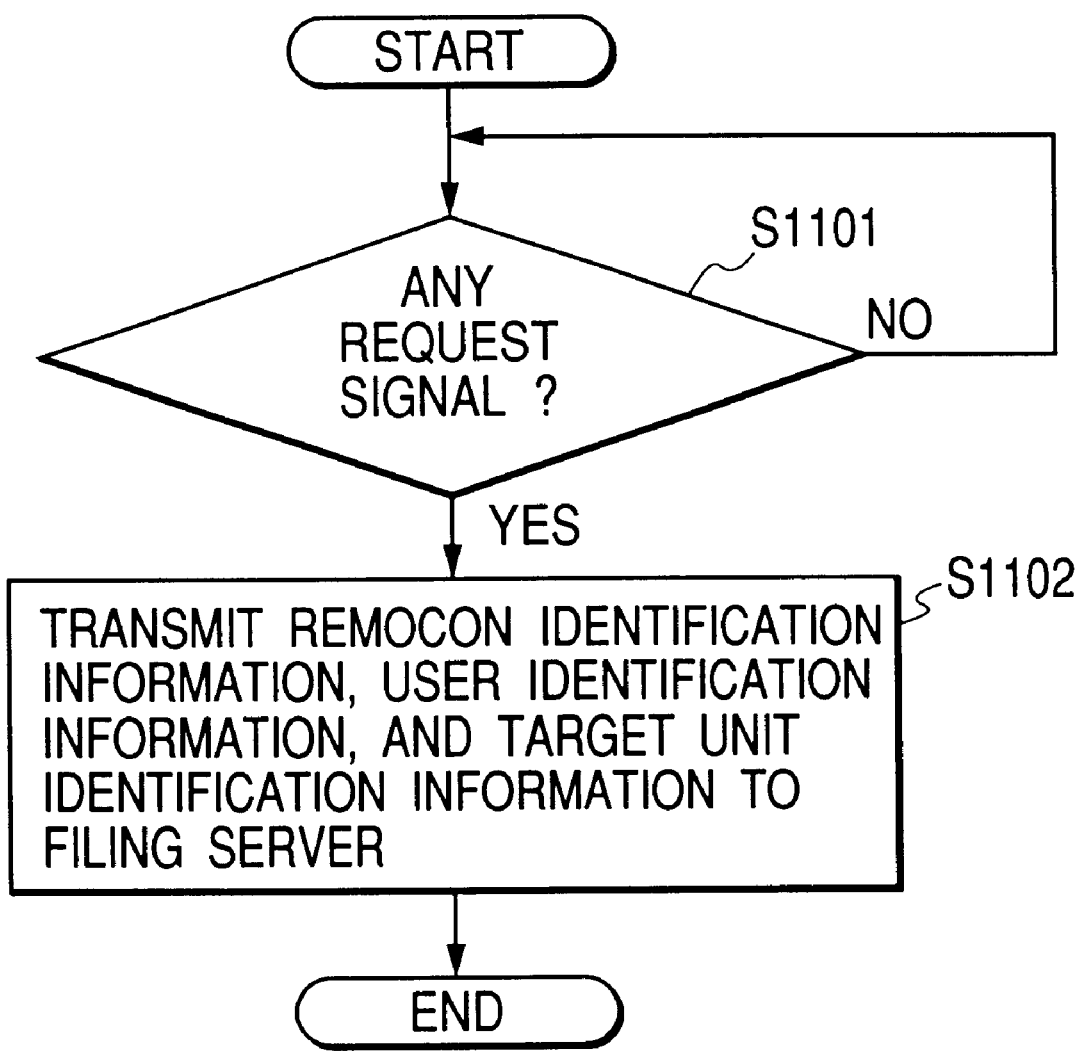
FIG. 110 is a flowchart showing the processing performed by a target model for the example wherein via a wireless LAN a controller receives a different UI for each user and displays it.

FIG. 110 is a flowchart showing the processing performed by the target model when the controller receives a different UI for each user, via the wireless LAN, instead of directly receiving it from a target model, and displays it. The processing performed by the controller 960a or 960b will now be described.

At step S1101 the controller 960a or 960b waits until an instruction from a user is input. At step S1102 the controller identification data received from the controller 960, the user identification data, and the target model identification data are transmitted to the server 1041, and the issuance of the UI is requested.

Figures 111, 112:
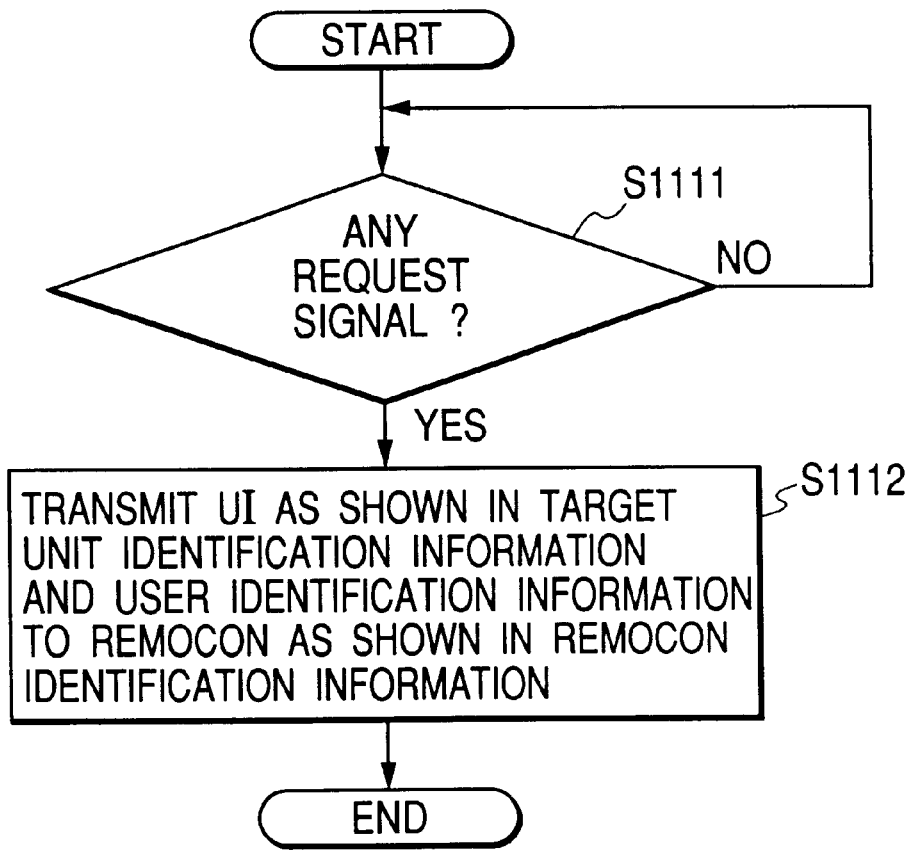
FIG. 111 is a flowchart showing the processing performed by a server for the example wherein via a wireless LAN a controller receives a different UI for each user and displays it.
FIG. 112 is a table showing a UI determined in consonance with a target model and user identification information.

FIG. 111 is a flowchart showing the processing performed by the server 1041 when the controller receives a different UI for each user via the wireless LAN, instead of directly receiving it from a target model, and displays it. FIG. 112 is a table showing UIs that are determined by the target model and user identification data. The processing performed by the server 1041 will now be described.

At step S1111 the server 1041 waits until a UI transmission request signal is transmitted from the target model. At step S1112 in accordance with the definitions in FIG. 112, the UI that corresponds to the target model identification data and the user identification data is transmitted to the controller 960a or 960b, which is indicated by identification data received from the target model.

[Thirty-eighth Embodiment]

Figure 113:
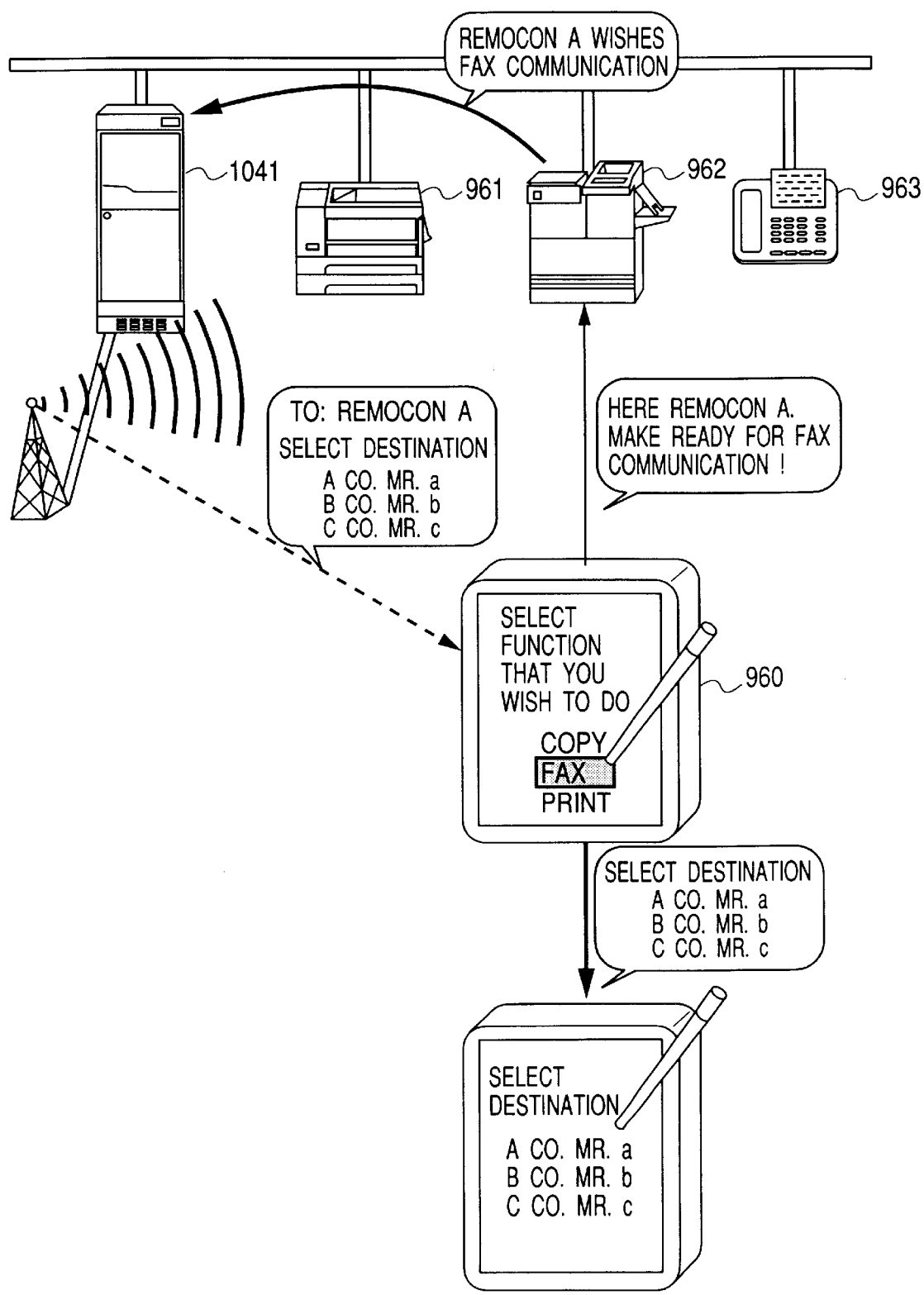
FIG. 113 is a diagram illustrating an example wherein a model in front that is to be operated performs a function that the model does not have.
Figure 114:
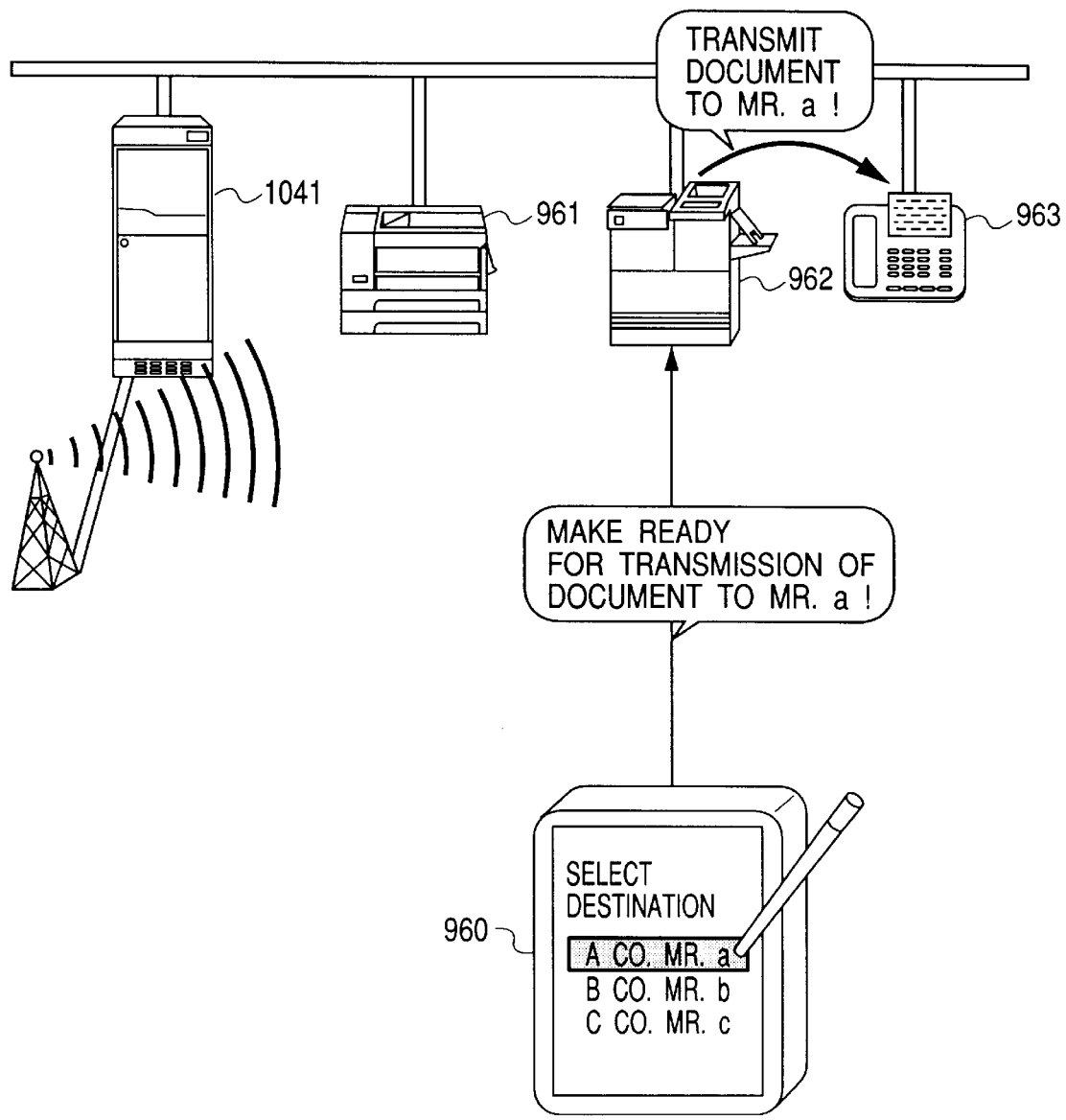
FIG. 114 is a diagram illustrating an example wherein a model in front that is to be operated performs a function that the model does not have.

FIGS. 113 and 114 are diagrams illustrating an example where provided is a function that a model to be operated in front does not have. The communication between a user, a controller and a target model will now be described.

(1) A user faces a controller 960 to a target model, and designated a desired function.

(2) The target model receives a request from the controller 960 and transmits it to a server 1041.

(3) The server 1041 transmits a UI of a model that corresponds to the requested function.

(4) The controller 960 displays a received UI.

(5) The user performs operation according to an instruction of the UI. In this example, the user sets a document to be transmitted to a copier 962 in front, and the controller 960 instructs the destination to execute the operation.

(6) The target model handles what it can do and requests another apparatus to process what it can not do. In this case, since the copier 962 reads a document but can not facsimile the document, it transmits to a facsimile machine 963 the document data and the contents of the operation instruction.

(7) The facsimile machine 963 transmits by fax the received document data to the instructed destination.

In the above example, to determine an apparatus that the copier 962 asks for the function that the copier 962 can not perform, each apparatus may have knowledge for other apparatuses. Or, the apparatuses on the network may be queried if they can execute the function, and according to the result, the apparatus to be asked for may be determined. Or, an inquiry may be issued to the server 1041 that has knowledge-of the models that correspond to functions.

[Thirty-ninth Embodiment]

Figure 115:
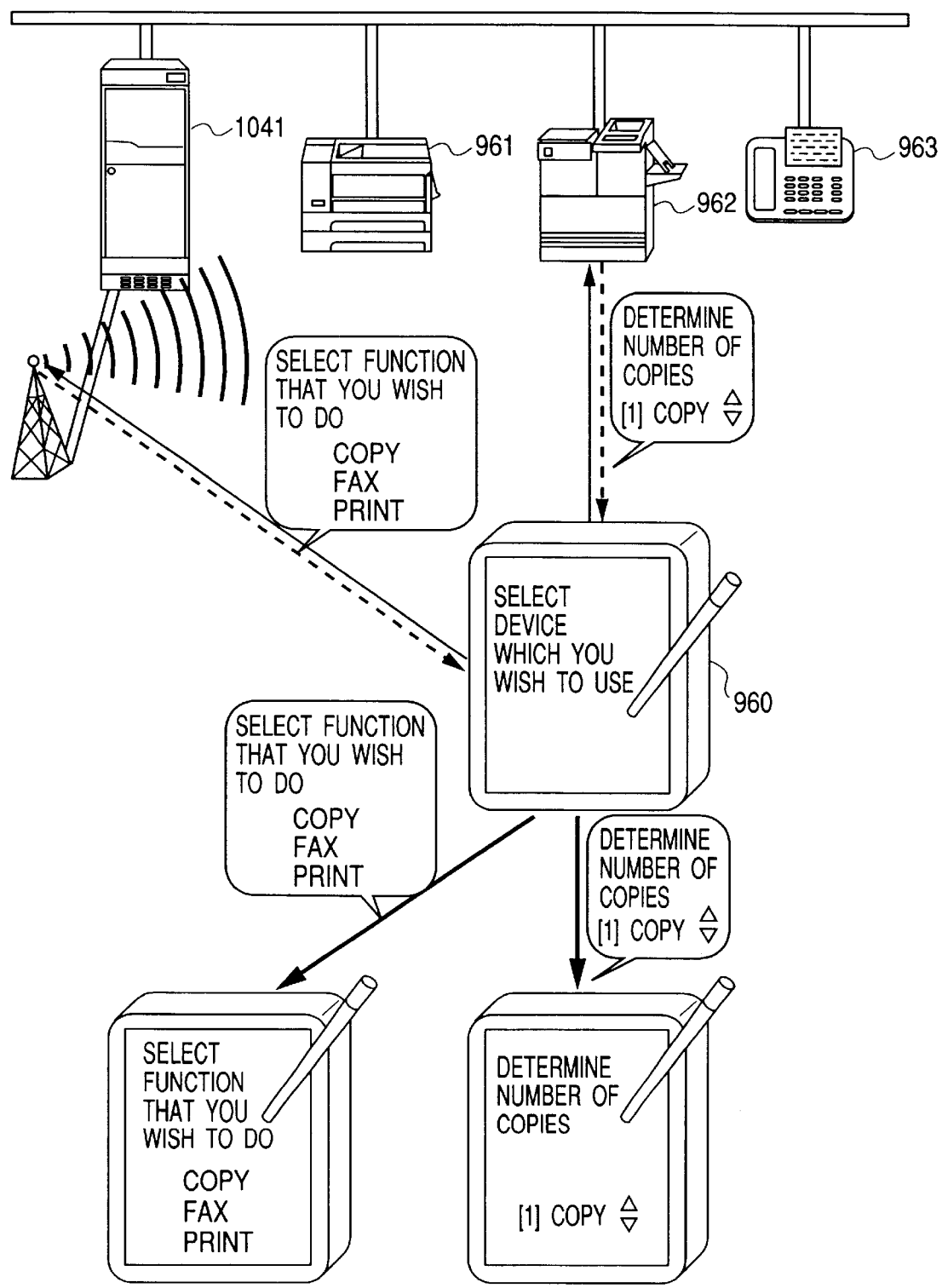
FIG. 115 is a diagram showing an example performed when communication can not be performed directly with a model in front that is to be operated.

FIG. 115 is a diagram illustrating an example where, when a controller can not directly communicate with a target model in front because an obstacle is present in route between the target model and the controller, indirect communication is attempted using another route.

The communication between the user, the controller and the target model will now be described. It should be noted that (2) and (3) are not necessarily required. When, for example, in (4) a target model generates a signal to the controller at predetermined intervals, the same effect can be obtained. In other words, only the essential portion is shown in FIG. 115.

(1) A user directs the controller 960 to a target model.

(2) The user touches a touch panel on the controller 960 in order to determine the timing at which the controller 960 transmits a UI request signal to the target model. Or, the controller 960 is set in advance to transmit a UI request signal at a predetermined interval.

(3) The controller 960 transmits a UI request signal to the target model.

(4) A UI signal is transmitted upon the receipt of the UI request signal from the controller 960, or according to the setup that a UI request signal at a specified interval.

(5) The controller 960 that receives the UI signal displays the UI.

(6) If a UI is not transmitted following a predetermined period of time after the UI request signal was transmitted, or if a UI is not transmitted during a period longer than a predetermined interval, which is set for transmission of UIs, another route is employed to transmit a UI request signal. In this example, when infrared communication can not be performed, communication through a wireless LAN is attempted.

(7) The UI acquired across the LAN is displayed.

Figure 116:
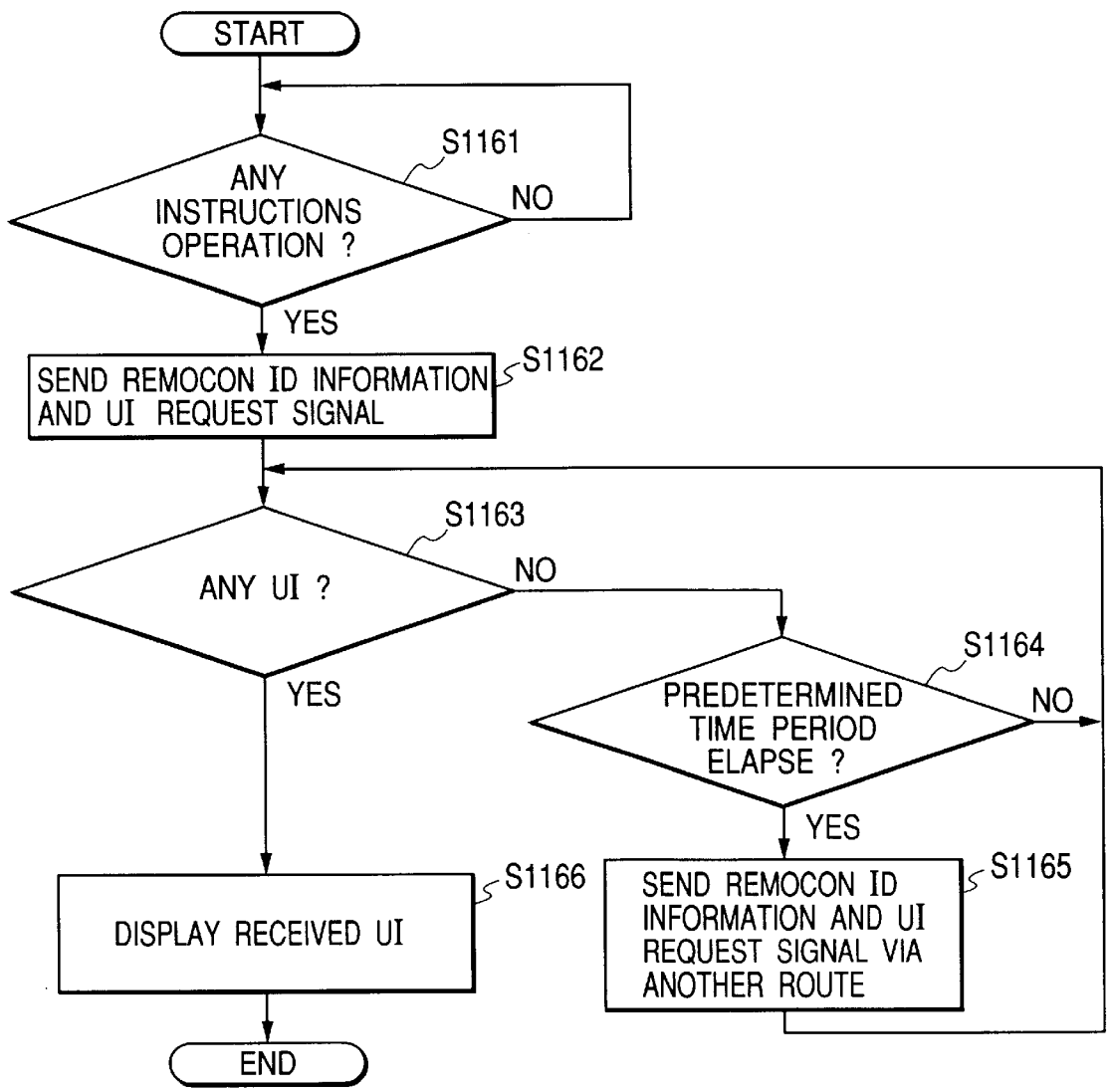
FIG. 116 is a flowchart showing the processing performed by a controller according to a thirty-ninth embodiment.

FIG. 116 is a flowchart showing the processing performed by a controller for an example where, when the controller can not directly communicate with a target model in front because an obstacle is present in route between the target model and the controller, indirect communication is attempted using another route. The processing performed by the controller 960 will now be described.

At step S1161 the controller 960 waits until an instruction from a user is input. At step S1162 a UI request signal for requesting a UI and controller identification data for identifying a controller are transmitted to the target model by an infrared ray communication method. At step S1163 a check is performed to determine whether or not the UI has been received. At step S1164 a check is performed to determine whether a predetermined period of time has elapsed following the transmission of the request. At step S1165 a UI request signal, for requesting a UI, and controller identification data, for identifying a controller, are transmitted by a route, such as across a wireless LAN, that is different from the route at step S1162. At step S1166 the received UI is displayed.

In this case, the UI request signal that is directly transmitted to the target model is to be sent to the wireless LAN server 1041. However, since the wireless LAN server 1041 that receives the UI request signal is not sure of a target model, first a menu for selecting a model (function) is displayed. A UI corresponding to the selected model is displayed. Upon receipt of the model selection signal from the controller 960, the wireless LAN server 1041 may transmit to the controller 960 a UI that corresponds to the model, or may transmit the menu and a plurality of UIs available from the menu.

[Fortieth Embodiment]

Figure 117:
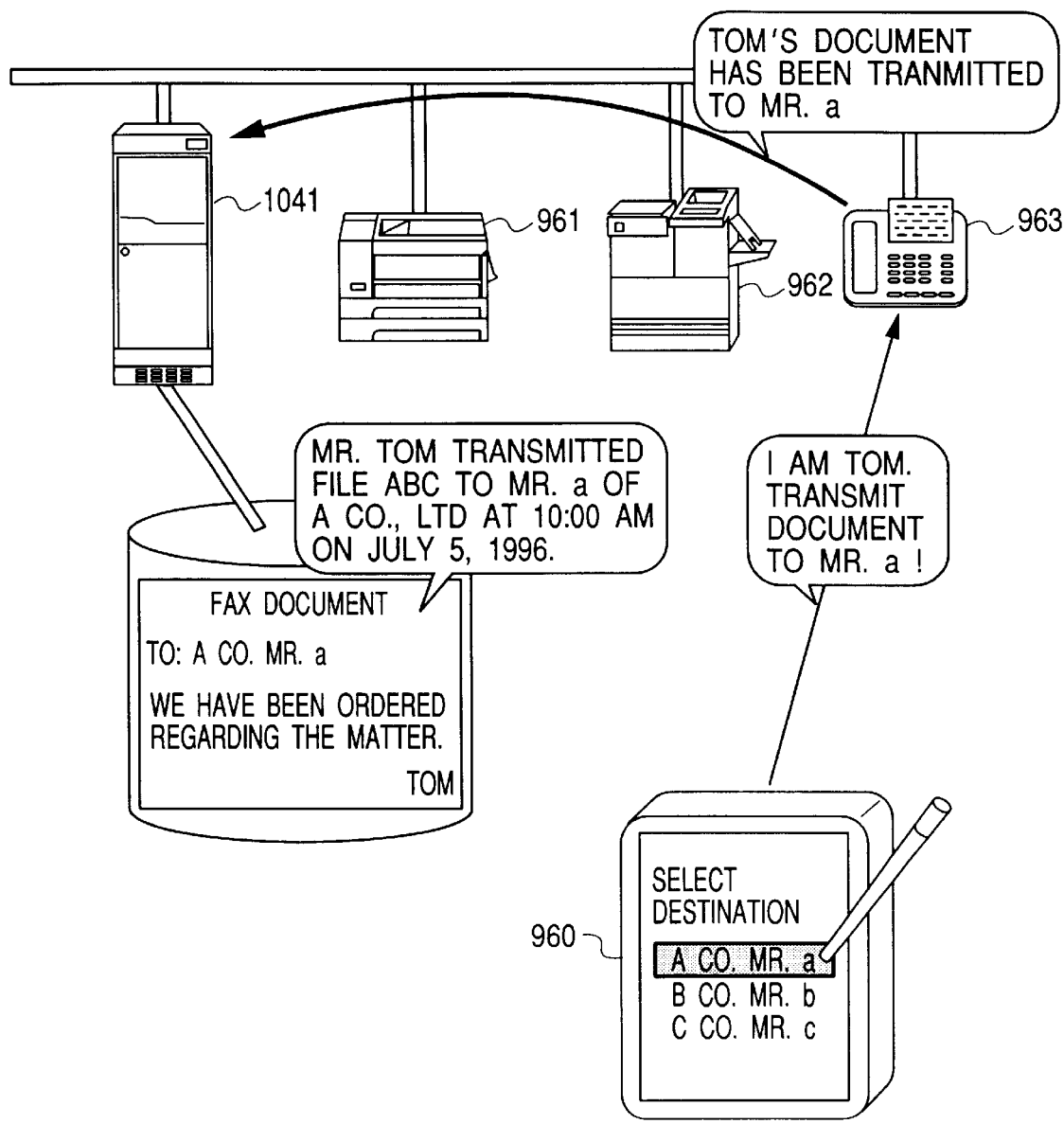
FIG. 117 is a diagram showing an example wherein an operation/action by a user and a time are jointly stored as history along with important associated information.

FIG. 117 is a diagram showing an example where an operation and an action performed by a user, the time and associated important information are stored as history.

An explanation will be given for the processing for storing, as history, the operation/action performed by the user, the time and the associated important information.

(1) A user sets a document in a facsimile machine 963, and instructs the transmission of the document and the user's name (sender's name) to Mr. a of A company.

(2) According to the instruction, the facsimile machine 963 transmits the document to Mr. a. Also according to the instruction from Tom, the facsimile machine 963 notifies the server 1041 of the fact that the document has been transmitted to Mr. a together with the transmitted document and the transmission time.

(3) The server 1041 saves the received document as a file "File ABC" and stores the fact of the receipt as history information.

Figure 118:
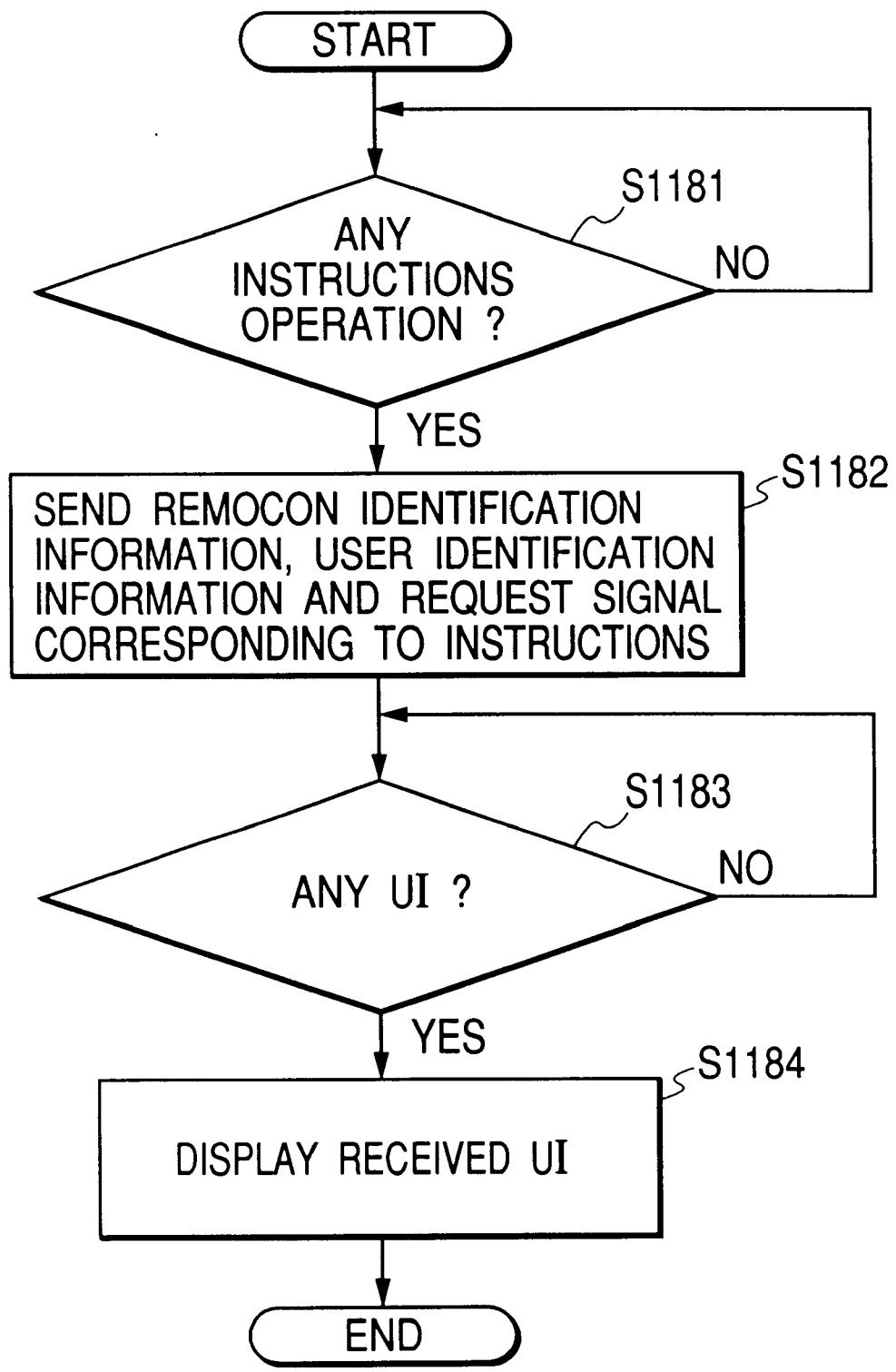
FIG. 118 is a flowchart for the processing performed by a controller according to a fortieth embodiment.

FIG. 118 is a flowchart showing the processing performed by the controller for an example where an operation and an action performed by a user, the time and the associated important information are stored as history data. The processing performed by the controller will now be described.

At step S1181 the controller 960 waits until an instruction from a user is input. At step S1182 a request signal, for the instruction of the user, controller identification data, for identifying a controller, and the user identification data, for identifying the user, are transmitted by an infrared ray communication method. At step S1183 the controller 960 waits until a UI signal is output by any device. At step S1184, the received UI is displayed.

Figure 119:
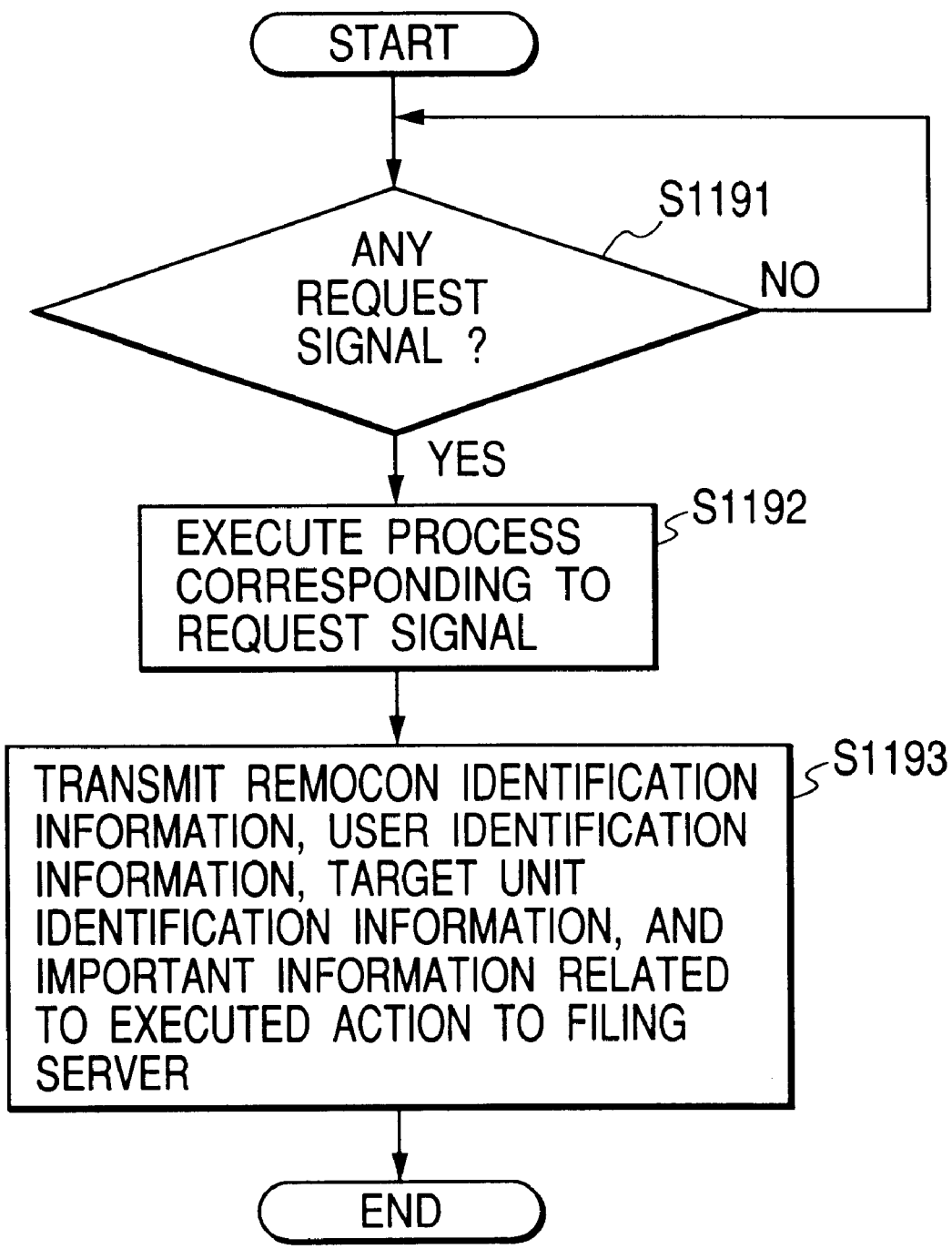
FIG. 119 is a flowchart for the processing performed by a target model according to the fortieth embodiment.

FIG. 119 is a flowchart showing the processing performed by the target model for an example where an operation and an action performed by a user, the time and the associated important information are stored as history data. The processing performed by the target model will now be described.

At step S1191 the target model waits until a request signal is transmitted by the controller 960. At step S1192 a process corresponding to the request signal from the controller 960 is performed. In the example shown in FIG. 117 a document set by the user is read and transmitted to Mr. a of A company. At step S1193 controller identification data received from the controller 960, the user identification data, and target model identification data, and important data associated with the action that was performed, are transmitted to the server 1401. In the example in FIG. 117, according to the instruction from Tom, the fact that the document was transmitted to Mr. a is sent to the server 1041, together with the transmission time and the transmitted document that is the important information associated with the fact.

Figure 120:
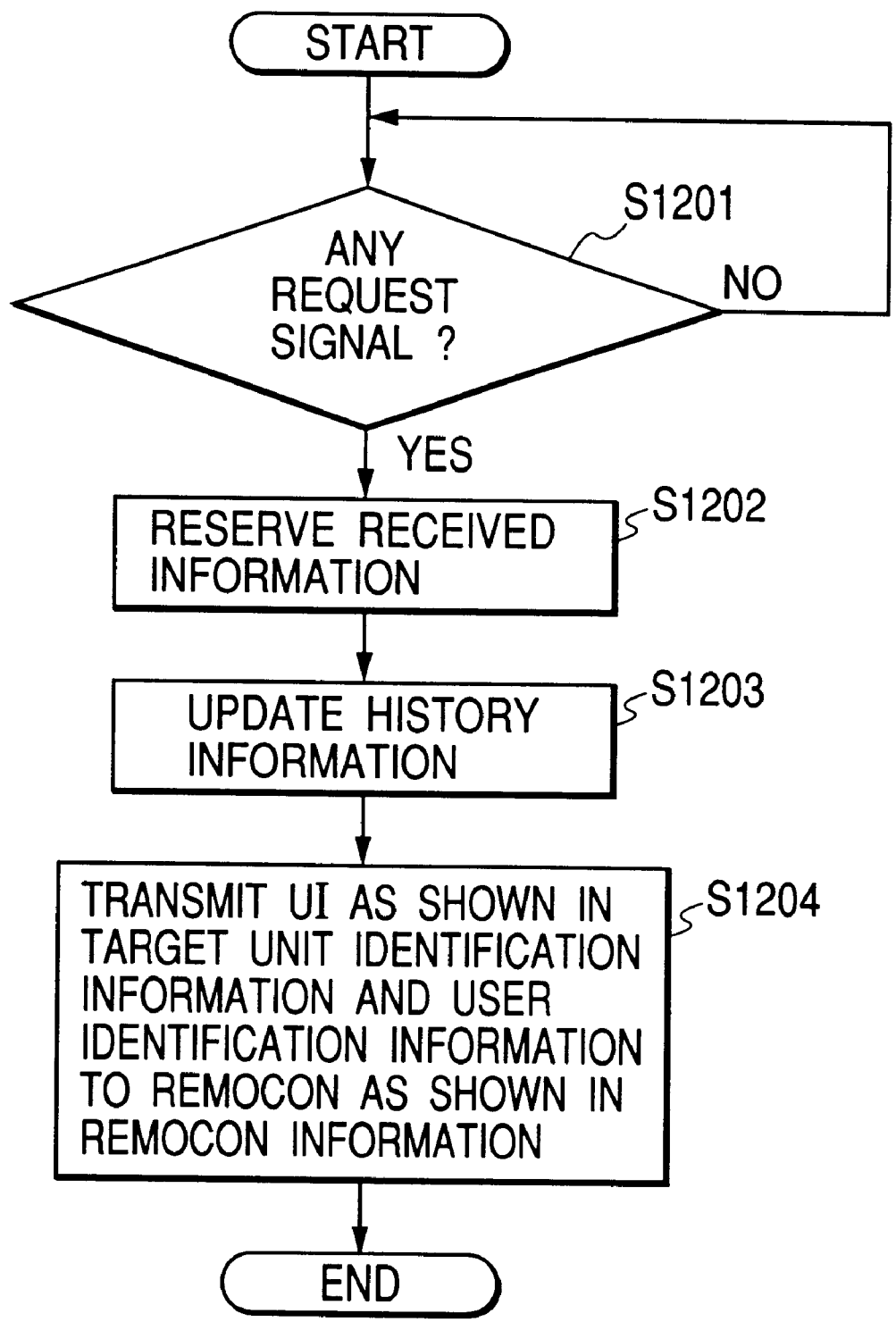

FIG. 120 is a flowchart showing the processing performed by the server for an example where an operation and an action performed by a user, the time and the associated important information are stored as history data. FIG. 121 is a diagram showing example history information that is updated as the result of processing. The processing performed by the server will now be described.

At step S1201 the server waits until it receives a request signal from the target model. At step S1202 the important information associated with the received fact is stored. In the example in FIG. 117 the document the transmission of which is instructed by Tom is saved as File ABC.

At step S1203 the history data are updated in consonance with the received fact. In the example shown in FIG. 117 the fact that Tom transmitted a document to M. a of A company at 10:00 on Jul. 5, 1996 is recorded together with the file name stored at step S1201. FIG. 121 is a table showing updated history data; the fact that Mary printed ten copies of File XYZ on Jul. 3, 1996, and the fact that Tom transmitted File ABC to Mr. a of A company at 10:00 on Jul. 5, 1996. At step S1204 a UI that indicates the normal termination of the processing is transmitted to the controller that is defined by the controller identification data received from the target model.

[Forty-first Embodiment]

Figure 122:
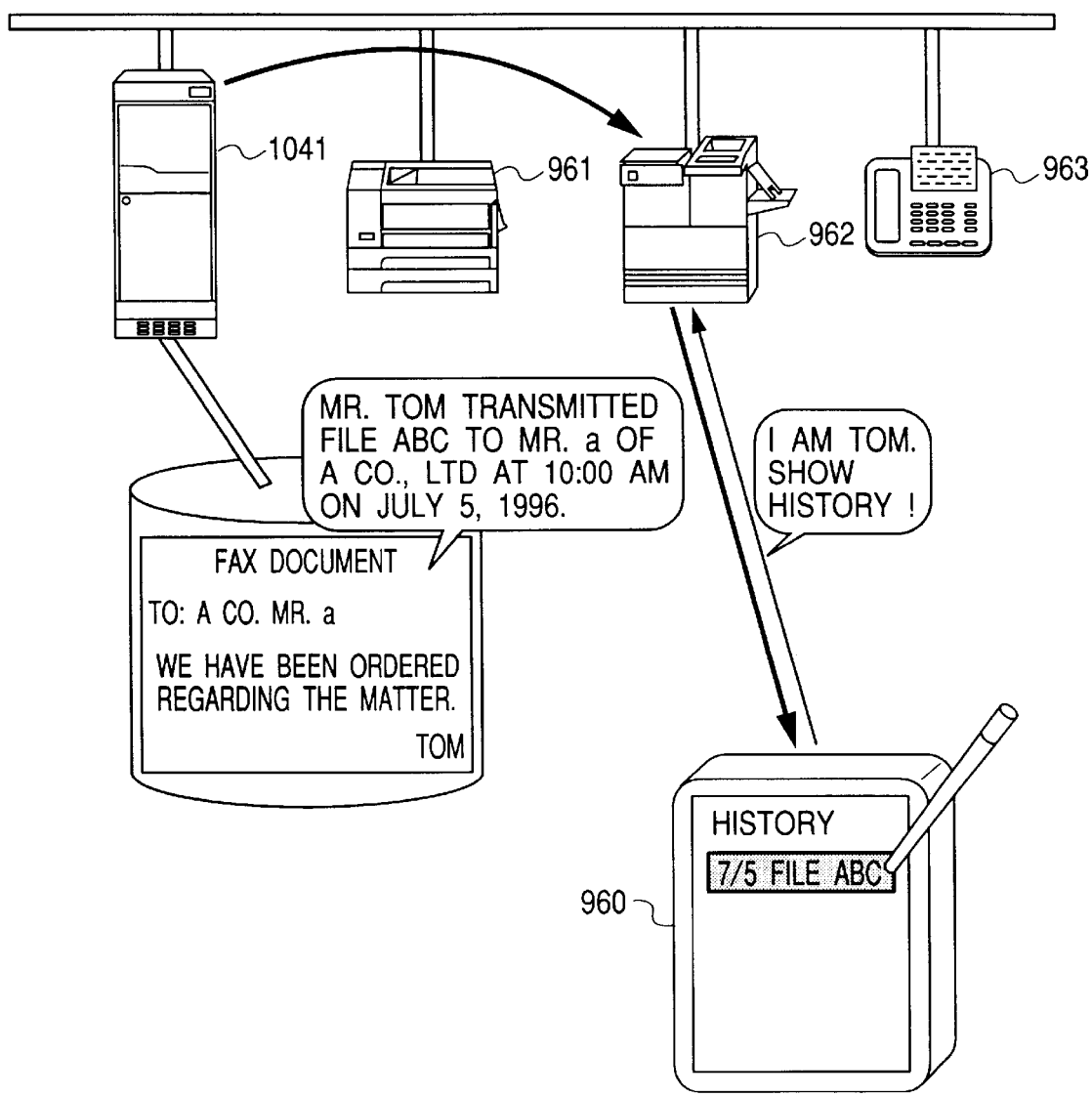
Figure 123:
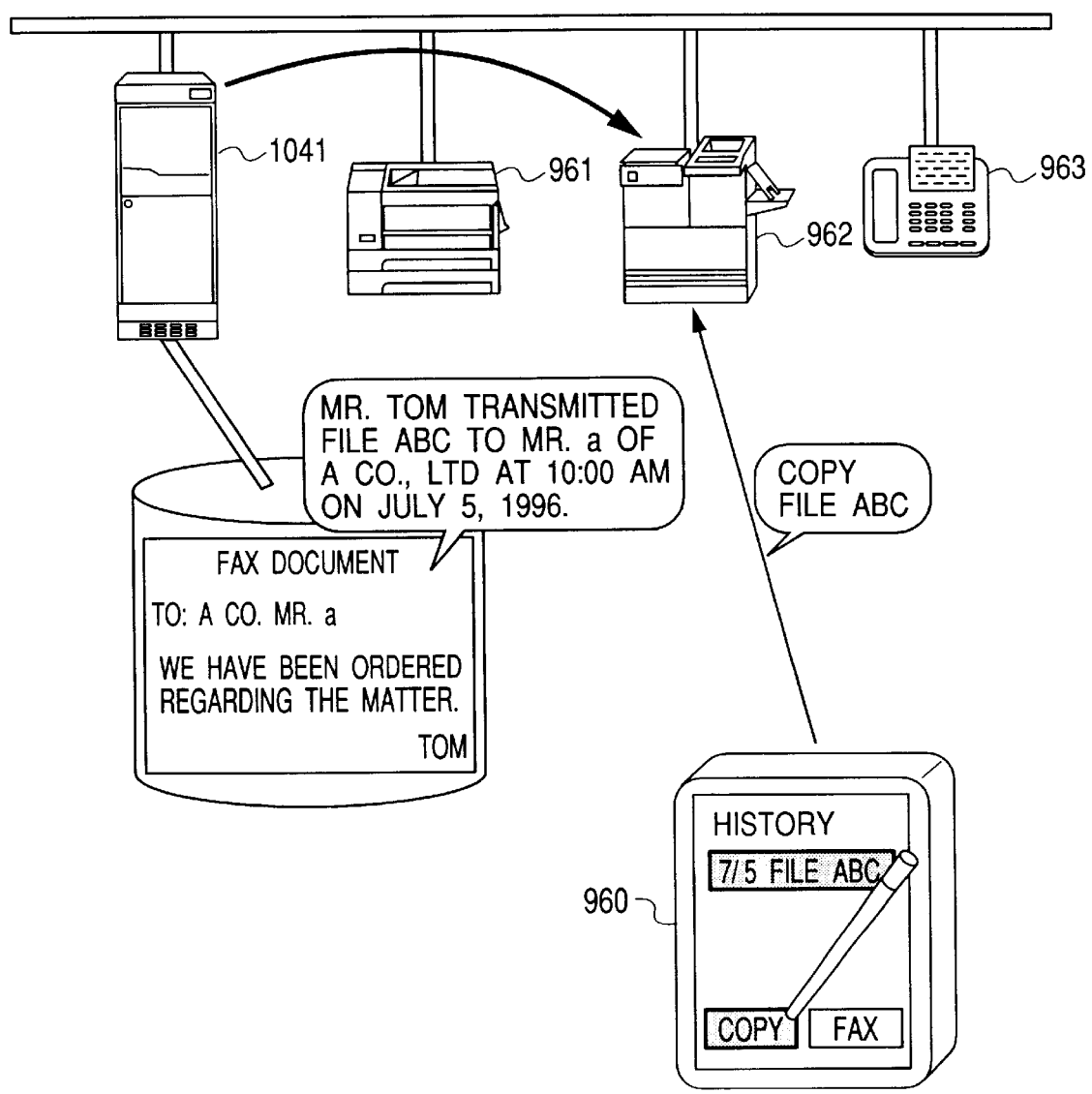

FIGS. 122 and 123 are diagrams showing an example where an operation/action performed by a user, the time and associated important information are stored as history data and based on the history data an operation is performed.

An explanation will be described the processing for the example where an operation/action performed by a user, the time and associated important information are stored as history data and based on the history data an operation is performed.

(1) A controller 960 instructs a copier 962 to show the history of Tom.

(2) Upon receipt of the instruction, the copier 962 asks a server 1401 for managing the history to show the history of Tom.

(3) The server 1041 refers to the history data and transmits, as a UI, only the history associated with the Tom to the copier 962. The copier 962 transmits the received history data to the controller 960.

(4) Tom selects a specific fact from the history data displayed on the controller 960, and instructs an action. In this case, since Tom needs a material that was previously sent to A company, the fact "File ABC was sent to Mr. a of A company" is selected and action "copy" is instructed to acquire the material from the copier 962 in front.

(5) The copier 962 transmits to the server 1041 the instruction "copy File ABC" from the user.

(6) The server 1041 sends a corresponding document "File ABC" to the copier 962.

(7) The copier 962 prints a document received by the server 1041.

In the above example, the fact "File ABC was sent to Mr. a of A company" is selected from the history in order to acquire necessary material from the copier 962 in front. When the name of document "File ABC" to be output is obtained, the list of files can be displayed instead of the history data and the file name can be selected, or the file name can be input directly.

In addition, in the above example, the document to be extracted is the one that is transmitted by the facsimile machine 963 and stored in the server 1041. A document stored in a PC across the network can also be employed.

Figure 124:
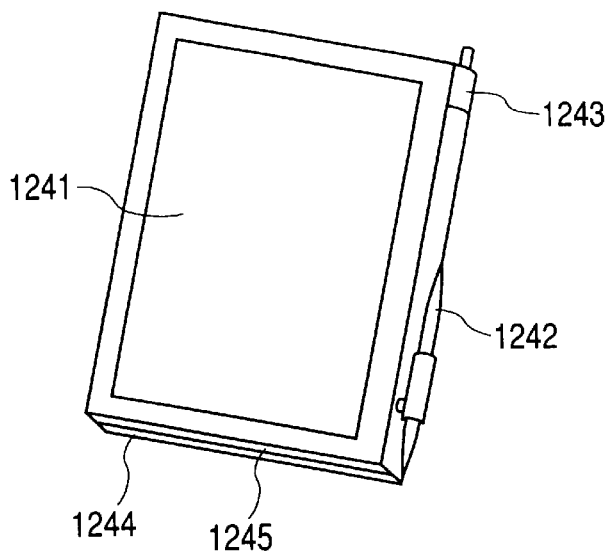

FIG. 124 is a diagram showing the structure of the controller 960 used in this embodiment.

A display 1241 is used to display data on a liquid crystal screen. A resistance film is attached to the display 1241, and data can be input with a pen 1242. A button on a screen may be selected by the pen 1242. Furthermore, a character recognition function is provided, and the characters written with the pen 1242 can be input. Instead of this function, a voice input/recognition function may be employed to input information.

The input information can be transmitted from a communication unit 1243 to another apparatus. A CPU 1244 for controlling and a storage unit 1245 are provided inside the apparatus, and input information and information received by the communication unit 1243 and the history of the operations are stored. The storage unit 1245 can be a SRAM card, an SIMM or an HDD. The controller 960 is battery operated and water resistant.

Figure 125:
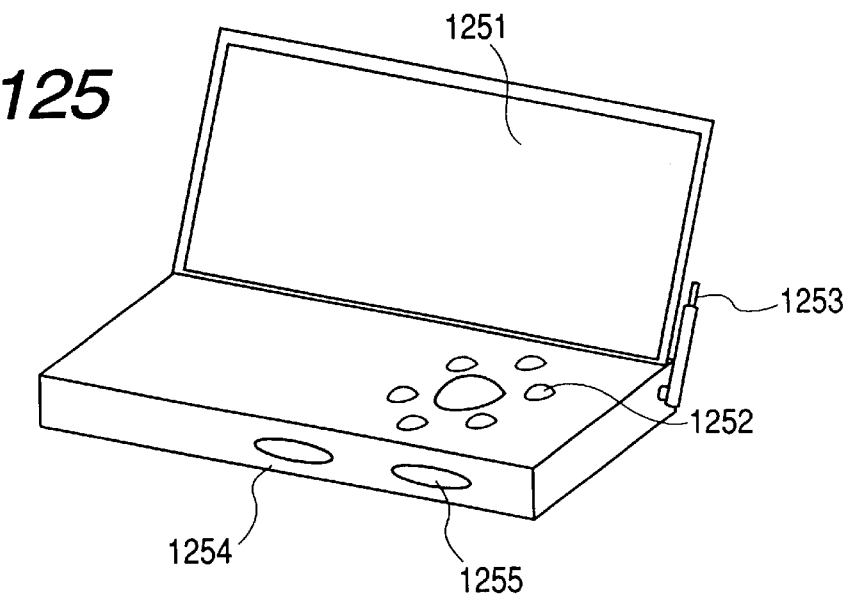

FIG. 125 is a diagram illustrating another example structure of the controller 960 used in the embodiment.

A display 1251 is used to display data using liquid crystal or a CRT. A touch panel can be additionally provided as an option to the display 1251. Thus, information can be input by a finger or a pen. An input unit 1252 is used to input information by manipulation of a button. The input data can be transmitted from a communication unit 1253 to another apparatus. A CPU 1254 for controlling and a storage unit 1255 are provided inside the apparatus, and input information and information received by the communication unit 1253 and the history of the operations are stored. The storage unit 1255 can be a SRAM card, an SIMM or an HDD.

The controller in FIG. 125 can be used as a button controller with the storage unit 1255 being removed. The controller can be used as a personal digital assistant (PC) with the communication unit 1253 being removed. In addition, the controller can be used as is shown in FIG. 124, with the input unit 1252 being removed and with the touch panel provided.

Figure 126:
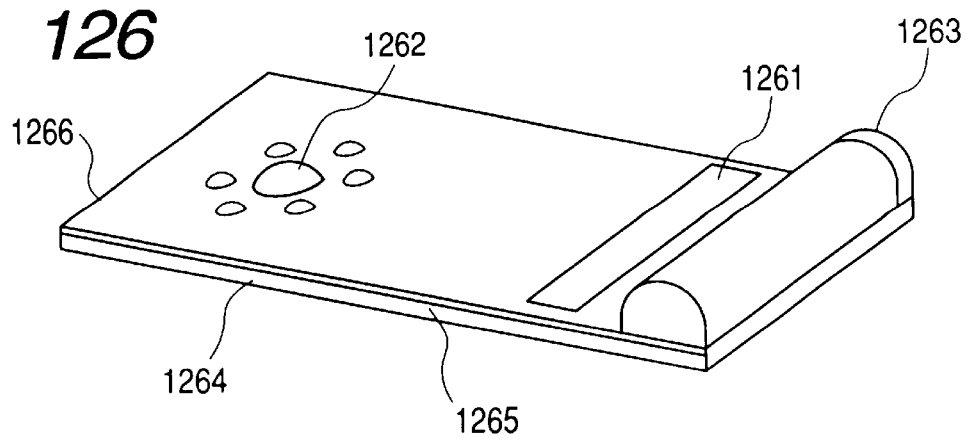

FIG. 126 is a diagram showing an additional example structure of the controller 960 used in this embodiment.

A display 1261 is used to display data using liquid crystal. An input unit 1262 is used to input information by manipulating a button. The input data can be transmitted by an infrared communication unit 1263 to another apparatus. A CPU 1264 for controlling and a storage unit 1265 are provided inside the apparatus, and input information and information received by the infrared communication unit 1263 and the history of the operations are stored. The storage unit 1265 can be a SRAM card, an SIMM or an HDD. Furthermore, a PCMCIA slot 1266 is provided, and, for example, a PCMCIA card is loaded into the slot 1266 to enable the connection by a PCMCIA bus, so that two communication channels can be employed. The infrared communication unit 1263 may be used only for transmission by light emission, and the PCMCIA bus may be used for reception. Of course, the connection by the PCMCIA bus may not be employed.

[Forty-second Embodiment]

This system arrangement according to this embodiment is as shown in FIGS. 41A and 41B, and information processing apparatuses 411, 412 and 413 can communicate with each other.

When the information processing apparatus 411 needs information stored in the information processing apparatus 412, or when the information is to be transmitted to the information processing apparatus, or when an instruction is to be transmitted to the information processing apparatus 412, the information processing apparatus 411 requests the communication with the information processing apparatus 412 and exchanges required information and an instruction.

Any apparatus can be used for the information processing apparatuses 411, 412 or 413 so long as they have necessary communication function; a printer, a scanner, a facsimile machine, a desktop PC or a digital camera can be used.

FIG. 127 is a diagram illustrating the functional arrangement for this embodiment.

An operating unit 41 displays a screen required for a user to operate in accordance with data stored in an operation data memory area 42. An operation performed by a user or an instruction issued by a user is acquired by the operation unit 41 and transmitted to a task reception unit 43.

The operation data 42 is data to be referred to by the operation unit 41, and specifies the process at the operation unit 41. In this embodiment, based on the information received by the task reception unit 43, the operation data 42 is altered or updated by a process execution unit 47, which will be described later, so that flexible procedures can be provided.

One of methods for operating an apparatus other than the information processing unit 411, i.e., the information processing apparatus 412, is the one for acquiring the operation data 42 for the information processing apparatus 412 and for altering and updating the operation data 42 of the information processing apparatus 411.

In another example, the presence of the information processing apparatus 412, which is connected across the network to the information processing apparatus 411 in this embodiment, is detected, so that a new function obtained by combining the two information processing apparatuses can be implemented. Information required for an instruction for the function is added to the operation data 42, and thus, the function obtained by combining a plurality of apparatuses can be provided.

The task reception unit 43receives not only information from the operation unit 41, but also receives, as the status change, a change in the environment of the information processing apparatus 411 or a task received from another apparatus, such as the information processing apparatus 412. Task reception unit 43 also detects the connection of a new information processing apparatus to the network, receives as a task a print instruction from another apparatus, or detects that no process is performed during a specified period of time. As a result, received information is added as a new task to a task table 44.

The task reception unit 43 is required as well as the process execution unit 47, which will be described later, to communicate with different apparatuses.

The task table 44 is a table in which are stored tasks having the activation condition and the contents. FIGS. 129A to 129F are examples for the task table 44.

In FIGS. 129A to 129F, the tasks are stored from the top of the table in the order of priorities. The addition of a task to the task table 44 is performed by the previously mentioned task reception unit 43 and the process execution unit 47 to be described later. Extraction of the task from the task table 44 is performed by a task analysis unit 45, which will be described later.

The task analysis unit 45 extracts a task having the highest priority from the task table 44, and analyzes the object of the task. Since the task analysis unit 45 analyzes the object, a planning decision unit 46 and the process execution unit 47 can avoid inefficient processing and can perform an optimal process.

For example, a task 63 in the task table 44 in FIGS. 129A to 129F is analyzed and understood that the direct object is printing and the final object is to transmit a printed document to a user. If the final object can be achieved by an efficient method, it is found that even printing is unnecessary, and planning is performed according to that effect. The information to be processed is also analyzed, and it is found that format conversion is required.

The planning decision unit 46 receives the analysis from the task analysis unit 45, makes planning for a process to be performed. For example, for the task 63 stored in the task table 44 in FIGS. 129A to 129F, a process for extracting an object from an apparatus B before printing of the object is planned.

The process execution unit 47 performs a process according to the contents determined by the planning decision unit 46, e.g., sends an instruction to another apparatus. The process execution unit 47 will be described in detail in a forty-third embodiment and following embodiments. The functional arrangement in FIG. 127 can be provided by the hardware configuration in FIG. 3.

Figure 128:
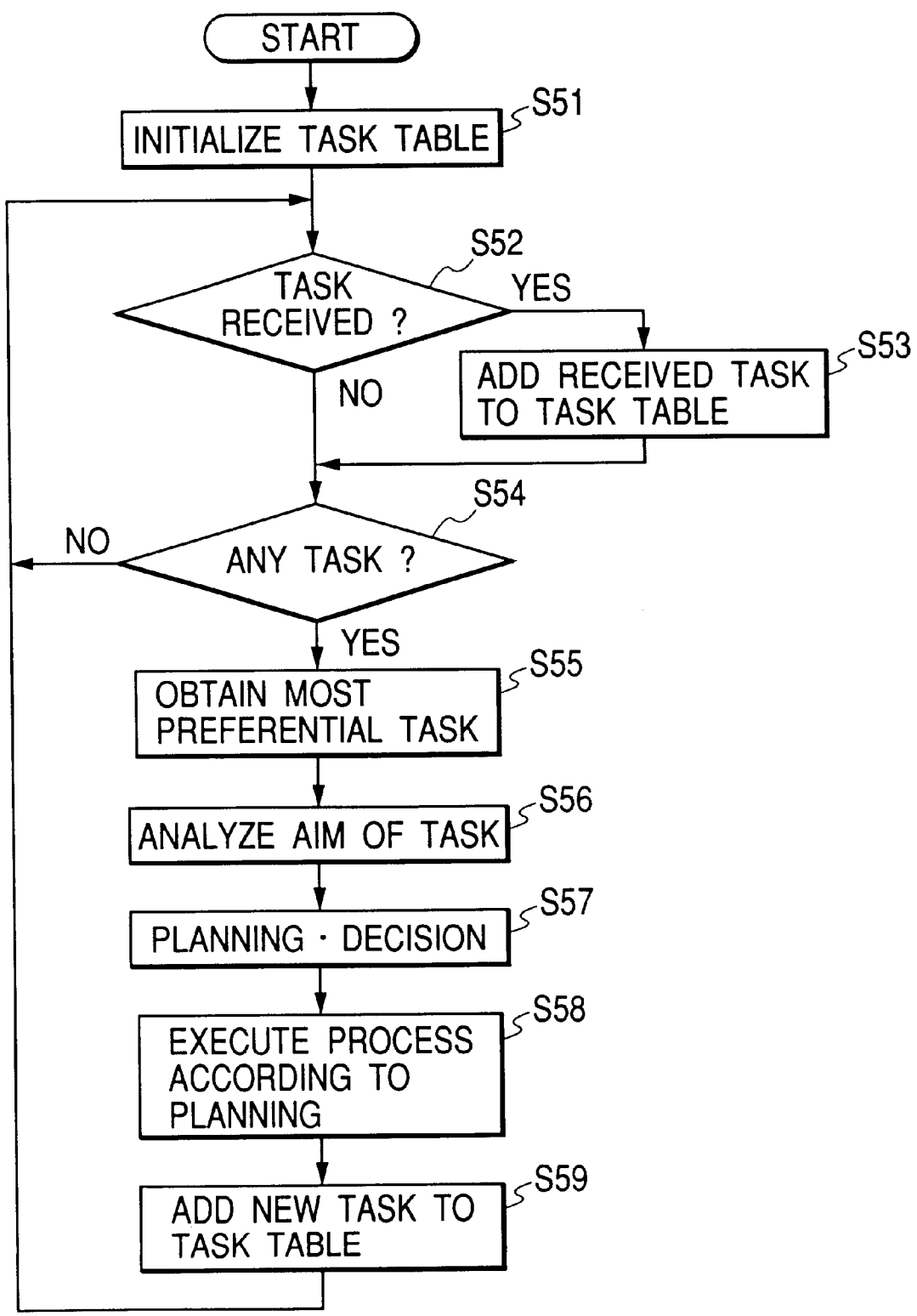

FIG. 128 is a flowchart showing the processing for this embodiment.

When the information processing apparatus 411 in this embodiment is activated, at step S51 the task table 44 is initialized as is denoted by 61 in FIG. 129A.

Then, at step S52 a check is performed to determine whether the task reception unit 43 has received, as the status change, information that is acquired by the operation unit 41 for an operation instruction from a user, an environmental change, or a task from another apparatus. When the task is received, program control advances to step S53, and as is shown in FIG. 129B, the analysis task 62 of the received information is added to the head of the task table 44.

Following this, at step S54 a check is performed to determine whether or not an executable task is present in the task table 44. If there is no such task, program control returns to step S52, whereat the reception of the task is examined again. If there is such a task, program control moves to step S55, whereat the task having the highest priority is extracted from the task table 44.

At step S56 the object of the task is analyzed, and at step S57 the process to be performed is planned and decided. If the task table is in the state shown in FIG. 129B, highest priority task 62 "ANALYZE" is extracted, it is apprehended that its object is analysis of received information, and planning for analysis is performed.

At step S58 the process according to the planning is performed, and as needed, a new task is added to the task table 44. When, for example, the received information is analyzed according to the plan obtained from the task 62 "ANALYZE" in FIG. 129B, the contents "Print 'contract-.doc' from B" which is instructed by a user through the operation unit 41, are analyzed and a new task 63 "PRINT" is added as is shown in FIG. 129C.

Program control returns again to step S52. However, since no new task is received, program control moves to step S54, and the above process is repeated. As a result, task 63 "PRINT" in FIG. 129C, which was added at step S58, is extracted, analyzed and planned. To execute task PRINT, it is found that the object must be present in the information processing apparatus 411, and new task 64 "PULL" and task 65 "PRINT" which employs the "pulled" object, are added as is shown in FIG. 129D.

In addition, when the processing is repeated, the task 64 "PULL" in FIG. 129D is executed. Since the contents of the task PULL are important portions for 4the present invention, detailed explanation for them will be given for the forty-third embodiment and the following.

When the process is further repeated, the object that is acquired as the result of the task PULL is employed to perform task 65 in FIG. 129E. As a result, the task table 44 is returned to the initial state, as is shown in FIG. 129F.

[Forty-third Embodiment]

Figure 130:
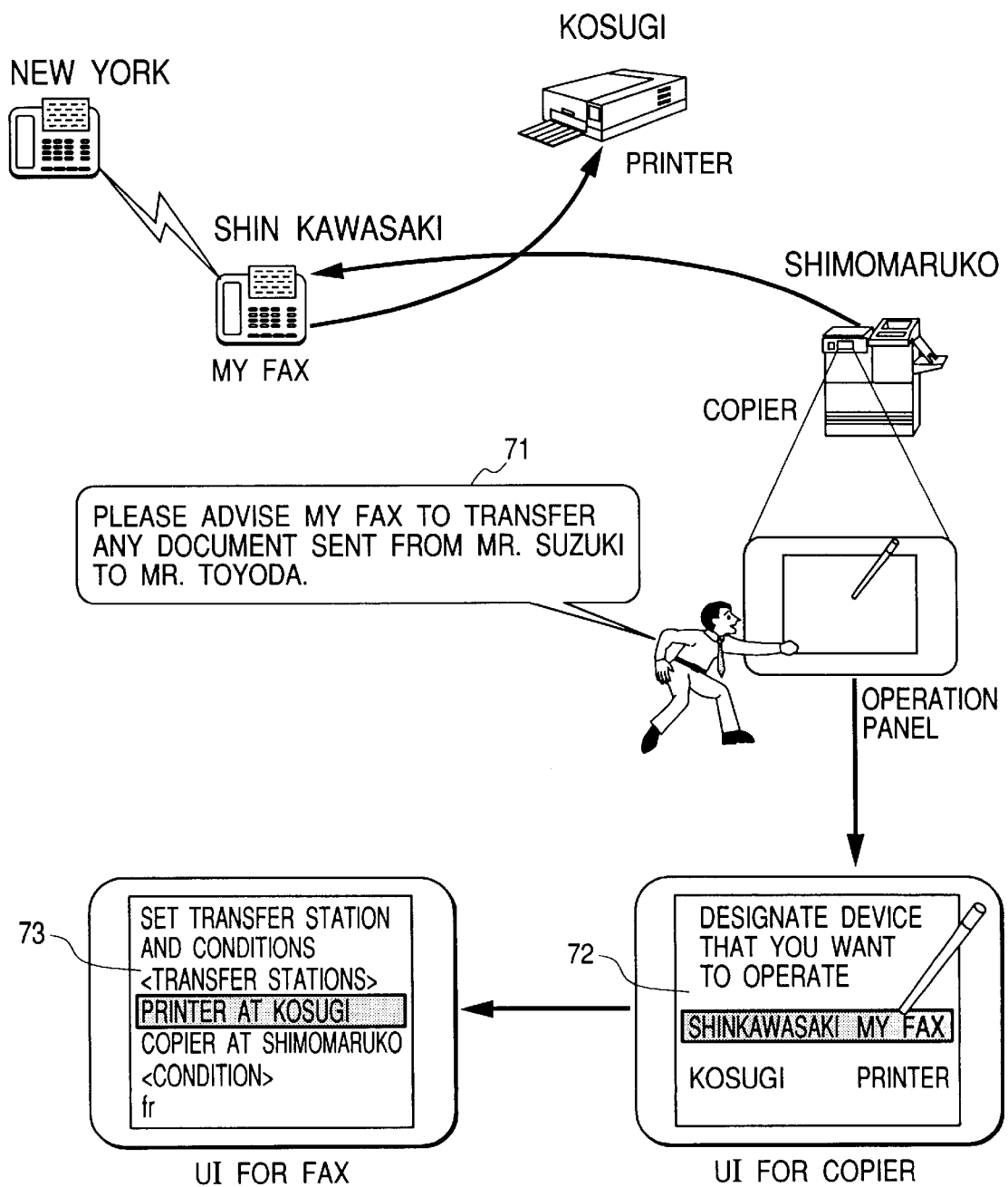

FIG. 130 is a diagram showing an example input/output device that can operate another apparatus.

The operation procedure (UI) implemented by the operation unit 41 is performed by referring to the operation data 42 that the information processing apparatus 411 originally includes, or by referring to the operation data 42 that is acquired from another information processing apparatus 412 connected to the network.

An instruction 71 by a user's voice, or the employment of an operation panel screen 72 to designate a target device, is performed by referring to the operation data 42 that are originally included in a copier, which serves as the information processing apparatus 411.

The copier 74, which is the information processing apparatus 411, executes the task PULL at the process execution unit 47, and refers to on the operation data 42, which are acquired from a facsimile machine 75 that serves as the information processing apparatus 412 connected via the network, to designate a transfer destination and a condition by using the screen 73 of the operation panel.

The operation data 42 of the facsimile machine 75 may be held by the copier 74 in advance, and be referred to as needed.

The operation data 42 of the facsimile machine 75 may be acquired from another device, such as a server.

A specific method for communication between the information processing apparatuses 411 and 412 will be explained in detail for a forty-ninth embodiment and the following embodiments.

[Forty-fourth Embodiment]

Figure 131:
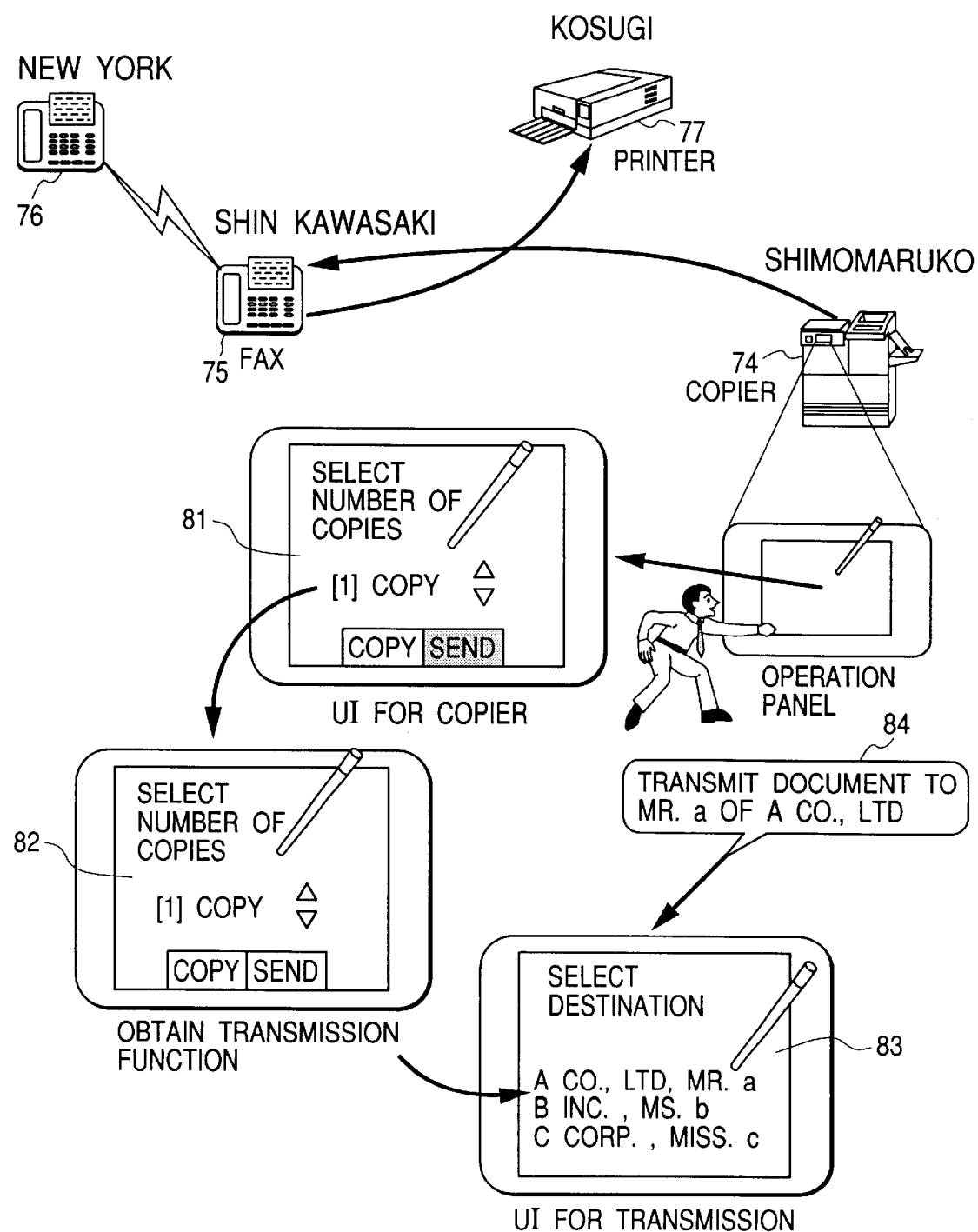

FIG. 131 is a diagram showing an input/output apparatus that can operate a function obtained by a combination of a plurality of devices.

The procedure (UI: User Interface) implemented by the operation unit 41 is performed by referring to the operation data 42 the information processing apparatus 411 originally includes, or by referring to the operation data 42 that is updated as the result of the detection of the information processing apparatus 412 connected via the network.

The number of copies using the operation panel 81 in FIG. 131 is designated by referring to the operation data 42 that is originally included in the copier 74, which serves as the information processing apparatus 411. The "Copy" displayed in the lower portion of the operation panel indicates an instruction of copying, and "transmit" displayed in the hatched state indicates that the transmission process is disabled.

As the result of the detection of the facsimile machine 75, which serves as the information processing apparatus 412 connected via the network, the operation data 42 of the copier 74 are updated to the function that can be used, i.e., the transmission function from which the hatching is removed, and is referred to, so that the number of copies on a display 82 is designated using the operation panel, as well as the operation panel 81.

When a user selects and instructs the execution of the transmission function, a display 83 for designating the transmission destination is provided and the transmission function can be executed. As is described above, when a user need only set a desired document on a copier near the user and instruct the execution of the transmission function, the document can be transmitted by using the function of the facsimile machine 75, which is at a remote area and is connected via a network. This accomplishes both the document input function of the copier and the document transmission function of the facsimile machine.

When the facsimile machine 75 is not connected on the display 81, the transmission operation on the display 83 for designating the transmission destination is performed in advance, and at the same time that the connection of the facsimile machine 75 is detected, the contents of the transmission operation is transmitted to the facsimile machine 75. Thus, in consonance with the contents, the automatic transmission can be performed, or the reservation operation, such as a confirmation to a user before automatic transmission, as is shown in a screen 84, can be performed.

In this embodiment, while the facsimile machine 75 is not connected, the display "transmit" for a transmission instruction is displayed by hatching to indicate transmission is enabled. Such a display may not be provided at all.

A specific method for communication between the information processing apparatuses 411 and 412 will be described in detail for the forty-ninth embodiment and the following.

[Forty-fifth Embodiment]

FIG. 132 is a diagram illustrating an example input/output device that can communicate with a user.

In the example in FIG. 132, a user sends an instruction 93 to a copier 91 that is physically located in a remote area in order to permit a MyDesk 92, a desktop personal computer, to display the current location of the user.

The instruction 93 "Display present place on <MyDesk>", which is sent to the copier 91 that serves as the information processing apparatus 411, is transmitted from the operation unit 41 to the task reception unit 43. The contents are analyzed and planning is performed on the results. Then, the execution unit 47 executes the final data as an instruction task INDICATE for a PC 92, which serves as the information processing apparatus 412 connected via the network.

The PC 92, which is the information processing apparatus 412 connected via the network, receives communication task COMMUNICATION from the reception unit 43, analyzes a received instruction, and perform planning on the results. Then, the execution unit 47 displays a message on a screen.

A specific method for communication between the information processing apparatuses 411 and 412 will be described in detail for the forty-ninth embodiment and the following.

[Forty-sixth Embodiment]

FIG. 133 is a diagram illustrating an example input/output device that can acquire information from another apparatus.

In the example in FIG. 133, a user sends an instruction 1333 to a printer 1331 that is located in a physically remote area to print information 1334 "contract.doc" that is stored in apparatus B1332.

The instruction 1333 "Please fetch 'contract.doc' from B and print it" which the user sent to the printer 1331 that serves as the information processing apparatus 411, is transmitted from the operation unit 41 to the task reception unit 43. The contents are analyzed and planning is performed on the results. Then, the execution unit 47 executes the final data as information acquisition task PULL for the apparatus B 1332, which serves as the information processing apparatus 412 connected via the network. The apparatus B can be a printer, a scanner, a desktop PC or a filing server.

The apparatus B1332, which serves as the information processing apparatus 412 connected via the network, receives the information acquisition task PULL from the reception unit 43, analyzes the received instruction, and performs planning on the data. The execution unit 47 then transmits corresponding information 1334 "contract.doc".

A specific method for communication between the information processing apparatuses 411 and 412 will be described in detail for the forty-ninth embodiment and the following.

[Forty-seventh Embodiment]

FIG. 134 is a diagram illustrating an example input/output device that can be stored in another apparatus.

In the example shown in FIG. 134, a user reads a document 115 using a scanner 111 and sends an instruction 113 to permit a filing server 112 at a physically remote area to perform filing with a title and an index.

The instruction 113 "Filing to Filing Server, Title, Index Extraction" which the user sent to the scanner 111 that serves as the information processing apparatus 411, is transmitted from the operation unit 41 to the task reception unit 43. The contents are analyzed and planning is performed on the results. Then, the execution unit 47 executes the final data as information storage task PUSH for the filing server 112, which serves as the information processing apparatus 412 connected via the network.

The filing server 112, which serves as the information processing apparatus 412 connected via the network, receives the information storage task PUSH from the reception unit 43, analyzes the received instruction, and performs planning on the data. The execution unit 47 then files corresponding information 115 "contract.doc".

A specific method for communication between the information processing apparatuses 411 and 412 will be described in detail for the forty-ninth embodiment and the following.

[Forty-eighth Embodiment]

FIG. 135 is a diagram illustrating an example input/output device that can be stored in another apparatus.

In the example shown in FIG. 135, a user sends an instruction 123 to a printer 121 to transmit information 125, which is stored in a filing server 122 located at a physically remote area, to John 124 who is located at a physically farther area.

The instruction 123 "Action: SEND, What: abc.doc, From: Filing Server, To: John" which the user sent to the printer 121 that serves as the information processing apparatus 411, is transmitted from the operation unit 41 to the task reception unit 43. The contents are analyzed and planning is performed on the results. Then, the execution unit 47 executes the final data as an instruction task for the filing server 122, which serves as the information processing apparatus 412 connected via the network.

The filing server 122, which serves as the information processing apparatus 412 connected via the network, receives the instruction task from the reception unit 43, analyzes the received instruction, and performs planning on the data. The execution unit 47 then transmits corresponding information 125 "abc.doc" to John by E-mail.

A specific method for communication between the information processing apparatuses 411 and 412 will be described in detail for the forty-ninth embodiment and the following.

[Forty-ninth Embodiment]

FIGS. 136A and 136B are flowcharts showing the processing for <COMMUNICATE> task.

<COMMUNICATE> task is performed when arbitrary apparatuses A and B need communicate with each other. In FIGS. 136A and 136B are shown the processing that the apparatus A (a source) that transmits a COMMUNICATE request is to execute for communication with the apparatus B (destination) that receives a COMMUNICATE request.

At step S1312, the apparatus A contacts the apparatus B to establish the connection for communication. At step S1313 a check is performed to determine where a reply is received from the apparatus B. If there is no response from the apparatus B, at step S1314 a check is performed to determine whether or not a user or another person should be notified of no response. If notification is necessary, at step S1315 a notification is issued to a user by an appropriate means/medium. At step S1316, according to the decision/assumption of the system or the setup by the user, a check is performed to determine whether the task should be re-execute by the system later. If the re-execution of the task is necessary, at step S1317 the task is added to the task table, and the processing is thereafter terminated. If the re-execution of the task is not required, at step S1318 the task is deleted, and is added to "failed list". The processing is thereafter terminated.

When, at step S1313, a response is received, at step S1319 whether the response is "Will call back" is determined. If the response is "Will call back" the apparatus B will call back the apparatus A later. At step S1320, a check is performed to determine whether or not the user or another person should be notified of the response. If notification is necessary, at step S1321 the notification is issued to the user by an appropriate means/medium. At step S1322 the system adds the task to the task table, and remembers that the apparatus B will call back so as to cope with the call back. The processing is thereafter terminated.

If, at step S1319, the response is not "Will call back" at step S1323 whether the response is "Contact later" is determined. If the response is "Contact later" it is assumed that the apparatus B wants a contact later, and the above described processes at step S1314 and the following steps are performed. When, at step S1323, the response is not "Contact later" it is assumed that the response is "OK" and at step S1324 the response is confirmed. If the response is not "OK" an error occurs. At step S1331 an error message is displayed.

When the response is "OK" at step S1325 a check is performed to determine whether or not a negotiation with the apparatus B is required for the current operation. If the negotiation is required, at step S1326 a negotiation is initiated. The object to be negotiated includes a data format for data execute and protocol/version exchange, and a data format for other information required in advance for correct communication. This negotiation is repeated until the communication base used in common for the apparatuses A and B is established.

At step S1327 information to be transmitted is issued as an request from the apparatus A to the apparatus B. At step S1328, whether or not a response is received. When the response is received, at step S1329 a check is performed to determine whether there is an action to be executed relative to the received response. The action is, for example, conversion of a format or erasure of an unnecessary header. The object of the communication includes actions such as printing, transmission, filing, voice output and display. This means that necessary actions should be executed, and at step S1330 these actions are added to the task table.

When, at step S1328, there is no response, the above described processes at step S1314 and the following steps are performed. The above processing loop is continued until requested information is obtained or until the system can not continue the processing.

[Fiftieth Embodiment]

FIGS. 137A and 137B are flowcharts showing the processing for <PULL> task.

<PULL> task is performed when an arbitrary apparatus A needs to extract information from an apparatus B. In FIGS. 137A and 137B are shown the processing that the apparatus A (a source) that transmits a PULL request is to execute for communication with the apparatus B (destination) that receives a PULL request.

At step S1412, the apparatus A contacts the apparatus B to establish the connection for communication. At step S1413 a check is performed to determine where a reply is received from the apparatus B. If there is no response from the apparatus B, at step S1414 a check is performed to determine whether or not a user or another person should be notified of no response. If notification is necessary, at step S1415 a notification is issued to a user by an appropriate means/medium. At step S1416, according to the decision/ assumption of the system or the setup by the user, a check is performed to determine whether the task should be re-execute by the system later. If the re-execution of the task is necessary, at step S1417 the task is added to the task table, and the processing is thereafter terminated. If the re-execution of the task is not required, at step S1418 the task is deleted, and is added to "failed list". The processing is thereafter terminated.

When, at step S1413, a response is received, at step S1419 whether the response is "Will call back" is determined. If the response is "Will call back" the apparatus B will call back the apparatus A later. At step S1420, a check is performed to determine whether or not the user or another person should be notified of the response. If notification is necessary, at step S1421 the notification is issued to the user by an appropriate means/medium. At step S1422 the system adds the task to the task table, and remembers that the apparatus B will call back so as to cope with the call back. The processing is thereafter terminated.

If, at step S1419, the response is not "Will call back" at step S1423 whether the response is "Contact later" is determined. If the response is "Contact later" it is assumed that the apparatus B wants a contact later, and the above described processes at step S1414 and the following steps are performed. When, at step S1423, the response is not "Contact later" it is assumed that the response is "OK" and at step S1424 the response is confirmed. If the response is not "OK" an error occurs. At step S1431 an error message is displayed.

When the response is "OK" at step S1425 a check is performed to determine whether or not a negotiation with the apparatus B is required for the current operation. If the negotiation is required, at step S1426 a negotiation is initiated. The object to be negotiated includes a data format for data execute and protocol/version exchange, and a data format for other information required in advance for correct communication. This negotiation is repeated until the communication base used in common for the apparatuses A and B is established.

At step S1427 information to be extracted is issued as a request from the apparatus A to the apparatus B. At step S1428, whether or not requested information is received. When the requested information is received, at step S1429 a check is performed to determine whether there is an action to be executed relative to the received response. The action is, for example, conversion of a format or erasure of an unnecessary header. The object of the extraction of information includes actions such as printing, transmission, filing, voice output and display. This means that necessary actions should be executed, and at step S1430 these actions are added to the task table.

When, at step S1428, requested information is not acquired, the above described processes at step S1414 and the following steps are performed. The above processing loop is continued until requested information is obtained or until the system can not continue the processing.

[Fifty-first Embodiment]

FIGS. 138A and 138B are flowcharts showing the processing for <PUSH> task.

<PUSH> task is performed when an arbitrary apparatus A need to transmit information to an apparatus B. In FIGS. 138A and 138B are shown the processing that the apparatus A (a source) that transmits a PUSH request is to execute for communication with the apparatus B (destination) that receives a PUSH request.

At step S1512, the apparatus A contacts the apparatus B to establish the connection for communication. At step S1513 a check is performed to determine where a reply is received from the apparatus B. If there is no response from the apparatus B, at step S1514 a check is performed to determine whether or not a user or another person should be notified of no response. If notification is necessary, at step S1515 a notification is issued to a user by an appropriate means/medium. At step S1516, according to the decision/ assumption of the system or the setup by the user, a check is performed to determine whether the task should be re-execute by the system later. If the re-execution of the task is necessary, at step S1517 the task is added to the task table, and the processing is thereafter terminated. If the re-execution of the task is not required, at step S1518 the task is deleted, and is added to "failed list". The processing is thereafter terminated.

When, at step S1513, a response is received, at step S1519 whether the response is "Will call back" is determined. If the response is "Will call back" the apparatus B will call back the apparatus A later. At step S1520, a check is performed to determine whether or not the user or another person should be notified of the response. If notification is necessary, at step S1521 the notification is issued to the user by an appropriate means/medium. At step S1522 the system adds the task to the task table, and remembers that the apparatus B will call back so as to cope with the call back. The processing is thereafter terminated.

If, at step S1519, the response is not "Will call back" at step S1523 whether the response is "Contact later" is determined. If the response is "Contact later" it is assumed that the apparatus B wants a contact later, and the above described processes at step S1514 and the following steps are performed. When, at step S1523, the response is not "Contact later" it is assumed that the response is "OK" and at step S1524 the response is confirmed. If the response is not "OK" an error occurs. At step S1531 an error message is displayed.

When the response is "OK" at step S1525 a check is performed to determine whether or not a negotiation with the apparatus B is required for the current operation. If the negotiation is required, at step S1526 a negotiation is initiated. The object to be negotiated includes a data format for data execute and protocol/version exchange, and a data format for other information required in advance for correct communication. This negotiation is repeated until the communication base used in common for the apparatuses A and B is established.

At step S1527 information to be transmitted is issued as a request from the apparatus A to the apparatus B. At step S1528, whether or not a response is received. When the response is received, at step S1529 a check is performed to determine whether there is an action to be executed relative to the received response. The action is, for example, conversion of a format or erasure of an unnecessary header. The object of the communication includes actions such as printing, transmission, filing, voice output and display. This means that necessary actions should be executed, and at step S1530 these actions are added to the task table.

When, at step S1528, there is no response, the above described processes at step S1514 and the following steps are performed. The above processing loop is continued until requested information is obtained or until the system can not continue the processing.

[Fifty-second Embodiment]

FIGS. 139A and 139B are flowcharts showing the processing for <INDICATE> task.

<INDICATE> task is performed when an arbitrary apparatus A needs to send an instruction to an apparatus B. In FIGS. 139A and 139B are shown the processing that the apparatus A (a source) that transmits an INDICATE request is to execute for communication with the apparatus B (destination) that receives an INDICATE request.

At step S1612, the apparatus A contacts the apparatus B to establish the connection for communication. At step S1613 a check is performed to determine where a reply is received from the apparatus B. If there is no response from the apparatus B, at step S1614 a check is performed to determine whether or not a user or another person should be notified of no response. If notification is necessary, at step S1615 a notification is issued to a user by an appropriate means/medium. At step S1616, according to the decision/assumption of the system or the setup by the user, a check is performed to determine whether the task should be re-execute by the system later. If the re-execution of the task is necessary, at step S1617 the task is added to the task table, and the processing is thereafter terminated. If the re-execution of the task is not required, at step S1618 the task is deleted, and is added to "failed list". The processing is thereafter terminated.

When, at step S1613, a response is received, at step S1619 whether the response is "Will call back" is determined. If the response is "Will call back" the apparatus B will call back the apparatus A later. At step S1620, a check is performed to determine whether or not the user or another person should be notified of the response. If notification is necessary, at step S1621 the notification is issued to the user by an appropriate means/medium. At step S1622 the system adds the task to the task table, and remembers that the apparatus B will call back so as to cope with the call back. The processing is thereafter terminated.

If, at step S1619, the response is not "Will call back" at step S1623 whether the response is "Contact later" is determined. If the response is "Contact later" it is assumed that the apparatus B wants a contact later, and the above described processes at step S1614 and the following steps are performed. When, at step S1623, the response is not "Contact later" it is assumed that the response is "OK" and at step S1624 the response is confirmed. If the response is not "OK" an error occurs. At step S1631 an error message is displayed.

When the response is "OK" at step S1625 a check is performed to determine whether or not a negotiation with the apparatus B is required for the current operation. If the negotiation is required, at step S1626 a negotiation is initiated. The object to be negotiated includes a data format for data execute and protocol/version exchange, and a data format for other information required in advance for correct communication. This negotiation is repeated until the communication base used in common for the apparatuses A and B is established.

At step S1627 according to the operation instruction by the user employing the operation unit 41, an instruction is issued as an request from the apparatus A to the apparatus B. At step S1628, a check is performed to determine whether or not a response is received. When the response is received, at step S1629 a check is performed to determine whether there is an action to be executed relative to the received response. The action is, for example, conversion of a format or erasure of an unnecessary header. The object of the communication includes actions such as printing, transmission, filing, voice output and display. This means that necessary actions should be executed, and at step S1630 these actions are added to the task table.

When, at step S1628, there is no response, the above described processes at step S1614 and the following steps are performed. The above processing loop is continued until requested information is obtained or until the system can not continue the processing.

[Fifty-third Embodiment]

FIGS. 140A and 140B are flowcharts showing the processing for <RESPOND> task.

<RESPOND> task is performed when an apparatus B (destination) that receives a COMMUNICATE request sends a response. In FIGS. 140A and 140B are shown the processing that is to be executed by the apparatus B that receives a COMMUNICATE request (e.g., PULL) from a transmission apparatus (source) A.

At step S1712 a check is performed to determine whether or not a request type is contact. If the request is contact, the apparatus A attempts to establish connection with the apparatus B for communication. At step S1713 the current status or a specific user's set value is allocated for status Si. At step S1314 whether the status S1 is a "Very busy" mode or a "Standby" mode is determined. If the status S1 is either mode, it is assumed that the apparatus B can not accept the request from the apparatus A. Then, at step S1715 the optimal response is decided. A check is performed to determine whether or not the apparatus B can call back the apparatus A any time. If the apparatus B can call back, program control moves to step S1716 and response "Will call back" is transmitted. If the apparatus B can not call back, at step S1717 response "Contact later" is transmitted. This means that the apparatus A must contact the apparatus B later. When, at step S1714, the status Al is neither a "Very busy" mode nor a "Standby" mode, response "OK" is transmitted. The processing is thereafter terminated.

When the request type is not contact, at step S1719 a check is performed to determine whether the request type is a request for information. If so, at step S1720 a response is transmitted relative to the request for information, which will be described later in FIG. 141. When the request type is not a request for information, at step S1721 a check is performed to determine whether the request type is a request for storage of information. If so, at step S1722 a response relative to the request for storage of information, which will be described later in FIG. 142, is issued. If the request type is not a request for storage of information, at step S1723 a check is performed to determine whether the request type is a request for an instruction. If so, at step S1724 a response relative to the request for an instruction, which will be described later, is issued. If the request type is not a request for an instruction, at step S1725 an optimal response is issued, and the processing is thereafter terminated.

FIG. 141 is a flowchart showing a response task relative to the request for information. In this flowchart, a process will be explained that is initiated when the request type is a request for information (step S1720 in FIGS. 140A and 140B).

At step S1812 a check is performed to determine whether or not negotiation is required with the apparatus A that issued the request for an instruction. If the negotiation is required, program control moves to step S1813, whereat the negotiation is initiated. The object to be negotiated includes a data format for data execute and protocol/version exchange, and a data format for other information required in advance for correct communication. This negotiation is repeated until the communication base used in common for the apparatuses A and B is established.

Following this, at step S1814 fetching of requested information is performed. At step S1815, a check is performed to determine whether or not the requested information is found. If the information is not found, at step S1816 response=NG is transmitted and the processing is terminated.

If the requested information is found, at step S1817 a check is performed to determine whether the information should be transferred immediately. If the immediate transmission is required, program control moves to step S1820, whereat a check is performed to determine whether or not data formatting or data conversion is required. If data formatting or data conversion is required, at step S1819 it is performed. Then, at step S1820 the requested information is transmitted as a response and the processing is thereafter terminated. If the immediate transmission is not required, program control moves to step S1821, whereat a task for transmitting the data later is added to the task table. At step S1822 response=OK is issued, and the processing is terminated.

FIG. 142 is a flowchart showing a response task relative to the request for storage of information. In this flowchart, a process will be explained that is initiated when the request type is a request for storage of information (step S1722 in FIGS. 140A and 140B).

At step S1912 a check is performed to determine whether or not negotiation is required with the apparatus A that issued the request for an instruction. If the negotiation is required, program control moves to step S2013, whereat the negotiation is initiated. The object to be negotiated includes a data format for data execute and protocol/version exchange, and a data format for other information required in advance for correct communication. This negotiation is repeated until the communication base used in common for the apparatuses A and B is established.

Following this, at step S1914 information transmitted for the apparatus A is acquired. At step S1915 whether or not the information is received is determined. If the information is not yet received, program control goes to step S1916, whereat response=NG is returned, and the processing is terminated. If the information received, whereat a check is performed to determine whether or not data formatting or data conversion is required. If data formatting or data conversion is required, at step S1918 it is performed. Then, at step S1919 response=OK is issued, and the processing is terminated.

FIG. 143 is a flowchart showing a response task relative to a request for an instruction. In this flowchart, a process will be explained that is initiated when the request type is a request for an instruction (step S1724 in FIGS. 140A and 140B).

At step S2012 a check is performed to determine whether or not negotiation is required with the apparatus A that issued the request for an instruction. If the negotiation is required, program control moves to step S1913, whereat the negotiation is initiated. The object to be negotiated includes a data format, conversion protocol, upgrading of a version, adjustments associated with alteration of information types, and specification of the instruction contents. The negotiation process is planed before this process is initiated.

Following this, at step S2014 instruction information is interpreted to decide a process to be performed next. At step S2015 a check is performed to determine whether or not the process can be executed. If the process can not be performed, response=NG is returned and the processing is terminated.

When the process can be performed, program control moves to step S2017, whereat whether or not immediate execution is required. If the process need not be performed immediately, program control goes to step S2020, whereat a task for designating the performance of a corresponding process is added to the task table, and response=OK is returned. The processing is thereafter terminated.

If the process should be immediately performed, program control advances to step S2018, whereat the instructed process is performed. The processing is thereafter terminated.

[Fifty-fourth Embodiment]

An explanation of PULL task, for example pull printing for extracting and printing information, i.e., an example print on demand process will now be given, by referring to FIG. 133.

In the example in FIG. 133, a user sends an instruction 1333 to a printer A1331 to extract information 1334 "contract.doc" included in an apparatus B1332 that is located physically away from the printer A and to permit the printer A to print the information 1334. The apparatus B can be a printer, a scanner, a desktop PC, or a filing server.

The contents "Please fetch 'contract.doc' from B and print it" which is an instruction from the user to the printer A1331, may be a command input using a mouse, or via a keyboard, by voice or a digitizer, or may be a sentence in the natural language by character recognition.

When the apparatus B is a different device type from the apparatus A, e.g., a scanner, the information formatting is TIFF, BMP or JPEG, and format conversion is required. This data conversion may be performed either by the apparatus B or by the printer A to obtain the appropriate data format. When the apparatus B is a printer and information of the apparatus B has a format that the printer A can understand (e.g., when both apparatuses A and B are PCL printers), data conversion is not required. In other cases, even when both apparatuses are printers, data conversion is necessary. It should be noted that the apparatus A is not necessary a printer, and may be another output device, such as a facsimile machine, a copier or a display.

The transmission of information for the PULL task will now be described. FIG. 144 is a diagram showing an example pull session. In this example, the apparatuses A and B are printers, but as is described above, the apparatuses A and B need not necessarily be the same device type, and can be a scanner, a printer, a copier or a facsimile machine.

The apparatus A performs the procedures in FIGS. 137A and 137B while the apparatus B performs the procedures in FIG. 141. First, the apparatus A contacts the apparatus B to establish a connection for communication (step S1412). When the response is OK (steps S1424 and S1822), a request for information (information <abc> in this example) and an information format, if necessary, are transmitted to the apparatus B (step S1427).

The apparatus B fetches the requested information (step S1814), converts the format, as needed (step S1819), and transmits information in response to the request (step S1820).

When the apparatus A extracts information from the apparatus B, it executes a necessary action in accordance with the instruction from the user or the determination of the system. The necessary action is, for example, printing, and in this case, pull printing is performed, i.e., information is extracted from a remote area and printed. In other words, print on demand can be accomplished.

Another necessary action is a display. In this case, pull viewing is performed, i.e., information is extracted from a remote area and displayed. In other words, view on demand can be accomplished. An additional necessary action is audio output. In this case, pull hearing is performed, i.e., information is extracted from a remote area and can be listened to. In other words, hear on demand can be accomplished.

Similarly, further necessary actions are storage, filing and transferring. Any type of information can be extracted; a document, a file, electronic mail, a schedule, a status report, a log, voice mail or telephone call.

[Fifty-fifth Embodiment]

FIG. 145 is a diagram showing another example pull session. Along the same procedure as in FIG. 144, the apparatus A requests information <abc> to the apparatus B. However, the apparatus B does not immediately transmits the requested information (No at step S1817). A task for transmitting the data later is added to the task table (step S1821), and response=OK is returned to terminate the processing (step S1822). In this case, the transfer of the requested information is a print request from the apparatus B after a new session is established.

[Fifty-sixth Embodiment]

FIG. 146 is a diagram showing an additional example pull session. In this example, a negotiation is held before the transfer of necessary information (steps S1425 and S1426 and steps S1812 to S1822). Since the information to be extracted by the apparatus A is a file, the apparatus A requests the apparatus B for a list of files. The apparatus B transmits the list of files to the apparatus A. From the list, the apparatus decides information necessary for the system or instructs the input of information necessary for a user. The apparatus A then decides the information to be requested, and issues a request for information to the apparatus B in the same manner as described above.

[Fifty-seventh Embodiment]

FIG. 147 is a diagram showing an example of Hear On Demand. In this example, "Read out New Mail" is input. While, in FIG. 147, an input window is employed for this input, any input device, such as a voice input device, a keyboard or a digitizer, can be employed as in the previous examples.

In this example, the above command is transmitted to an apparatus A (printer) at Kosugi, and mail to be output is stored in an apparatus B (desktop PC) at Shimomaruko. The apparatuses A and B may be located in the same place, or in the same or different network domain. This session will be described while referring to FIG. 148.

FIG. 148 is a diagram showing a further example pull session. Information type is electronic mail and a requested format is voice. The procedures are, however, the same as previously described.

The apparatus A requests the information (mail) (step S1427), the apparatus B converts the requested data into a suitable format (voice format in this example) (step S1819), and sends a response. Then, the apparatus A performs an optimal action. Since the optimal action is output of information by voice, the contents of mail is read aloud. While, in this example, the apparatus B converts text data into voice format, when the apparatus B can not convert the data the apparatus A may perform such conversion before the data output.

[Fifty-eighth Embodiment]

FIG. 149 is a diagram for explaining another pull task. In this example, an apparatus C is employed to issue a command to an apparatus A. The apparatus A is a display, and an instruction "Display my schedule" is issued to the apparatus C. Although the communication is not specified in the instruction, it means that a user extracts schedule data from the apparatus B (user's desktop PC) and displays it on the apparatus A.

While the information type is schedule information, the procedures for this is the same as explained previously.

[Fifty-ninth Embodiment]

FIG. 150 is a diagram for explaining an example push task. In this example, an apparatus A that receives a command is a scanner. The command shown in FIG. 150 is issued to instruct the apparatus A to transmit a document obtained by scanning to an apparatus B (printer) and to instruct the apparatus B to hold the document instead of printing it. This session will now be described.

FIG. 151 is a diagram showing a session for the push task in FIG. 150. As is described above, the apparatus A is a scanner and the apparatus B is a printer.

The apparatus A performs the procedures in FIGS. 138A and 138B while the apparatus B performs the procedures in FIG. 132. First, the apparatus A contacts the apparatus B to establish a connection for communication (step S1512). Assume that the response is OK (steps S1524 and S1718).

Then, transfer of information (information <abc>) is requested. Since the request type is a request storage of information, the apparatus performs the procedures in FIG. 142. At the negotiation (step S1526 and S1913), the apparatus B requests the apparatus A for a format (<xyz>) of information to be transferred.

The apparatus A changes the format, if necessary, and transmits the requested information (step S1527). Upon the receipt of the information, the apparatus B performs a required action according to the decision of the transmission side, the user or the apparatus B. The action is, for example, format conversion, filing, index preparation, data extraction, or title extraction. The necessary action in this embodiment is to hold a received document instead of printing it.

[Sixtieth Embodiment]

FIG. 152 is a diagram showing another example push task. The apparatus A, which is a scanner in this example, sends a request to the apparatus B (scanner) and the apparatus C (filing server) to push information, to file a document on a reception side and to extract its title and index.

The specific processing is the same as that in the fifty-ninth embodiment. The session between the apparatuses A and B will now be described while referring to FIG. 153. The same thing is applied for the session between the apparatuses A and C. Communication between the apparatuses A and B and communication between the apparatuses A and C are performed in parallel.

FIG. 153 is a diagram showing an example push session. The apparatuses A and B are scanners. when the apparatus B receives data, it performs a required action. In this case, the apparatus A transmits information for designating an associated action that should be executed. The action is filing and extraction of a title and an index. While in this example the action is instructed from the apparatus A, the apparatus B may decide an action, and may abandon a received action.

[Sixty-first Embodiment]

FIG. 154 is a diagram showing another example push task, which is a transmission of electronic mail. An apparatus A (printer) at Kosugi is to transmit electronic mail "Get design from Bill" to an apparatus B (having a different network sub-domain from John's PC and the apparatus A) in New York.

Any method can be used for mail transmission. First, when the apparatus A has a mail transmission function, it transmits the mail. If the apparatus A does not have such a function, it transmits mail information to another apparatus on the network, e.g., a mail server, and asks the mail transmission.

[Sixty-second Embodiment]

The instruction task INDICATE will be described while referring to FIG. 132. A user sends an instruction 93 to a copier 91 that is physically located in a remote area in order to permit a MyDesk 92, a desktop personal computer, to display the current location of the user.

The instruction 93 "Display present place on <MyDesk>", which is sent to the copier 91 that serves as the information processing apparatus 411, is transmitted from the operation unit 41 to the task reception unit 43. The contents are analyzed and planning is performed on the results. Then, the execution unit 47 executes the final data as an instruction task INDICATE for a PC 92, which serves as the information processing apparatus 412 connected via the network.

The PC 92, which is the information processing apparatus 412 connected via the network, receives instructed information from the reception unit 43, analyzes a received instruction, and perform planning on the results. Then, the execution unit 47 displays the location, such as "Now in conference Shimomaruko A111 conference room" on a screen.

Transmission of information for each session between the information processing apparatuses 411 and 412 will be explained while referring to FIG. 155. FIG. 155 is a diagram showing transmission of information for each session between a copier, which serves as the information processing apparatus 411 for instruction task INDICATE, and a PC, which serves as the information processing apparatus 412.

The transmission side performs the processing in FIGS. 139A and 139B, while the reception side performs the processing in FIG. 143. The communication contents are an instruction and information for processing corresponding to the instruction. The transmission of information is the same as that in the above described push task.

In response to the instruction request from the apparatus A, the apparatus B transmits <xyz> instruction type that can be understood by the apparatus B. Upon receipt of the information, the apparatus A changes the instruction information, as needed.

Then, the apparatus A issues, to the apparatus B, an instruction and necessary information to display on the PC screen the fact that a conference is being held and the current location. The apparatus B receives the information, performs the process in consonance with the information, and displays the location of the user on the screen, as is instructed.

[Sixty-third Embodiment]

Another example instruction task INDICATE will now be described while referring to FIG. 130. A user sends an instruction 71 to a copier 74 at a physically remote area in order to set a facsimile machine 75 at Shinkawasaki so that it transfers, to a printer 77 of Mr. Toyoda at Kosugi, a document that is received from Mr. Suzuki.

The instruction 71 "Please advice MyFax to transfer any document sent from Mr. Suzuki to Mr. Toyoda" which is sent to the copier 74 that serves as the information processing apparatus 411, is transmitted from the operation unit 41 to the task reception unit 43. The contents are analyzed and planning is performed on the results. Then, the execution unit 47 executes the final data as an instruction task INDICATE for the facsimile machine 75, which serves as the information processing apparatus 412 connected via the network.

The facsimile machine 75, which is the information processing apparatus 412 connected via the network, receives instruction information from the reception unit 43, analyzes a received instruction, and perform planning on the results. Then, the execution unit 47 alters the condition setting. The transmission of information for each session between the information processing apparatuses 411 and 412 will be described while referring to FIG. 156.

FIG. 156 is a diagram showing transmission of information for each session between a copier, which serves as the information processing apparatus 411 in this example instruction task INDICATE, and a facsimile machine, which swerves as the information processing apparatus 412. The transmission side performs the processing in FIGS. 139A and 139B, while the reception side performs the processing in FIG. 143. The transmission of information is the same as that in the above described example.

In response to the instruction request from the apparatus A, the apparatus B transmits <xyz> instruction type that can be understood by the apparatus B. Upon receipt of the information, the apparatus A changes the instruction information, as needed. In this example, the apparatus A transmits to the apparatus B an instruction and necessary information to transfer, to Mr. Toyoda, a document that is transmitted from the Mr. Suzuki and addresses the user. Upon receipt of the information, the apparatus B performs the required processing in consonance with the information, and sets a designated condition.

[Sixty-fourth Embodiment]

An additional example instruction task INDICATE will now be described while referring to FIG. 135. A user sends an instruction 123 to a scanner 121 at a physically remote area in order to instruct a filing server 122 to transfer a stored document 125 "abc.doc" to John 124.

The instruction 123 "Action: SEND, What: r, From: Filing Server, To: John" which is sent to the scanner 121 that serves as the information processing apparatus 411, is transmitted from the operation unit 41 to the task reception unit 43. The contents are analyzed and planning is performed on the results. Then, the execution unit 47 executes the final data as an instruction task INDICATE for the filing server 122, which serves as the information processing apparatus 412 connected via the network.

The filing server 122, which is the information processing apparatus 412 connected via the network, receives instruction information from the reception unit 43, analyzes a received instruction, and perform planning on the results. Then, the execution unit 47 transmits a document. The transmission of information for each session between the information processing apparatuses 411 and 412 will be described while referring to FIG. 157.

FIG. 157 is a diagram showing transmission of information for each session between a scanner, which serves as the information processing apparatus 411, and a filing server, which serves as the information processing apparatus 412. The transmission side performs the processing in FIGS. 139A and 139B, while the reception side performs the processing in FIG. 143. The transmission of information is the same as that in the above described example.

In response to the instruction request from the apparatus A, the apparatus B transmits <xyz> instruction type that can be understood by the apparatus B. Upon receipt of the information, the apparatus A changes the instruction information, as needed. In this example, the apparatus A transmits to the apparatus B an instruction and necessary information to transfer, to John, a document "abc.doc" that is stored in the filing server.

Upon receipt of the information, the apparatus B performs the required processing in consonance with the information, decides an optimal transmission method, such as E-mail, and transmits the document to John as is instructed.

[Sixty-fifth Embodiment]

FIG. 158 is a diagram showing an operation along the procedures of another apparatus. In the sixty-fourth embodiment explained while referring to FIG. 135, a user sends an instruction to the scanner 121 that is located at a physically remote area, in order to instruct the filing server 122 to transfer the stored document 125 "abc.doc" to the John's desktop 124. And the scanner 121 interprets contents and executes the instruction task INDICATE.

In this embodiment, however, a printer 351 receives operation information 353 from a filing server 352 and displays it, and a user performs operation in accordance with the display and transmits the operation data to the filing server 352. In this manner, the same effect as in the sixty-fourth embodiment can be obtained.

When a user requests the printer 351, which serves as the information processing apparatus 411, to operate the filing server 352, a planning decision unit 46 in the printer 351 makes a plan that necessary operation data 353 should be obtained to implement the operation procedures of the filing server 352. The process execution unit 47 executes the information acquisition task PULL for the filing server 352, which is the information processing apparatus 412 connected via the network.

The filing server 352, which is the information processing apparatus 412 connected via the network, receives instruction request information from the reception unit 43, analyzes a received request, and perform planning on the results. Then, the execution unit 47 transmits the operation data 353.

A screen is provided on the operation unit 41 of the scanner 351, which receives the operation data 353 from the filing server 352, and the operation unit 41 displays, on the screen, the procedures of the filing server 352 that correspond to the operation data 353.

According to the displayed operation screen, the information concerning the operation of the user is transmitted to the filing server 352 in the same manner. The filing server 352 that receives the operation of the user interprets it and performs a necessary process. As a result, transmission of the file "abc.doc" to John, which is the object to the user, is enabled.

In the above description, the filing server 352 transmits the operation data 353 for implementing the operation procedures of the filing server 352; however, an operation data server may be prepared for managing the operation data 353, and may transmit the operation data 353. The operation data may also be transmitted from the third information processing apparatus that receives the operation data 353 of the filing server 352, like the printer 351 that serves as the information processing apparatus 411. The printer 351 may be replaced with a scanner.

[Sixty-sixth Embodiment]

FIG. 162 is a diagram showing the relationship between the change to three statuses of a print job and processes corresponding to the individual statuses. An output device (printer), which serves as the information processing apparatus 411, receives a print job that includes a document for which a user instructed printing.

First, an input job determination unit 391 determines whether a received print job should be immediately printed or should be held until a print execution condition is established. The result is transmitted to a pending job management unit 392 or an output wait job management unit 394.

The pending job management unit 392 stores the received print job as a pending job in a pending job table 393. The pending job management unit 392 examines the pending job table 393 for the job for which print execution condition is established. If such a job is found, it is extracted from the pending job table 393. The pending job for which the print condition is established is transmitted to the output wait job management unit 394.

The output wait job management unit 394 stores a received print job as an output wait job in an output wait job table 395. When printing at the output unit 396 is enabled, the output wait job is extracted from the output wait job table 395 and transmitted to the output unit 396.

The output unit 396 prints the received job. When printing is successful, the print job is transmitted to an output job management unit 397 to store the print job that has been output.

The output job management unit 397 stores, as an output job, the received print job that has been output in an output job table 398.

As is described above, the received print job is changed into three statues and processed. The print execution condition of a pending job is not only a condition where the job is held until the user instructs printing, but also a condition where printing is initiated at a designated time, or a condition where, if the main printer is other than printer A that serves as the information processing apparatus 411, the main printer is ready for printing.

FIGS. 163A and 163B are flowcharts showing the printing processing for this embodiment. The processing of a print task "PRINT (A, 'abc.doc')" or "PRINT (not A, 'abc.doc')" is performed when an instruction is issued to the printer A, which is the information processing apparatus 411, to print document "abc.doc" by the printer A and by a printer other than the printer A.

When the print task PRINT is activated, at step S4001 a check is performed to determine whether or not a document to be printed is included in a print job. When there is no document to be printed, program control moves to step S4002. At step S4002 a check is performed to determine whether the document is included among the documents in the print jobs that are entered in the pending job table 393, the output wait job table 395 or the output job table 398. When, at step S4003, the document is not found, program control advances to step S4004.

At step S4004 the information acquisition task PULL is performed in order to acquire the document from another information processing apparatus 412. If, at step S4005, it is ascertained that the document is successfully acquired, program control advances to step S4006. If the acquisition of the document fails, program control moves to step S4016, whereat an error is displayed and another necessary process is performed. The processing is thereafter terminated. At step S4006 a check is performed to determine whether the document to be printed can be printed by the printer A, which is the information processing apparatus 411, or by a printer other than the printer A. If the conversion of the document into a printer description language is required, program control moves to step S4007.

At step S4007 a check is performed to determine whether or not the printer A, which is the information processing apparatus 411, can convert the document form. If the conversion is possible, program control goes to step S4008, whereat the document to be printed is converted into a suitable form. When the conversion is impossible, program control goes to step S4009, whereat instruction INDICATE is issued to another information processing apparatus 412 to convert the document to be printed. According to the instruction INDICATE, the information processing apparatus 412 may immediately perform the conversion and return the result, or may return only an acknowledgement and perform conversion after printing is instructed later.

At step S4010 a check is performed to determine whether or not the conversion result is successful. If it is successful, program control advances to step S4011. If the conversion fails, program control moves to step S4016, whereat an error is displayed and another required process is performed. The processing is thereafter terminated.

At step S4011 a check is performed to determine whether or not the printer A, which is the information processing apparatus 411, should print a document. When it is determined the printer A should print the document, program control advances to step S4012, and the document is printed. When the information processing apparatus 412 should print the document, program control goes to step S4013, and the information storage task PUSH and print task PRINT for the information processing apparatus 412 are performed.

At step S4014, whether or not the printing is successful is determined. When the printing is successful, program control advances to step S4015, and the print job is regarded as the output job, which is then stored in the output job table 398. The other necessary process is performed, and the processing is terminated. When the printing fails, program control moves to step S4016, whereat an error is displayed and another required process is performed. The processing is thereafter terminated.

The conversion of the document at step S4008 includes a conversion of a normal text document into a document in a printer description language; a conversion of a document in a specific printer language into another printer language that the employed printer can understand; a conversion of an image format document read by a scanner or a digital camera into a document in a printer language; or a conversion of a document in the common language in WWW into a printer language.

The conversion instruction INDICATE at step S4009 may be an instruction to the information processing apparatus 412 that has a specific application to convert a document in a language inherent to the corresponding application into a document in a printer language that can be printed; or an instruction to the information processing apparatus 412 that has a specific printing function to convert a document in a language inherent to a specific printer into a document in a printer language that can be printed.

FIG. 164 is a diagram showing the relationship between the print job and the processing, which are explained while referring to FIGS. 162 and 163, and the user's operation. When a user permits the scanner A411, which serves as the information processing apparatus 412, to read document "abc.doc" 144 and issues an instruction "Send 'abc.doc' to printer B" the printer B 412, which serves as the information processing apparatus 411 that receives the print job, does not print "abc.doc" immediately, but regards it as a pending job and stores it in the pending job table 393.

When the user sends an instruction "Show pending documents" the document "abc.doc" is displayed on the operation panel of the printer B. Furthermore, when the user designates the document "abc.doc" and issues an erasure instruction "Delete pending document" the designated document is deleted from the pending job table 393.

When the user designates the document "abc.doc" and issues an instruction "Print pending document" the document "abc.doc" is changed to a print wait job, which is then stored in the output wait job table 395. When the printing is enabled, it is printed (415).

When the printing is successful, the document "abc.doc" is changed to the output job, which is then stored in the output job table 395. In addition, when the user designates the output document "abc.doc" and issues an erasure instruction "Delete printed document" the designated document is deleted from the output job table 398.

FIG. 165 is a diagram showing an example display screen that is used by a user to operate a print job in the three statues as explained in FIG. 162. In accordance with the operation by a user, an instruction from the information processing apparatus 412, or the result obtained by the process performed by the information processing apparatus 411, the print jobs in the three statuses are operated arbitrarily, and are added as a new task to the task table 399.

For example, a user utilizes the operation screen in FIG. 165 to delete (4209) a print job stored in the pending job table 393 (4201), to send (4208) the print jot to print using another printer, or to print it immediately. It is also possible to instruct to increase the priority (4210) of a print job stored in the output wait job table 395 (4202) so that it will be printed first, or a print job, or to print (4204) again the print job stored in the output job table 398 (4203).

The present invention can be applied either for a system that is constructed by a plurality of apparatuses (e.g., a host computer, an interface device, a display) or for an apparatus including a single device.

The following is also included within the scope of the present invention: in order to operate various devices to implement functions in the above embodiments, software program code for implementing the functions in the previous embodiments are supplied to a computer in an apparatus or in a system that is connected to various devices, and in consonance with the program, the computer (or a CPU or an MPU) in the system or the apparatus operates the devices to accomplish the functions in the above embodiments. In this case, the program code read from a memory medium accomplishes the functions of the above described embodiments. And the program code and means for supplying the program code to the computer, e.g., a memory medium on which such program code is recorded, constitute the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, not only for a case where the functions in the previous embodiments can be performed when program code is read and executed by the computer, but also for a case where, according to an instruction in the program code, an OS (Operating System) running on the computer, or another application software program, interacts with the program code to accomplish the functions in the above embodiments, this program code can be included in the embodiments of the present invention.

Furthermore, the present invention includes a case where program code, read from a memory medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

When the present invention is applied for the above memory medium, program code corresponding to the previously described flowcharts is stored in the memory medium.

What is claimed is:

1. A printing apparatus comprising:
communication means for communicating with an external printer;
printing means for printing out information;
determination means for determining statuses of said printing apparatus itself and said external printer;
request means for making a request of said external printer for information to be printed out by said external printer based on the statuses obtained by said determination means;
receiving means for receiving the information to be printed out from said external printer in response to the request; and
control means for permitting said printing means to print out the information received by said receiving means in place of said external printer.

2. An information processing apparatus comprising:
communication means for communicating with a plurality of printers;
Input means for receiving document information to be printed out and designation information for designating one of the plurality of printers to print out the document information;
detection means for detecting statuses of the plurality of printers through said communication means;
determination means for determining whether or not the printer designated by the designation information is suitable to print out the document information and for selecting another one of the plurality of printers to print out the document information if the designated printer is determined not to be suitable, based on the statuses of the plurality of printers;
selection means for selecting another one of the plurality of printers suitable to print out the document information if the designated printer is determined not to be suitable, based on the statuses of the plurality of printers; and
Control means for transmitting the document information through said communication means to the another one of the plurality of printers selected by said selection means and requesting the selected printer to print out the document information.

3. An information processing apparatus comprising:
reception means for receiving information to be processed;
processing means for processing said information;
conversion control means for controlling a conversion of said information that is received by said reception means into information, described using a description language, that is to be processed by said processing means; and
processing control means for controlling said reception means to receive the converted information from said external device and for controlling said processing means to process the converted information.

4. An information processing apparatus according to claim 3, wherein an object for the conversion is information described in a language inherent to a specific application or to an output device.

5. An information processing apparatus according to claim 3, wherein said information that is received as an object for conversion is either a text document, an image format, a specific printer description language, or a document description language.

6. A printing method comprising:
a communication step of communicating with an external printer;
a printing step of printing out information;
a determination step of determining statuses of said printing apparatus itself and said external printer;
a requesting step of making a request of said eternal printer for information to be printed out by said external printer based on the statuses obtained by said determination step;
a receiving step of receiving the information to be printed out from said external printer in response to the request; and
a control step of permitting said printing step to print out the received information in place of said external printer.

7. An information processing method comprising:
a communication step of communicating with an a plurality of printers;
an input step of receiving document information to be printed out and designation information for designating one of the plurality of printers to print out the document information;
a detecting step of detecting statuses of the plurality of printers through said communication step;
a determination step of determining whether or not the printer designated by the designation information is suitable to print out the document information and for selecting another one of the plurality of printers to print out the document information if the designated printer is determined not to be suitable, based on the statuses of the plurality of printers;
a selection step of selecting another one of the plurality of printers suitable to print out the document information if the designated printer is determined not to be suitable, based on the statuses of the plurality of printers; and
a control step of transmitting the document information to the another one of the plurality of printers selected by said selection step at said communication step and of requesting the selected printer to print out the document information.

* * * * *

UNITED STATES PATENT AND TRADEMARK OFFICE
CERTIFICATE OF CORRECTION

PATENT NO. : 6,567,176 B1
DATED : May 20, 2003
INVENTOR(S) : Suresh Jeyachandran et al.

It is certified that error appears in the above-identified patent and that said Letters Patent is hereby corrected as shown below:

<u>Drawings,</u>
Sheet 19, FIG. 18, "PLOBLEM" should read -- PROBLEM --.
Sheet 28, FIG. 38, "EXESTS" should read -- EXISTS --.
Sheet 105, FIG. 117, "TRANMITTED" should read -- TRANSMITTED --.
Sheet 139, FIG. 148, "MASSAGE" should read -- MESSAGE --.

<u>Column 1,</u>
Line 18, "apparatus-can" should read -- apparatus can --.

<u>Column 2,</u>
Line 26, "transmitted-to" should read -- transmitted to --.

<u>Column 5,</u>
Line 12, "ing." should read -- ing --.

<u>Column 6,</u>
Line 18, "an." should read -- an --.

<u>Column 7,</u>
Line 27, "information;" should read -- information; and --.

<u>Column 8,</u>
Line 21, "those" should read -- like those --; and
Line 57, "an" should read -- by an --.

<u>Column 12,</u>
Line 43, "example" should read -- an example of --.

<u>Column 14,</u>
Line 43, "scanner;" should read -- scanner. --.

<u>Column 17,</u>
Line 25, "for" (second occurrence) should be deleted.

<u>Column 23,</u>
Line 51, "silo." should read -- S110. --.

<u>Column 25,</u>
Line 11, "window-in" should read -- window in --;
Line 15, "is the" should be deleted; and
Line 29, "acquire" should read -- Acquire --.

UNITED STATES PATENT AND TRADEMARK OFFICE
CERTIFICATE OF CORRECTION

PATENT NO.    : 6,567,176 B1
DATED         : May 20, 2003
INVENTOR(S)   : Suresh Jeyachandran et al.

It is certified that error appears in the above-identified patent and that said Letters Patent is hereby corrected as shown below:

Column 27,
Line 13, "process" should read -- process for --; and
Line 47, "affecting" should read -- effecting --.

Column 31,
Line 15, "sued" should read -- used --.

Column 41,
Line 26, "letter" should read -- a letter --;
Line 37, "where" should read -- Where --;
Line 51, "S710" should read -- S710, --; and "(where" should read -- (Where --;
Line 61, "show" should read -- shows --; and
Line 63, "is." should read -- it is. --.

Column 42,
Line 13, "respond" should read -- respond to --; and
Line 55, "is" should read -- are --.

Column 43,
Line 1, "event" (first occurrence) should read -- event takes --.

Column 44,
Line 56, "being" should be deleted.

Column 49,
Line 41, "on" should read -- on the --.

Column 51,
Line 25, "of" should read -- of the --.

Column 52,
Line 23, "at" should read -- At --.

Column 54,
Line 10, "user" (first occurrence) should read -- user and --.

Column 55,
Line 28, "knowledge-of" should read -- knowledge of --.

UNITED STATES PATENT AND TRADEMARK OFFICE
CERTIFICATE OF CORRECTION

PATENT NO. : 6,567,176 B1
DATED : May 20, 2003
INVENTOR(S) : Suresh Jeyachandran et al.

It is certified that error appears in the above-identified patent and that said Letters Patent is hereby corrected as shown below:

Column 57,
Line 25, "document" should read -- document, --;
Line 26, "Tom" should read -- Tom, --;
Line 29, "to M." should read -- to Mr. --;
Line 44, "described" should read -- given describing --; and
Line 45, "action" should read -- action is --.

Column 59,
Line 51, "43receives" should read -- 43 receives --.

Column 62,
Line 54, "perform" should read -- performs --.

Column 64,
Line 11, "need" should read -- need to --.

Column 66,
Line 23, "need" should read -- needs --.

Column 68,
Line 46, "Si." should read -- S1. --.

Column 70,
Line 61, "necessary" should read -- necessarily --.

Column 71,
Line 38, "transmits" should read -- transmit --.

Column 72,
Line 28, "is" should read -- are --.

Column 73,
Line 5, "when" should read -- When --; and
Line 44, "perform" should read -- performs --.

Column 74,
Line 25, "perform" should read -- performs --; and
Line 34, "swerves" should read -- serves --.

Column 75,
Lines 1 and 52, "perform" should read -- performs --.

UNITED STATES PATENT AND TRADEMARK OFFICE
CERTIFICATE OF CORRECTION

PATENT NO. : 6,567,176 B1
DATED : May 20, 2003
INVENTOR(S) : Suresh Jeyachandran et al.

It is certified that error appears in the above-identified patent and that said Letters Patent is hereby corrected as shown below:

<u>Column 79, line 22 through Column 80, line 65,</u>
Claims 1-7 should be deleted and substituted with the following claims 1-7:

--1. A printing apparatus comprising:

communication means for communicating with an external printer;

printing means for printing out information;

determination means for determining statuses of said printing apparatus itself and said external printer;

request means for making a request of said external printer for information to be printed out by said external printer if it is determined that said printing apparatus itself is idle and that the external printer is busy, based on the statuses obtained by said determination means;

receiving means for receiving the information to be printed out from said external printer in response to the request; and control means for permitting said printing means to print out the information received by said receiving means in place of said external printer.

2. An information processing apparatus comprising:

communication means for communicating with a plurality of printers;

input means for receiving document information to be printed out and designation information for designating one of the plurality of printers to print out the document information;

detection means for detecting statuses of the plurality of printers through said communication means;

determination means for determining whether or not the printer designated by the designation information is suitable to print out the document information;

selection means for selecting another one of the plurality of printers suitable to print out the document information if the designated printer is determined not to be suitable, based on the statuses of the plurality of printers, said selecting means selecting a specified printer if a transfer of document information to the specified printer is set in the status of the designated printer; and control means for transmitting the document information through said communication means to the another one of the plurality of printers selected by said selection means and requesting the selected printer to print out the document information.

UNITED STATES PATENT AND TRADEMARK OFFICE
CERTIFICATE OF CORRECTION

PATENT NO. : 6,567,176 B1
DATED : May 20, 2003
INVENTOR(S) : Suresh Jeyachandran et al.

It is certified that error appears in the above-identified patent and that said Letters Patent is hereby corrected as shown below:

Column 79, line 22 through Column 80, line 65 (cont'd),

3. An information processing apparatus comprising:

reception means for receiving information to be processed;

processing means for processing said information;

conversion control means for controlling a conversion of said information that is received by said reception means by transmitting the information to an external device and for requesting the external device to perform the conversion of the information into information, described using a description language, that is to be processed by said processing means; and processing control means for controlling said reception means to receive the converted information from said external device and for controlling said processing means to process the converted information.

4. An information processing apparatus according to claim 3, wherein an object for the conversion is information described in a language inherent to a specific application or to an output device.

5. An information processing apparatus according to claim 3, wherein said information that is received as an object for conversion is either a text document, an image format, a specific printer description language, or a document description language.

6. A printing method comprising:

a communication step, of communicating with an external printer;

a printing step, of printing out information;

a determination step, of determining statuses of a printing apparatus that is being used in performing said printing method and of said external printer;

a requesting step, of making a request of said eternal printer for information to be printed out by said external printer if it is determined that the printing apparatus itself is idle and that the external printer is busy, based on the statuses obtained in said determination step;

a receiving step, of receiving the information to be printed out from said external printer in response to the request; and a control step, of permitting said printing step to be performed, to print out the received information in place of said external printer.

UNITED STATES PATENT AND TRADEMARK OFFICE
CERTIFICATE OF CORRECTION

PATENT NO. : 6,567,176 B1
DATED : May 20, 2003
INVENTOR(S) : Suresh Jeyachandran et al.

It is certified that error appears in the above-identified patent and that said Letters Patent is hereby corrected as shown below:

<u>Column 79, line 22 through Column 80, line 65 (cont'd),</u>

7. An information processing method comprising:

a communication step, of communicating with an a plurality of printers;

an input step, of receiving document information to be printed out and designation information for designating one of the plurality of printers to print out the document information;

a detecting step, of detecting statuses of the plurality of printers through said communication step;

a determination step, of determining whether or not the printer designated by the designation information is suitable to print out the document information;

a selection step, of selecting another one of the plurality of printers suitable to print out the document information if the designated printer is determined not to be suitable, based on the statuses of the plurality of printers, said selecting step including selection of a specified printer if a transfer of document information to the specified printer is set in the status of the designated printer; and a control step, of transmitting the document information to the another one of the plurality of printers selected by said selection step at said communication step and of requesting the selected printer to print out the document information.--

Signed and Sealed this

Thirteenth Day of September, 2005

JON W. DUDAS
*Director of the United States Patent and Trademark Office*